United States Patent
Kamo et al.

(10) Patent No.: US 7,206,143 B2
(45) Date of Patent: Apr. 17, 2007

(54) IMAGE-FORMATION OPTICAL SYSTEM, AND IMAGING SYSTEM INCORPORATING THE SAME

(75) Inventors: Yuji Kamo, Hino (JP); Toshihide Nozawa, Hachioji (JP)

(73) Assignee: Olympus Corporation, Shibuya-ku Tokyo (JP)

( * ) Notice: Subject to any disclaimer, the term of this patent is extended or adjusted under 35 U.S.C. 154(b) by 0 days.

(21) Appl. No.: 10/838,638

(22) Filed: May 5, 2004

(65) Prior Publication Data

US 2004/0228009 A1 Nov. 18, 2004

(30) Foreign Application Priority Data

| May 13, 2003 | (JP) | ............................. 2003-134222 |
| Jun. 13, 2003 | (JP) | ............................. 2003-168780 |
| Jun. 13, 2003 | (JP) | ............................. 2003-168781 |
| Jun. 30, 2003 | (JP) | ............................. 2003-186642 |
| Jul. 2, 2003 | (JP) | ............................. 2003-190197 |

(51) Int. Cl.
*G02B 9/34* (2006.01)

(52) U.S. Cl. ..................... 359/771; 359/774
(58) Field of Classification Search ............... 359/771, 359/772, 774, 778, 749, 753
See application file for complete search history.

(56) References Cited

U.S. PATENT DOCUMENTS 3,944,339 A * 3/1976 Momiyama ................. 359/774
6,747,810 B2 * 6/2004 Sato ........................... 359/774

FOREIGN PATENT DOCUMENTS

| JP | 55-096915 | 7/1980 |
| JP | 63-199312 | 8/1988 |
| JP | 01-128025 | 5/1989 |
| JP | 02-137812 | 5/1990 |
| JP | 05-040220 | 2/1993 |
| JP | 2000-028914 | 1/2000 |
| JP | 2001-281539 | 10/2001 |

* cited by examiner

*Primary Examiner*—Alicia M Harrington
(74) *Attorney, Agent, or Firm*—Kenyon & Kenyon LLP

(57) ABSTRACT

The invention relates to an image-formation optical system capable of achieving wide-angle arrangement and compactness at the same time and an imaging system that incorporates the same. The image-formation optical system is made up of, in order from its object side, a first positive lens L1, a second negative lens L2, a third positive lens L3 and a fourth positive lens L4. The composite focal length of the first positive lens L1 and the second negative lens L2 is positive, or the composite focal length of the second negative lens L2, the third positive lens L3 and the fourth positive lens L4 is negative.

44 Claims, 39 Drawing Sheets

IMAGE-FORMATION OPTICAL SYSTEM, AND IMAGING SYSTEM INCORPORATING THE SAME

This application claims the benefits of Japanese Applications No. 2003-134222 filed in Japan on May 13, 2003, No. 2003-168780 and No. 2003-168781 filed in Japan on Jun. 13, 2003, No. 2003-186642 filed in Japan on Jun. 30, 2003, and No. 2003-190197 filed in Japan on Jul. 2, 2003, the contents of which are herein incorporated by this reference.

BACKGROUND OF THE INVENTION

The present invention relates generally to an image-formation optical system and an imaging system that incorporates the same. More particularly, the invention is concerned with imaging systems such as digital still cameras, digital video cameras, cellular phones, personal computers, small-format cameras mounted on motor cars, surveillance cameras or the like, all harnessing solid-state image pickup devices, e.g., CCDs or CMOSs, In recent years, electronic cameras using solid-stage image pickup devices such as CCDs or CMOSs to take subject images have come into wide use in place of silver-halide film cameras. For imaging systems mounted on portable computers, cellular phones, etc. among those electronic cameras, size and weight reductions are especially demanded.

Some conventional image-formation optical systems used with such imaging systems are made up of one or two lenses. With those optical systems, however, any high performance is not expectable because of their inability to correct field curvature, as already known from discussions about aberrations. To achieve high performance, therefore, it is required to use three or more lenses.

However, even three-lens constructions have their own limitation in view of performance. For instance, when three-lens construction is applied to a CCD camera of as many as about 2,000,000 pixels, only marginal performance improvement is obtained even with recourse to some aspheric surfaces.

Thus, four-lens constructions comprising three lenses plus one lens are now envisaged. For a typical four-lens construction type, an inverted Ernostar type comprising +−++ lenses is known.

Prior inverted Ernostar types are typically known from the following patent publications 1, 2, 3, 4, 5, 6 and 7.

Patent Publication 1
JP-A 55-96915
Patent Publication 2
JP-A 63-199312
Patent Publication 3
JP-A 1-128025
Patent Publication 4
JP-A 2-137812
Patent Publication 5
JP-A 5-40220
Patent Publication 6
JP-A 2000-28914
Patent Publication 7
JP-A 2001-281539

With the conventional inverted Ernostar types, however, neither is any tradeoff between wide-angle arrangement and size reductions obtained, nor is any compromise achieved between size reductions and high performance.

SUMMARY OF THE INVENTION

In consideration of such problems with the prior art as mentioned above, one object of the present invention is to provide an image-formation optical system that can meet demands for a sensible tradeoff between wide-angle arrangement and significant compactness, and an imaging system that incorporates the same.

Another object of the present invention is to provide an image-formation optical system that can meet demands for a sensible compromise between significant compactness and high performance, and an imaging system that incorporates the same.

Yet another object of the present invention is to provide an image-formation optical system that has high performance albeit being less expensive, and an imaging system that incorporates the same.

To accomplish the above objects, the present invention is embodied as the following $1^{st}$ to $5^{th}$ aspects.

The image-formation optical system according to the first embodiment of the first aspect of the invention is characterized in that a first positive lens, a second negative lens of double-concave shape, a third positive lens and a fourth positive meniscus lens convex on its object side are located in order from the object side of the image-formation optical system, wherein the composite focal length of the first positive lens and the second negative lens is positive.

The image-formation optical system according to the second embodiment of the first aspect of the invention is characterized in that a first positive lens of double-convex shape, a second negative lens, a third positive lens and a fourth positive lens of a meniscus shape convex on its object side are located in order from the object side of the image-formation optical system, wherein the composite focal length of the second negative lens, the third positive lens and the fourth positive lens is negative.

The image-formation optical system according to the third embodiment of the first aspect of the invention is characterized in that a first positive lens of double-convex shape, a second negative lens, a third positive lens of double-convex shape and a fourth positive lens of a meniscus shape convex on its object side are located in order from the object side of the image-formation optical system.

The imaging system according to the first embodiment of the second aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens and satisfies the following condition:

$$0.5 < f_{12}/Ih < 12.0 \qquad (21)$$

Here $f_{12}$ is the composite focal length of the first positive lens and the second negative lens, and Ih is the maximum image height of the image-formation optical system.

The imaging system according to the second embodiment of the second aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens and satisfies the following condition:

$$-10 < f_{234}/Ih < -0.5 \qquad (22)$$

Here $f_{234}$ is the composite focal length of the second negative lens, the third positive lens and the fourth positive lens, and Ih is the maximum image height of the image-formation optical system.

The imaging system according to the third embodiment of the second aspect of the invention comprises an image-formation optical system and an image pickup device located on the image side thereof, characterized in that said image-formation comprises, in order from the object side thereof, a first positive lens, a second negative lens, a third positive lens and a fourth positive lens with the composite refracting power of the first positive lens and the second negative lens being positive, and satisfies the following condition:

$$1 < d^2/(f \cdot Ih) < 6 \qquad (23)$$

Here d is the length of the image-formation optical system, f is the focal length of the image-formation optical system, and Ih is the maximum image height of the image-formation optical system.

The imaging system according to the fourth embodiment of the second aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens with the composite refracting power of the second negative lens, the third positive lens and the fourth negative lens being negative, and satisfies the following condition:

$$1 < d^2/(f \cdot Ih) < 3.5 \qquad (24)$$

Here d is the length of the image-formation optical system, f is the focal length of the image-formation optical system, and Ih is the maximum image height of the image-formation optical system.

The imaging system according to the fifth embodiment of the second aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens with the composite refracting power of the first positive lens and the second negative lens being positive, and satisfies the following condition:

$$5 < f \cdot Fno/(Ih \cdot \tan \theta_{out}) < 35 \qquad (25)$$

Here f is the focal length of the image-formation optical system, Fno is the F-number of the image-formation optical system, Ih is the maximum height of the image-formation optical system, and $\theta_{out}$ is the exit angle of a chief ray at the maximum image height.

The imaging system according to the sixth embodiment of the second aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens with the composite refracting power of the second negative lens, the third positive lens and the fourth positive lens being negative, and satisfies the following condition:

$$8 < f \cdot Fno/(Ih \cdot \tan \theta_{out}) < 12.5 \qquad (26)$$

Here f is the focal length of the image-formation optical system, Fno is the F-number of the image-formation optical system, Ih is the maximum height of the image-formation optical system, and $\theta_{out}$ is the exit angle of a chief ray at the maximum image height.

The image-formation optical system according to the seventh embodiment of the second aspect of the invention is characterized by comprising, in order from the object side thereof, a first positive lens, a second negative lens, a third positive lens and a fourth positive lens, and satisfying the following condition:

$$1.4 < n_{avg} < 1.6 \qquad (27)$$

Here $n_{avg}$ is the average value of d-line refractive indices of the first positive lens, the second negative lens, the third positive lens and the fourth positive lens.

The image-formation optical system according to the eighth embodiment of the second aspect of the invention is characterized by comprising, in order from the object side thereof, a first positive lens, a second negative lens, a third positive lens and a fourth positive lens, wherein the first positive lens is made of glass, and the second negative lens, the third positive lens and the fourth positive lens are each made of plastics.

The image-formation optical system according to ninth embodiment of the second aspect of the invention is characterized by comprising, in order from the object side thereof, a first positive lens, a second negative lens, a third positive lens and a fourth positive lens, wherein the first positive lens, the second negative lens, the third positive lens and the fourth positive lens are each made of plastics.

The imaging system according to the first embodiment of the third aspect of the invention comprises an image-formation optical system and an image pickup device located on the image side thereof, characterized in that said image-formation optical system comprises, in order from the object side thereof, a first positive lens of double-convex shape, a second negative lens, a third positive lens and a fourth positive lens of meniscus shape, and satisfies the following condition:

$$0.5 < f_1/Ih < 1.8 \qquad (41)$$

Here $f_1$ is the focal length of the first positive lens, and Ih is the maximum image height of the image-formation optical system.

The image-formation optical system according to the second embodiment of the third aspect of the invention is characterized by comprising, in order from the object side thereof, a first positive lens of double-convex shape, a second negative lens, a third positive lens and a fourth positive lens, and satisfying the following condition:

$$-2.0 < f_2/f < -0.65 \qquad (42)$$

Here $f_2$ is the focal length of the second negative lens, and f is the focal length of the image-formation optical system.

The imaging system according to the fourth embodiment of the third aspect of the invention comprises an image-formation optical system and an image pickup device located on the image side thereof, characterized in that said image-formation optical system comprises, in order from the object side thereof, a first positive lens of double-convex shape, a second negative lens, a third positive lens and a fourth positive lens, and satisfies the following condition:

$$-18 < f_{234}/Ih < -0.5 \qquad (43)$$

Here $f_{234}$ is the composite focal length of the second negative lens, the third positive lens and the fourth positive lens, and Ih is the maximum image height of the image-formation optical system.

The imaging system according to the fifth embodiment of the third aspect of the invention comprises an image-formation optical system and an image pickup device located on the image side thereof, characterized in that said image-formation optical system comprises, in order from the object side thereof, a first positive lens of double-convex shape, a second negative lens, a third positive lens and a fourth positive lens with an aperture stop located on the object side of the first positive lens, and satisfies the following condition:

$$1.0 < f_3/Ih < 2.7 \qquad (44)$$

Here $f_3$ is the focal length of the third positive lens, and Ih is the maximum image height of the image-formation optical system.

The image-formation optical system according to sixth embodiment of the third aspect of the invention is characterized by comprising, in order from the object side thereof, a first positive lens of double-convex shape, a second negative lens, a third positive lens and a fourth positive lens with an aperture stop located on the object side of the first positive lens, and satisfying the following condition:

$$-0.6 < f/f_{23} < 0.15 \qquad (45)$$

Here $f_{23}$ is the composite focal length of the second negative lens and the third positive lens, and f is the focal length of the image-formation optical system.

The image-formation optical system according to the first embodiment of the fourth aspect of the invention is characterized by comprising, in order from the object side thereof, a first positive lens, a second negative lens, a third positive lens and a fourth positive lens, and satisfying the following condition:

$$-1.4 < f_2/f < -0.7 \qquad (61)$$

Here $f_2$ is the focal length of the second negative lens, and f is the focal length of the image-formation optical system.

The image-formation optical system according to the third embodiment of the fourth aspect of the invention is characterized by comprising, in order from the object side thereof, a first positive lens, a second negative lens double-concave shape, a third positive lens and a fourth positive lens, and satisfying the following condition:

$$5 < f_4/f < 200 \qquad (62)$$

Here $f_4$ is the focal length of the fourth positive lens, and f is the focal length of the image-formation optical system.

The image-formation optical system according to the fifth embodiment of the fourth aspect of the invention is characterized by comprising, in order from the object side thereof, a first positive lens, a second negative lens of double-concave shape, a third positive lens and a fourth positive lens, and satisfying the following condition:

$$0.1 < f_{12}/f < 6 \qquad (63)$$

Here $f_{12}$ is the composite focal length of the first positive lens and the second negative lens, and f is the focal length of the image-formation optical system.

The image-formation optical system according to the seventh embodiment of the fourth aspect of the invention is characterized by comprising, in order from the object side thereof, a first positive lens, a second negative lens of double-concave shape, a third positive lens and a fourth positive lens, and satisfying the following condition:

$$-1.3 < f_1/f_2 < -0.1 \qquad (64)$$

Here $f_1$ is the focal length of the first positive lens, and $f_2$ is the focal length of the second negative lens.

The image-formation optical system according to the ninth embodiment of the fourth aspect of the invention is characterized by comprising, in order from the object side thereof, a first positive lens, a second negative lens, a third positive lens and a fourth positive lens, and satisfying the following conditions:

$$0.75 < f_{34}/f < 5 \qquad (65)$$

$$-1 < f_2/f_3 < -0.5 \qquad (66)$$

Here $f_{34}$ is the composite focal length of the third positive lens and the fourth positive lens, f is the focal length of the image-formation optical system, $f_2$ is the focal length of the second negative lens, and $f_3$ is the focal length of the third positive lens.

The imaging system according to the 11$^{th}$ embodiment of the fourth aspect of the invention comprises an image-formation optical system and an image pickup device located on the image side thereof, characterized in that said image-formation optical system comprises, in order from the object side thereof, a first positive lens of double-convex shape, a second negative lens, a third positive lens of meniscus shape and a fourth positive lens with an aperture stop located on the object side of the first positive lens, and satisfying the following condition:

$$1 < f_3/Ih < 3 \qquad (67)$$

Here $f_3$ is the focal length of the third positive lens, and Ih is the maximum image height of the image-formation optical system.

The imaging system according to the first embodiment of the fifth aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens, and satisfies the following condition:

$$10 < f_4/Ih < 2.50 \qquad (81)$$

Here $f_4$ is the focal length of the fourth positive lens, and Ih is the maximum image height of the image-formation optical system.

The image-formation optical system according to the second embodiment of the fifth aspect of the invention is characterized by comprising, in order from the object side thereof, a first positive lens, a second negative lens, a third positive lens and a fourth positive lens of meniscus shape, and satisfying the following condition:

$$-2 < f_2/f < -0.65 \qquad (82)$$

Here $f_2$ is the focal length of the second negative lens, and f is the focal length of the image-formation optical system.

The imaging system according to the fourth embodiment of the fifth aspect of the invention comprises an image-formation optical system and an image pickup device located on the image side thereof, characterized in that said image-formation optical system comprises, in order from the object side thereof, a first positive lens of double-convex shape, a second negative lens, a third positive lens and a fourth positive lens of meniscus shape, and satisfies the following condition:

$$1 < f_3/Ih < 3 \qquad (83)$$

Here $f_3$ is the focal length of the third positive lens, and Ih is the maximum image height of the image-formation optical system.

The imaging system according to the fifth embodiment of the fifth aspect of the invention comprises an image-formation optical system and an image pickup device located on the image side thereof, characterized in that said image-formation optical system comprises, in order from the object side thereof, a first positive lens, a second negative lens, a third positive lens and a fourth positive lens of meniscus shape, and satisfies the following condition:

$$0.5 < f_{12}/Ih < 25 \qquad (84)$$

Here $f_{12}$ is the composite focal length of the first positive lens and the second negative lens, and Ih is the maximum image height of the image-formation optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
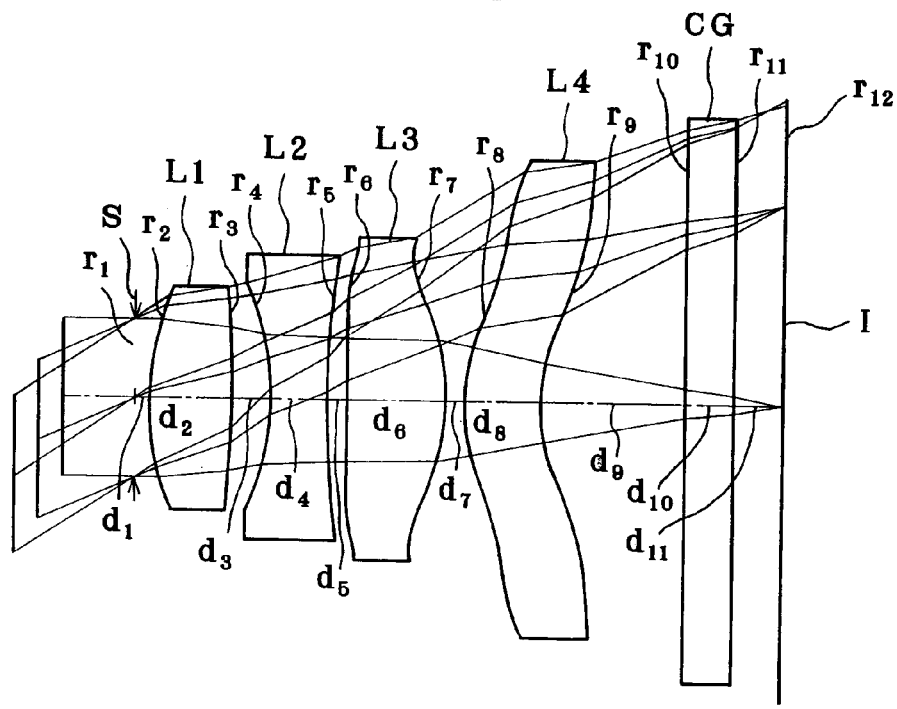
FIG. 1 is illustrative in section of the lens arrangement of Example 1 of the image-formation optical system according to the first aspect of the invention upon focused on an object point at infinity.

First of all, advantages and actions of the above arrangements according to the first to fifth aspects of the invention are explained.

Advantages and actions of the above arrangements according to the first aspect of the invention are now explained.

The image-formation optical system according to the first embodiment of the first aspect of the invention is characterized by comprising, in order from the object side thereof, a first positive lens, a second negative lens of double-concave shape, a third positive lens and a fourth positive meniscus lens convex on its object side, wherein the composite focal length of the first positive lens and the second negative lens is positive.

The image-formation optical system according to the second embodiment of the first aspect of the invention is characterized by comprising, in order from the object side thereof, a first positive lens of double-convex shape, a second negative lens, a third positive lens and a fourth positive lens of a meniscus shape convex on its object side, wherein the composite focal length of the second negative lens, the third positive lens and the fourth positive lens is negative.

The image-formation optical system according to the third embodiment of the first aspect of the invention is characterized by comprising, in order from the object side thereof, a first positive lens of double-convex shape, a second negative lens, a third positive lens of double-convex shape and a fourth positive lens of a meniscus shape convex on its object side.

Advantages and actions of the above arrangements according to the first aspect of the invention are now explained.

First, advantages and actions of the image-formation optical system according to the first embodiment of the first aspect are explained.

The number of lenses is now explained. As already described, at least three lenses are necessary to achieve high performance from the center to as far as the periphery of a screen. Even with the triplet type considered to have the highest performance (comprising, in order from its object side, a positive lens, a negative lens and a positive lens), however, the bending of astigmatism in the sagittal direction for instance remains uncorrected. Accordingly, a peripheral image plane moves forward at an intermediate position of the screen and backward at a peripheral position of the screen, resulting unavoidably in blurred images. In view of performance, the triplet type is unsuitable for application to an optical system compatible even with a CCD comprising a great number of pixels as contemplated herein. For this reason, the present invention uses one more lens to improve performance.

In the case of a CCD-incorporating camera, on the other hand, there are some limitations to optical design, unlike a silver-halide film camera. As off-axis light beams emerging from an image-formation lens system are incident on a CCD at too large an angle, full advantage can never be taken of the ability of a microlens to condense light, offering a problem that an image undergoes drastic brightness variations between its central position and its peripheral position. Accordingly, the CCD must be designed such that the angle of light rays incident thereon becomes relatively small.

Thus, in consideration of the angle of incidence of light on the CCD, the first aspect of the invention makes use of a four-lens, inverted Ernostar type that is expected to have high performance and comprises, in order from the object side thereof, a positive lens, a negative lens, a positive lens and a positive lens. More specifically, a triplet type arrangement comprising a positive lens, a negative lens and a positive lens is located on the object side of the image-formation optical system to ensure ever higher image-formation capability, and one more lens is located on the image side of the image-formation optical system to make correction for aberrations remaining uncorrected at the three lenses forming the triplet. In addition, positive power is allocated to the side of the image-formation optical system nearest to an image plane, so that the angle of incidence of light on the CCD is kept small by its converging effect.

To achieve wide-angle arrangement and compactness or the object of the first aspect of the invention, however, it is further required to satisfy three such requirements as mentioned below.

The construction of the second lens is now explained. Only one of four lenses that form the inverted Ernostar type is a negative lens, and so the construction of this negative lens is important to the performance of the whole optical system. For compactness in general, the power of each lens must be enhanced; it is necessary for the negative lens to make effective correction for aberrations produced at three such positive lenses. In favor of wide-angle arrangement, off-axis aberrations such as astigmatism and distortion must be properly corrected; that is, a proper power balance must be made between converging action and diverging action. Accordingly, the second negative lens is configured in such a double-concave form as to allow both its surfaces to have diverging action.

The construction of the fourth lens is now explained. The fourth positive lens is so spaced away from the second negative lens that it is less susceptible of correction of aberrations by the diverging action of the second negative lens. For this reason, the fourth lens is made up of a meniscus lens one surface of which has diverging action, so that aberrations can be effectively corrected. This ensures correction of residual aberrations such as peripheral coma and astigmatism. To shift the principal points of the optical system toward the object side for compactness, however, it is then necessary to configure the fourth positive lens in a meniscus form convex on its object side, thereby holding back an increase in the length of the optical system.

The constructions of the first lens and the second lens are now explained. In the inverted Ernostar type, the composite focal length of the third lens and the fourth lens is necessarily positive because both lenses are positive. Here, if the composite power of the first lens and the second lens is negative, it is then in principle difficult to reduce the length of the optical system because of a retrofocus type of −+ construction. It is thus necessary to make the composite focal length of the first lens and the second lens positive.

By satisfying these requirements at the same time, an image-formation optical system of high performance that is well corrected as far as the periphery of the screen can be provided even in the form of a small-format, wide-angle arrangement.

Advantages and actions of the image-formation optical system constructed according to the above second embodiment are now explained.

The construction of the first lens is now explained. Generally when it comes to one positive lens, the best image-formation capability could be obtained when that positive lens is of meniscus shape having converging action at one surface and diverging action at another surface, because aberrations can be cancelled out. For a typical positive meniscus lens, however, one surface must be designed with strong positive power, because another surface acts as a surface having a negative power effect. For this reason, as the power of the lens becomes too strong, the curvature of positive power becomes steep, leading to a possibility of higher-order aberrations. With such a lens located as the foremost lens, high performance is not expectable because aberrations are enlarged through an image side portion of the optical system to difficult-to-correct extents. For the inverted Ernostar type optical system according the first aspect of the invention, on the other hand, it is not preferable to reduce the power of the first lens, because the power of the optical system must be guaranteed by the third and fourth lenses located on the image plane side of the optical system, resulting in a shift of the principal points toward the image side and, hence, an increase in the size of the optical system. Thus, it is favorable for compactness to increase the positive power of the first lens. In the first aspect of the invention, therefore, the first lens is made up of a double-convex lens, both surfaces of which have converging action. This means that the power of the first lens is allocated to two surfaces to hold back the occurrence of higher-order aberrations, and strong power is given to the positive lenses on the object side to shift the principal points of the optical system toward the object side, so that the optical system can be slimmed down.

The construction of the fourth lens is now explained. Aberrations are effectively corrected by a combination of the converging action of both surfaces of the first lens with the negative diverging action of the second lens. As the power of the first lens becomes strong, aberrations remain undercorrected only by the second lens; degradation by residual aberrations of peripheral performance in particular becomes noticeable and so the wide-angle arrangement according to the first aspect of the invention is substantially unachievable. Those residual aberrations must be corrected by configuring the fourth lens in a meniscus form having diverging action at one surface. It is then necessary to configure the fourth lens in a meniscus form convex on its object side, as already described in conjunction with the image-formation optical system according to the above first embodiment.

The constructions of the second, third and fourth lenses are now explained. It is to be understood that when strong power is allocated to the first lens, any effective compactness is unachievable unless some considerable care is taken of the constructions of the third and fourth lenses. As generally known in the art, constructing an optical system in a telephoto type form is favorable for length reductions. In the invention, the second, third and fourth lenses should preferably have a negative composite power because the telephoto type is constructed of the first lens and the second, third and fourth lenses.

By meeting these requirements at the same time, it is possible to provide an image-formation optical system that can maintain high performance even at wide-angle arrangements while compactness is effectively achieved.

Advantages and actions of the image-formation optical system constructed according to the above third embodiment are now explained.

As already explained in conjunction with the image-formation optical system according to the above second embodiment, compactness is achievable with well-corrected aberrations by composing the first lens of a double-convex lens to give strong power thereto and constructing the fourth lens in a meniscus form convex on its object side. In the invention, since the first lens has strong power, strong power is given to the second lens, too, for the purpose of making correction for aberrations. Since the inverted Ernostar type according to the first aspect of the invention has only one negative lens, aberrations produced at other positive lenses, that is, the third lens and the fourth lenses, too, must be corrected. In other words, it is required to make the power of the second lens much stronger. As the power of the second becomes strong, however, Petzval's sum is overcorrected in a negative direction, resulting in degradation of peripheral performance and, hence, failing to meet the requirement for the wide-angle arrangement according to the first aspect of the invention. In the first aspect of the invention, therefore, such degradation of peripheral performance must be prevented by composing the third positive lens of a double-convex lens both surfaces of which have diverging action to make correction for the Petzval's sum in a positive direction.

By meeting these requirements at the same time, it is possible to provide an image-formation optical system that can maintain high performance even at wide-angle arrangements while compactness is effectively achieved.

According to the fourth embodiment of the first aspect of the invention, the image-formation optical system as recited in the above first embodiment is further characterized in that the first positive lens is of double-convex shape.

In the image-formation optical system according to the above first embodiment, too, the first positive lens should preferably be of double-convex shape as explained in conjunction with the above second embodiment.

According to the fifth embodiment of the first aspect of the invention, the image-formation optical system as recited in the above first or second embodiment is further characterized in that the third positive lens in the first and the second image-formation optical system is of double-convex shape.

In the image-formation optical system according to the above first or second embodiment, too, the third positive lens should preferably be of double-convex shape, as explained in conjunction with the above third embodiment.

According to the sixth embodiment of the first aspect of the invention, the image-formation optical system as recited in the above first or second embodiment is further characterized in that the third positive lens is of a meniscus shape convex on its image side.

While the third lens and the fourth lens in the inverted Ernostar type according to the first aspect of the invention are each a positive lens, it is understood that the allocation of strong powers to these lenses is unfavorable for compactness, because the principal points of the optical system are shifted toward the image side. It is therefore preferable that the third lens and the fourth lens have a relatively enhanced role in correction of aberrations. To this end, the third positive lens should preferably be in a meniscus form having diverging action at its one surface. In consideration of aberration balance, it is also preferable that the third lens is of a meniscus shape convex on the image side, because the fourth lens is of a meniscus shape convex on the object side.

According to the seventh embodiment of the first aspect of the invention, the image-formation optical system as recited in the above first or third embodiment is further characterized in that the composite focal length of the second negative lens, the third positive lens and the fourth positive lens is negative.

In the image-formation optical system according to the above first or third embodiment, too, it is preferable that the composite power of the second negative lens, the third positive and the fourth positive lens is negative, as explained in conjunction with the above second embodiment.

According to the eight embodiment of the first aspect of the invention, the image-formation optical system as recited in above second or third embodiment is further characterized in that the second negative lens is of double-concave shape.

In the image-formation optical system as recited in the above second or third embodiment, too, it is preferable that the second negative lens is of double-concave shape, as explained in conjunction with the image-formation optical system according to the above first embodiment.

According to the $10^{th}$ embodiment of the $1^{st}$ aspect of the invention, the image-formation optical system as recited in any one of the above $1^{st}$ to $9^{th}$ embodiments is further characterized in that an aperture stop is located on the object side of the first positive lens.

According to the $11^{th}$ embodiment of the first aspect of the invention, the image-formation optical system as recited in any one of the above $1^{st}$ to $9^{th}$ embodiments is further characterized in that an aperture stop is interposed between the first positive lens and the second negative lens.

The image-formation optical systems constructed according to the $10^{th}$ and $11^{th}$ embodiments of the first aspect of the invention are now explained. When a CCD is used as an image pickup device, incidence of an off-axes light beam from the image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. To make the angle of incidence of light rays on the CCD small, it is preferable to locate the aperture stop nearer to the object side of the optical system. Especially when the aperture stop is located nearest to the object side, the merit is that chromatic aberration of magnification can be well corrected because both the first positive lens and the second negative lens having relatively strong powers of opposite signs are located on the image side of the optical system. Especially when the apertures stop is interposed between the first positive and the second negative lens, the merit is that off-axis aberrations can be well corrected, because powers are allocated before and after the aperture stop so that coma can be easily balanced between upper light rays and lower light rays.

The imaging system according to the $12^{th}$ embodiment of the first aspect of the invention is characterized by comprising the image-formation optical system as recited in any one of the above 1st to 11th embodiments and an electronic image pickup device located on the image side thereof.

According to the 13th embodiment of the first aspect of the invention, the imaging system as recited in the above 12th embodiment is further characterized by satisfying the following condition:

$$15° < \alpha < 40° \qquad (1)$$

Here $\alpha$ is the angle of incidence of a chief ray on an image plane at the maximum image height.

A problem with using a CCD as the image pickup device is that as an off-axis light beam emerging from the image-formation optical system is incident on the image plane at too large an angle, an image suffers from drastic brightness changes between its central position and its peripheral position. If the light beam is incident on the image plane at a small angle, on the other hand, that problem may then be solved; however, this now gives rise to an increase in the length of the optical system. It is thus preferable to satisfy the following condition:

$$15° < \alpha < 40° \qquad (1)$$

Here $\alpha$ is the angle of incidence of a chief ray on the image plane at the maximum image height.

As the upper limit of 40° to condition (1) is exceeded, the angle of the chief ray on the CCD becomes too large, resulting in a drop of the brightness at the peripheral position of an image. As the lower limit of 15° is not reached, the optical system becomes too long.

More preferably, $$15° < \alpha < 35° \qquad (1\text{-}1)$$

Even more preferably, $$18° < \alpha < 30° \qquad (1\text{-}2)$$

According to the 14th embodiment of the first aspect of the invention, the imaging system as recited in the above 12th or 13th embodiment is further characterized by satisfying the following condition:

$$0.3 < f_1/Ih < 2.5 \qquad (2)$$

Here $f_1$ is the focal length of the first positive lens, and Ih is the maximum image height of the image-formation optical system.

As the upper limit of 2.5 to condition (2) is exceeded, the power of the first positive lens becomes too weak, making the optical system bulky, and as the lower limit of 0.3 is not reached, the power of the first positive lens becomes too strong to ensure optical performance and, in particular, to correct spherical aberrations, coma and astigmatism.

More preferably, $$0.5 < f_1/Ih < 1.8 \qquad (2\text{-}1)$$

Even more preferably, $$0.6 < f_1/Ih < 1.6 \qquad (2\text{-}2)$$

According to the 15th embodiment of the first aspect of the invention, the image-formation optical system as recited in any one of the above 1st to 11th embodiments is further characterized by satisfying:

$$-2.0 < f_2/f < -0.3 \qquad (3)$$

Here $f_2$ is the focal length of the second negative lens, and f is the focal length of the image-formation optical system.

As the upper limit of −0.3 to condition (3) is exceeded, the power of the second negative lens becomes too strong, leading to higher-aberrations such as coma and, hence, under performance. As the lower limit of −2.0 is not reached, the power of the second negative lens becomes too weak, ending up with an increase in the length of the optical system. In addition, it is impossible to make full correction for aberrations occurring at other positive lenses; spherical aberrations, longitudinal chromatic aberration, etc. become worse.

More preferably, $$-1.8 < f_2/f < -0.5 \qquad (3\text{-}1)$$

Even more preferably, $$-1.6 < f_2/f < -0.6 \qquad (3\text{-}2)$$

According to the 16th embodiment of the first aspect of the invention, the imaging system as recited in any one of the above 12th to 14th embodiments is further characterized by satisfying the following condition:

$$0.7 < f_3/Ih < 5.0 \qquad (4)$$

Here $f_3$ is the focal length of the third positive lens, and Ih is the maximum image height of the image-formation optical system.

As the upper limit of 5.0 to condition (4) is exceeded, the power of the third positive lens becomes too weak to make sufficient correction for spherical aberrations and coma. As the lower limit of 0.7 is not reached, the power of the third positive lens becomes too strong, causing the principal points of the optical system to be shifted toward the image side of the optical system. Consequently, the optical system becomes long or spherical aberrations and coma are over-corrected.

More preferably, $$1.0 < f_3/Ih < 3.0 \qquad (4\text{-}1)$$

Even more preferably, $$1.3 < f_3/Ih < 2.5 \qquad (4\text{-}2)$$

According to the 17th embodiment of the first aspect of the invention, the image-formation optical system according to any one of the above 1st to 11th and the 15th embodiments is further characterized by satisfying the following condition:

$$1.5 < f_4/f < 500 \qquad (5)$$

Here $f_4$ is the focal length of the fourth positive lens, and f is the focal length of the image-formation optical system.

As the upper limit of 500 to condition (5) is exceeded, the power of the fourth positive lens becomes too weak, leading to an increase in the angle of incidence of light rays on CCD or insufficient correction of spherical aberrations and coma. As the lower limit of 1.5 is not reached, the power of the fourth positive lens becomes too strong, causing the principal points of the optical system to be shifted toward the image side of the optical system. As a result, the optical system becomes long or coma and astigmatism are overcorrected.

More preferably, $$3 < f_4/f < 300 \qquad (5\text{-}1)$$

Even more preferably, $$5 < f_4/f < 100 \qquad (5\text{-}2)$$

According to the 18th embodiment of the first aspect of the invention, the image-formation optical system as recited in any one of the above 1st to 11th, 15th and 17th embodiments is further characterized by satisfying the following condition:

$$1.0 < f_{12}/f < 50.0 \tag{6}$$

Here $f_{12}$ is the composite focal length of the first positive lens and the second negative lens, and f is the focal length of the image-formation optical system.

As the upper limit of 50.0 to condition (6) is exceeded, it is impossible to effectively reduce the length of the optical system because of a slender telephoto effect. As the lower limit of 1.0 is not reached, the power of the first and second lenses becomes too strong, leaving aberrations uncorrected, which cannot be corrected even at the third and fourth lenses.

More preferably, $$1.2 < f_{12}/f < 35.0 \tag{6-1}$$

Even more preferably, $$1.5 < f_{12}/f < 20.0 \tag{6-2}$$

According to the 19th embodiment of the first aspect of the invention, the imaging system as recited in any one of the above 12th to 14th and the 16th embodiments is further characterized by satisfying the following condition:

$$-50 < f_{234}/Ih < -1.0 \tag{7}$$

Here $f_{234}$ is the composite focal length of the second negative lens, the third positive lens and the fourth positive lens, and Ih is the maximum image height of the image-formation optical system.

As the upper limit of −1.0 to condition (7) is exceeded, the negative power of the second negative lens becomes too strong, and so coma becomes worse. Falling short of the lower limit of −50 renders effective compactness impossible because the power of the second negative lens becomes too weak and the telephoto effect becomes slender.

More preferably, $$-30 < f_{234}/Ih < -1.5 \tag{7-1}$$

Even more preferably, $$-10 < f_{234}/Ih < -2.0 \tag{7-2}$$

According to the 20th embodiment of the first aspect of the invention, the image-formation optical system as recited in any one of the above 1st to 11th, 15th, 17th and 18th embodiments is further characterized by satisfying the following condition:

$$-0.9 < (r_{1f} + r_{1r})/(r_{1f} - r_{1r}) < 0.5 \tag{8}$$

Here $r_{1f}$ is the axial radius of curvature of the object side-surface of the first positive lens, and $r_{1r}$ is the axial radius of curvature of the image side-surface of the first positive lens.

As the upper limit of 0.5 to condition (8) is exceeded, the converging action of the entrance side-surface of the first positive lens on the first bending of light rays becomes too slender to make effective correction for spherical aberrations and coma, and as the lower limit of −0.9 is not reached, higher-order aberrations are likely to occur because the power of the entrance side-surface of the first positive lens becomes too strong.

More preferably, $$-0.85 < (r_{1f} + r_{1r})/(r_{1f} - r_{1r}) < 0.2 \tag{8-1}$$

Even more preferably, $$-0.8 < (r_{1f} + r_{1r})/(r_{1f} - r_{1r}) < 0 \tag{8-2}$$

According to the 21st embodiment of the first aspect of the invention, the image-formation optical system as recited any one of the above 1st to 11th, 15th, 17th, 18th and 20th embodiments is further characterized by satisfying the following condition:

$$-0.8 < (r_{2f} + r_{2r})/(r_{2f} - r_{2r}) < 1.0 \tag{9}$$

Here $r_{2f}$ is the axial radius of curvature of the object side-surface of the second negative lens, and $r_{2r}$ is the axial radius of curvature of the image side-surface of the second negative lens.

As the upper limit of 1.0 to condition (9) is exceeded, the negative power of the exit side of the second negative lens becomes too strong, and as the lower limit of −0.8 is not reached, the negative power of the entrance side of the second negative lens becomes too strong. In either case, performance becomes worse due to a growing likelihood of higher-order aberrations.

More preferably, $$-0.7 < (r_{2f} + r_{2r})/(r_{2f} - r_{2r}) < 0.8 \tag{9-1}$$

Even more preferably, $$-0.6 < (r_{2f} + r_{2r})/(r_{2f} - r_{2r}) < 0.6 \tag{9-2}$$

According to the 22nd embodiment of the first aspect of the invention, the image-formation optical system as recited in any one of the above 1st to 11th, 15th, 17th, 18th, 20th and 21st embodiments is further characterized by satisfying the following condition:

$$1 < (r_{3f} + r_{3r})/(r_{3f} - r_{3r}) < 10 \tag{10}$$

Here $r_{3f}$ is the axial radius of curvature of the object side-surface of the third positive lens, and $r_{3r}$ is the axial radius of curvature of the image side-surface of the third positive lens.

As the upper limit of 10 to condition (10) is exceeded, both the diverging action of the entrance side and the converging action of the exit side of the third positive lens become strong, rendering higher-order aberrations likely to occur and coma and astigmatism in particular worse, and as the lower limit of 1 is not reached, the third positive lens takes on a nearly plano-convex shape; the effect of its entrance side on correction of aberrations becomes slender, failing to achieve high performance in an effective manner.

More preferably, $$1.05 < (r_{3f} + r_{3r})/(r_{3f} - r_{3r}) < 5 \tag{10-1}$$

Even more preferably, $$1.1 < (r_{3f} + r_{3r})/(r_{3f} - r_{3r}) < 3 \tag{10-2}$$

According to the 23rd embodiment of the first aspect of the invention, the image-formation optical system as recited in the above 3rd embodiment is further characterized by satisfying the following condition:

$$0 < (r_{3f} + r_{3r})/(r_{3f} - r_{3r}) < 0.99 \tag{11}$$

Here $r_{3f}$ is the axial radius of curvature of the object side-surface of the third positive lens, and $r_{3r}$ is the axial radius of curvature of the image side-surface of the third positive lens.

As the upper limit of 0.99 to condition (11) is exceeded, the third positive lens takes on a nearly plano-convex shape, rendering the action of its entrance surface on correction of aberrations slender and, hence, failing to achieve high performance in an effective manner. As the lower limit of 0 is not reached, the angle of incidence of light rays diverged by the negative lens on the entrance surface of the third positive lens becomes too large, rendering coma and astigmatism worse.

More preferably, $$0.2<(r_{3f}+r_{3r})/(r_{3f}-r_{3r})<0.95 \quad (11\text{-}1)$$

Even more preferably, $$0.5<(r_{3f}+r_{3r})/(r_{3f}-r_{3r})<0.9 \quad (11\text{-}2)$$

According to the 24th embodiment of the first aspect of the invention, the image-formation optical system as recited in any one of the above 1st to 11th, 15th, 17th, 18th and 20th to 23rd embodiments is further characterized by satisfying the following condition:

$$-0.3<(r_{4f}-r_{4r})/(r_{4f}+r_{4r})<0.3 \quad (12)$$

Here $r_{4f}$ is the axial radius of curvature of the object side-surface of the fourth positive lens, and $r_{4r}$ is the axial radius of curvature of the image side-surface of the fourth positive lens.

As the upper limit of 0.3 to condition (12) is exceeded, the positive power of the fourth positive lens becomes too weak to make the angle of incidence of light on a CCD small, and as the lower limit of −0.3 is not reached, the power of the entrance surface of the fourth positive lens becomes too strong, rendering coma and astigmatism worse.

More preferably, $$-0.15<(r_{4f}-r_{4r})/(r_{4f}+r_{4r})<0.25 \quad (12\text{-}1)$$

Even more preferably, $$-0.1<(r_{4f}-r_{4r})/(r_{4f}+r_{4r})<0.2 \quad (12\text{-}2)$$

According to the 25th embodiment of the first aspect of the invention, the imaging system as recited in any one of the above 12th to 14th, 16th and 19th embodiments is further characterized in that the image-formation optical system comprises at least one aspheric surface that satisfies the following condition:

$$0.01<|(r_{sp}+r_{asp})/(r_{sp}-r_{asp})-1|<100 \quad (13)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with the aspheric surface taken into account is defined by the following equation:

$$r_{ASP}=y\cdot(1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

According to the 26th embodiment of the first aspect of the invention, the imaging system as recited in the above 25th embodiment is further characterized in that the aspheric surface is located at the first positive lens.

According to the 27th embodiment of the first aspect of the invention, the imaging system as recited in the above 25th embodiment is further characterized in that the aspheric surface is located at the second negative lens.

According to the 28th embodiment of the first aspect of the invention, the imaging system as recited in the above 25th embodiment is further characterized in that the aspheric surface is located at the third positive lens.

According to the 29th embodiment of the first aspect of the invention, the imaging system as recited in the above 25th embodiment is further characterized in that the aspheric surface is located at the fourth positive lens.

As the upper limit of 100 to condition (13) is exceeded, the effect of the aspheric surface becomes too slender for correction of aberrations and so coma and astigmatism become worse. As the lower limit of 0.01 is not reached, the effect of the aspheric surface becomes too strong; aberrations remain overcorrected, causing the performance of the optical system to become worse and rendering lens processing difficult.

More preferably, $$0.05<|(r_{sp}+r_{asp})/(r_{sp}-r_{asp})-1|<50 \quad (13\text{-}1)$$

Even more preferably, $$0.1<|(r_{sp}+r_{asp})/(r_{sp}-r_{asp})-1|<10 \quad (13\text{-}2)$$

With more aberrations produced at the first positive lens that is a lens for receiving light rays in the first place, they are enlarged and transmitted through a part of the optical system on the image side. It is thus desired that aberrations produced there be sufficiently reduced. In other words, at least the first positive lens should preferably be provided with an aspheric surface.

The second negative lens is only one negative lens in the optical system; giving strong power thereto contributes to correction of coma and chromatic aberrations, and compactness as well. However, too strong power gives rise to higher-order aberrations that render the performance of the optical system worse. It is thus preferable that at least the second negative lens is provided with an aspheric surface.

In favor of compactness, it is preferable for the third positive lens to be weaker in power than that of the first positive lens. However, giving weaker power to this lens means that it is less capable of correcting aberrations. For the third positive lens, therefore, it is desired that aberration correction capability be enhanced without increasing power. It is thus preferable that the third positive lens is provided with an aspheric surface. More preferably, both surfaces of the third positive lens should be defined by aspheric surfaces.

With the fourth positive lens, it is possible to make correction for astigmatism left uncorrected at three lenses on the object side of the optical system, i.e., at the triplet. More preferably for correction of the bending of astigmatism, the surface power of the fourth positive lens should be varied; the fourth positive lens should be provided with an aspheric surface. Even more preferably, both surfaces should be defined by aspheric surfaces.

Throughout the first aspect of the invention, the lower or upper limits to the above conditions (1) to (13) may be reduced down to those to the respective subordinate conditions.

It is understood that if the above conditions are applied in suitable combinations as desired, the advantages of the first aspect of the invention are then much more enhanced.

Advantages and actions of the second aspect of the invention as described above are now explained.

The imaging system according to the first embodiment of the second aspect of the invention comprises an image-formation optical system and an image pickup device located on the image side thereof, characterized in that said image-formation optical system comprises, in order from an object side thereof, a first positive lens, a second negative lens, a third positive lens and a fourth positive lens, and satisfies the following condition:

$$0.5 < f_{12}/Ih < 12.0 \tag{21}$$

Here $f_{12}$ is the composite focal length of the first positive lens and the second negative lens, and Ih is the maximum image height of the image-formation optical system.

Advantages and actions of the imaging system constructed according to the first embodiment of the second aspect of the invention are now explained.

First, the number of lenses is explained. As already described, at least three lenses are necessary to achieve high performance from the center to as far as the periphery of a screen. Even with the triplet type considered to have the highest performance (comprising, in order from its object side, a positive lens, a negative lens and a positive lens), however, the bending of astigmatism in the sagittal direction for instance remains uncorrected. Accordingly, a peripheral image plane moves forward at an intermediate position of the screen and backward at a peripheral position of the screen, resulting unavoidably in blurred images. In view of performance, the triplet type is unsuitable for application to an optical system compatible even with CCD comprising a great number of pixels as contemplated herein. For this reason, the second aspect of the invention uses one more lens to improve performance.

In the case of a CCD-incorporating camera, on the other hand, there are some limitations to optical design, unlike a silver-halide film camera. As off-axis light beams emerging from an image-formation lens system are incident on CCD at too large an angle, full advantage can never be taken of the ability of a microlens to condense light, offering a problem that an image undergoes drastic brightness variations between its central position and its peripheral position. Accordingly, the CCD must be designed such that the angle of light rays incident thereon becomes relatively small.

Thus, in consideration of the angle of incidence on a CCD, the second aspect of the invention makes use of a four-lens, inverted Ernostar type that is expected to have high performance and comprises, in order from the object side thereof, a positive lens, a negative lens, a positive lens and a positive lens. More specifically, a triplet type arrangement comprising a positive lens, a negative lens and a positive lens is located on the object side of the image-formation optical system to ensure ever higher image-formation capability, and one more lens is located on the image side of the image-formation optical system to make correction for aberrations remaining uncorrected at the three lenses forming the triplet. In addition, positive power is allocated to the side of the image-formation optical system nearest to an image plane, so that the angle of incidence of light on the CCD is kept small by its converging effect.

As already described, however, the inverted Ernostar type is difficult to achieve compactness. To achieve compactness that is the first object of the second aspect of the invention, the image-formation optical system must be constructed as described below.

The third lens and the fourth lens in the inverted Ernostar type are both positive lenses, so too is their composite power. This means that if the composite power of the rest of the inverted Ernostar type, that is, the first lens and the second lens, is negative, then a retrofocus type of –+ construction is formed. In other words, the principal points of the retrofocus type are shifted toward the image side; in principle, the length of the optical system can hardly be reduced, failing to accomplish the object of the second aspect of the invention. For this reason, the composite power of the first lens and the second lens should be positive. To achieve compactness and high performance at the same time, however, the composite focal length of the first lens and the second lens should satisfy the following condition:

$$0.5 < f_{12}/Ih < 12.0 \tag{21}$$

Here $f_{12}$ is the composite focal length of the first positive lens and the second negative lens, and Ih is the maximum image height of the image-formation optical system.

As the upper limit of 12.0 to condition (21) is exceeded, the first lens and the second lens take on a kind of retrofocus type because their composite power becomes weak, resulting in an increase in the length of the optical system. As the lower limit of 0.5 is not reached, the composite power of the first lens and the second lens becomes too strong to make correction for coma, astigmatism and Petzval's sum produced at the second negative lens in particular, resulting in under-performance.

More preferably, $$10.0 < f_{12}/Ih < 10.0 \tag{21-1}$$

Even more preferably, $$1.5 < f_{12}/Ih < 5.0 \tag{21-2}$$

With the thus constructed arrangement, it is possible to obtain an image-formation optical system that meets compactness and high performance at the same time.

The imaging system according to the second embodiment of the second aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens, and satisfies the following condition:

$$-10 < f_{234}/Ih < -0.5 \tag{22}$$

Here $f_{234}$ is the composite focal length of the second negative lens, the third positive lens and the fourth positive lens, and Ih is the maximum image height of the image-formation optical system.

Advantages and actions of the imaging system constructed according to the second embodiment of the second aspect of the invention are now explained.

In accordance with the first embodiment of the second aspect of the invention, the optical system is kept from becoming the retrofocus type to achieve compactness. A telephoto type of +– construction from its object side, on the other hand, is more favorable for compactness because its principal points are shifted toward its object side. With the imaging system according to the second embodiment of the second aspect of the invention, therefore, compactness is achieved by intentional exploitation of the telephoto type. More specifically, negative power is given to the $2^{nd}$ to $4^{th}$ lenses, so that the telephoto type is constructed with the positive power of the first lens and the negative power of the $2^{nd}$ to $4^{th}$ lenses. However, it is then necessary to satisfy condition (22) for the purpose of achieving compactness and high performance at the same time.

As the upper limit of –0.5 to condition (22) is exceeded, the negative power of the second lens becomes too strong, rendering coma, astigmatism and Petzval'sum worse or the positive power of the third and fourth lenses becomes too weak, rendering coma and distortion worse. Falling short of the lower limit of –10 is less effective for compactness, because the composite power of the $2^{nd}$ to $4^{th}$ lenses becomes too weak to obtain any satisfactory telephoto effect.

More preferably, $$-8.0<f_{234}/Ih<1.0 \tag{22-1}$$

Even more preferably, $$-5.0<f_{234}/Ih<-2 \tag{22-2}$$

With the thus constructed arrangement, it is possible to obtain an image-formation optical system that meets compactness and high performance at the same time.

The imaging system according to the third embodiment of the second aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the first positive lens and the second negative lens is positive, and satisfies the following condition:

$$1<d^2/(f\cdot Ih)<6 \tag{23}$$

Here d is the length of the image-formation optical system, f is the focal length of the image-formation optical system, and Ih is the maximum image height of the image-formation optical system.

The imaging system according to the fourth embodiment of the second aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the second negative lens, the third positive lens and the fourth positive lens is negative, and satisfies the following condition:

$$1<d^2/(f\cdot Ih)<3.5 \tag{24}$$

Here d is the length of the image-formation optical system, f is the focal length of the image-formation optical system, and Ih is the maximum image height of the image-formation optical system.

Advantages and actions of the imaging systems constructed according to the third and fourth embodiments of the second aspect of the invention are now explained.

As already described in conjunction with the imaging systems according to the above first and second embodiments of the second aspect of the invention, compactness is achievable even with the inverted Ernostar type. In some cases, however, satisfactory compactness is unachievable simply by use of the first and second lenses whose composite power is positive or the second, third and fourth lenses whose composite power is negative. In other words, the image-formation optical system comprising a reduced number of lenses according to the second aspect of the invention is less effective for compactness unless the thickness of each lens, surface-to-surface spacing and back focus are properly determined. Accordingly, when the composite power of the first and second lenses is positive, it is necessary to satisfy condition (23) with focal length and an angle of field taken into account. It is understood that, unless otherwise stated, d in condition (23) stands for a distance from the first surface of the optical system to the image plane; however, when an aperture stop is located nearest to the object side, it represents a distance from the aperture stop to the image plane.

As the upper limit of 6 to condition (23) is exceeded, the image-formation optical system becomes too long to achieve compactness. As the lower limit of 1 is not reached, the power of each lens becomes too strong, offering problems such as underperformance, large lens thickness, too narrow a surface-to-surface spacing, and difficulty with which processing and assembling are carried out.

More preferably, $$1.2<d^2/(f\cdot Ih)<5 \tag{23-1}$$

Even more preferably, $$1.5<d^2/(f\cdot Ih)<3.5 \tag{23-2}$$

When the composite power of the second, third and fourth lenses is negative, it is again preferable to condition (24):

$$1<d^2/(f\cdot Ih)<3.5 \tag{24}$$

More preferably, $$1.5<d^2/(f\cdot Ih)<3.25 \tag{24-1}$$

The imaging system according to the fifth embodiment of the second aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the first positive lens and the second negative lens is positive, and satisfies the following condition:

$$5<f\cdot Fno/(Ih\cdot\tan\theta_{out})<35 \tag{25}$$

Here f is the focal length of the image-formation optical system, Fno is the F-number of the image-formation optical system, Ih is the maximum image height of the image-formation optical system, and $\theta_{out}$ is the exit angle of a chief ray at the maximum image height.

The imaging system according to the sixth embodiment of the second aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the second negative lens, the third positive lens and the fourth positive lens is negative, and satisfies the following condition:

$$8<f\cdot Fno/(Ih\cdot\tan\theta_{out})<12.5 \tag{26}$$

Here f is the focal length of the image-formation optical system, Fno is the F-number of the image-formation optical system, Ih is the maximum image height of the image-formation optical system, and $\theta_{out}$ is the exit angle of a chief ray at the maximum image height.

Advantages and actions of the imaging systems constructed according to the fifth and sixth embodiments of the second aspect of the invention are now explained.

If the composite focal length of the first and second lenses is positive, it is effective for compact, as explained in conjunction with the imaging system of the first embodiment of the second aspect of the invention. For effective compactness, care must also be taken the following two parameters.

The first is a pupil position that affects the size of the optical system. Generally when an exit pupil is positioned afar, the gentler the angle of incidence of light on an image plane, the longer the optical system becomes. Conversely with the exit pupil located nearby, the length of the optical system may be reduced. However, it is not preferable to position the exit pupil too nearby, because lens power becomes strong, rendering the performance of the optical system worse, and the angle of incidence of light rays on the image pickup device or CCD becomes steep, causing large brightness variations between the center and the periphery of an image.

The second is an aperture that affects the size of the optical system alike. Specifically, with a decreasing F-number, light quantity must be increased and, hence, lens diameter must be increased. To give some edge thickness to a lens, lens's center thickness must be increased, generally resulting in an increase in optical system length.

To accomplish compactness that is the object of the second aspect of the invention, it is thus necessary to satisfy condition (25) with an exit angle and aperture taken into consideration.

As the upper limit of 35 to condition (25) is exceeded, the exit pupil is positioned too afar, and lens's edge thickness and lens-to-lens spacing become too large, failing to achieve compactness. As the lower limit of 5 is not reached, the exit pupil is positioned too nearby, and so the power of each lens becomes too strong, making the performance of the optical system worse. Otherwise, brightness changes extremely between the center and the periphery of a screen, and lens processing and assembling are difficult because of increased lens thickness and too narrow surface-to-surface spacing.

More preferably, $$6 < f \cdot Fno/(Ih \cdot \tan \theta_{out}) < 25 \quad (25\text{-}1)$$

Even more preferably, $$7 < f \cdot Fno/(Ih \cdot \tan \theta_{out}) < 15 \quad (25\text{-}2)$$

If the composite power of the second lens, the third lens and the fourth lens is negative, it is effective for compactness, as explained in conjunction with the imaging system of the second embodiment of the second aspect of the invention. In this case, too, it is necessary to satisfy condition (26).

More preferably, $$8.5 < f \cdot Fno/(Ih \cdot \tan \theta_{out}) < 11.5 \quad (26\text{-}1)$$

The image-formation optical system according to the seventh embodiment of the second aspect of the invention is characterized by comprising, in order from an object side thereof, a first positive lens, a second negative lens, a third positive lens and a fourth positive lens and satisfying the following condition:

$$1.4 < n_{avg} < 1.6 \quad (27)$$

Here $n_{avg}$ is the average value of d-line refractive indices of the first positive lens, the second negative lens, the third positive lens and the fourth positive lens.

Advantages and actions of the image-formation optical system constructed according too the seventh embodiment of the second aspect of the invention are now explained.

Petzval's sum is dependent on lens's power and refractive index. To correct that, it is common to increase the refractive index of a positive lens and decrease the refractive index of a negative lens. The inverted Ernostar type utilized in the second aspect of the invention is made up of three positive lenses and one negative lens, and for effective correction of coma, the refractive indices of the three positive lenses out of the four lenses should be increased. In favor of correction of coma, however, the average value of the refractive indices of the four lenses cannot be lowered in actual applications, because it is unacceptable to largely decrease the refractive index of the negative lens. A problem with this arrangement is that cost reductions are hardly achievable because high-refractive-index glass materials are expensive. According to the second aspect of the invention, cost reductions are thus intended by using three positive lenses that have not too high refractive indices and one negative lens that has not too high a refractive index. However, as the refractive indices of the positive lenses are too low, coma produced there becomes too much for correction at the negative lens. It is thus necessary to satisfy condition (27).

Glass materials exceeding the upper limit of 1.6 to condition (27) become too expensive for significant cost reductions. As the lower limit of 1.4 is not reached, there is produced too much coma for high performance.

More preferably, $$1.45 < n_{avg} < 1.58 \quad (27\text{-}1)$$

The image-formation optical system according to the eighth embodiment of the second aspect of the invention is characterized by comprising, in order from an object side thereof, a first positive lens, a second negative lens, a third positive lens and a fourth positive lens, wherein the first positive lens is made of glass, and the second negative lens, the third positive lens and the fourth positive lens are each made of plastics.

Advantages and actions of the image-formation optical system constructed according to the eighth embodiment of the second aspect of the invention are now explained.

Use of plastics is effective for cost reductions. Plastics vary in shape and refractive index with temperature and humidity, causing changes in focus positions. The arrangement according to the second aspect of the invention is most significantly affected by changes in the power of the first positive lens. This is the reason only this lens is made of glass that is little affected. It is thus possible to provide an image-formation optical system that is less susceptible to performance degradation while meeting the demand for cost reductions.

The image-formation optical system according to the ninth embodiment of the second aspect of the invention is characterized by comprising, in order from an object side thereof, a first positive lens, a second negative lens, a third positive lens and a fourth positive lens, wherein the first positive lens, the second negative lens, the third positive lens and the fourth positive lens are all made of plastics.

Advantages and actions of the image-formation optical system constructed according to the ninth embodiment of the second aspect of the invention are now explained.

If the $1^{st}$ to $4^{th}$ lenses are all made of plastics, further cost reductions are achievable. Focus displacements, if any, may be corrected by detection of them by autofocusing, followed by forward and backward movement of the lenses.

The imaging system according to the $10^{th}$ embodiment of the second aspect of the invention comprises an image-formation optical system and an image pickup device located on an image side thereof, characterized in that said image-formation optical system is defined by any one of the image-formation optical systems according to the $7^{th}$ to $9^{th}$ embodiments of the second aspect of the invention.

Advantages and actions of the imaging system constructed according to the $10^{th}$ embodiment of the second aspect of the invention can be understood from the explanations of the imaging systems according to the $7^{th}$ to $9^{th}$ embodiments of the second aspect of the invention, and so are not explained.

The imaging system according to the $11^{th}$ embodiment of the second aspect of the invention is characterized in that in any one of the imaging systems according to the above $1^{st}$ to $6^{th}$ and $10^{th}$ embodiments, the first positive lens is of double-convex shape.

Advantages and actions of the imaging system constructed according to the $11^{th}$ embodiment of the second aspect of the invention are now explained.

Generally when it comes to one positive lens, the best image-formation capability could be obtained when that positive lens has a meniscus form having converging action at one surface and diverging action at another surface, because aberrations can be cancelled out. In the case of a typical positive meniscus lens, however, one surface must be designed with strong positive power, because another surface acts as a surface having a negative power effect. For this reason, as the power of the lens becomes too strong, the curvature of positive power becomes steep, leading to a possibility of higher-order aberrations. With such a lens located as the foremost lens, high performance is not expectable because aberrations are enlarged through an image side part of the optical system to difficult-to-correct extents. For the inverted Ernostar type optical system according to the second aspect of the invention, on the other hand, it is not preferable to reduce the power of the first lens, because the power of the optical system must be guaranteed by the third and fourth lenses located on the image plane side of the optical system, resulting in a shift of the principal points toward the image side and, hence, an increase in the size of the optical system. Thus, it is favorable for compactness to increase the positive power of the first lens. In the second aspect of the invention, therefore, the first lens is made up of a double-convex lens, both surfaces of which have converging action. This means that the power of the first lens is allocated to two surfaces to hold back higher-order aberrations, and strong power is given to the positive lens on the object side to shift the principal points of the optical system toward the object side, so that the optical system can be slimmed down.

According to the $12^{th}$ embodiment of the invention, the imaging system as recited in any one of the above $1^{st}$ to $6^{th}$ and $10^{th}$ embodiments is further characterized in that the second negative lens is of double-concave shape.

Advantages and actions of the imaging system constructed according to the $12^{th}$ embodiment of the second aspect of the invention are now explained.

Only one of four lenses that form the inverted Ernostar type is a negative lens having diverging action, and so the construction of this negative lens is important to the performance of the whole optical system. For compactness in general, the power of each lens must be enhanced; it is necessary for the negative lens to make effective correction for aberrations produced at three such positive lenses. In favor of wide-angle arrangement, off-axis aberrations such as astigmatism and distortion must be properly corrected; that is, a proper power balance must be made between converging action and diverging action. Accordingly, the second negative lens is configured in such a double-concave form as to allow both surfaces to have diverging actions.

According to the $13^{th}$ embodiment of the second aspect of the invention, the imaging system as recited in any one of the above $1^{st}$ to $6^{th}$ and $10^{th}$ embodiments is characterized in that the third positive lens is of double-convex shape.

Advantages and actions of the imaging system constructed according to the $13^{th}$ embodiment of the second aspect of the invention are now explained.

Only one of the four lenses that form the inverted Ernostar type is a negative lens having diverging action, and so increasing the power of this lens contributes immediately to compactness and high performance. As the power of the second negative lens becomes strong, however, Petzval's sum is often overcorrected in a negative direction, rendering peripheral performance worse. Preferably in the second aspect of the invention, therefore, the third positive lens is configured in a double-convex form both surfaces of which have converging action for the purpose of correcting the Petzval's sum in a positive direction thereby preventing the peripheral performance from becoming worse.

According to the $14^{th}$ embodiment of the second aspect of the invention, the imaging system as recited in any one of the above $1^{st}$ to $6^{th}$ and $10^{th}$ embodiments is further characterized in that the third positive lens is in a meniscus form convex on its image side.

Advantages and actions of the imaging system constructed according to the $14^{th}$ embodiment of the second aspect of the invention are now explained.

While the third lens and the fourth lens in the inverted Ernostar type according to the second aspect of the invention are each a positive lens, it is understood that the allocation of strong powers to those lenses is unfavorable for compactness, because the principal points of the optical system are shifted toward the image side of the optical system. It is therefore preferable that at least the third lens plays a relatively enhanced role in correction of aberrations. To this end, the third positive lens should preferably be in a meniscus form having diverging action at its one surface. In consideration of aberration balance, it is also preferable that the third lens is in such a meniscus form convex on the image side as to keep the angle of a rim light beam incident thereon gentle.

According to the $15^{th}$ embodiment of the second aspect of the invention, the imaging system as recited in any one of the above $2^{nd}$, $4^{th}$, $6^{th}$ and $10^{th}$ embodiments is further characterized in that the composite refracting power of the first positive lens and the second negative lens is positive.

Advantages and actions of the imaging system constructed according to the above $15^{th}$ embodiment of the second aspect of the invention are now explained.

In the inverted Ernostar type, the composite focal length of the third lens and the fourth lens is always positive because both lenses are positive. Here, if the composite power of the first lens and the second lens is negative, it is then in principle difficult to reduce the length of the optical system because of a retrofocus type of −+ construction. It is thus necessary to make the composite focal length of the first lens and the second lens positive.

According to the $16^{th}$ embodiment of the second aspect of the invention, the imaging system as recited in any one of the above $1^{st}$, $3^{rd}$, $5^{th}$ and $10^{th}$ is further characterized in that the composite refracting power of the second negative lens, the third positive lens and the fourth positive lens is negative.

Advantages and actions of the imaging system constructed according to the above $16^{th}$ embodiment of the second aspect of the invention are now explained.

When strong power is allocated to the first lens, any effective compactness is unachievable unless some considerable care is taken of the constructions of the third and fourth lenses. As generally known in the art, constructing an optical system in a telephoto type form is favorable for length reductions. In the invention, the second, third and fourth lenses should preferably have a negative composite power because the telephoto type is constructed of the first lens and the second, third and fourth lenses.

According to the $17^{th}$ embodiment of the second aspect of the invention, the imaging system as recited any one of the above 1st to 6th and 10th embodiments is further characterized in that an aperture stop is located on the object side of the first positive lens.

According to the 18th embodiment of the second aspect of the invention, the imaging system as recited any one of the above 1st to 6th and 10th embodiments is further characterized in that an aperture stop is interposed between the first positive lens and the second negative lens.

Advantages and actions of the imaging systems according to the above 17th and 18th embodiments of the second aspect of the invention are now explained.

When a CCD is used as the image pickup device, incidence of an off-axes light beam from the image-formation optical system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of an aperture stop is of importance because it is difficult to manipulate the exit pupil position with the lenses. To make the angle of incidence of light rays on the CCD small, it is preferable to locate the aperture stop nearer to the object side of the optical system. Especially when the aperture stop is located nearest to the object side, the merit is that chromatic aberration of magnification can be well corrected because both the first positive lens and the second negative lens having relatively strong powers of opposite signs are located on the image side of the optical system. Especially when the apertures stop is interposed between the first positive lens and the second negative lens, the merit is that off-axis aberrations can be well corrected, because powers are allocated before and after the aperture stop so that coma can be easily balanced between upper light rays and lower light rays.

According to the 19th embodiment of the second aspect of the invention, the imaging system as recited any one of the above 1st to 6th and 10th embodiments are further characterized by satisfying the following condition:

$$15° < \alpha < 40° \tag{28}$$

Here $\alpha$ is the angle of incidence of a chief ray on an image plane at the maximum image height.

Advantages and actions of the imaging system constructed according to the 19th embodiment of the second aspect of the invention are now explained.

A problem with using a CCD as the image pickup device is that as an off-axis light beam emerging from the image-formation optical system is incident on the image plane at too large an angle, an image suffers from drastic brightness changes between its central position and its peripheral position. If the light beam is incident on the image plane at a small angle, on the other hand, that problem may then be solved; however, this now gives rise to an increase in optical system length. It is thus preferable to satisfy condition (28).

As the upper limit of 40° to condition (28) is exceeded, the angle of incidence of the chief ray on the CCD becomes too large, resulting in a drop of the brightness at the peripheral position of the image. As the lower limit of 15° is not reached, the optical system becomes too long.

More preferably, $$15° < \alpha < 35° \tag{28-1}$$

Even more preferably, $$18° < \alpha < 30° \tag{28-2}$$

According to the 20th embodiment of the second aspect of the invention, the imaging system as recited in any one of the above 1st to 6th and 10th embodiments is further characterized by satisfying the following condition:

$$0.3 < f_1/f_3 < 0.9 \tag{29}$$

Here $f_1$ is the focal length of the first positive lens, and $f_3$ is the focal length of the third positive lens.

Advantages and actions of the imaging system constructed according to the 20th embodiment of the second aspect of the invention are now explained.

If stronger power is given to the third positive lens than to the first positive lens, the principal points of the optical system are shifted toward the image side of the optical system, resulting in an increase in the size of the optical system. For meeting the demand for further compactness, it is thus preferable to satisfy condition (29).

As the upper limit of 0.9 to condition (29) is exceeded, the power of the third positive lens becomes too strong for compactness. As the lower limit of 0.3 is not reached, the power of the first positive lens becomes too strong, causing much spherical aberration and coma to be produced and rendering the performance of the optical system worse.

More preferably, $$0.5 < f_1/f_3 < 0.75 \tag{29-1}$$

According to the 2lst embodiment of the second aspect of the invention, the imaging system as recited any one of the above 1st to 6th and 10th embodiments is further characterized by satisfying the following condition:

$$-1 < f_2/f_3 < -0.4 \tag{30}$$

Here $f_2$ is the focal length of the second negative lens, and $f_3$ is the focal length of the third positive lens.

Advantages and actions of the imaging system constructed according to the 21st embodiment of the second aspect of the invention are now explained.

The second negative lens is only one negative lens, and so must serve to correct aberrations produced at the positive lenses with some power. Here, if too strong power is given to the third positive lens, then the positive lens overreacts to the effect of the negative lens on correction of aberrations, resulting in under-performance. In addition, the principal points of the optical system are shifted toward the image side of the optical system, resulting in an increase in the size of the optical system. It is thus preferable to make the power of the third positive lens relatively weaker than the power of the second negative lens or satisfy condition (30).

As the upper limit of −0.4 to condition (30) is exceeded, the power of the third lens becomes too strong, resulting in overcorrection of aberrations and a failure in achieving compactness. As the lower limit of −1 is not reached, the power of the third lens relative to the second lens becomes too weak, resulting in under-correction of aberrations.

More preferably, $$-0.9 < f_2/f_3 < -0.5 \tag{30-1}$$

According to the 22nd embodiment of the second aspect of the invention, the imaging system as recited in any one of the above 1st to 6th and 10th embodiments is further characterized by satisfying the following condition:

$$-1.3 < f_1/f_2 < 0.3 \tag{31}$$

Here $f_1$ is the focal length of the first positive lens, and $f_2$ is the focal length of the second negative lens.

Advantages and actions of the imaging system constructed according to the 22$^{nd}$ embodiment of the second aspect of the invention are now explained.

The first positive lens has relatively strong power, and so more aberrations are produced there. This means that the relation of the first positive lens to the second negative lens located on its image side is of significance. Therefore, it is preferable to satisfy condition (31).

As the upper limit of −0.3 is exceeded, the power of the second negative lens becomes relatively too strong, and as the lower limit of −1.3 is not reached, the power of the first positive lens becomes relatively too strong. In either case, spherical aberrations, coma and longitudinal chromatic aberration become worse.

More preferably, $$-1.1 < f_1/f_2 < 0.5 \tag{31-1}$$

According to the 23$^{rd}$ embodiment of the second aspect of the invention, the imaging system as recited in any one of the 1$^{st}$ to 6$^{th}$ and 10$^{th}$ embodiments is further characterized in that said image-formation optical system comprises at least one aspheric surface that satisfies the following condition:

$$0.01 < |(r_{sp}+r_{asp})/(r_{sp}-r_{asp})-1| < 100 \tag{32}$$

Here $r_{sp}$ is the axial radius of curvature of the aspheric surface, and $r_{asp}$ is a value that is obtained when a difference between a radius of curvature $r_{ASP}$ with the aspheric surface taken into account and an axial radius of curvature reaches a maximum in an optically effective range.

Here, the radius of curvature $r_{ASP}$ with the aspheric surface taken into account is defined by the following equation:

$$r_{ASP}=y-(1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

According to the 24$^{th}$ embodiment of the second aspect of the invention, the imaging system as recited in the above 23$^{rd}$ embodiment is further characterized in that the aspheric surface is located at the first positive lens.

According to the 25$^{th}$ embodiment of the second aspect of the invention, the imaging system as recited in the above 23$^{rd}$ embodiment is further characterized in that the aspheric surface is located at the second negative lens.

According to the 26$^{th}$ embodiment of the second aspect of the invention, the imaging system as recited in the above 23$^{rd}$ embodiment is further characterized in that the aspheric surface is located at the third positive lens.

According to the 27$^{th}$ embodiment of the second aspect of the invention, the imaging system as recited in the above 23$^{rd}$ embodiment is further characterized in that the aspheric surface is located at the fourth positive lens.

Advantages and actions of the imaging systems constructed according to the 23$^{rd}$ to 27$^{th}$ embodiments of the second aspect of the invention are now explained.

By use of at least one aspheric surface, aberrations can be well corrected; it is desired to satisfy condition (32).

As the upper limit of 100 to condition (32) is exceeded, the effect of the aspheric surface becomes too slender for correction of aberrations and so coma and astigmatism become worse. As the lower limit of 0.01 is not reached, the effect of the aspheric surface becomes too strong; aberrations remain overcorrected, causing the performance of the optical system to become worse and rendering lens processing difficult.

More preferably, $$0.05 < |(r_{sp}+r_{asp})/(r_{sp}-r_{asp})-1| < 50 \tag{32-1}$$

Even more preferably, $$0.1 < |(r_{sp}+r_{asp})/(r_{sp}-r_{asp})-1| < 10 \tag{32-2}$$

With more aberrations produced at the first positive lens that is a lens for receiving light rays in the first place, they are enlarged and transmitted through a part of the optical system on the image side. It is thus desired that aberrations produced there be sufficiently reduced. In other words, at least the first positive lens should preferably be provided with an aspheric surface.

The second negative lens is only one negative lens in the optical system; giving strong power thereto contributes to correction of coma and chromatic aberrations, and compactness as well. However, too strong power gives rise to higher-order aberrations that render the performance of the optical system worse. It is thus preferable that at least the second negative lens is provided with an aspheric surface.

In favor of compactness, it is preferable for the third positive lens to be weaker in power than that of the first positive lens. However, giving weaker power to this lens means that it is less capable of correcting aberrations. For the third positive lens, therefore, it is desired that aberration correction capability be enhanced without increasing power. It is thus preferable that the third positive lens is provided with an aspheric surface. More preferably, both surfaces of the third positive lens should be defined by aspheric surfaces.

With the fourth positive lens, it is possible to make correction for astigmatism left uncorrected at three lenses on the object side of the optical system, i.e., at the triplet. More preferably for correction of the bending of astigmatism, the surface power of the fourth positive lens should be varied; the fourth positive lens should be provided with an aspheric surface. Even more preferably, both surfaces should be defined by aspheric surfaces.

Throughout the second aspect of the invention, the lower or upper limits to the above conditions (21) to (32) may be limited to those to the respective subordinate conditions.

The above embodiments of the second aspect of the invention may be used in any desired combinations.

It is understood that if the above conditions are applied in suitable combinations as desired, the advantages of the second aspect of the invention are then much more enhanced.

Advantages and actions of the embodiments constructed according to the third aspect of the invention are now explained.

The imaging system according to the first embodiment of the third aspect of the invention comprises an image-formation optical system and an image pickup device located on an image side thereof, characterized in that:

said image-formation optical system comprises, in order from an object side thereof, a first positive lens of double-convex shape, a second negative lens, a third positive lens and a fourth positive lens of meniscus shape, and satisfies the following condition:

$$0.5 < f_1/Ih < 1.8 \tag{41}$$

Here $f_1$ is the focal length of the first positive lens, and Ih is the maximum image height of the image-formation optical system.

The number of lenses is now explained. As already described, at least three lenses are necessary to achieve high performance from the center to as far as the periphery of a screen. Even with the triplet type considered to have the highest performance (comprising, in order from its object side, a positive lens, a negative lens and a positive lens), however, the bending of astigmatism in the sagittal direction for instance remains uncorrected. Accordingly, a peripheral image plane moves forward at an intermediate position of the screen and backward at a peripheral position of the screen, resulting unavoidably in blurred images. In view of performance, the triplet type is unsuitable for application to an optical system compatible even with a CCD comprising a great number of pixels as contemplated herein. For this reason, the third aspect of the invention uses one more lens to improve performance.

In the case of a CCD-incorporating camera, on the other hand, there are some limitations to optical design, unlike a silver-halide film camera. As off-axis light beams emerging from an image-formation lens system are incident on the CCD at too large an angle, full advantage can never be taken of the ability of a microlens to condense light, offering a problem that an image undergoes drastic brightness variations between its central position and its peripheral position. Accordingly, the CCD must be designed such that the angle of light rays incident thereon becomes relatively small.

Thus, in consideration of the angle of incidence of light rays on a CCD, the third aspect of the invention makes use of a four-lens, inverted Ernostar type that is expected to have high performance and comprises, in order from the object side thereof, a positive lens, a negative lens, a positive lens and a positive lens. More specifically, a triplet type arrangement comprising a positive lens, a negative lens and a positive lens is located on the object side of the image-formation optical system to ensure ever higher image-formation capability, and one more lens is located on the image side of the image-formation optical system to make correction for aberrations remaining uncorrected at the three lenses forming the triplet. In addition, positive power is allocated to the side of the image-formation optical system nearest to an image plane, so that the angle of incidence of light on the CCD is kept small by its converging effect.

For the simultaneous achievement of compactness and high performance that are the object of the third aspect of the invention, a great deal of importance is given to the first positive lens in the third aspect of the invention.

First, the construction of the first positive lens is now explained. Generally when it comes to one positive lens, the best image-formation capability could be obtained when that positive lens has a meniscus form having converging action at one surface and diverging action at another surface, because aberrations can be cancelled out. In the case of a typical positive meniscus lens, however, one surface must be designed with strong positive power, because another surface acts as a surface having a negative power effect. For this reason, as the power of the lens becomes too strong, the curvature of positive power becomes steep, leading to a possibility of higher-order aberrations. With such a lens located as the foremost lens, high performance is not expectable because aberrations are enlarged through an image side part of the optical system to difficult-to-correct extents. For the inverted Ernostar type optical system according the third aspect of the invention, on the other hand, it is not preferable to reduce the power of the first lens, because the power of the optical system must be guaranteed by the third and fourth lenses located on the image plane side of the optical system, resulting in a shift of the principal points of the optical system toward the image side of the optical system and, hence, an increase in the size of the optical system. Thus, it is favorable for compactness to increase the positive power of the first lens.

In the third aspect of the invention, therefore, the first lens is made of a double-convex lens, both surfaces of which have converging action. This means that the power of the first lens is allocated to two surfaces to hold back higher-order aberrations, and strong power is given to the positive lens on the object side to shift the principal points of the optical system toward the object side of the optical system, so that the optical system can be slimmed down.

It is then required for the first positive lens to satisfy condition (41).

As the upper limit of 1.8 to condition (41) is exceeded, the power of the first positive lens becomes too weak to achieve compactness, and as the lower limit of 0.5 is not reached, the power of the first positive lens becomes strong to such an extent that spherical aberrations, coma, etc. become worse.

More preferably, $$0.7 < f_1/Ih < 1.7 \tag{41-1}$$

Even more preferably, $$0.9 < f_1/Ih < 1.6 \tag{41-2}$$

Further, the construction of the fourth lens must also be properly determined. Aberrations are effectively corrected by a combination of the converging action of both surfaces of the first lens with the negative diverging action of the second lens. As the power of the first lens becomes strong, aberrations remain uncorrected only by the second lens; degradation by residual aberrations of peripheral performance in particular becomes noticeable and so the wide-angle arrangement according to the third aspect of the invention is substantially unachievable. Those residual aberrations must be corrected by configuring the fourth lens in a meniscus form having diverging action at one surface.

By using such arrangement as described above, it is possible to provide a high-performance image-formation optical system that has well-corrected aberrations albeit being slimmed down.

The image-formation optical system according to the second embodiment of the third aspect of the invention is characterized by comprising, in order from an object side thereof, a first positive lens of double-convex shape, a second negative lens, a third positive lens and a fourth positive lens, and satisfying the following condition:

$$-2.0 < f_2/f < -0.65 \tag{42}$$

Here $f_2$ is the focal length of the second negative lens, and f is the focal length of the image-formation optical system.

The imaging system according to the third embodiment of the third aspect of the invention comprises an image-formation optical system and an image pickup device located on an image side thereof, characterized in that:

said image-formation optical system is an image-formation optical system as recited in the above second embodiment.

Advantages and actions of the image-formation optical system constructed according to the second embodiment and the imaging system constructed according to the third embodiment of the third aspect of the invention are now explained.

When the first positive lens is of double-convex shape, spherical aberrations and coma remain uncorrected, because both its surfaces have converging action. In view of high performance, the construction of the second negative lens for correcting those aberrations is of importance. Since the principal points of the optical system must be shifted toward the object side of the optical system for the purpose of compactness, on the other hand, the location and power of the negative lens for enabling this shift to be effectively carried out are also of importance. Now that the optical system according to the third aspect of the invention comprises only one negative lens, however, it is impossible to satisfactorily achieve compactness and high performance unless the power of the second negative lens is properly determined. It is thus required to satisfy condition (42).

As the upper limit of −0.65 to condition (42) is exceeded, compactness is little achievable because the power of the second negative lens becomes too strong to effectively shift the principal points toward the object side. As the lower limit of −2.0 is not reached, the power of the second negative lens becomes too weak for perfect correction of aberrations produced at the first lens and, consequently, spherical aberrations, coma and longitudinal chromatic aberration in particular become worse.

More preferably, $$-1.6 < f_2/f < -0.7 \tag{42-1}$$

Even more preferably, $$-1.3 < f_2/f < -0.75 \tag{42-2}$$

The imaging system according to the fourth embodiment of the third aspect of the invention comprises an image-formation optical system and an image pickup device located on an image side thereof, characterized in that:

said image-formation optical system comprises, in order from an object side thereof, a first positive lens of double-convex shape, a second negative lens, a third positive lens and a fourth positive lens, and satisfies the following condition:

$$-18 < f_{234}/Ih < -0.5 \tag{43}$$

Here $f_{234}$ is the composite focal length of the second negative lens, the third positive lens and the fourth positive lens, and Ih is the maximum image height of the image-formation optical system.

Advantages and actions of the imaging system constructed to the fourth embodiment of the third aspect of the invention are now explained.

As already described, strong power is imparted to the first positive lens located nearest to the object side of the optical system so that the principal points can be shifted toward the object side for compactness. In what follows, how compactness is more effectively achieved is explained.

As generally known in the art, constructing an optical system in a telephoto type form is favorable for length reductions. Even when the inverted Ernostar type is constructed in this way, compactness is effectively achievable. In the third aspect of the invention, therefore, the telephoto type is constructed of the first lens and the second, third and fourth lens. That is, the second lens, the third lens and the fourth lens are constructed in such a way as to have a negative composite focal length. Now that the second to fourth lens arrangement comprises two positive lenses and one negative lens, however, it is not desired that the negative power of the negative lens becomes too strong, because the power of the positive lenses must then be made relatively weak, resulting in the effect on correction of aberrations becoming slender or high performance being not obtained due to more aberrations produced at the second negative lens. Thus, the composite focal length of the second lens, the third lens and the fourth lens must satisfy condition (43).

As the upper limit of −0.5 to condition (43) is exceeded, the negative composite power becomes too strong and so the effect of the third and the fourth lens on correction of aberrations becomes slender, or the power of the negative lens becomes too strong, resulting in degradation of peripheral performance for coma and astigmatism in particular. As the lower limit of −18 is not reached, effective compactness is unachievable.

More preferably, $$-15 < f_{234}/Ih < 1.0 \tag{43-1}$$

Even more preferably, $$-10 < f_{234}/Ih < 1.5 \tag{43-2}$$

The imaging system according to the fifth embodiment of the third aspect of the invention comprises an image-formation optical system and an image pickup device located on an image side thereof, characterized in that:

said image-formation optical system comprises, in order from an object side thereof, a first positive lens of double-convex shape, a second negative lens, a third positive lens and a fourth positive lens, with an aperture stop located on an object side of the first positive lens, and satisfying the following condition:

$$1.0 < f_3/Ih < 2.7 \tag{44}$$

Here $f_3$ is the focal length of the third positive lens, and Ih is the maximum image height of the image-formation optical system.

Advantages and actions of the imaging system constructed according to the fifth embodiment of the third aspect of the invention are now explained.

First, the position of the aperture stop is explained. When a CCD is used as the image pickup device, incidence of an off-axes light beam from an image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. In the imaging system according to the fifth embodiment of the third aspect of the invention, therefore, the aperture stop is located nearest to the object side of the optical system for the purpose of making the angle of light rays on the CCD small. Especially when the aperture stop is located nearest to the object side of the inverted Ernostar type optical system, the merit is that chromatic aberration of magnification can be well corrected because both the first positive lens and the second negative lens having relatively strong powers of opposite signs are located on the image side of the optical system.

In this arrangement, the third positive lens, because of being spaced away from the aperture stop, plays a role in correction of peripheral performance or aberrations because of an increase in the height of rim rays. For the aforesaid reasons, when the first positive lens is of double-convex shape, the first positive lens has strong power, and the second negative lens has power relatively strong enough to make correction for aberrations produced at the positive lens as well. Still, some aberrations of the first positive lens remain uncorrected. For this reason, the third positive lens must correct aberrations produced at the first and second lenses. However, giving too strong power to the third positive brings about a shift of the principal points of the optical system toward the image side thereof, resulting in an increase in the length of the optical system. It is thus preferable for the third positive lens to satisfy condition (44).

As the upper limit of 2.7 to condition (44) is exceeded, the power of the third lens becomes too weak and, accordingly, peripheral performance, especially coma and astigmatism become worse. As the lower limit of 1.0 is not reached, it is difficult to slim down the optical system because the power of the third positive lens becomes too strong.

More preferably, $$1.2 < f_3/Ih < 2.5 \tag{44-1}$$

Even more preferably, $$1.4 < f_3/Ih < 2.2 \tag{44-2}$$

The image-formation optical system according the sixth embodiment of the third aspect of the invention is characterized by comprising, in order from an object side thereof, a first positive lens of double-convex shape, a second negative lens, a third positive lens and a fourth positive lens, with an aperture stop located on an object side of the first positive lens, and satisfying the following condition:

$$-0.6 < f/f_{23} < 0.15 \tag{45}$$

Here $f_{23}$ is the composite focal length of the second negative lens and the third positive lens, and f is the focal length of the image-formation optical system.

The imaging system according to the seventh embodiment of the third aspect of the invention comprises an image-formation optical system and an image pickup device located on an image side thereof, characterized in that:

said image-formation optical system is an image-formation optical system as recited in the above sixth embodiment.

Advantages and actions of the image-formation optical system constructed according to the sixth embodiment and the imaging system constructed according to the seventh embodiment of the third aspect of the invention are now explained.

When the first positive lens is of double-convex shape, in principle, aberrations remain there, because both its surfaces have converging action. Those aberrations must be corrected by way of the diverging action of the second negative lens. With the aperture stop located on the object side of the first positive lens, however, light rays at the periphery of a screen differ significantly in height between the first positive lens and the second negative lens, often resulting in a failure in sufficient correction of coma and astigmatism. For this reason, it is preferable to enhance the role of the third lens in correction of those aberrations. Thus, the third positive lens is configured in such a meniscus form as to have diverging action at one surface and make opposite corrections for aberrations at two surfaces.

If, at this time, the power of the third positive lens is increased with respect to the second negative lens, the principal points of the optical system are shifted toward the image side of the optical system, rendering compactness difficult. It is thus necessary for the composite focal length of the second negative lens and the third positive lens to satisfy condition (45).

As the upper limit of 0.15 to condition (45) is exceeded, compactness is little achievable. As the lower limit of −0.6 is not reached, the power of the second negative lens becomes too strong or the power of the third positive lens becomes too weak. In either case, coma and astigmatism become worse.

More preferably, $$-0.5 < f/f_{23} < 0.1 \tag{45-1}$$

Even more preferably, $$-0.4 < f/f_{23} < 0 \tag{45-2}$$

According to the eighth embodiment of the third aspect of the invention, the imaging system as recited in any one of the above first, third to fifth and seventh embodiments of the third aspect is further characterized in that the second negative lens is of double-concave shape.

Advantages and actions of the imaging system constructed to the eighth embodiment of the third aspect of the invention are now explained.

Only one of four lenses that form the inverted Ernostar type is a negative lens having diverging action, and so the construction of this negative lens is important to the performance of the whole optical system. For compactness in general, the power of each lens must be enhanced; it is necessary for the negative lens to make effective correction for aberrations produced at three such positive lenses. In favor of wide-angle arrangement, off-axis aberrations such as astigmatism and distortion must be properly corrected; that is, a proper power balance must be made between converging action and diverging action. Accordingly, the second negative lens is configured in such a double-concave form as to allow both surfaces to have diverging action.

According to the ninth embodiment of the third aspect of the invention, the imaging system as recited in any one of the above first, third to fifth and seventh embodiments is characterized in that the third positive lens is of double-convex shape.

Advantages and actions of the imaging system constructed according to the ninth embodiment of the third aspect of the invention are now explained.

Only one of the four lenses that form the inverted Ernostar type is a negative lens having diverging action, and so increasing the power of this lens contributes to compactness and high performance. As the power of the second negative lens becomes strong, however, Petzval's sum is often overcorrected in a negative direction, rendering peripheral performance worse. Preferably in the third aspect of the invention, therefore, the third positive lens is configured in a double-convex form both surfaces of which have converging action for the purpose of correcting the Petzval's sum in a positive direction thereby preventing the peripheral performance from becoming worse.

According to the $10^{th}$ embodiment of the $3^{rd}$ aspect of the invention, the imaging system as recited in any one of the above $1^{st}$, $3^{rd}$ to $5^{th}$ and $7^{th}$ embodiments is further characterized in that the third positive lens is in a meniscus form convex on its image side.

While the third lens and the fourth lens in the inverted Ernostar type according to the third aspect of the invention are each a positive lens, it is understood that the allocation of strong powers to those lenses is unfavorable for compactness, because the principal points of the optical system are shifted toward the image side of the optical system. It is therefore preferable that at least the third lens plays a relatively enhanced role in correction of aberrations. To this end, the third positive lens should preferably be in a meniscus form having diverging action at its one surface. In consideration of aberration balance, it is also preferable that the third lens is in such a meniscus form convex on the image side as to keep the angle of a rim light beam incident thereon gentle.

According to the 11th embodiment of the third aspect of the invention, the imaging system as recited in any one of the above 1st, 3rd to 5th and 7th embodiments is further characterized in that the composite refracting power of the first positive lens and the second negative lens is positive.

Advantages and actions of the imaging system constructed according to the 11th embodiment of the third aspect of the invention are now explained.

In the inverted Ernostar type, the composite focal length of the third lens and the fourth lens is always positive because both lenses are positive. Here, if the composite power of the first lens and the second lens is negative, it is then in principle difficult to reduce the length of the optical system because of a retrofocus type of −+ construction. It is thus preferable to make the composite focal length of the first lens and the second lens positive.

According to the 12th embodiment of the third aspect of the invention, the imaging system as recited in any one of the above 1st, 3rd to 5th and 7th embodiments is further characterized in that the composite refracting power of the second negative lens, the third positive lens and the fourth positive lens is negative.

Advantages and actions of the imaging system constructed according to the 12th embodiment of the third aspect of the invention are now explained.

When strong power is allocated to the first lens, any effective compactness is unachievable unless some considerable care is taken of the constructions of the third and fourth lenses. As generally known in the art, constructing an optical system in a telephoto type form is favorable for length reductions. Here, the second, third and fourth lenses should preferably have a negative composite power because the telephoto type is constructed of the first lens and the second, third and fourth lenses.

According to the 13th embodiment of the third aspect of the invention, the imaging system as recited in any one of the above 1st, 3rd, 5th and 7th embodiments is further characterized by satisfying the following condition:

$$-100 < f_{234}/Ih < -0.5 \qquad (46)$$

Here $f_{234}$ is the composite focal length of the second negative lens, the third positive lens and the fourth positive lens, and Ih is the maximum image height of the image-formation optical system.

Advantages and actions of the imaging system constructed according to the 13th embodiment of the third aspect of the invention are now explained.

By allowing the second, third and fourth lenses to have a negative composite power, it is acceptable to set up a telephoto type arrangement with the positive power of the first lens and the negative powers of the second, third and fourth lenses. It is here preferable to satisfy condition (46) thereby achieving compactness and high performance at the same time.

As the upper limit of −0.5 to condition (46) is exceeded, the negative power of the second lens becomes too strong and, accordingly, coma, astigmatism and Petzval's sum become worse, or the positive powers of the third lens and the fourth lens become too weak and, accordingly, coma and distortion becomes worse. As the lower limit of −100 is not reached, any effective compactness is not achievable because the composite power of the second, third and fourth lenses becomes too weak to obtain any significant telephoto effect.

More preferably, $$-50 < f_{234}/Ih < -1.0 \qquad (46\text{-}1)$$

Even more preferably, $$-20 < f_{234}/Ih < -1.5 \qquad (46\text{-}2)$$

According to the 14th embodiment of the third aspect of the invention, the imaging system as recited in any one of the above 1st, 3rd and 4th embodiments is further characterized in that an aperture stop is located on the object side of the first positive lens.

According to the 15th embodiment of the third aspect of the invention, the imaging system as recited in any one of the above 1st, 3rd and 4th embodiments is further characterized in that an aperture stop is interposed between the first positive lens and the second negative lens.

Advantages and actions of the imaging systems constructed according to the 14th and 15th embodiments of the third aspect of the invention are now explained.

When a CCD is used as the image pickup device, incidence of an off-axes light beam from the image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. To make the angle of incidence of light rays on the CCD small, it is preferable to locate the aperture stop near to an object side. Especially when the aperture stop is located nearest to the object side, the merit is that chromatic aberration of magnification can be well corrected because both the first positive lens and the second negative lens having relatively strong powers of opposite signs are located on the image side. Especially when the apertures stop is interposed between the first positive and the second negative lens, the merit is that off-axis aberrations can be well corrected, because powers are allocated before and after the aperture stop so that coma can be easily balanced between upper light rays and lower light rays.

According to the 16th embodiment of the third aspect of the invention, the imaging system as recited in any one of the above 1st, 3rd to 5th and 7th embodiments is further characterized by the following condition:

$$0.5 < f_{12}/f < 30 \qquad (47)$$

Here $f_{12}$ is the composite focal length of the first positive lens and the second negative lens, and f is the focal length of the image-formation optical system.

Advantages and actions of the imaging system constructed according to the 16th embodiment of the third aspect of the invention are now explained.

In the inverted Ernostar type, the composite focal length of the third lens and the fourth lens is positive because both lenses are positive. Here, if the composite power of the first lens and the second lens is negative, it is then in principle difficult to reduce the length of the optical system because of a retrofocus type of −+ construction, wherein the principal points of the optical system are shifted toward the image side of the optical system. This is not preferable because the object of the third aspect of the invention is not accomplished. It is thus necessary to make the composite focal length of the first lens and the second lens positive; it is preferable to satisfy condition (47) for the purpose of achieving compactness and high performance at the same time.

As the upper limit of 30 to condition (47) is exceeded, the composite focal length of the first and the second lens becomes too short and, accordingly, compactness is little achievable. As the lower limit of 0.5 is not reached, the composite focal length of the first and the second lens becomes too long and, accordingly, considerable higher-order aberrations such as coma are produced, rendering the performance of the optical system worse.

More preferably, $$0.8 < f_{12}/f < 20 \tag{47-1}$$

Even more preferably, $$1.0 < f_{12}/f < 10 \tag{47-2}$$

According to the 17$^{th}$ embodiment of the third aspect of the invention, the imaging system as recited in any one of the above 1$^{st}$, 3$^{rd}$ to 5$^{th}$ and 7$^{th}$ embodiments is further characterized by satisfying the following condition:

$$0.4 < f_1/f_3 < 0.9 \tag{48}$$

Here $f_1$ is the focal length of the first positive lens, and $f_3$ is the focal length of the third positive lens.

Advantages and actions of the imaging system constructed according to the 17$^{th}$ embodiment of the third aspect of the invention are now explained.

Giving stronger power to the third positive lens than to the first positive lens renders the optical system bulkier because its principal points are shifted toward its image side. For the purpose of further size reductions, it is thus preferable to satisfy condition (48).

As the upper limit of 0.9 to condition (48) is exceeded, compactness is unachievable because the power of the third positive lens becomes too strong. As the lower limit of 0.4 is not reached, the power of the first positive lens becomes too strong, resulting in more spherical aberrations and coma, or the power of the third positive lens becomes too weak, resulting in under-correction of aberrations. In either case, the performance of the optical system becomes worse.

More preferably, $$0.5 < f_1/f_3 < 0.75 \tag{48-1}$$

Even more preferably, $$0.4 < f_1/f_3 < 0.9 \tag{48-2}$$

According to the 18$^{th}$ embodiment of the third aspect of the invention, the imaging system as recited any one of the above 1$^{st}$, 3$^{rd}$ to 5$^{th}$ and 7$^{th}$ embodiments is further characterized by satisfying the following condition:

$$0.3 < f_1/f_{34} < 0.9 \tag{49}$$

Here $f_1$ is the focal length of the first positive lens, and $f_{34}$ is the composite focal length of the third positive lens and the fourth positive lens.

Advantages and actions of the imaging system constructed according to the 18$^{th}$ embodiment of the third aspect of the invention are now explained.

Giving stronger power to the third positive lens and the fourth positive lens than to the first positive lens renders the optical system bulkier because the principal points of the optical system are shifted toward the image side of the optical system. It is thus preferable to satisfy condition (49) for the purpose of achieving further size reductions.

As the upper limit of 0.9 to condition (49) is exceeded, the composite power of the third positive lens and the fourth positive lens becomes too strong and, accordingly, compactness is unachievable. As the lower limit of 0.3 is not reached, the power of the first positive lens becomes too strong, resulting in more spherical aberrations and coma, or the power of the third positive lens becomes too weak, resulting in under-correction of aberrations. In either case, the performance of the optical system becomes worse.

More preferably, $$0.4 < f_1/f_{34} < 0.8 \tag{49-1}$$

According to the 19$^{th}$ embodiment of the third aspect of the invention, the imaging system as recited in any one of the above 1$^{st}$, 3$^{rd}$ to 5$^{th}$ and 7$^{th}$ embodiments is further characterized by satisfying the following condition:

$$-0.9 < (r_{1f} + r_{1r})/(r_{1f} - r_{1r}) < 0.5 \tag{50}$$

Here $r_{1f}$ is the axial radius of curvature of the object side-surface of the first positive lens, and $r_{1r}$ is the axial radius of curvature of the image side-surface of the first positive lens.

Advantages and actions of the imaging system constructed according to the 19$^{th}$ embodiment of the third aspect of the invention are now explained.

As the upper limit of 0.5 to condition (50) is exceeded, the converging action of the entrance side of the first positive lens on the first bending of light rays becomes too slender to make effective correction for spherical aberrations and coma, and as the lower limit of −0.9 is not reached, higher-order aberrations are likely to occur because the power of the entrance side of the first positive lens becomes too strong.

More preferably, $$-0.85 < (r_{1f} + r_{1r})/(r_{1f} - r_{1r}) < 0.2 \tag{50-1}$$

Even more preferably, $$-0.8 < (r_{1f} + r_{1r})/(r_{1f} - r_{1r}) < 0 \tag{50-2}$$

According to the 20$^{th}$ embodiment of the third aspect of the invention, the imaging system as recited in any one of the above 1$^{st}$, 3$^{rd}$ to 5$^{th}$ and 7$^{th}$ embodiments is further characterized by satisfying the following condition:

$$15° < \alpha < 40° \tag{51}$$

Here $\alpha$ is the angle of incidence of a chief ray on the image plane at the maximum image height.

Advantages and actions of the imaging system constructed according to the 20$^{th}$ embodiment of the third aspect of the invention are now explained.

A problem with using a CCD as the image pickup device is that as an off-axis light beam emerging from the image-formation optical system is incident on the image plane at too large an angle, an image suffers from drastic brightness changes between its central position and its peripheral position. If the light beam is incident on the image plane at a small angle, on the other hand, that problem may then be solved; however, this now gives rise to an increase in the length of the optical system. It is thus preferable to satisfy condition (51).

As the upper limit of 40° to condition (51) is exceeded, the angle of the chief ray on the CCD becomes too large, resulting in a drop of the brightness at the peripheral position of an image. As the lower limit of 15° is not reached, the optical system becomes too long.

More preferably, $$15° < \alpha < 35° \tag{51-1}$$

Even more preferably, $$18° < \alpha < 30° \tag{51-2}$$

According to the 21$^{st}$ embodiment of the third aspect of the invention, the imaging system as recited in any one of the above 1$^{st}$, 3$^{rd}$ to 5$^{th}$ and 7$^{th}$ embodiments is further characterized by satisfying the following condition:

$$1.4 < n_1 < 1.7 \quad (52)$$

Here $n_1$ is the refractive index of the first positive lens.

Advantages and actions of the imaging system constructed according to the 21$^{st}$ embodiment of the third aspect of the invention are now explained.

In favor of cost reductions, it is generally necessary to use glass having a low refractive index. For a positive lens, on the other hand, it is required to increase its refractive index for correction of Petzval's sum. For this reason, the refractive index of the first positive lens, to which strong power is given, should preferably satisfy condition (52).

Exceeding the upper limit of 1.7 to condition (52) makes cost reductions difficult, and falling short of the lower limit of 1.4 renders Petzval's sum worse.

More preferably, $$1.45 < n_1 < 1.65 \quad (52\text{-}1)$$

According to the 22$^{nd}$ embodiment of the third aspect of the invention, the imaging system as recited in any one of the above 1$^{st}$, 3$^{rd}$ to 5$^{th}$ and 7$^{th}$ embodiments is further characterized in that said image-formation optical system comprises at least one aspheric surface that satisfies the following condition:

$$0.01 < |(r_{sp}+r_{asp})/(r_{sp}-r_{asp})-1| < 100 \quad (53)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP} = y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

According to the 23$^{rd}$ embodiment of the third aspect of the invention, the imaging system as recited in the above 22$^{nd}$ embodiment is further characterized in that the aspheric surface is located at the second negative lens.

According to the 24$^{th}$ embodiment of the third aspect of the invention, the imaging system as recited in the 22$^{nd}$ embodiment is further characterized in that the aspheric surface is used at the third positive lens.

According to the 25$^{th}$ embodiment of the third aspect of the invention, the imaging system as recited in the above 22$^{nd}$ embodiment is further characterized in that the aspheric surface is located at the fourth positive lens.

Advantages and actions of the imaging systems constructed according to the 22$^{nd}$ to 25$^{th}$ embodiments of the third aspect of the invention are now explained.

It is desired that at least one aspheric surface be used for satisfactory correction of aberrations and condition (53) be satisfied.

As the upper limit of 100 to condition (53) is exceeded, the effect of the aspheric surface becomes too slender for correction of aberrations and so coma and astigmatism become worse. As the lower limit of 0.01 is not reached, the effect of the aspheric surface becomes too strong; aberrations remain overcorrected, causing the performance of the optical system to become worse and rendering lens processing difficult.

More preferably, $$0.05 < |(r_{sp}+r_{asp})/(r_{sp}-r_{asp})-1| < 50 \quad (53\text{-}1)$$

Even more preferably, $$0.1 < |(r_{sp}+r_{asp})/(r_{sp}-r_{asp})-1| < 10 \quad (53\text{-}2)$$

The second negative lens is only one negative lens in the optical system; giving strong power thereto contributes to correction of coma and chromatic aberrations and compactness as well. However, too strong power gives rise to higher-order aberrations that render the performance of the optical system worse. It is thus preferable that at least the second negative lens is provided with an aspheric surface.

In favor of compactness, it is preferable for the third positive lens to be weaker in power than that of the first positive lens. However, giving weaker power to this lens means that it is less capable of correcting aberrations. For the third positive lens, therefore, it is desired that aberration correction capability be enhanced without increasing power. It is thus preferable that the third positive lens is provided with an aspheric surface. More preferably, both surfaces of the third positive lens should be defined by aspheric surfaces.

With the fourth positive lens, it is possible to make correction for astigmatism left uncorrected at three lenses on the object side of the optical system, i.e., at the triplet. More preferably for correction of the bending of astigmatism, the power of the surface of the fourth positive lens should be varied; the fourth positive lens should be provided with an aspheric surface. Even more preferably, both surfaces should be defined by aspheric surfaces.

According to the 26$^{th}$ embodiment of the third aspect of the invention, the imaging system as recited in any one of the above 1$^{st}$, 3$^{rd}$ to 5$^{th}$ and 7$^{th}$ embodiments is further characterized in that said image-formation optical system comprises at least one aspheric surface that satisfies the following condition:

$$0.1 < |(r_{sp}+r_{asp})/(r_{sp}-r_{asp})-1| < 20 \quad (54)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP} = y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

Advantages and actions of the imaging system constructed according to 26$^{th}$ embodiment of the third aspect of the invention are now explained.

With more aberrations produced at the first positive lens that is a lens for receiving light rays in the first place, they are enlarged and transmitted through a part of the optical system on the image side. It is thus desired that aberrations produced there be sufficiently reduced. In other words, at least the first positive lens should preferably be provided with an aspheric surface that satisfies condition (54).

As the upper limit of 20 to condition (54) is exceeded, the effect of the aspheric surface in the first positive lens becomes too weak to leave coma and astigmatism uncorrected, rendering the performance of the whole screen worse. As the lower limit of 0.1 is not reached, the effect of the aspheric surface becomes too strong to leave spherical aberrations and coma over-corrected, making the performance of the optical system worse and lens processing difficult.

More preferably, $$0.2<|(r_{sp}+r_{asp})/(r_{sp}-r_{asp})-1|<15 \tag{54-1}$$

Even more preferably, $$0.5<|(r_{sp}+r_{asp})/(r_{sp}-r_{asp})-1|<10 \tag{54-2}$$

Throughout the first aspect of the invention, the lower or upper limits to the above conditions (41) to (54) may be limited to those to the respective subordinate conditions.

It is understood that if the above conditions are applied in suitable combinations as desired, the advantages of the third aspect of the invention are then much more enhanced.

Advantages and actions of the fourth aspect of the invention as described above are now explained.

The image-formation optical system according to the first embodiment of the fourth aspect of the invention is characterized by comprising, in order from an object side thereof, a first positive lens, a second negative lens, a third positive lens and a fourth positive lens, and satisfying the following condition:

$$-1.4<f_2/f<-0.7 \tag{61}$$

Here $f_2$ is the focal length of the second negative lens, and f is the focal length of the image-formation optical system.

The imaging system according to the second embodiment of the third aspect of the invention comprises an image-formation optical system and an image pickup device located on an image side thereof, characterized in that:

said image-formation optical system is an image-formation optical system as recited in the above first embodiment.

Advantages and actions of the image-formation optical system constructed according to the first embodiment and the imaging system constructed according to the second embodiment of the fourth aspect of the invention are now explained.

First, the number of lenses is explained. As already described, at least three lenses are necessary to achieve high performance from the center to as far as the periphery of a screen. Even with the triplet type considered to have the highest performance (comprising, in order from its object side, a positive lens, a negative lens and a positive lens), however, the bending of astigmatism in the sagittal direction for instance remains uncorrected. Accordingly, a peripheral image plane moves forward at an intermediate position of the screen and backward at a peripheral position of the screen, resulting unavoidably in blurred images. In view of performance, the triplet type is unsuitable for application to an optical system compatible even with a CCD comprising a great number of pixels as contemplated herein. For this reason, the fourth aspect of the invention uses one more lens to improve performance.

In the case of a CCD-incorporating camera, on the other hand, there are some limitations to optical design, unlike a silver-halide film camera. As off-axis light beams emerging from an image-formation lens system are incident on a CCD at too large an angle, full advantage can never be taken of the ability of a microlens to condense light, offering a problem that an image undergoes drastic brightness variations between its central position and its peripheral position. Accordingly, the CCD must be designed such that the angle of light rays incident thereon becomes relatively small.

Thus, in consideration of the angle of incidence of light rays on the CCD, the fourth aspect of the invention makes use of a four-lens, inverted Ernostar type that is expected to have high performance and comprises, in order from the object side thereof, a positive lens, a negative lens, a positive lens and a positive lens. More specifically, a triplet type arrangement comprising a positive lens, a negative lens and a positive lens is located on the object side of the image-formation optical system to ensure ever higher image-formation capability, and one more lens is located on the image side of the image-formation optical system to make correction for aberrations remaining undercorrected at the three lenses forming the triplet. In addition, positive power is allocated to the side of the image-formation optical system nearest to an image plane, so that the angle of incidence of light rays on the CCD is kept small by its converging effect.

To simultaneously accomplish compactness and high performance, that is, the object of the fourth aspect of the invention, importance is given to the second negative lens.

Referring now to the construction of the second negative lens, only one of four lenses that form the inverted Ernostar type is a negative lens, and so the construction of this negative lens is important to the performance of the whole optical system only by use of positive lenses having converging action, it is difficult to make satisfactory correction for spherical aberrations and coma in particular; the diverging action of the negative lens is essential for that correction. For compactness, on the other hand, it is important how the principal points of the optical system are manipulated; in other words, to what degree the power of the negative lens be increased is important for the purpose of manipulating them by a combination of the negative lens with the positive lenses. Thus, it is required to make the power of the second negative lens relatively strong.

However, as the power of the negative lens becomes too strong, it is difficult to balance performance because the power of the positive lenses must be increased so as to make correction for aberrations produced at that negative lens itself. In the lens type according to the fourth aspect of the invention, when the positive powers of the third lens and the fourth lens become strong, the negative power of the second lens often tends to combine with the positive powers of the third lens and the fourth lens, leading to a retrofcus type wherein the optical system becomes rather long.

To accomplish the object of the fourth aspect of the invention, it is thus required to properly determine the focal length of the second negative lens or satisfy condition (61).

When the upper limit of −0.7 to condition (16) is exceeded, the power of the second negative lens becomes too strong with the result that higher-order aberrations are produced to put the performance of the optical system in an ill-balanced state. As the lower limit of −1.4 is not reached, the power of the second negative lens becomes too weak with the result that spherical aberrations and coma are left undercorrected or the optical system becomes bulky.

More preferably, $$-1.3<f_2/f<-0.8 \tag{61-1}$$

According to the fourth aspect of the invention as described above, it is possible to provide a small-format yet high-performance image-formation optical system with well-corrected aberrations.

The image-formation optical system according to the third embodiment of the fourth aspect of the invention is characterized by comprising, in order from an object side thereof, a first positive lens, a second negative lens of double-concave shape, a third positive lens and a fourth positive and satisfying the following condition.

$$5 < f_4/f < 200 \tag{62}$$

Here $f_4$ is the focal length of the fourth positive lens, and f is the focal length of the image-formation optical system.

The imaging system according to the fourth embodiment of the fourth aspect of the invention comprises an image-formation optical system and an image pickup device located on an image side thereof, characterized in that said image-formation optical system is an image-formation optical system as recited in the above third embodiment.

The image-formation optical system according to the third embodiment and the imaging system according to the fourth embodiment of the fourth aspect of the invention are now explained.

The construction of the second lens is now explained. Only one of four lenses that form the inverted Ernostar type is a negative lens, as previously described, and so the construction of this negative lens is important to the performance of the whole optical system. For high performance, it is necessary for the negative lens to make effective correction for aberrations produced at three such positive lenses. For correction of off-axis aberrations such as astigmatism and distortion, a proper power balance must be made between converging action and diverging action. Accordingly, the second negative lens is configured in such a double-concave form as to allow both surfaces to have diverging actions.

On the other hand, both the third lens and the fourth lens located on the image side of the optical system with respect to the second negative lens are positive, so too is their composite power. When the second negative lens is configured in such a double-concave form as to make correction for aberrations, its power becomes strong so that the negative power of the second negative lens combines with the positive powers of the third lens and the fourth lens, resulting in a retrforcus type where the optical system becomes rather long. To eliminate this problem thereby achieving compactness that is the object of the fourth aspect of the invention, the composite power of the third lens and the fourth lens should be decreased. It is here noted that the fourth positive lens, located nearest to the image side of the optical system, is less effective for correction of aberrations than the third positive lens, because a light beam passing through the fourth positive lens is thinner than that through the third positive lens. Thus, by making the power of the fourth positive lens weaker than that of the third positive lens, it is possible to achieve compactness while keeping high performance. Accordingly, it is necessary for the fourth positive lens to satisfy condition (62).

As the upper limit of 200 to condition (62) is exceeded, the effect of the fourth positive lens on correction of aberrations becomes too slender with the result that the performance of the optical system becomes worse, and as the lower limit of 5 is not reached, the power of the fourth positive lens becomes too strong to meet the demand for compactness.

More preferably, $$10 < f_4/f < 150 \tag{62-1}$$

Even more preferably, $$15 < f_4/f < 100 \tag{62-2}$$

The image-formation optical system according to the fifth embodiment of the fourth aspect of the invention is characterized by comprising, in order from an object side thereof, a first positive lens, a second negative lens of double-concave shape, a third positive lens and a fourth positive lens and satisfying the following condition:

$$0.1 < f_{12}/f < 6 \tag{63}$$

Here $f_{12}$ is the composite focal length of the first positive lens and the second negative lens, and f is the focal length of the image-formation optical system.

The imaging system according to the sixth embodiment of the fourth aspect of the invention comprises an image-formation optical system and an image pickup device located on an image side thereof, characterized in that said image-formation optical system is an image-formation optical system as recited in the above fifth embodiment.

Advantages and actions of the image-formation optical system constructed according to the fifth embodiment and the imaging system and the imaging system constructed according to the sixth embodiment of the fourth aspect of the invention are now explained.

As explained in conjunction with the image-formation optical system according to the above fifth embodiment and the imaging system according to the above sixth embodiment of the fourth aspect of the invention, even when it is intended to achieve high performance using a double-concave lens as the second lens, compactness is often unachievable. With the lens type according to the fourth aspect of the invention wherein the composite power of the third lens and the fourth lens is positive, the demand for compactness is not met, because it assumes on a retrofocus type when the composite power of the lenses located on the object side of the optical system with respect to the third lens is negative. To eliminate this problem, the composite power of the first lens and the second lens should be positive, so that compactness can be achieved because of ++ power construction. It is then for the composite focal length of the first lens and the second lens to satisfy condition (63).

As the upper limit of 6 to condition (63) is exceeded, the composite power of the first lens and the second lens becomes too weak to such an extent that compactness is not effectively achievable. As the lower limit of 0.1 is not reached, the power of the first positive lens becomes too strong with the result that spherical aberrations and coma become worse and so the performance of the optical system becomes worse.

More preferably, $$0.5 < f_{12}/f < 5 \tag{63-1}$$

Even more preferably, $$1 < f_{12}/f < 4 \tag{63-2}$$

The image-formation optical system according to the seventh embodiment of the fourth aspect of the invention is characterized by comprising, in order from an object side thereof, a first positive lens, a second negative lens of double-concave shape, a third positive lens and a fourth positive lens and satisfying the following condition:

$$-1.3 < f_1/f_2 < -0.1 \tag{64}$$

Here $f_1$ is the focal length of the first positive lens, and $f_2$ is the focal length of the second negative lens.

The imaging system according to the eighth embodiment of the fourth aspect of the invention comprises an image-formation optical system and an image pickup device located on an image side thereof, characterized in that said image-formation optical system is an image-formation optical system as recited in the above seventh embodiment.

Advantages and actions of the image-formation optical system constructed according to the seventh embodiment and the imaging system constructed according to the eighth embodiment of the fourth aspect of the invention are now explained.

By locating the principal points of the optical system on the object side thereof with respect to the focal length thereof, compactness could be achieved. For the image-formation optical system according to the fourth aspect of the invention, it is preferable to allocate strong power to the first positive lens that is located nearest to the object side of the optical system among the three positive lenses, because the principal points are shifted toward the object side. However, when strong power is given to the first positive lens, high performance cannot be achieved unless aberrations left uncorrected there are well corrected, because they are enlarged and transmitted through the lenses located on the image side. To make effective correction for aberrations left uncorrected at the first positive lens, it is preferable that the second negative lens located just adjacent to the image side of the first positive lens is configured in a double-concave form both surfaces of which have diverging action. Further, if the powers of these lenses are properly determined, it is then possible to achieve much higher performance. It is thus required for the first positive lens and the second negative lens to satisfy condition (64).

As the upper limit of −0.1 to condition (64) is exceeded, the power of the first positive lens becomes too weak with the result that compactness is unachievable or the power of the second negative lens becomes too strong with the result that spherical aberrations and coma are overcorrected, leading to underperformance. As the lower limit of −1.3 is not reached, the power of the first positive lens becomes too strong with the result that higher-order aberrations occur, leading to underperformance, or the power of the second negative lens becomes too weak and so the diverging effect becomes too slender, rendering spherical aberrations, coma, chromatic aberrations, etc. worse.

More preferably, $$-1.2 < f_1/f_2 < -0.2 \quad (64\text{-}1)$$

Even more preferably, $$-1.1 < f_1/f_2 < -0.3 \quad (64\text{-}2)$$

The image-formation optical system according to the ninth embodiment of the fourth aspect of the invention is characterized by comprising, in order from an object side thereof, a first positive lens, a second negative lens, a third positive lens and a fourth positive lens and satisfying the following conditions:

$$0.75 < f_{34}/f < 5 \quad (65)$$

$$-1 < f_2/f_3 < -0.5 \quad (66)$$

Here $f_{34}$ is the composite focal length of the third positive lens and the fourth positive lens, f is the focal length of the image-formation optical system, $f_2$ is the focal length of the second negative lens, and $f_3$ is the focal length of the third positive lens.

The imaging system according to the 10$^{th}$ embodiment of the 4$^{th}$ aspect of the invention comprises an image-formation optical system and an image pickup device located on an image side thereof, characterized in that said image-formation optical system is an image-formation optical system as recited in the above 9$^{th}$ embodiment.

Advantages and actions of the image-formation optical system constructed according to the 9$^{th}$ embodiment and the imaging system constructed according to the 10$^{th}$ embodiment of the 4$^{th}$ aspect of the invention are now explained.

To simultaneously achieve compactness and high performance, that is, the object of the 4$^{th}$ aspect of the invention, importance is given to the third positive lens. In the lens type according to the 4$^{th}$ aspect of the invention, both the third lens and the fourth lens are positive, so too is their composite power; that is, as strong power is given thereto, the optical system becomes long because the principal points are shifted toward the image side with respect to the focal length. For compactness, it is thus necessary not to give too strong power to the third lens and the fourth lens or to satisfy condition (65).

More preferably, $$0.85 < f_{34}/f < 4 \quad (65\text{-}1)$$

Even more preferably, $$0.9 < f_{34}/f < 2 \quad (65\text{-}2)$$

As the upper limit of 5 to condition (65) is exceeded, the composite power of the third lens and the fourth lens becomes too weak, so also is the effect on correction of aberrations. As the lower limit of 0.75 is not reached, the powers of the third lens and the fourth lens become too strong for compactness.

In this case, more aberrations than can be corrected at the second negative lens are produced at the first positive lens to which relatively strong power is allocated. It is thus necessary to correct such residual aberrations at the third lens and the fourth lens. It is here noted that as can be appreciated from discussions about aberrations and so on, not only lens power but also ray height is important for correction of aberrations, and it is effective for the third positive lens close in ray height to the second negative lens to take a kind of role in correction of aberrations. It is thus necessary for the third positive lens to have relatively strong power with respect to the second negative lens or satisfy condition (66).

As the upper limit of −0.5 to condition (66) is exceeded, the power of the second negative lens becomes too strong, leading to overcorrection of aberrations and underperformance, or the power of the third positive lens becomes too weak to correct aberrations left uncorrected at the first lens and the second lens, leading to under-performance. As the lower limit of −1 is not reached, the power of the second negative lens becomes too weak with the result of spherical aberrations, coma and chromatic aberrations are left undercorrected, leading to under-performance, or the power of the third positive lens becomes too strong for compactness.

More preferably, $$-0.9 < f_2/f_3 < -0.6 \quad (66\text{-}1)$$

By satisfying two such conditions at the same time, it is possible to achieve the object of the 4$^{th}$ aspect of the invention.

The imaging system according to the 11$^{th}$ embodiment of the 4$^{th}$ aspect of the invention comprises an image-formation optical system and an image pickup device located on an image side thereof, characterized in that:

said image-formation optical system comprises, in order from an object side thereof, a first positive lens of double-convex shape, a second negative lens, a third positive lens of meniscus shape and a fourth positive lens, with an aperture stop located on an object side of the first positive lens, and satisfying the following condition:

$$1 < f_3/Ih < 3 \tag{67}$$

Here $f_3$ is the focal length of the third positive lens, and Ih is the maximum image height of the image-formation optical system.

Advantages and actions of the imaging system constructed according to the 11$^{th}$ embodiment of the 4$^{th}$ aspect of the invention are now explained.

First of all, the construction of the first lens is explained. Generally when it comes to one positive lens, the best image-formation capability could be obtained when that positive lens has a meniscus form having converging action at one surface and diverging action at another surface, because aberrations can be cancelled out. In the case of a typical positive meniscus lens, however, one surface must be designed with strong positive power, because another surface acts as a surface having a negative power effect. For this reason, as the power of the lens becomes too strong, the curvature of positive power becomes steep, leading to a possibility of higher-order aberrations. With such a lens located as the foremost lens, high performance is not expectable because aberrations are enlarged through an image side portion of the optical system to difficult-to-correct extents.

For the inverted Ernostar type optical system according the fourth aspect of the invention, on the other hand, it is not preferable to reduce the power of the first lens, because the power of the optical system must be guaranteed by the third lens and the fourth lens located on the image plane side of the optical system, resulting in a shift of the principal points toward the image side and, hence, an increase in the size of the optical system. Thus, it is favorable for compactness to increase the positive power of the first lens.

In the fourth aspect of the invention, therefore, the first lens is made up of a double-convex lens, both surfaces of which have converging action. This means that the power of the first lens is allocated to two surfaces to hold back the occurrence of higher-order aberrations, and strong power is given to the positive lenses on the object side to shift the principal points of the optical system toward the object side of the optical system, so that the optical system can be slimmed down.

The position of the aperture stop is now explained. When a CCD is used as the image pickup device, incidence of an off-axes light beam from the image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. Thus, the aperture stop is located nearest to the object side of the optical system for the purpose of making the angle of light rays on the CCD small. Especially when the aperture stop is located nearest to the object side of the inverted Ernostar type optical system, the merit is that chromatic aberration of magnification can be well corrected because both the first positive lens and the second negative lens having relatively strong powers of opposite signs are located on the image side of the optical system.

The third positive lens is now explained. When the first positive lens is of double-convex shape, in principle, aberrations remain there, because both its surfaces have converging action. Those aberrations must be corrected by way of the diverging action of the second negative lens. With the aperture stop located on the object side of the first positive lens, however, light rays at the periphery of a screen differ significantly in height between the first positive lens and the second negative lens, often resulting in a failure in sufficient correction of coma and astigmatism. For this reason, it is preferable to enhance the role of the third lens in correction of those aberrations. Thus, the third positive lens is configured in such a meniscus form as to have diverging action at one surface and make opposite corrections for aberrations at two surfaces. It is then necessary to satisfy condition (67).

As the upper limit of 3 to condition (67) is exceeded, the power of the third positive lens becomes too weak for effective correction of aberrations left uncorrected at the second lens, leading to under-performance. As the lower limit of 1 is not reached, the power of the third positive lens becomes too strong with the result that the principal points of the optical system are shifted toward the image side of the optical system to such an extent that compactness is unachievable.

More preferably, $$1.1 < f_3/Ih < 2.7 \tag{67-1}$$

Even more preferably, $$1.2 < f_3/Ih < 2.5 \tag{67-2}$$

According to the 12$^{th}$ embodiment of the 4$^{th}$ aspect of the invention, the imaging system as recited in any one of the above 2$^{nd}$, 10$^{th}$ and 11$^{th}$ embodiments is further characterized in that the second negative lens is of double-concave shape.

In the case of the imaging system according to the above 2$^{nd}$, 10$^{th}$ or 11$^{th}$ embodiment of the 4$^{th}$ aspect of the invention, too, the second negative lens should preferably be of double-concave shape, as explained in conjunction with the image-formation optical system according to the above 3$^{rd}$ embodiment.

According to the 13$^{th}$ embodiment of the 4$^{th}$ aspect of the invention, the imaging system as recited in any one of the above 2$^{nd}$, 4$^{th}$, 6$^{th}$, 8$^{th}$ and 10$^{th}$ embodiments is further characterized in that the third positive lens is of double-convex shape.

Advantages and actions of the imaging system constructed according to the 13$^{th}$ embodiment of the 4$^{th}$ aspect of the invention are now explained.

Only one of the four lenses that form the inverted Ernostar type is a negative lens having diverging action, and so increasing the power of this lens contributes to compactness and high performance. As the power of the second negative lens becomes strong, however, Petzval's sum is often overcorrected in a negative direction, rendering peripheral performance worse. Preferably in the 4th aspect of the invention, therefore, the third positive lens is configured in a double-convex form both surfaces of which have converging action for the purpose of correcting the Petzval's sum in a positive direction thereby preventing the peripheral performance of the optical system from becoming worse.

According to the 14$^{th}$ embodiment of the 4$^{th}$ aspect of the invention, the imaging system as recited in any one of the above 2$^{nd}$, 4$^{th}$, 6$^{th}$, 8$^{th}$, 10$^{th}$ and 11$^{th}$ embodiments is further characterized in that the third positive lens is in a meniscus form convex on its image side.

Advantages and actions of the imaging system constructed according to the 14th embodiment of the 4th aspect of the invention are now explained.

While the third lens and the fourth lens in the inverted Ernostar type according to the 4th aspect of the invention are each a positive lens, it is understood that the allocation of strong powers to those lenses is unfavorable for compactness, because the principal points are shifted toward the image side. It is therefore preferable that at least the third lens plays a relatively enhanced role in correction of aberrations. To this end, the third positive lens should preferably be in a meniscus form having diverging action at its one surface. In consideration of aberration balance, it is also preferable that the third lens is in such a meniscus form convex on the image side as to keep the angle of a rim light beam incident thereon gentle.

According to the 15th embodiment of the second aspect of the invention, the imaging system as recited in any one of the above 2nd, 4th, 8th, 10th and 11th embodiments is further characterized in that the composite refracting power of the first positive lens and the second negative lens is positive.

Advantages and actions of the imaging system constructed according to the above 15th embodiment of the 4th aspect of the invention are now explained.

In the inverted Ernostar type, the composite focal length of the third lens and the fourth lens is always positive because both lenses are positive. Here, if the composite power of the first lens and the second lens is negative, it is then in principle difficult to reduce the length of the optical system because of a retrofocus type of −+ construction. It is thus preferable to make the composite focal length of the first lens and the second lens positive.

According to the 16th embodiment of the 4th aspect of the invention, the imaging system as recited in any one of the above 2nd, 4th, 6th, 8th, 10th and 11th is further characterized in that the composite refracting power of the second negative lens, the third positive lens and the fourth positive lens is negative.

Advantages and actions of the imaging system constructed according to the above 16th embodiment of the 4th aspect of the invention are now explained.

When strong power is allocated to the first lens, any effective compactness is unachievable unless some considerable care is taken of the constructions of the third and fourth lenses. As generally known in the art, constructing an optical system in a telephoto type form is favorable for length reductions. In the invention, the second, third and fourth lenses should preferably have a negative composite power because the telephoto type is constructed of the first lens and the second, third and fourth lenses.

According to the 17th embodiment of the 4th aspect of the invention, the imaging system as recited in any one of the above 2nd, 4th, 6th, 8th, 10th and 11th embodiments is further characterized by satisfying the following condition:

$$0.5 < f_{12}/Ih < 50 \quad (68)$$

Here $f_{12}$ is the composite focal length of the first positive lens and the second negative lens, and Ih is the maximum image height of the image-formation optical system.

Advantages and actions of the imaging system constructed according to the 17th embodiment of the 4th aspect of the invention are now explained.

The third lens and the fourth lens in the inverted Ernostar type are both positive lenses, and so their composite power is positive. This means that if the composite power of the rest of the inverted Ernostar type, that is, the first lens and the second lens, is negative, then a retrofocus type of −+ construction is formed. In other words, the principal points of the retrofocus type are shifted toward the image side; in principle, the length of the optical system cannot be reduced, failing to accomplish the object of the 4th aspect of the invention. For this reason, the composite power of the first lens and the second lens should be positive. To achieve compactness and high performance at the same time, however, the composite focal length of the first lens and the second lens should satisfy condition (68).

As the upper limit of 50 to condition (68) is exceeded, the composite focal length of the first lens and the second lens becomes too short for compactness. As the lower limit of 0.5 is not reached, the composite focal length of the first lens and the second lens becomes too long with the result that more higher-order aberrations such as coma are produced, leading to underperformance.

More preferably, $$0.8 < f_{12}/Ih < 30 \quad (68\text{-}1)$$

Even more preferably, $$10.0 < f_{12}/Ih < 15 \quad (68\text{-}2)$$

According to the 18th embodiment of the 4th aspect of the invention, the imaging system as recited in any one of the above 2nd, 4th, 6th, 8th, 10th and 11th embodiments is further characterized by satisfying the following condition:

$$-100 < f_{234}/Ih < -0.5 \quad (69)$$

Here $f_{234}$ is the composite focal length of the second negative lens, the third positive lens and the fourth positive lens, and Ih is the maximum image height of the image-formation optical system.

Advantages and actions of the imaging system constructed according to the 18th embodiment of the 4th aspect of the invention are now explained.

Negative power may be given to the 2nd to 4th lenses, so that the telephoto type is constructed with the positive power of the first lens and the negative power of the 2nd to 4th lenses. However, it is then necessary to satisfy condition (69) for the purpose of achieving compactness and high performance at the same time.

As the upper limit of −0.5 to condition (69) is exceeded, the negative power of the second lens becomes too strong, rendering coma, astigmatism and Petzval's sum worse or the positive power of the third and fourth lenses becomes too weak, rendering coma and distortion worse. Falling short of the lower limit of −100 is less effective for compactness, because the composite power of the 2nd to 4th lenses becomes too weak to obtain satisfactory telephoto effect.

More preferably, $$-50 < f_{234}/Ih < -1.0 \quad (69\text{-}1)$$

Even more preferably, $$-20 < f_{234}/Ih < -1.5 \quad (69\text{-}2)$$

According to the 19th embodiment of the 4th aspect of the invention, the imaging system as recited any one of the above 2nd, 4th, 6th, 8th and 10th embodiments is further characterized in that an aperture stop is located on the object side of the first positive lens.

According to the 20th embodiment of the 4th aspect of the invention, the imaging system as recited in any one of the above 2nd, 4th, 6th, 8th and 10th embodiments is further characterized in that an aperture stop is interposed between the first positive lens and the second negative lens.

Advantages and actions of the imaging systems constructed according to the 19$^{th}$ and 20$^{th}$ embodiments of the 4$^{th}$ aspect of the invention are now explained.

When a CCD is used as the image pickup device, incidence of an off-axes light beam from the image-formation optical system on an image plane at too large an angle offers a problem that an image undergoes drastically brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of an aperture stop is of importance because it is difficult to manipulate the exit pupil position with the lenses. To make the angle of incidence of light rays on the CCD small, it is preferable to locate the aperture stop nearer to the object side of the optical system. Especially when the aperture stop is located nearest to the object side, the merit is that chromatic aberration of magnification can be well corrected because both the first positive lens and the second negative lens having relatively strong powers of opposite signs are located on the image side of the optical system. Especially when the apertures stop is interposed between the first positive and the second negative lens, the merit is that off-axis aberrations can be well corrected, because powers are allocated before and after the aperture stop so that coma can be easily balanced between upper light rays and lower light rays.

According to the 21$^{st}$ embodiment of the 4$^{th}$ aspect of the invention, the imaging system as recited in any one of the above 2$^{nd}$, 4$^{th}$, 6$^{th}$, 8$^{th}$ and 11$^{th}$ embodiments is further characterized by satisfying the following condition:

$$-1 < f_2/f_3 < -0.5 \tag{70}$$

Here $f_2$ is the focal length of the second negative lens, and $f_3$ is the focal length of the third positive lens.

Advantages and actions of the imaging system according to the 21$^{st}$ embodiment of the 4$^{th}$ aspect of the invention are now explained.

The second negative lens is only one negative power lens, and so must serve to correct aberrations produced at the positive lenses with some power. Here, if too strong power is given to the third positive lens, then the positive lens overreacts to the effect of the negative lens on correction of aberrations, resulting in under-performance. In addition, the principal points of the optical system are shifted toward the image side of the optical system, resulting in an increase in the size of the optical system. It is thus preferable to make the power of the third positive lens relatively weaker than the power of the second negative lens or satisfy condition (70).

As the upper limit of −0.5 to condition (70) is exceeded, the power of the third lens becomes too strong, resulting in overcorrection of aberrations and a failure in achieving compactness. As the lower limit of −1 is not reached, the power of the third lens relative to the second lens becomes too weak, resulting in undercorrection of aberrations.

More preferably, $$-0.9 < f_2/f_3 < -0.6 \tag{70-1}$$

According to the 22$^{nd}$ embodiment of the 4$^{th}$ aspect of the invention, the imaging system as recited any one of the above 2$^{nd}$, 4$^{th}$, 6$^{th}$, 8$^{th}$, 10$^{th}$ and 11$^{th}$ embodiments is further characterized by satisfying the following condition:

$$0.8 < f_2/r_6 < 5 \tag{71}$$

Here $f_2$ is the focal length of the second negative lens, and $r_6$ is the axial radius of curvature of the image side-surface of the third positive lens.

Advantages and actions of the imaging system constructed according to the 22$^{nd}$ embodiment of the 4$^{th}$ aspect of the invention are now explained.

To make effective correction of aberrations left uncorrected at the first lens and the second lens, it is preferable to satisfy condition (71) that defines the converging action of the third positive lens relative to the diverging action of the second negative lens.

As the upper limit of 5 to condition (71) is exceeded, the converging action of the third positive lens overly surpasses the diverging action of the second negative lens, and as the lower limit of 0.8 is not reach, that converging action becomes too slender. In any case, coma and astigmatism become worse.

More preferably, $$0.9 < f_2/r_6 < 4.5 \tag{71-1}$$

Even more preferably, $$1 < f_2/r_6 < 4 \tag{71-2}$$

According to the 23$^{rd}$ embodiment of the 4$^{th}$ aspect of the invention, the imaging system as recited in any one of the above 2$^{nd}$, 4$^{th}$, 6$^{th}$, 8$^{th}$, 10$^{th}$ and 11$^{th}$ embodiments is further characterized by satisfying the following condition:

$$-0.5 < f_1/f_{23} < 0.3 \tag{72}$$

Here $f_1$ is the focal length of the first positive lens, and $f_{23}$ is the composite focal length of the second negative lens and the third positive lens.

Advantages and actions of the imaging system constructed according to the 23$^{rd}$ embodiment of the 4$^{th}$ aspect of the invention are now explained.

To achieve compactness more effectively while aberrations of the first positive lens are properly corrected at the second lens and the third lens, it is preferable to satisfy condition (72).

As the upper limit of 0.3 to condition (72) is exceeded, the power of the second negative lens becomes too weak with the result that spherical aberrations, coma and chromatic aberrations become worse, or the power of the third positive lens becomes strong with the result that the lens system becomes bulky. As the lower limit of −0.5 is not reached, the power of the second negative lens becomes too strong with the result that higher-order aberrations occur, or the power of the third positive lens becomes too weak with the result that aberrations left uncorrected at the first lens and the second lens cannot fully be corrected, leading to underperformance.

More preferably, $$-0.4 < f_1/f_{23} < 0.2 \tag{72-1}$$

Even more preferably, $$-0.3 < f_1/f_{23} < 0.15 \tag{72-2}$$

According to the 24$^{th}$ embodiment of the 4$^{th}$ aspect of the invention, the imaging system as recited in any one of the above 2$^{nd}$, 4$^{th}$, 6$^{th}$, 8$^{th}$, 10$^{th}$ and 11$^{th}$ embodiments is further characterized by satisfying the following condition:

$$0.4 < f_1/f_3 < 0.9 \tag{73}$$

Here $f_1$ is the focal length of the first positive lens, and $f_3$ is the focal length of the third positive lens.

Advantages and actions of the imaging system constructed according to the 24th embodiment of the 4th aspect of the invention are now explained.

Giving stronger power to the third positive lens than to the first positive lens causes the principal points of the optical system to be shifted toward the image side of the optical system, leading to an increase in the size of the optical system. It is thus preferable to satisfy condition (73).

As the upper limit of 0.9 to condition (73) is exceeded, the power of the third positive lens becomes too strong for compactness, and as the lower limit of 0.4 is not reached, the power of the first positive lens becomes too strong with the result that more spherical aberrations and coma are produced and, hence, the performance of the optical system becomes worse.

More preferably, $$0.5 < f_1/f_3 < 0.75 \quad (73\text{-}1)$$

According to the 25th embodiment of the 4th aspect of the invention, the imaging system as recited in any one of the above 2nd, 4th, 6th, 8th, 10th and 11th embodiments is further characterized by satisfying the following condition:

$$10° < \alpha < 40° \quad (74)$$

Here $\alpha$ is the angle of incidence of a chief ray on an image plane at the maximum image height.

Advantages and actions of the imaging system constructed according to the 25th embodiment of the 4th aspect of the invention are now explained.

A problem with using a CCD as the image pickup device is that as an off-axis light beam emerging from the image-formation optical system is incident on the image plane at too large an angle, an image suffers from drastic brightness changes between its central position and its peripheral position. If the light beam is incident on the image plane at a small angle, on the other hand, that problem may then be solved; however, this now gives rise to an increase in the length of the optical system. It is thus preferable to satisfy condition (74).

As the upper limit of 40° to condition (74) is exceeded, the angle of the chief ray on the CCD becomes too large, resulting in a drop of the brightness at the peripheral position of the image. As the lower limit of 10° is not reached, the optical system becomes too long.

More preferably, $$15° < \alpha < 35° \quad (74\text{-}1)$$

Even more preferably, $$17.5° < \alpha < 25° \quad (74\text{-}2)$$

According to the 26th embodiment of the 4th aspect of the invention, the imaging system as recited in any one of the above 2nd, 4th, 6th, 8th, 10th and 11th embodiments is further characterized by satisfying the following condition:

$$-1.5 < r_3/r_4 < -0.3 \quad (75)$$

Here $r_3$ is the axial radius of curvature of the object side of the second negative lens, and $r_4$ is the axial radius of curvature of the image side of the second negative lens.

Advantages and actions of the imaging system constructed according to the 26th embodiment of the 4th aspect of the invention are now explained.

It is preferable to properly determine the converging actions of the respective surfaces of the second negative lens. More specifically, it is preferable to satisfy condition (75).

As the upper limit of −0.3 to condition (75) is exceeded, the curvature of the entrance surface becomes too gentle to make effective correction for aberrations produced at the first positive lens, and as the lower limit −1.5 is not reached, the curvature of the exit surface becomes too steep with the result that higher-order aberrations are likely to occur, leading to under-performance.

More preferably, $$-1.3 < r_3/r_4 < -0.4 \quad (75\text{-}1)$$

Even more preferably, $$-1.1 < r_3/r_4 < -0.5 \quad (75\text{-}2)$$

According to the 27th embodiment of the 4th aspect of the invention, the imaging system as recited in any one of the above 2nd, 4th, 6th, 8th, 10th and 11th embodiments is further characterized by satisfying the following condition:

$$1.1 < r_5/r_6 < 20 \quad (76)$$

Here $r_5$ is the axial radius of curvature of the object side of the third positive lens, and $r_6$ is the axial radius of curvature of the image side of the third positive lens.

Advantages and actions of the imaging system constructed according to the 27th embodiment of the 4th aspect of the invention are now explained.

When the third positive lens is of meniscus shape, it is preferable to properly allocate the powers of the surfaces thereof in such a way as to make proper correction for aberrations left uncorrected at the second lens. More specifically, it is preferable to satisfy condition (76).

As the upper limit of 20 to condition (76) is exceeded, the curvature of the object side of the third positive lens comes too close to that of the image side, and so the effect thereof on correction of aberrations becomes slender. As the lower limit of 1.1 is not reached, the effect of the object side of the third positive lens on correction of aberrations becomes slender, resulting in underperformance.

More preferably, $$1.2 < r_5/r_6 < 15 \quad (76\text{-}1)$$

Even more preferably, $$1.3 < r_5/r_6 < 10 \quad (76\text{-}2)$$

According to the 28th embodiment of the 4th aspect of the invention, the imaging system as recited in any one of the above 2nd, 4th, 6th, 8th, 10th and 11th embodiments is further characterized in that said image-formation optical system comprises at least one aspheric surface that satisfies the following condition:

$$0.01 < |(r_{sp}+r_{asp})/(r_{sp}-r_{asp})-1| < 100 \quad (77)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP} = y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

Advantages and actions of the imaging system constructed according to 28th embodiment of the third aspect of the invention are now explained.

It is desired that at least one aspheric surface be used for satisfactory correction of aberrations and condition (77) be satisfied.

As the upper limit of 100 to condition (77) is exceeded, the effect of the aspheric surface becomes too slender for correction of aberrations and so coma and astigmatism become worse. As the lower limit of 0.01 is not reached, the effect of the aspheric surface becomes too strong; aberrations remain overcorrected, causing the performance of the optical system to become worse and rendering lens processing difficult.

More preferably, $$0.05<|(r_{sp}+r_{asp})/(r_{sp}-r_{asp})-1|<50 \qquad (77\text{-}1)$$

Even more preferably, $$0.1<|(r_{sp}+r_{asp})/(r_{sp}-r_{asp})-1|<1 \qquad (77\text{-}2)$$

With more aberrations produced at the first positive lens that is a lens for receiving light rays in the first place, they are enlarged and transmitted through a part of the optical system on the image side. It is thus desired that aberrations produced there be sufficiently reduced. In other words, at least the first positive lens should preferably be provided with an aspheric surface.

With the fourth positive lens, it is possible to make correction for astigmatism left uncorrected at three lenses on the object side of the optical system, i.e., at the triplet. More preferably for correction of bending of astigmatism, the power of the surface of the fourth positive lens should be varied; the fourth positive lens should be provided with an aspheric surface. Even more preferably, both surfaces should be defined by aspheric surfaces.

According to the 29th embodiment of the 4th aspect of the invention, the imaging system as recited in any one of the above 2nd, 4th, 6th, 8th, 10th and 11th embodiments is further characterized in that the second negative lens in the image-formation optical system comprises at least one aspheric surface that satisfies the following condition:

$$0.1<|(r_{sp}+r_{asp})/(r_{sp}-r_{asp})-1|<20 \qquad (78)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP}=y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

Advantages and actions of the imaging system constructed according to 29th embodiment of the third aspect of the invention are now explained.

The second negative lens is only one negative lens in the optical system; giving strong power thereto contributes to correction of coma and chromatic aberrations and compactness as well. However, too strong power gives rise to higher-order aberrations that render the performance of the optical system worse. It is thus preferable that at least the second negative lens is provided with an aspheric surface that satisfies condition (78).

As the upper limit of 20 to condition (78) is exceeded, the effect of the aspheric surface in the first positive lens becomes too slender for correction of coma and astigmatism, with the result that the performance of the whole screen becomes worse. As the lower limit of 0.1 is not reached, the effect of the aspheric surface becomes too strong, and so spherical aberrations and coma in particular are left overcorrected, with the result that the performance of the optical system becomes worse and lens processing is difficult.

More preferably, $$0.2<|(r_{sp}+r_{asp})/(r_{sp}-r_{asp})-1|<15 \qquad (78\text{-}1)$$

Even more preferably, $$0.5<|(r_{sp}+r_{asp})/(r_{sp}-r_{asp})-1|<10 \qquad (78\text{-}2)$$

According to the 30th embodiment of the 4th aspect of the invention, the imaging system as recited in any one of the above 2nd, 4th, 6th, 8th, 10th and 11th embodiments is further characterized in that the third positive lens in the image-formation optical system comprises at least one aspheric surface that satisfies the following condition:

$$0.1<|(r_{sp}+r_{asp})/(r_{sp}-r_{asp})-1|<20 \qquad (79)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP}=y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

Advantages and actions of the imaging system constructed according to 30th embodiment of the 4th of the invention are now explained.

In favor of compactness, it is preferable for the third positive lens to be weaker in power than that of the first positive lens. However, giving weaker power to this lens means that it is less capable of correcting aberrations. For the third positive lens, therefore, it is desired that aberration correction capability be enhanced without increasing power. It is thus preferable that the third positive lens is provided with an aspheric surface. More preferably, both surfaces of the third positive lens should be defined by aspheric surfaces. The aspheric surface(s) should the preferably satisfy condition (79).

As the upper limit of 20 to condition (79) is exceeded, the effect of the aspheric surface in the third positive lens becomes too slender for correction of coma and astigmatism, with the result that the performance of the whole screen becomes worse. As the lower limit of 0.1 is not reached, the effect of the aspheric surface becomes too strong, and so spherical aberrations and coma in particular are left overcorrected, with the result that the performance of the optical system becomes worse and lens processing is difficult.

More preferably, $$0.2 < |(r_{sp}+r_{asp})/(r_{sp}-r_{asp})-1| < 10 \quad (79\text{-}1)$$

Even more preferably, $$0.5 < |(r_{sp}+r_{asp})/(r_{sp}-r_{asp})-1| < 5 \quad (79\text{-}2)$$

Throughout the first aspect of the invention, the lower or upper limits to the above conditions (61) to (79) may be reduced down to those to the respective subordinate conditions.

It is understood that if the above conditions are applied in suitable combinations as desired, the advantages of the first aspect of the invention are then much more enhanced.

Advantages and actions of the fifth aspect of the invention as described above are now explained.

The imaging system according to the first embodiment of the fifth aspect of the invention comprises an image-formation optical system and an image pickup device located on an image side thereof, characterized in that:

said image-formation optical system comprises, in order from an object side thereof, a first positive lens, a second negative lens, a third positive lens and a fourth positive lens, and satisfies the following condition:

$$10 < f_4/Ih < 250 \quad (81)$$

Here $f_4$ is the focal length of the fourth positive lens, and Ih is the maximum image height of the image-formation optical system.

Advantages and actions of the imaging system constructed according to the first embodiment of the fifth aspect of the invention are now explained.

First, the number of lenses is explained. As already described, at least three lenses are necessary to achieve high performance from the center to as far as the periphery of a screen. Even with the triplet type considered to have the highest performance (comprising, in order from its object side, a positive lens, a negative lens and a positive lens), however, the bending of astigmatism in the sagittal direction for instance remains uncorrected. Accordingly, a peripheral image plane moves forward at an intermediate position of the screen and backward at a peripheral position of the screen, resulting unavoidably in blurred images. In view of performance, the triplet type is unsuitable for application to an optical system compatible even with CCD comprising a great number of pixels as contemplated herein. For this reason, the fifth aspect of the invention uses one more lens to improve performance.

In the case of a CCD-incorporating camera, on the other hand, there are some limitations to optical design, unlike a silver-halide film camera. As off-axis light beams emerging from an image-formation lens system are incident on a CCD at too large an angle, full advantage can never be taken of the ability of a microlens to condense light, offering a problem that an image undergoes drastic brightness variations between its central position and its peripheral position. Accordingly, the CCD must be designed such that the angle of light rays incident thereon becomes relatively small.

Thus, in consideration of the angle of incidence on the CCD, the fifth aspect of the invention makes use of a four-lens, inverted Ernostar type that is expected to have high performance and comprises, in order from the object side thereof, a positive lens, a negative lens, a positive lens and a positive lens. More specifically, a triplet type arrangement comprising a positive lens, a negative lens and a positive lens is located on the object side of the image-formation optical system to ensure ever higher image-formation capability, and one more lens is located on the image side of the image-formation optical system to make correction for aberrations remaining undercorrected at the three lenses forming the triplet. In addition, positive power is allocated to the side of the image-formation optical system nearest to an image plane, so that the angle of incidence on the CCD is kept small by its converging effect.

The construction of the fourth positive lens is now explained. In the inverted Ernostar type used in the fifth aspect of the invention, two positive lenses are located on its image plane side, and so the principal points of the optical system tend to move toward the image side. This often causes the length of the optical system to become long. To shorten the length of the optical system, therefore, the power profile of the positive lenses located on the image side is of importance. In consideration of axial marginal rays, on the other hand, the height of light rays through the fourth lens, located on the image side with respect to the first lens and the third lens, is likely to become lowest, because the focal length of the image-formation optical system according to the fifth aspect of the invention is positive. As taught by discussions about aberrations, lens power as well as ray height are important factors for aberration correction capabilities; the fourth lens is relatively less contributable to correction of aberrations. It is thus preferable to give relatively weak power to the fourth positive lens, so that the principal points of the optical system are unlikely to move toward the image side of the optical system, thereby achieving compactness and high performance. It is then necessary for the fourth positive lens to satisfy condition (81) with a balance between optical system size and performance taken into account.

As the upper limit of 250 to condition (81) is exceeded, the power of the fourth positive lens becomes too weak with the result that its effect on correction of aberrations becomes slender, leading to underperformance. As the lower limit of 10 is not reached, the power of the fourth positive lens becomes too strong, rendering the optical system bulky.

More preferably, $$20 < f_4/Ih < 200 \quad (81\text{-}1)$$

Even more preferably, $$30 < f_4/Ih < 100 \quad (81\text{-}2)$$

According to the second embodiment of the fifth aspect of the invention, there is provided an image-formation optical system characterized by comprising, in order from an object side thereof, a first positive lens, a second negative lens, a third positive lens and a fourth positive lens of meniscus shape, and satisfying the following condition:

$$-2 < f_2/f < -0.65 \quad (82)$$

Here $f_2$ is the focal length of the second negative lens, and f is the focal length of the image-formation optical system.

According to the third embodiment of the fifth aspect of the invention, there is provided an imaging system comprising an image-formation optical system and an image pickup device located on an image side thereof, characterized in that said image-formation optical system is an image-formation optical system as recited in the above second embodiment of the fifth aspect.

Advantages and actions of the image-formation optical system constructed according to the second embodiment and the imaging system according to the third embodiment of the fifth aspect of the invention are now explained.

First, the construction of the fourth lens is now explained. In the lens type according to the fifth aspect of the invention, the fourth positive lens is little subject to correction of aberrations due to the diverging action of the second lens, because of being spaced away from it. For this reason, the fourth lens is made up of a meniscus lens having diverging action at one surface for effective correction of aberrations. This makes it possible to correct residual aberrations, especially peripheral coma and astigmatism. It is then preferable to use a meniscus lens so convex on its object side that the principal points of the optical system can be shifted toward the object side for the purpose of preventing the optical system from becoming long.

It is here noted that the lens type according to the fifth aspect of the invention comprises only one negative lens; the power of that negative lens is an important factor for compactness and high performance. Generally, one negative lens must be used to make correction for aberrations produced at three positive lenses. In consideration of the diverging action of the fourth positive lens, however, that much diverging action is not needed for the second negative lens. It is thus necessary for the second negative lens to satisfy condition (82).

As the upper limit of −0.65 to condition (82) is exceeded, the power of the second negative lens becomes too strong, leading to extraordinary diverging action, and as the lower limit of −2 is not reached, the power of the second negative lens becomes too weak, leading to insufficient diverging action. In either case, performance in general and coma and astigmatism in particular become worse.

More preferably, $$-1.8 < f_2/f < -0.7 \qquad (82\text{-}1)$$

Even more preferably, $$-1.5 < f_2/f < -0.75 \qquad (82\text{-}2)$$

According to the fourth embodiment of the fifth aspect of the invention, there is provided an imaging system comprising an image-formation optical system and an image pickup device located on an image side thereof, characterized in that:

said image-formation optical system comprises, in order from an object side thereof, a first positive lens of double-convex shape, a second negative lens, a third positive lens and a fourth positive lens of meniscus shape, and satisfying the following condition:

$$1 < f_3/Ih < 3 \qquad (83)$$

Here $f_3$ is the focal length of the third positive lens, and Ih is the maximum image height of the image-formation optical system.

Advantages and actions of the imaging system constructed according to the fourth embodiment of the fifth aspect of the invention are now explained.

By locating the principal points of an optical system on the object side thereof with respect to the focal length thereof, compactness could be achieved. For the image-formation optical system according to the fourth aspect of the invention, it is preferable to allocate strong power to the first positive lens that is located nearest to the object side of the optical system among the three positive lenses, because the principal points of the optical system are shifted toward the object side of the optical system. However, when strong power is given to the first positive lens, high performance cannot be achieved unless aberrations left uncorrected there are well corrected, because they are enlarged and transmitted through the lenses located on the image side of the optical system.

Generally when it comes to one positive lens, the best image-formation capability would be obtained when that positive lens has a meniscus form having converging action at one surface and diverging action at another surface, because aberrations can be cancelled out. In the case of a typical positive meniscus lens, however, one surface must be designed with strong positive power, because another surface acts as a surface having a negative power effect. For this reason, as the power of the lens becomes too strong, the curvature of positive power becomes steep, leading to a possibility of higher-order aberrations. In the fifth aspect of the invention, therefore, the first lens is made up of a double-convex lens, both surfaces of which have converging action. This means that the power of the first lens is allocated to two surfaces to hold back the occurrence of higher-order aberrations, and strong power is given to the positive lenses on the object side to shift the principal points of the optical system toward the object side of the optical system, so that the optical system can be slimmed down.

It is noted, however, that there are in principle aberrations uncorrected at the first positive lens because of having converging action at both its surfaces. To achieve high performance, those residual aberrations must be corrected.

The fourth lens is now explained. The fourth lens must have diverging action. As explained in conjunction with the image-formation optical system according to the above second embodiment and the imaging system according to the above third embodiment, the fourth positive lens is made up of a meniscus lens to obtain one more lens having diverging action, so that aberrations of the first positive lens can effectively be corrected.

The third lens is now explained. The third lens must be constructed with relatively weak power, because giving strong positive power to the third lens causes the principal points of the optical system to be shifted toward the image side of the optical system and the converging action to become overly strong. It is thus necessary to satisfy condition (83).

As the upper limit of 3 to condition (83) is exceeded, the power of the third positive lens becomes too weak with the result that its effect on correction of aberrations decreases, leading to underperformance. As the lower limit of 1 is not reached, the power of the third positive lens becomes too strong with the result that its converging action becomes overly strong and, hence, the optical system becomes less than satisfactory in terms of performance and size.

More preferably, $$1.1 < f_3/Ih < 2.7 \qquad (83\text{-}1)$$

Even more preferably, $$1.2 < f_3/Ih < 2.5 \qquad (83\text{-}2)$$

According to the fifth embodiment of the fifth aspect of the invention, there is provided an imaging system comprising an image-formation optical system and an image pickup device located on an image side thereof, characterized in that:

said image-formation optical system comprises, in order from an object side thereof, a first positive lens, a second negative lens, a third positive lens and a fourth positive lens of meniscus shape, and satisfying the following condition:

$$0.5 < f_{12}/Ih < 25 \qquad (84)$$

Here $f_{12}$ is the composite focal length of the first positive lens and the second negative lens, and Ih is the maximum image height of the image-formation optical system.

Advantages and actions of the imaging system constructed according to the fifth embodiment of the fifth aspect of the invention are now explained.

The position of the aperture stop is now explained. When a CCD is used as the image pickup device, incidence of an off-axes light beam from the image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. Thus, the aperture stop is located nearest to the object side of the optical system for the purpose of making the angle of light rays on the CCD small. Especially when the aperture stop is located nearest to the object side of the inverted Ernostar type optical system, the merit is that chromatic aberration of magnification can be well corrected because both the first positive lens and the second negative lens having relatively strong powers of opposite signs are located on the image side of the optical system.

In this case, the fourth positive lens is located farthest away from the aperture stop, so that an off-axis chief ray becomes highest there. As taught by discussions about aberrations, coma and astigmatism in particular, because of being sensitive to ray heights, have some considerable influences on aberrations at the periphery of a screen. Accordingly, unless aberrations produced at the fourth lens itself are reduced, off-axis aberrations will become worse. It is thus preferable to construct the fourth positive lens of a meniscus lens that has diverging action at one surface so that aberrations can be canceled out at each surface thereby reducing the amount of aberrations produced for compactness.

How to achieve compactness is now explained. In the lens type according to the fifth aspect of the invention, the third lens and the fourth lens are both positive lenses, so too is their composite power. This means that if the composite power of the rest of the inverted Ernostar type, that is, the first lens and the second lens, is negative, then a retrofocus type of −+ construction is formed. In other words, the principal points of the retrofocus type are shifted toward the image side thereof; in principle, the length of the optical system cannot be reduced, failing to accomplish the object of the fifth aspect of the invention. For this reason, the composite power of the first lens and the second lens should be positive, and so the composite focal length of the first and second lenses should satisfy condition (84).

As the upper limit of 25 to condition (84) is exceeded, the first lens and the second lens take on a kind of retrofocus type because their composite power becomes weak, resulting in an increase in the length of the optical system. As the lower limit of 0.5 is not reached, the composite power of the first lens and the second lens becomes too strong to make correction for coma, astigmatism and Petzval's sum produced at the second negative lens in particular, resulting in under-performance.

More preferably, $$1 < f_{12}/Ih < 22 \quad (84\text{-}1)$$

Even more preferably, $$2 < f_{12}/Ih < 20 \quad (84\text{-}2)$$

According to the sixth embodiment of the fifth aspect of the invention, the imaging system as recited in any one of the above first and third to fifth embodiments is further characterized in that the second negative lens is of double-concave shape.

Advantages and actions of the imaging system constructed according to the sixth embodiment of the fifth aspect of the invention are now explained.

Only one of four lenses that form the inverted Ernostar type is a negative lens having diverging action, and so the construction of this negative lens is important to the performance of the whole optical system. For compactness in general, the power of each lens must be enhanced; it is necessary for the negative lens to make effective correction for aberrations produced at three such positive lenses. In favor of wide-angle arrangement, off-axis aberrations such as astigmatism and distortion must be properly corrected; that is, a proper power balance must be made between converging action and diverging action. Accordingly, the second negative lens is configured in such a double-concave form as to allow both surfaces to have diverging action.

According to the seventh embodiment of the fifth aspect of the invention, the imaging system as recited in any one of the above first and third to fifth embodiments is characterized in that the third positive lens is of double-convex shape.

Advantages and actions of the imaging system constructed according to the seventh embodiment of the fifth aspect of the invention are now explained.

Only one of the four lenses that form the inverted Ernostar type is a negative lens having diverging action, and so increasing the power of this lens contributes to compactness and high performance. As the power of the second negative lens becomes strong, however, Petzval's sum is often overcorrected in a negative direction, rendering peripheral performance worse. Preferably in the fifth aspect of the invention, therefore, the third positive lens is configured in a double-convex form both surfaces of which have converging action for the purpose of correcting the Petzval's sum in a positive direction thereby preventing the peripheral performance from becoming worse.

According to the eighth embodiment of the fifth aspect of the invention, the imaging system as recited in any one of the above $1^{st}$ and $3^{rd}$ to $5^{th}$ embodiments is further characterized in that the third positive lens is in a meniscus form convex on its image side.

While the third lens and the fourth lens in the inverted Ernostar type according to the third aspect of the invention are each a positive lens, it is understood that the allocation of strong powers to those lenses is unfavorable for compactness, because the principal points of the optical system are shifted toward the image side of the optical system. It is therefore preferable that at least the third lens plays a relatively enhanced role in correction of aberrations. To this end, the third positive lens should preferably be in a meniscus form having diverging action at its one surface. In consideration of aberration balance, it is also preferable that the third lens is in such a meniscus form convex on the image side as to keep the angle of a rim light beam incident thereon gentle.

According to the ninth embodiment of the fifth aspect of the invention, the imaging system as recited in any one of the above $1^{st}$ and $3^{rd}$ to $5^{th}$ embodiments is further characterized in that the composite refracting power of the first positive lens and the second negative lens is positive.

Advantages and actions of the imaging system constructed according to the $9^{th}$ embodiment of the fifth aspect of the invention are now explained.

In the inverted Ernostar type, the composite focal length of the third lens and the fourth lens is always positive because both lenses are positive. Here, if the composite power of the first lens and the second lens is negative, it is then in principle difficult to reduce the length of the optical system because of a retrofocus type of −+ construction. It is thus preferable to make the composite focal length of the first lens and the second lens positive.

According to the 10th embodiment of the 5th aspect of the invention, the imaging system as recited in any one of the above 1st and 3rd to 5th embodiments is further characterized in that the composite refracting power of the second negative lens, the third positive lens and the fourth positive lens is negative.

Advantages and actions of the imaging system constructed according to the 10th embodiment of the 5th aspect of the invention are now explained.

When strong power is allocated to the first lens, any effective compactness is unachievable unless some considerable care is taken of the constructions of the third and fourth lenses. As generally known in the art, constructing an optical system in a telephoto type form is favorable for length reductions. Here, the second, third and fourth lenses should preferably have a negative composite power because the telephoto type is constructed of the first lens and the second, third and fourth lenses.

According to the 11th embodiment of the 5th aspect of the invention, the imaging system as recited in any one of the above 1st, 3rd and 4th embodiments is further characterized by satisfying the following condition:

$$0.5 < f_{12}/Ih < 50 \tag{85}$$

Here $f_{12}$ is the composite focal length of the first positive lens and the second negative lens, and Ih is the maximum image height of the image-formation optical system.

Advantages and actions of the imaging system constructed according to the 11th embodiment of the 5th aspect of the invention are now explained.

In the inverted Ernostar type, the third lens and the fourth lens are both positive lenses, so too is their composite power. This means that if the composite power of the rest of the inverted Ernostar type, that is, the first lens and the second lens, is negative, then a retrofocus type of −+ construction is formed. In other words, the principal points of the retrofocus type are shifted toward the image side; in principle, the length of the optical system cannot be reduced, failing to accomplish the object of the fifth aspect of the invention. For this reason, the composite power of the first lens and the second lens should be positive. However, it is the preferable for the composite focal length to satisfy condition (85) in such a way as to achieve compactness and high performance at the same time.

As the upper limit of 50 to condition (85) is exceeded, composite focal length of the first lens and the second lens becomes too short to achieve compactness, and as the lower limit of 0.5 is not reached, the composite focal length of the first lens and the second lens becomes too long, resulting in more higher-order aberrations such as coma and, hence, underperformance.

More preferably, $$0.8 < f_{12}/Ih < 30 \tag{85-1}$$

Even more preferably, $$10.0 < f_{12}/Ih < 15 \tag{85-2}$$

According to the 12th embodiment of the 5th aspect of the invention, the imaging system as recited in any one of the above 1st and 3rd to 5th embodiments is further characterized by satisfying the following condition:

$$-100 < f_{234}/Ih < -0.5 \tag{86}$$

Here $f_{234}$ is the composite focal length of the second negative lens, the third positive lens and the fourth positive lens, and Ih is the maximum image height of the image-formation optical system.

Advantages and actions of the imaging system constructed according to the 12th embodiment of the 5th aspect of the invention are now explained.

By allowing the second, the third and the fourth lens to have a negative composite power, it is acceptable to set up a telephoto type arrangement with the positive power of the first lens and the negative power of the second, the third and the fourth lens. It is here preferable to satisfy condition (86) thereby achieving compactness and high performance at the same time.

As the upper limit of −0.5 to condition (86) is exceeded, the negative power of the second lens becomes too strong and, accordingly, coma, astigmatism and Petzval's sum become worse, or the positive power of the third lens and the fourth lens becomes too weak and, accordingly, coma and distortion becomes worse. As the lower limit of −100 is not reached, any effective compactness is not achievable because the composite power of the second, the third and the fourth lens becomes too weak to obtain any significant telephoto effect.

More preferably, $$-50 < f_{234}/Ih < -1.0 \tag{86-1}$$

Even more preferably, $$-20 < f_{234}/Ih < -1.5 \tag{86-2}$$

According to the 13th embodiment of the 5th aspect of the invention, the imaging system as recited in any one of the above 1st and 3rd to 5th embodiments is further characterized in that an aperture stop is located on the object side of the first positive lens.

According to the 14th embodiment of the 5th aspect of the invention, the imaging system as recited in any one of the above 1st and 3rd to 5th embodiments is further characterized in that an aperture stop is interposed between the first positive lens and the second negative lens.

The imaging systems constructed according to the 13th and 14th embodiments of the 5th aspect of the invention are now explained.

When a CCD is used as the image pickup device, incidence of an off-axes light beam from the image-formation lens system on an image plane at too large an angle offers a problem that an image undergoes drastic brightness variations between its central position and its peripheral position, because full advantage can never be taken of the ability of a microlens to condense light. In view of design considerations, therefore, the angle of light rays on the CCD, that is, an exit pupil position is of importance. In the case of an optical system comprising a reduced number of lenses, the position of the aperture stop is of importance because it is difficult to manipulate the exit pupil position with the lenses. To make the angle of incidence of light rays on the CCD small, it is preferable to locate the aperture stop near to an object side. Especially when the aperture stop is located nearest to the object side, the merit is that chromatic aberration of magnification can be well corrected because both the first positive lens and the second negative lens having relatively strong powers of opposite signs are located on the image side. Especially when the apertures stop is interposed between the first positive and the second negative lens, the merit is that off-axis aberrations can be well corrected, because powers are allocated before and after the aperture stop so that coma can be easily balanced between upper light rays and lower light rays.

According to the 15$^{th}$ embodiment of the 5$^{th}$ aspect of the invention, the imaging system as recited in any one of the above 1$^{st}$ and 3$^{rd}$ to 5$^{th}$ embodiments is further characterized by satisfying the following condition:

$$12°<\alpha<40° \quad (87)$$

Here $\alpha$ is the angle of incidence of a chief ray on the image plane at the maximum image height.

Advantages and actions of the imaging system constructed according to the 15$^{th}$ embodiment of the 5$^{th}$ aspect of the invention are now explained.

A problem with using a CCD as the image pickup device is that as an off-axis light beam emerging from the image-formation optical system is incident on the image plane at too large an angle, an image suffers from drastic brightness changes between its central position and its peripheral position. If the light beam is incident on the image plane at a small angle, on the other hand, that problem may then be solved; however, this now gives rise to an increase in the length of the optical system. It is thus preferable to satisfy condition (87).

As the upper limit of 400 to condition (87) is exceeded, the angle of the chief ray on the CCD becomes too large, resulting in a drop of the brightness at the peripheral position of the image. As the lower limit of 120 is not reached, the optical system becomes too long.

More preferably, $$15°<\alpha<35° \quad (87\text{-}1)$$

Even more preferably, $$18°<\alpha<30° \quad (87\text{-}2)$$

According to the 16$^{th}$ embodiment of the 5$^{th}$ aspect of the invention, the imaging system as recited in any one of the above 1$^{st}$ and 3$^{rd}$ to 5$^{th}$ embodiments is further characterized by satisfying the following condition:

$$-0.5<(r_{4f}-r_{4r})/(r_{4f}+r_{4r})<0.2 \quad (88)$$

Here $r_{4f}$ is the axial radius of curvature of the object side of the fourth positive lens, and $r_{4r}$ is the axial radius of curvature of the image side of the fourth positive lens.

Advantages and actions of the imaging system constructed according to the 16$^{th}$ embodiment of the 5$^{th}$ aspect of the invention are now explained.

The fourth positive lens should preferably satisfy condition (88). As the upper limit of 0.2 to condition (88) is exceeded, the positive power of the fourth positive lens becomes too weak to make the angle of incidence of light on a CCD small, and as the lower limit of −0.5 is not reached, the power of the entrance surface becomes too strong with the result that coma and astigmatism become worse.

More preferably, $$-0.4<(r_{4f}-r_{4r})/(r_{4f}+r_{4r})<0.15 \quad (88\text{-}1)$$

Even more preferably, $$-0.2<(r_{4f}-r_{4r})/(r_{4f}+r_{4r})<0.1 \quad (88\text{-}2)$$

According to the 17$^{th}$ embodiment of the 5$^{th}$ aspect of the invention, the imaging system as recited in any of the above 1$^{st}$ and 3$^{rd}$ to 5$^{th}$ embodiments is further characterized by satisfying the following condition:

$$0.4<f_1/f_3<0.9 \quad (89)$$

Here $f_1$ is the focal length of the first positive lens, and $f_3$ is the focal length of the third positive lens.

Advantages and actions of the imaging system constructed according to the 17$^{th}$ embodiment of the 5$^{th}$ aspect of the invention are now explained.

Giving stronger power to the third positive lens than to the first positive lens renders the optical system bulkier because the principal points of the optical system are shifted toward the image side of the optical system. For the purpose of further size reductions, it is thus preferable to satisfy condition (89).

As the upper limit of 0.9 to condition (89) is exceeded, compactness is unachievable because the power of the third positive lens becomes too strong. As the lower limit of 0.4 is not reached, the power of the first positive lens becomes too strong, resulting in more spherical aberrations and coma. In either case, the performance of the optical system becomes worse.

More preferably, $$0.5<f_1/f_3<0.75 \quad (89\text{-}1)$$

According to the 18$^{th}$ embodiment of the 5$^{th}$ aspect of the invention, the imaging system as recited in any one of the above 1$^{st}$ and 3$^{rd}$ to 5$^{th}$ embodiments is further characterized in that the fourth positive lens comprises an aspheric surface that satisfies the following condition:

$$10.0<Ya/ra<2.0 \quad (90)$$

Here Ya is the maximum height of a ray through the aspheric surface in the fourth positive lens, as measured from the optical axis of the optical system, and ra is the axial radius of curvature of the aspheric surface in the fourth positive lens.

Advantages and actions of the imaging system constructed according to the 18$^{th}$ embodiment of the 5$^{th}$ aspect of the invention are now explained.

To make correction for peripheral performance, especially the bending of astigmatism remaining at the first to third lenses of the inverted Ernostar type, it is preferable to make power changes large. To, at this time, make power changes between near and the periphery of the optical axis large, it is effective to largely change the shape of the aspheric surface in such a way that the effective diameter is larger than that the axial radius of curvature. That is, it is preferable for at least one aspheric surface in the fourth positive lens to satisfy condition (90).

As the upper limit of 2.0 to condition (90) is exceeded, the amount of power change due to the aspheric surface becomes too small to make sufficient correction for the bending of astigmatism. As the lower limit of 1.0 is not reached, the amount of power change due to the aspheric surface becomes too large, resulting in over-correction of astigmatism or excessive higher-order aberrations. Consequently, the performance of the optical system becomes too worse due to fabrication errors.

More preferably, $$1.05<Ya/ra<1.8 \quad (90\text{-}1)$$

Even more preferably, $$1.1<Ya/ra<1.5 \quad (90\text{-}2)$$

According to the 19$^{th}$ embodiment of the 5$^{th}$ aspect of the invention, the imaging system as recited in any one of the above 1$^{st}$ and 3$^{rd}$ to 5$^{th}$ embodiments is further characterized in that the fourth positive lens comprises an aspheric surface having at least one point of inflection that satisfies the following condition:

$$0.25 < Yca/Ya < 0.85 \quad (91)$$

Here Yca is the position, as measured from the optical axis of the optical system, of the point of inflection on the aspheric surface in the fourth positive lens, and Ya is the maximum height of a ray through the aspheric surface in the fourth positive lens, as measured from the optical axis.

Advantages and actions of the imaging system constructed according to the 19th embodiment of the 5th aspect of the invention are now explained.

To make correction for the bending of astigmatism, it is preferable to provide a point of inflection to the aspheric surface in the fourth positive lens, thereby giving rise to power changes. It is then preferable for at least one aspheric surface in the fourth positive lens to have at least one point of inflection and satisfy condition (91).

As the upper limit of 0.85 to condition (91) is exceeded, the position to change power is shifted to the periphery of a screen and so astigmatism at the middle of the screen cannot be fully corrected. As the lower limit of 0.25 is not reached, the position to change power is brought near to the center of the screen, resulting in overcorrection of astigmatism or excessive higher-order aberrations. Consequently, the performance of the optical system becomes too worse due to fabrication errors.

More preferably, $$0.3 < Yca/Ya < 0.7 \quad (91\text{-}1)$$

Even more preferably, $$0.35 < Yca/Ya < 0.6 \quad (91\text{-}2)$$

With two points of infection, off-axial performance can be much more improved, provided that the second point of infection satisfies the following condition:

$$0.6 < Yca/Ya < 0.9 \quad (92)$$

More preferably, $$0.7 < Yca/Ya < 0.8 \quad (92\text{-}1)$$

According to the 20th embodiment of the 5th aspect of the invention, the imaging system as recited in any one of the above 1st and 3rd to 5th embodiments is further characterized in that said image-formation optical system comprises an aspheric surface that satisfies the following condition:

$$0.01 < |(r_{sp}+r_{asp})/(r_{sp}-r_{asp})-1| < 100 \quad (93)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP} = y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

Advantages and actions of the imaging systems constructed according to the 20th embodiment of the 5th aspect of the invention are now explained.

It is desired that at least one aspheric surface be used for satisfactory correction of aberrations and condition (93) be satisfied.

As the upper limit of 100 to condition (93) is exceeded, the effect of the aspheric surface becomes too slender for correction of aberrations and so coma and astigmatism become worse. As the lower limit of 0.01 is not reached, the effect of the aspheric surface becomes too strong; aberrations remain overcorrected, causing the performance of the optical system to become worse and rendering lens processing difficult.

More preferably, $$0.05 < |(r_{sp}+r_{asp})/(r_{sp}-r_{asp})-1| < 50 \quad (93\text{-}1)$$

Even more preferably, $$0.1 < |(r_{sp}+r_{asp})/(r_{sp}r_{asp})-1| < 10 \quad (93\text{-}2)$$

With more aberrations produced at the first positive lens that is a lens for receiving light rays in the first place, they are enlarged and transmitted through a part of the optical system on the image side. It is thus desired that aberrations produced there be sufficiently reduced. In other words, at least the first positive lens should preferably be provided with an aspheric surface.

The second negative lens is only one negative lens in the optical system; giving strong power thereto contributes to correction of coma and chromatic aberrations and compactness as well. However, too strong power gives rise to higher-order aberrations that render the performance of the optical system worse. It is thus preferable that at least the second negative lens is provided with an aspheric surface.

In favor of compactness, it is preferable for the third positive lens to be weaker in power than that of the first positive lens. However, giving weaker power to this lens means that it is less capable of correcting aberrations. For the third positive lens, therefore, it is desired that aberration correction capability be enhanced without increasing power. It is thus preferable that the third positive lens is provided with an aspheric surface. More preferably, both surfaces of the third positive lens should be defined aspheric surfaces.

According to the 21st embodiment of the 5th aspect of the invention, the imaging system as recited in any one of the above 1st and 3rd to 5th embodiments is further characterized in that the fourth positive lens comprises an aspheric surface that satisfies the following condition:

$$0.1 < |(r_{sp}+r_{asp})/(r_{sp}-r_{asp})-1| < 20 \quad (94)$$

Here $r_{sp}$ is the axial radius of curvature of the aspheric surface, and $r_{asp}$ is a value that is obtained when a difference between a radius of curvature $r_{ASP}$ with the aspheric surface taken into account and the axial radius of curvature reaches a maximum in an optically effective range.

Here, the radius of curvature $r_{ASP}$ with an aspheric surface taken into account is defined by the following equation:

$$r_{ASP} = y \cdot (1+f'(y)^2)^{1/2}/f'(y)$$

where f(y) is an aspheric surface defining equation (a function for configuration provided that the direction of propagation of an optical axis from a tangential plane to an apex is positive), y is a height from the optical axis, and f'(y) is differential of first order.

The imaging systems constructed according to the 21st embodiment of the 5th aspect of the invention are now explained.

With the fourth positive lens, it is possible to make correction for astigmatism left uncorrected at three lenses on the object side of the optical system, i.e., at a triplet. More preferably for correction of the bending of astigmatism, the power of the surface of the fourth positive lens should be varied; the fourth positive lens should be provided with an aspheric surface that satisfies condition (94).

As the upper limit of 20 to condition (94) is exceeded, the effect of the aspheric surface in the fourth positive lens becomes too slender to make correction for the bending of astigmatism with the result that the performance of the periphery of the screen becomes worse. As the lower limit of 0.1 is not reached, the effect of the aspheric surface becomes too strong, resulting in overcorrection of astigmatism and coma. Consequently, the performance of the optical system becomes worse and lens processing becomes difficult.

More preferably, $$0.2<|(r_{sp}+r_{asp})/(r_{sp}-r_{asp})-1|<15 \quad (94\text{-}1)$$

Even more preferably, $$0.5<|(r_{sp}+r_{asp})/(r_{sp}-r_{asp})-1|<10 \quad (94\text{-}2)$$

Throughout the first aspect of the invention, the lower or upper limits to the above conditions (81) to (94) may be limited to those to the respective subordinate conditions.

It is understood that if the above conditions are applied in suitable combinations as desired, the advantages of the first aspect of the invention are then much more enhanced.

Examples 1 to 8 of the image-formation optical system according to the first aspect of the invention are given below. FIGS. 1 to 8 are illustrative in section of the lens arrangements of Examples 1 to 8 upon focused on an object point at infinity. In these figures, S stands for an aperture stop, L1 a first positive lens, L2 a second negative lens, L3 a third positive lens, L4 a fourth positive lens, CG a cover glass for an electronic image pickup device, I an image plane, and FS a flare stop. It is noted that the cover glass CG may be provided on its surface with a wavelength range-limiting multilayer film, with or without a low-pass filter function.

EXAMPLE 1

As shown in FIG. 1, the image-formation optical system of Example 1 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of Estylene, and the third and fourth lenses L3 and L4 are each made of an amorphous polyolefin Zeonex (trade name).

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.071 mm for $2^{nd}$ surface $r_2$, 1.177 mm for $3^{rd}$ surface $r_3$, 1.220 mm for $4^{th}$ surface $r_4$, 1.501 mm for $5^{th}$ surface $r_5$, 1.607 mm for $6^{th}$ surface $r_6$, 1.705 mm for $7^{th}$ surface $r_7$, 2.402 mm for $8^{th}$ surface $r_8$ and 2.517 mm for $9^{th}$ surface $r_9$.

EXAMPLE 2

Figure 2:
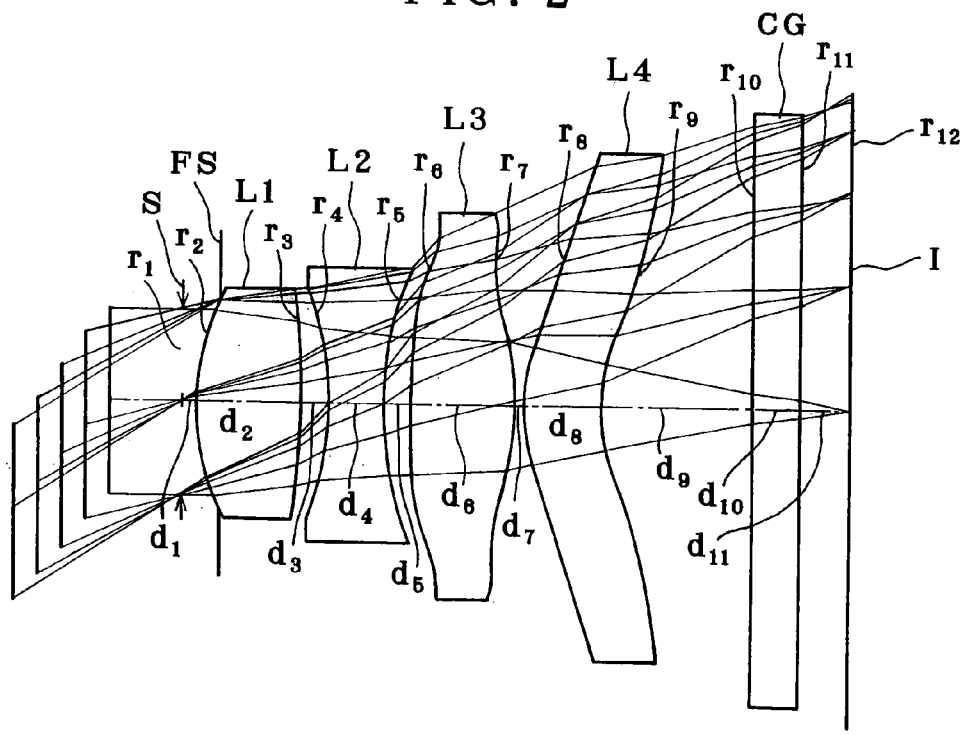
FIG. 2 is a lens arrangement section similar to FIG. 1 of Example 2 of the image-formation optical system.

As shown in FIG. 2, the image-formation optical system of Example 2 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of Estylene, and the third and fourth lenses L3 and L4 are each made of an amorphous polyolefin Zeonex.

The specifications of the wide-angle optical system according to this example are:
a focal length f=5.14 mm,
an image height Ih=3.3 mm, and
a half angle of view ω=32.76°.

The optically effective diameters of the respective lenses (on one sides) are 1.1 mm for $2^{nd}$ surface $r_2$, 1.203 mm for $3^{rd}$ surface $r_3$, 1.225 mm for $4^{th}$ surface $r_4$, 1.443 mm for $5^{th}$ surface $r_5$, 1.785 mm for $6^{th}$ surface $r_6$, 2.036 mm for $7^{th}$ surface $r_7$, 2.554 mm for $8^{th}$ surface $r_8$ and 2.675 mm for $9^{th}$ surface $r_9$.

Further, a flare stop FS for cutting rim light beams is interposed halfway between the aperture stop S and the first lens L1.

EXAMPLE 3

Figure 3:
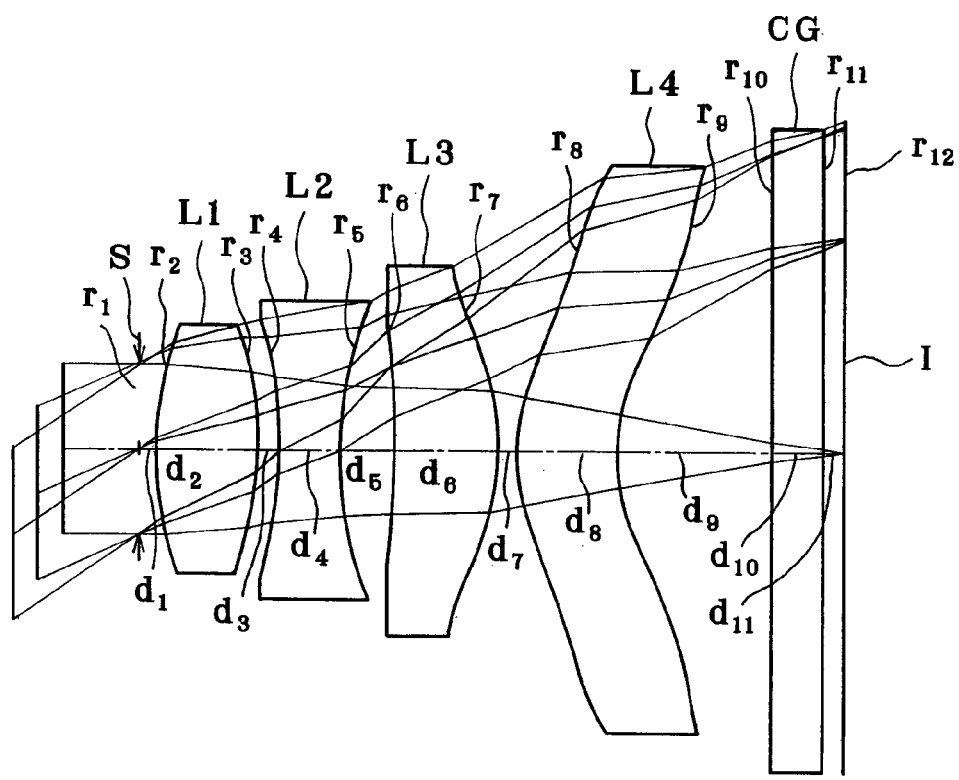
FIG. 3 is a lens arrangement section similar to FIG. 1 of Example 3 of the image-formation optical system.

As shown in FIG. 3, the image-formation optical system of Example 3 is made up of, in order from its object side, an aperture stop S, a first positive lens L1 that has an aspheric surface on its object side and is of double-convex shape, a second negative lens L2 that has an aspheric surface on its object side and is of double-concave shape, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of acrylic.

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.06 mm for $2^{nd}$ surface $r_2$, 1.209 mm for $3^{rd}$ surface $r_3$, 1.258 mm for $4^{th}$ surface $r_4$, 1.444 mm for $5^{th}$ surface $r_5$, 1.575 mm for $6^{th}$ surface $r_6$, 1.791 mm for $7^{th}$ surface $r_7$, 2.678 mm for $8^{th}$ surface $r_8$ and 2.770 mm for $9^{th}$ surface $r_9$.

EXAMPLE 4

Figure 4:
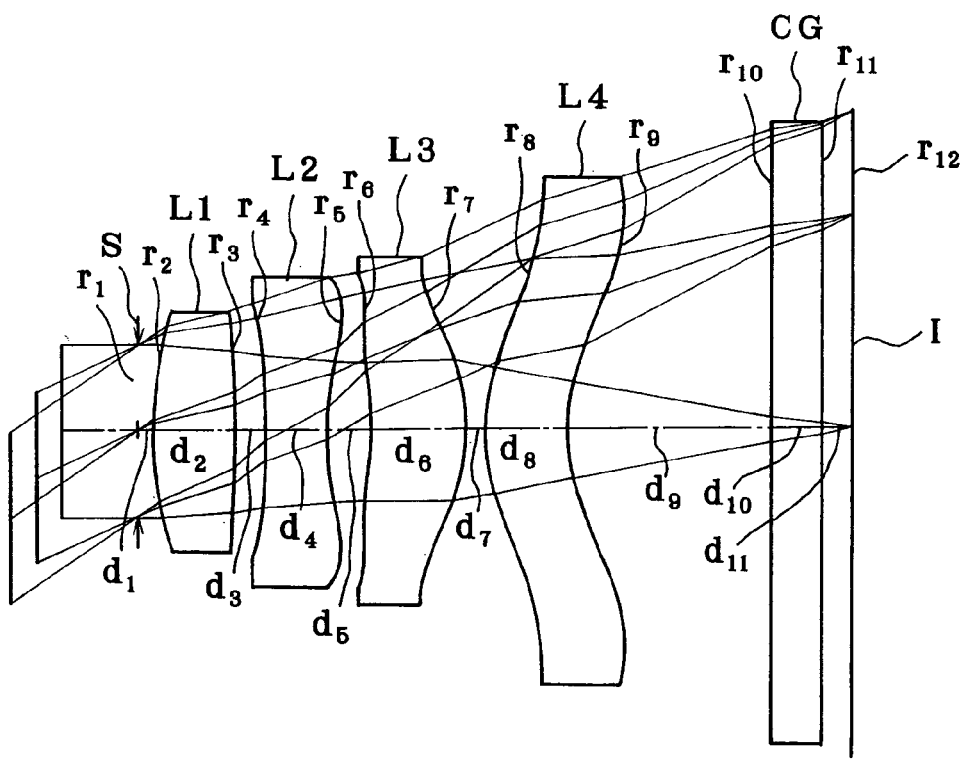
FIG. 4 is a lens arrangement section similar to FIG. 1 of Example 4 of the image-formation optical system.

As shown in FIG. 4, the image-formation optical system of Example 4 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.034 mm for $2^{nd}$ surface $r_2$, 1.174 mm for $3^{rd}$ surface $r_3$, 1.243 mm for $4^{th}$ surface $r_4$, 1.509 mm for $5^{th}$ surface $r_5$, 1.540 mm for $6^{th}$ surface $r_6$, 1.690 mm for $7^{th}$ surface $r_7$, 2.250 mm for $8^{th}$ surface $r_8$ and 2.467 mm for $9^{th}$ surface $r_9$.

EXAMPLE 5

Figure 5:
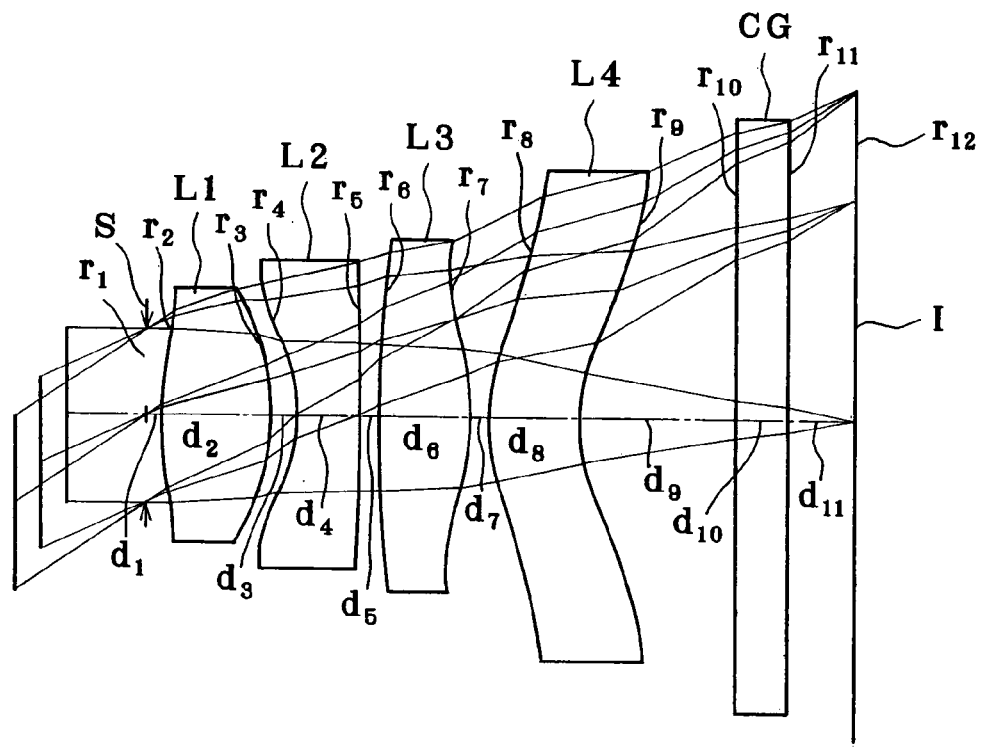
FIG. 5 is a lens arrangement section similar to FIG. 1 of Example 5 of the image-formation optical system.

As shown in FIG. 5, the image-formation optical system of Example 5 is made up of, in order from its object side, an aperture stop S, a first positive lens L1 that has an aspheric surface on its object side and is of double-convex shape, a second negative meniscus lens L2 that has an aspheric surface on its object side and is convex on its image side, a third positive lens L3 that has aspheric surfaces on both its sides and is of double-convex shape, a fourth positive meniscus lens L4 that is convex on its object side and has aspheric surfaces on both its sides and a cover glass CG. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of acrylic.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.014 mm for $2^{nd}$ surface $r_2$, 1.223 mm for $3^{rd}$ surface $r_3$, 1.279 mm for $4^{th}$ surface $r_4$, 1.480 mm for $5^{th}$ surface $r_5$, 1.581 mm for $6^{th}$ surface $r_6$, 1.697 mm for $7^{th}$ surface $r_7$, 2.134 mm for $8^{th}$ surface $r_8$ and 2.371 mm for $9^{th}$ surface $r_9$.

EXAMPLE 6

Figure 6:
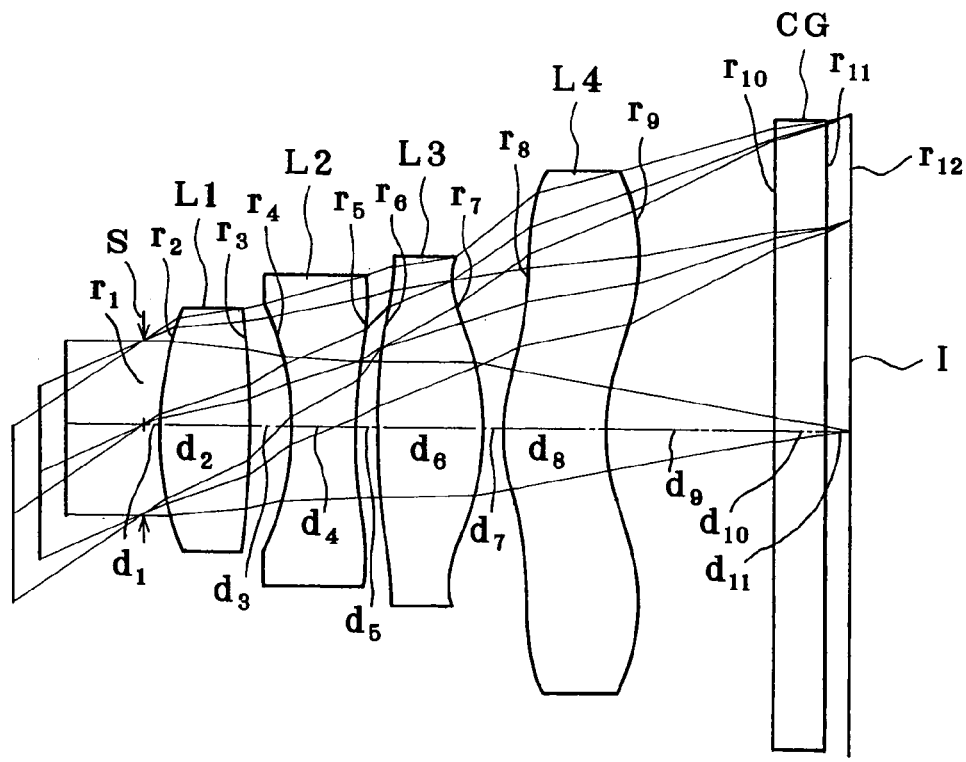
FIG. 6 is a lens arrangement section similar to FIG. 1 of Example 6 of the image-formation optical system.

As shown in FIG. 6, the image-formation optical system of Example 6 is made up of, in order from its object side, an aperture stop S, a first positive lens L1 of double-convex shape, a second negative lens L2 that is of double-concave shape and has aspheric surfaces on both its sides, a third positive lens L3 that has aspheric surfaces on both its sides and is of double-convex shape, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of Estylene, and the third and fourth lenses L3 and L4 are each made of an amorphous polyolefin Zeonex.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.070 mm for $2^{nd}$ surface $r_2$, 1.177 mm for $3^{rd}$ surface $r_3$, 1.221 mm for $4^{th}$ surface $r_4$, 1.497 mm for $5^{th}$ surface $r_5$, 1.573 mm for $6^{th}$ surface $r_6$, 1.681 mm for $7^{th}$ surface $r_7$, 2.323 mm for $8^{th}$ surface $r_8$ and 2.530 mm for $9^{th}$ surface $r_9$.

EXAMPLE 7

Figure 7:
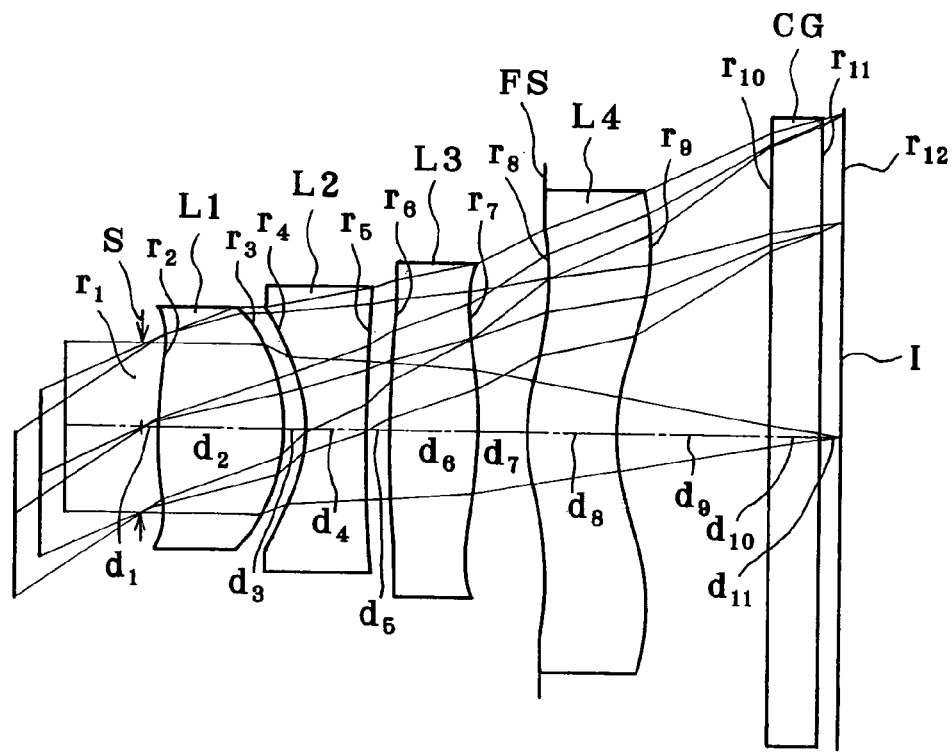
FIG. 7 is a lens arrangement section similar to FIG. 1 of Example 7 of the image-formation optical system.

As shown in FIG. 7, the image-formation optical system of Example 7 is made up of, in order from its object side, an aperture stop S, a first positive lens L1 that has an aspheric surface on its object side and is of double-convex shape, a second negative lens L2 that has an aspheric surface on its object side and is of double-concave shape, a third positive lens L3 that has aspheric surfaces on both its sides and is of double-convex shape, a fourth positive meniscus lens L4 that is convex on its object side and has aspheric surfaces on both its sides and a cover glass CG. In the instant example, the first, second, third and fourth lenses L1, L2, L3 and L4 are all made of glass.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 0.926 mm for $2^{nd}$ surface $r_2$, 1.191 mm for $3^{rd}$ surface $r_3$, 1.212 mm for $4^{th}$ surface $r_4$, 1.395 mm for $5^{th}$ surface $r_5$, 1.484 mm for $6^{th}$ surface $r_6$, 1.633 mm for $7^{th}$ surface $r_7$, 2 mm for $8^{th}$ surface $r_8$ and 2.375 mm for $9^{th}$ surface $r_9$.

Further, a flare stop FS for cutting rim light beams is interposed halfway between the third lens L3 and the fourth lens L4.

EXAMPLE 8

Figure 8:
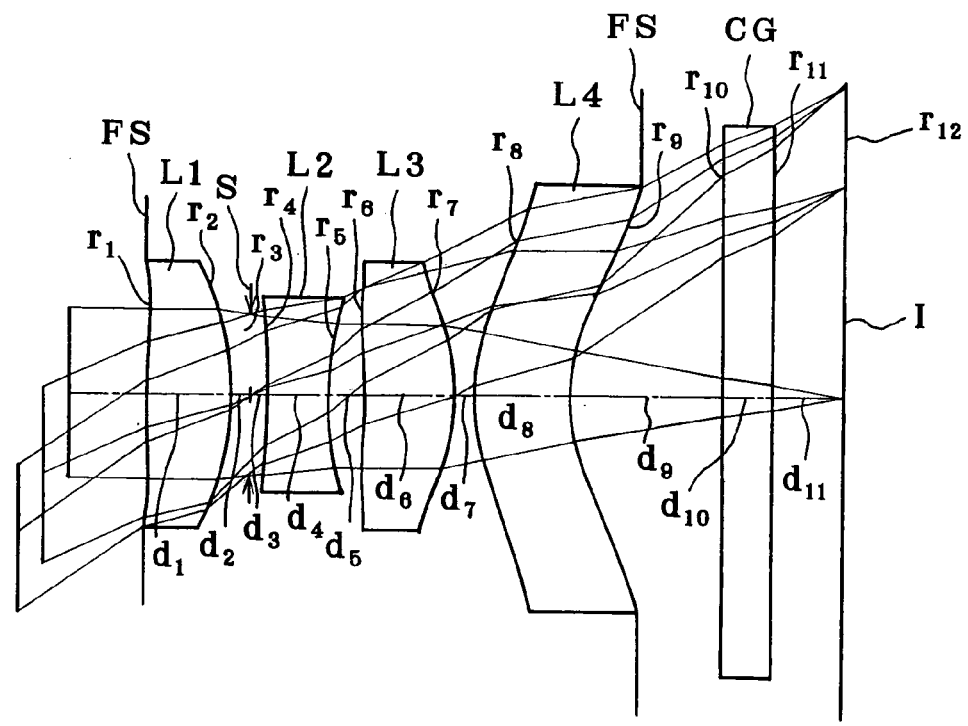
FIG. 8 is a lens arrangement section similar to FIG. 1 of Example 8 of the image-formation optical system.
Figure 9:
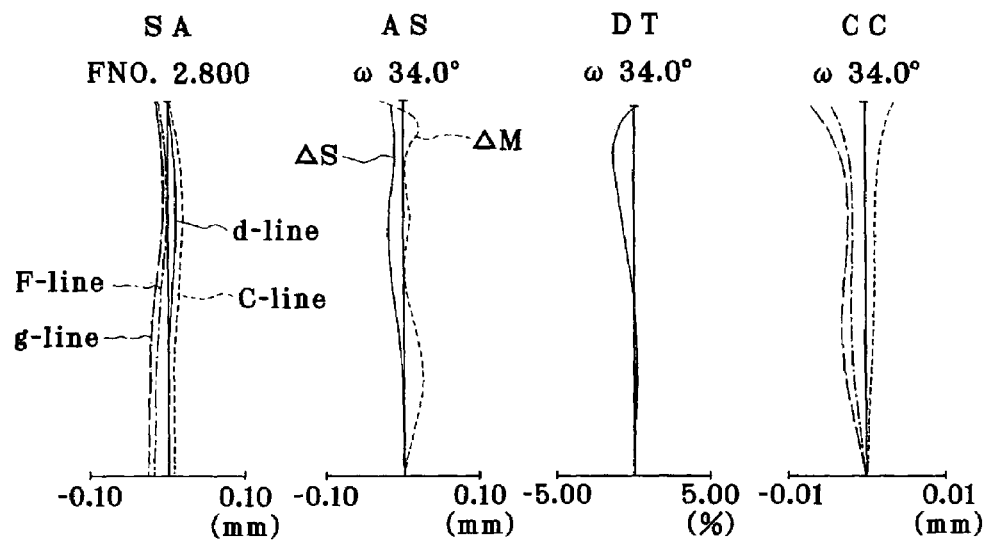
FIG. 9 is an aberration diagram for Example 1 upon focused on an object point at infinity.
Figure 10:
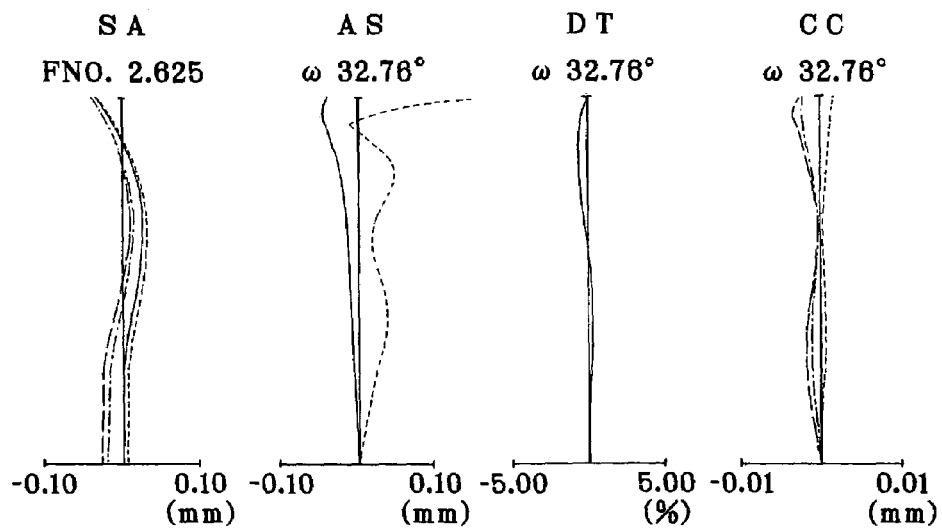
FIG. 10 is an aberration diagram for Example 2 upon focused on an object point at infinity.
Figure 11:
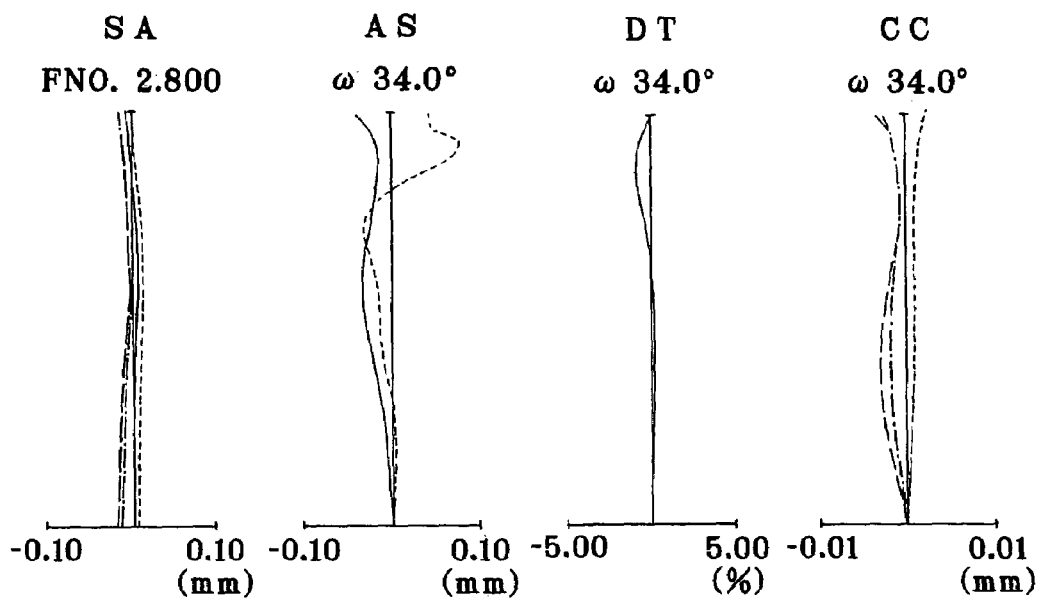
FIG. 11 is an aberration diagram for Example 3 upon focused on an object point at infinity.
Figure 12:
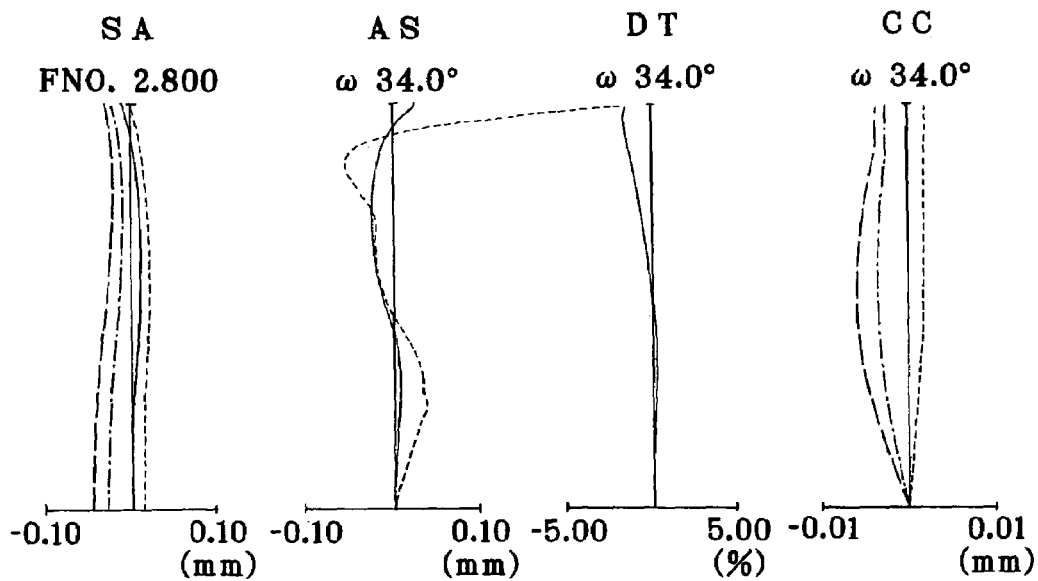
FIG. 12 is an aberration diagram for Example 4 upon focused on an object point at infinity.
Figure 13:
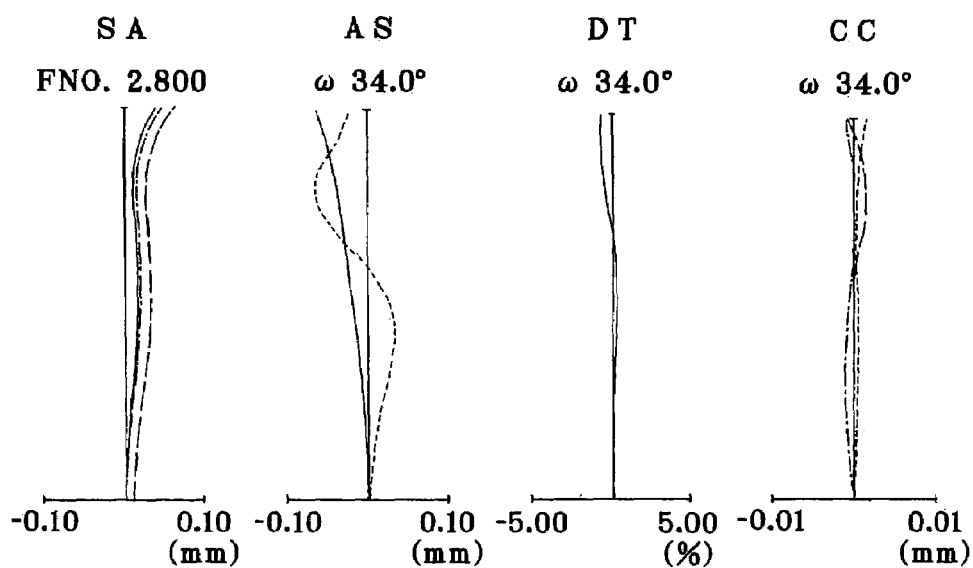
FIG. 13 is an aberration diagram for Example 5 upon focused on an object point at infinity.
Figure 14:
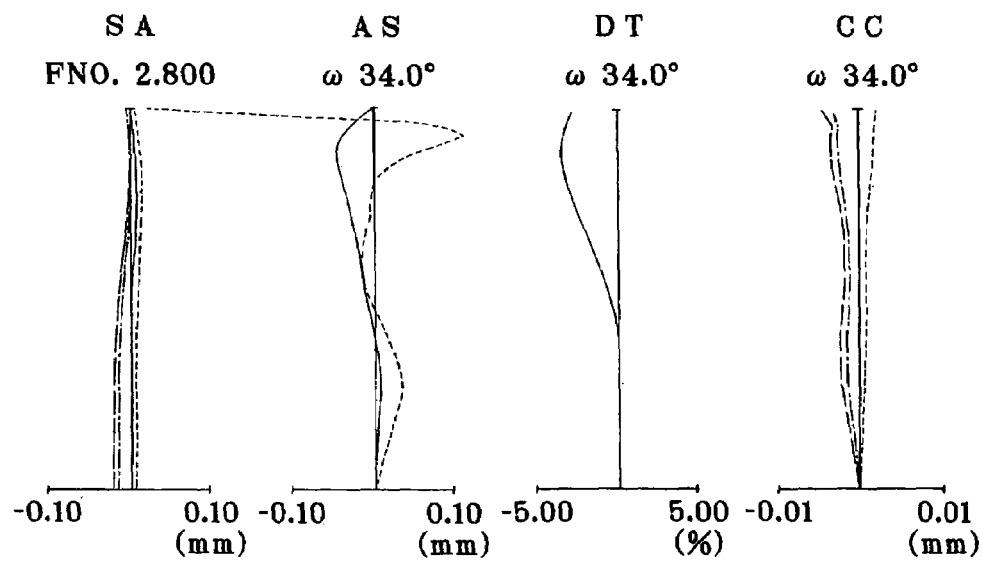
FIG. 14 is an aberration diagram for Example 6 upon focused on an object point at infinity.
Figure 15:
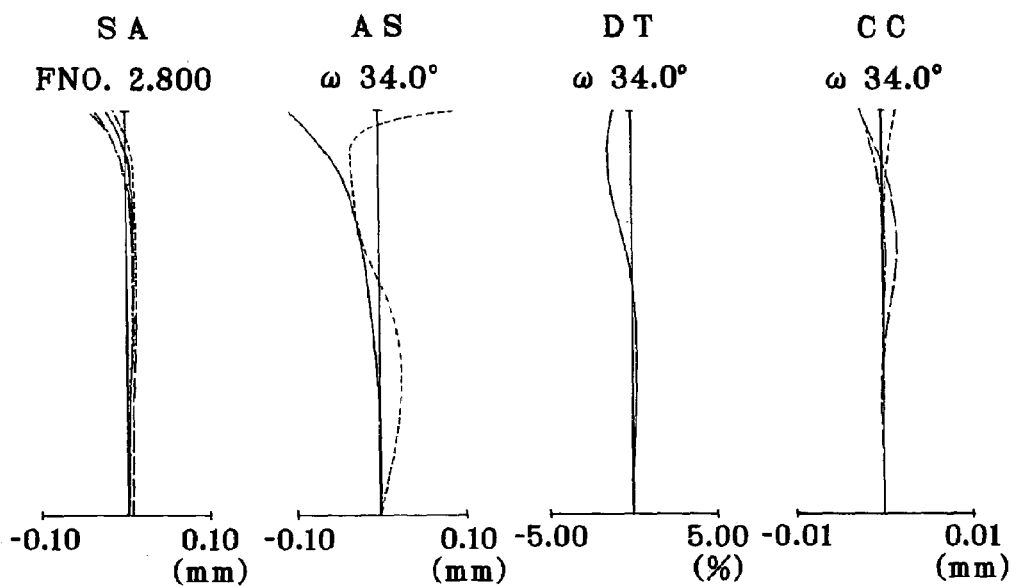
FIG. 15 is an aberration diagram for Example 7 upon focused on an object point at infinity.
Figure 16:
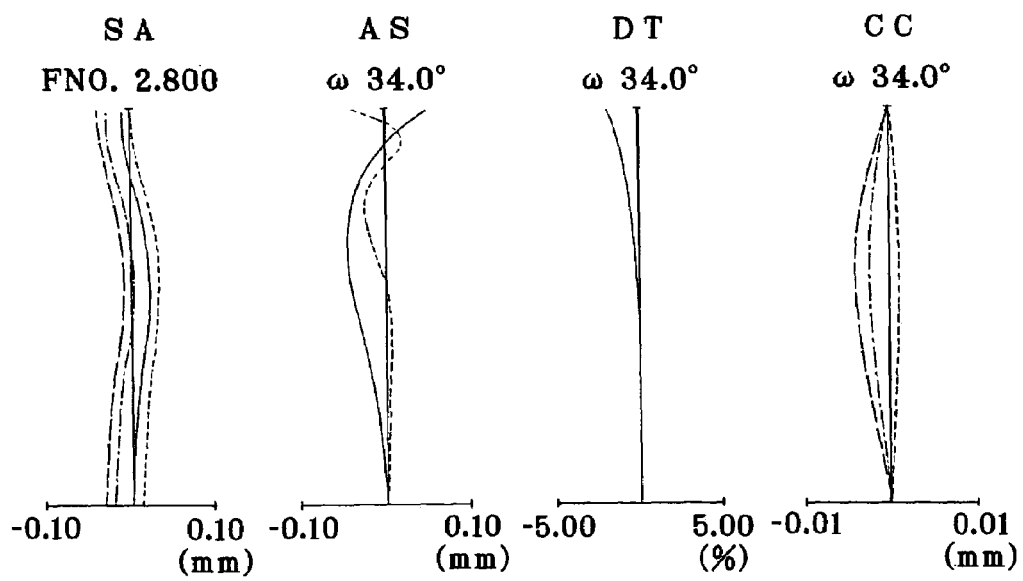
FIG. 16 is an aberration diagram for Example 8 upon focused on an object point at infinity.

As shown in FIG. 8, the image-formation optical system of Example 8 is made up of, in order from its object side, a first positive lens L1 that has an aspheric surface on its object side and is of double-convex shape, an aperture stop S, a second negative lens L2 that has an aspheric surface on its object side and is of double-concave shape, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.3 mm for $1^{st}$ surface $r_1$, 1.116 mm for $2^{nd}$ surface $r_2$, 0.827 mm for $4^{th}$ surface $r_4$, 0.963 mm for $5^{th}$ surface $r_5$, 1.089 mm for $6^{th}$ surface $r_6$, 1.317 mm for $7^{th}$ surface $r_7$, 1.884 mm for $8^{th}$ surface $r_8$ and 2.1 mm for $9^{th}$ surface $r_9$.

Further, flare stops FS for cutting off-axis light beams are located on the object side of the first lens L1 and interposed halfway between the fourth lens L4 and the cover glass CG.

The numerical data on each example are given below. Symbols used hereinafter but not hereinbefore have the following meanings:

$r_1, r_2, \ldots$ : radius of curvature of each lens surface, $d_1, d_2, \ldots$ : spacing between adjacent lens surfaces, $n_{d1}, n_{d2}, \ldots$ : d-line refractive index of each lens, and $\nu_{d1}, \nu_{d2}, \ldots$ : Abbe number of each lens.

Here let x be an optical axis on condition that the direction of propagation of light is positive and y be a direction orthogonal to the optical axis. Then, aspheric configuration is given by $$x = (y^2/r)/[1+\{1-(K+1)(y/r)^2\}^{1/2}] + A_4 y^4 + A_6 y^6 + A_8 y^8 + A_{10} y^{10} \quad (a)$$

where r is an axial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = \infty$(Stop) | $d_1 = 0.1500$ | | |
| $r_2 = 3.0587$ | $d_2 = 0.8585$ | $n_{d1} = 1.60311$ | $\nu_{d1} = 60.64$ |
| $r_3 = -10.6981$ | $d_3 = 0.3951$ | | |
| $r_4 = -3.1654$(Aspheric) | $d_4 = 0.6000$ | $n_{d2} = 1.57268$ | $\nu_{d2} = 33.51$ |
| $r_5 = 5.4377$(Aspheric) | $d_5 = 0.2033$ | | |
| $r_6 = -27.6495$(Aspheric) | $d_6 = 1.0398$ | $n_{d3} = 1.50913$ | $\nu_{d3} = 56.20$ |
| $r_7 = -2.2615$(Aspheric) | $d_7 = 0.2000$ | | |
| $r_8 = 1.7649$(Aspheric) | $d_8 = 0.8000$ | $n_{d4} = 1.50913$ | $\nu_{d4} = 56.20$ |
| $r_9 = 1.5213$(Aspheric) | $d_9 = 1.5351$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.5182$ | | |
| $r_{12} = \infty$(Image Plane) | | | |

Aspherical Coefficients
4 th surface $K = 4.2023$
$A_4 = -2.2305 \times 10^{-2}$
$A_6 = 5.2369 \times 10^{-2}$
$A_8 = -2.7263 \times 10^{-2}$
$A_{10} = 9.4663 \times 10^{-3}$
5 th surface $K = -88.7312$
$A_4 = 2.2077 \times 10^{-2}$
$A_6 = -1.9979 \times 10^{-2}$
$A_8 = 4.0561 \times 10^{-3}$
$A_{10} = 0.0000$
6 th surface $K = 268.9032$
$A_4 = 6.3212 \times 10^{-2}$
$A_6 = -3.6770 \times 10^{-2}$
$A_8 = 8.5052 \times 10^{-3}$
$A_{10} = 0.0000$
7 th surface $K = -1.1428$
$A_4 = 2.3346 \times 10^{-2}$
$A_6 = -7.0393 \times 10^{-3}$
$A_8 = 2.6723 \times 10^{-3}$
$A_{10} = 3.3657 \times 10^{-4}$ 8 th surface $K = -2.3742$
$A_4 = -2.8446 \times 10^{-2}$
$A_6 = -2.2614 \times 10^{-3}$
$A_8 = 1.2522 \times 10^{-3}$
$A_{10} = -8.3678 \times 10^{-5}$
9 th surface $K = -2.3018$
$A_4 = -4.1581 \times 10^{-2}$
$A_6 = 5.7947 \times 10^{-3}$
$A_8 = -6.8801 \times 10^{-4}$
$A_{10} = 5.1911 \times 10^{-5}$

EXAMPLE 2

| | | | |
|---|---|---|---|
| $r_1 = \infty$(Stop) | $d_1 = 0.1500$ | | |
| $r_2 = 2.7108$ | $d_2 = 1.0603$ | $n_{d1} = 1.58313$ | $\nu_{d1} = 59.38$ |
| $r_3 = -8.3420$ | $d_3 = 0.2982$ | | |
| $r_4 = -3.2482$(Aspheric) | $d_4 = 0.6000$ | $n_{d2} = 1.57268$ | $\nu_{d2} = 33.51$ |
| $r_5 = 4.6789$(Aspheric) | $d_5 = 0.2875$ | | |
| $r_6 = -38.8125$(Aspheric) | $d_6 = 1.0811$ | $n_{d3} = 1.50913$ | $\nu_{d3} = 56.20$ |
| $r_7 = -2.8236$(Aspheric) | $d_7 = 0.1100$ | | |
| $r_8 = 1.8103$(Aspheric) | $d_8 = 0.8000$ | $n_{d4} = 1.50913$ | $\nu_{d4} = 56.20$ |
| $r_9 = 1.5676$(Aspheric) | $d_9 = 1.6000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.5119$ | | |
| $r_{12} = \infty$(Image Plane) | | | |

Aspherical Coefficients
4 th surface $K = 4.2272$
$A_4 = -8.4154 \times 10^{-4}$
$A_6 = 3.3644 \times 10^{-2}$
$A_8 = -1.6878 \times 10^{-2}$
$A_{10} = 7.1535 \times 10^{-3}$
5 th surface $K = -1.5523$
$A_4 = 2.2157 \times 10^{-2}$
$A_6 = -1.1749 \times 10^{-2}$
$A_8 = 3.7361 \times 10^{-3}$
$A_{10} = 0.0000$
6 th surface $K = -1.942 \times 10^4$
$A_4 = 8.3063 \times 10^{-2}$
$A_6 = -3.2821 \times 10^{-2}$
$A_8 = 7.9071 \times 10^{-3}$
$A_{10} = -9.4840 \times 10^{-4}$
7 th surface $K = -11.8290$
$A_4 = -2.8580 \times 10^{-2}$
$A_6 = 2.6824 \times 10^{-2}$
$A_8 = -4.6918 \times 10^{-3}$
$A_{10} = 1.1729 \times 10^{-4}$
8 th surface $K = -2.8662$
$A_4 = -3.4945 \times 10^{-2}$
$A_6 = 6.4171 \times 10^{-3}$
$A_8 = -3.8843 \times 10^{-4}$
$A_{10} = 0.0000$
9 th surface $K = -3.1664$
$A_4 = -3.0308 \times 10^{-2}$
$A_6 = 3.7325 \times 10^{-3}$
$A_8 = -1.6144 \times 10^{-4}$
$A_{10} = 0.0000$

EXAMPLE 3

| | | | |
|---|---|---|---|
| $r_1 = \infty$(Stop) | $d_1 = 0.1500$ | | |
| $r_2 = 2.9580$(Aspheric) | $d_2 = 0.9782$ | $n_{d1} = 1.52542$ | $\nu_{d1} = 55.70$ |
| $r_3 = -3.7349$ | $d_3 = 0.2000$ | | |
| $r_4 = -4.5007$(Aspheric) | $d_4 = 0.6000$ | $n_{d2} = 1.58423$ | $\nu_{d2} = 30.40$ |
| $r_5 = 4.2505$ | $d_5 = 0.5088$ | | |
| $r_6 = -4.9834$(Aspheric) | $d_6 = 0.9920$ | $n_{d3} = 1.52542$ | $\nu_{d3} = 55.70$ |
| $r_7 = -2.3461$(Aspheric) | $d_7 = 0.2000$ | | |
| $r_8 = 1.8807$(Aspheric) | $d_8 = 0.9710$ | $n_{d4} = 1.52542$ | $\nu_{d4} = 55.70$ |
| $r_9 = 1.5744$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
2nd surface $K = -1.0122$
$A_4 = -7.9574 \times 10^{-3}$
$A_6 = 2.5720 \times 10^{-3}$
$A_8 = -3.9381 \times 10^{-3}$
$A_{10} = 0.0000$
4 th surface $K = 2.3582$
$A_4 = -4.7110 \times 10^{-3}$
$A_6 = 1.1238 \times 10^{-2}$
$A_8 = -1.2909 \times 10^{-4}$
$A_{10} = 0.0000$
6 th surface $K = -58.6240$
$A_4 = 2.6841 \times 10^{-2}$
$A_6 = -8.8928 \times 10^{-3}$
$A_8 = 1.3969 \times 10^{-3}$
$A_{10} = 0.0000$
7 th surface $K = -4.7253$
$A_4 = -7.6461 \times 10^{-3}$
$A_6 = -1.2130 \times 10^{-3}$
$A_8 = 1.5340 \times 10^{-3}$
$A_{10} = 0.0000$
8 th surface $K = -2.1946$
$A_4 = -1.8009 \times 10^{-2}$
$A_6 = -1.7068 \times 10^{-3}$
$A_8 = 7.0113 \times 10^{-4}$
$A_{10} = -4.1845 \times 10^{-5}$
9 th surface $K = -2.5566$
$A_4 = -1.5481 \times 10^{-2}$
$A_6 = -2.1682 \times 10^{-4}$
$A_8 = 1.1780 \times 10^{-4}$
$A_{10} = 0.0000$

EXAMPLE 4

| | | | |
|---|---|---|---|
| $r_1 = \infty$(Stop) | $d_1 = 0.1500$ | | |
| $r_2 = 3.9238$ | $d_2 = 0.7956$ | $n_{d1} = 1.60311$ | $\nu_{d1} = 60.64$ |
| $r_3 = -14.8635$ | $d_3 = 0.2880$ | | |
| $r_4 = -1120.8924$(Aspheric) | $d_4 = 0.6000$ | $n_{d2} = 1.58423$ | $\nu_{d2} = 30.40$ |
| $r_5 = 3.7966$(Aspheric) | $d_5 = 0.4029$ | | |
| $r_6 = -3.1331$(Aspheric) | $d_6 = 0.9180$ | $n_{d3} = 1.52542$ | $\nu_{d3} = 55.70$ |
| $r_7 = -1.8023$(Aspheric) | $d_7 = 0.2000$ | | |
| $r_8 = 1.7712$(Aspheric) | $d_8 = 0.8003$ | $n_{d4} = 1.52542$ | $\nu_{d4} = 55.70$ |
| $r_9 = 1.5477$(Aspheric) | $d_9 = 2.0000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2995$ | | |
| $r_{12} = \infty$(Image Plane) | | | |

Aspherical Coefficients
4 th surface $K = 0$
$A_4 = -3.7913 \times 10^{-2}$
$A_6 = -2.2372 \times 10^{-2}$
$A_8 = 1.4580 \times 10^{-2}$
$A_{10} = -3.6154 \times 10^{-3}$
5 th surface $K = 0$
$A_4 = 3.4094 \times 10^{-4}$
$A_6 = -1.7883 \times 10^{-2}$
$A_8 = -3.1065 \times 10^{-3}$
$A_{10} = 0.0000$
6 th surface $K = -1.2983$
$A_4 = 1.2496 \times 10^{-1}$
$A_6 = -2.4383 \times 10^{-2}$
$A_8 = -3.7556 \times 10^{-3}$
$A_{10} = 0.0000$
7 th surface $K = -1.4618$
$A_4 = 1.9189 \times 10^{-2}$
$A_6 = 5.3869 \times 10^{-3}$
$A_8 = -7.7595 \times 10^{-6}$
$A_{10} = 6.5893 \times 10^{-5}$
8 th surface $K = -3.7049$
$A_4 = -9.7911 \times 10^{-4}$
$A_6 = -4.7028 \times 10^{-3}$
$A_8 = 4.9457 \times 10^{-4}$
$A_{10} = 0.0000$
9 th surface $K = -3.6266$
$A_4 = -1.0162 \times 10^{-2}$
$A_6 = -1.3627 \times 10^{-3}$
$A_8 = 1.2305 \times 10^{-4}$
$A_{10} = 0.0000$

EXAMPLE 5

| | | | |
|---|---|---|---|
| $r_1 = \infty$(Stop) | $d_1 = 0.1500$ | | |
| $r_2 = 3.6303$(Aspheric) | $d_2 = 1.0301$ | $n_{d1} = 1.52542$ | $\nu_{d1} = 55.70$ |
| $r_3 = -2.4866$ | $d_3 = 0.2596$ | | |
| $r_4 = -1.5146$(Aspheric) | $d_4 = 0.6000$ | $n_{d2} = 1.58423$ | $\nu_{d2} = 30.40$ |
| $r_5 = -68.8423$ | $d_5 = 0.2000$ | | |
| $r_6 = 86.4611$(Aspheric) | $d_6 = 0.8500$ | $n_{d3} = 1.52542$ | $\nu_{d3} = 55.70$ |
| $r_7 = -2.8323$(Aspheric) | $d_7 = 0.2000$ | | |
| $r_8 = 1.8538$(Aspheric) | $d_8 = 0.8686$ | $n_{d4} = 1.52542$ | $\nu_{d4} = 55.70$ |
| $r_9 = 1.5592$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.6417$ | | |
| $r_{12} = \infty$(Image Plane) | | | |

Aspherical Coefficients
2 nd surface $K = -2.5872$
$A_4 = -1.5169 \times 10^{-2}$
$A_6 = 2.8143 \times 10^{-3}$
$A_8 = -1.4063 \times 10^{-2}$
$A_{10} = 0.0000$
4 th surface $K = 0$
$A_4 = 9.4079 \times 10^{-2}$
$A_6 = 4.0581 \times 10^{-3}$
$A_8 = 1.2000 \times 10^{-2}$
$A_{10} = 0.0000$ -continued 6 th surface K = 0
$A_4 = 2.3924 \times 10^{-2}$
$A_6 = -3.8788 \times 10^{-3}$
$A_8 = -5.5994 \times 10^{-4}$
$A_{10} = 0.0000$ 7 th surface K = −3.0771
$A_4 = 6.1182 \times 10^{-3}$
$A_6 = 1.5248 \times 10^{-2}$
$A_8 = -2.1155 \times 10^{-3}$
$A_{10} = 0.0000$ 8 th surface K = −3.2033
$A_4 = -2.1148 \times 10^{-2}$
$A_6 = -2.8724 \times 10^{-3}$
$A_8 = 1.4865 \times 10^{-3}$
$A_{10} = -1.3246 \times 10^{-4}$ 9 th surface K = −2.1411
$A_4 = -3.7778 \times 10^{-2}$
$A_6 = 4.6337 \times 10^{-3}$
$A_8 = -2.2796 \times 10^{-4}$
$A_{10} = 0.0000$

EXAMPLE 6

| | | | |
|---|---|---|---|
| $r_1 = \infty$(Stop) | $d_1 = 0.1500$ | | |
| $r_2 = 3.0692$ | $d_2 = 0.8643$ | $n_{d1} = 1.60311$ | $\nu_{d1} = 60.64$ |
| $r_3 = -9.7138$ | $d_3 = 0.4067$ | | |
| $r_4 = -3.1668$(Aspheric) | $d_4 = 0.6274$ | $n_{d2} = 1.57268$ | $\nu_{d2} = 33.51$ |
| $r_5 = 4.6548$(Aspheric) | $d_5 = 0.2073$ | | |
| $r_6 = 155.1654$(Aspheric) | $d_6 = 1.0145$ | $n_{d3} = 1.50913$ | $\nu_{d3} = 56.20$ |
| $r_7 = -2.6924$(Aspheric) | $d_7 = 0.2000$ | | |
| $r_8 = 1.7906$(Aspheric) | $d_8 = 0.9873$ | $n_{d4} = 1.50913$ | $\nu_{d4} = 56.20$ |
| $r_9 = 1.6510$(Aspheric) | $d_9 = 1.6285$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2357$ | | |
| $r_{12} = \infty$(Image Plane) | | | |

Aspherical Coefficients
4 th surface

K = 4.4464
$A_4 = -1.5236 \times 10^{-2}$
$A_6 = 2.9696 \times 10^{-2}$
$A_8 = -1.8646 \times 10^{-2}$
$A_{10} = 1.1479 \times 10^{-2}$ 5 th surface K = −72.6121
$A_4 = 5.9393 \times 10^{-2}$
$A_6 = -4.5685 \times 10^{-2}$
$A_8 = 6.3494 \times 10^{-3}$
$A_{10} = 0.0000$ 6 th surface K = 0
$A_4 = 8.1807 \times 10^{-2}$
$A_6 = -3.2840 \times 10^{-2}$
$A_8 = 3.2360 \times 10^{-3}$
$A_{10} = 0.0000$ 7 th surface K = 0.0351
$A_4 = -3.1521 \times 10^{-2}$
$A_6 = 3.4947 \times 10^{-2}$
$A_8 = -5.8668 \times 10^{-3}$
$A_{10} = 8.1743 \times 10^{-4}$ -continued 8 th surface K = −5.1533
$A_4 = -4.2264 \times 10^{-2}$
$A_6 = -6.8941 \times 10^{-4}$
$A_8 = 2.0097 \times 10^{-3}$
$A_{10} = -1.8108 \times 10^{-4}$ 9 th surface K = −1.5120
$A_4 = -8.7478 \times 10^{-2}$
$A_6 = 1.6023 \times 10^{-2}$
$A_8 = -1.8890 \times 10^{-3}$
$A_{10} = 1.0554 \times 10^{-4}$

EXAMPLE 7

| | | | |
|---|---|---|---|
| $r_1 = \infty$(Stop) | $d_1 = 0.1500$ | | |
| $r_2 = 5.2266$(Aspheric) | $d_2 = 1.2201$ | $n_{d1} = 1.67790$ | $\nu_{d1} = 50.72$ |
| $r_3 = -1.8052$ | $d_3 = 0.2000$ | | |
| $r_4 = -1.4786$(Aspheric) | $d_4 = 0.6000$ | $n_{d2} = 1.67270$ | $\nu_{d2} = 32.10$ |
| $r_5 = 33.7345$ | $d_5 = 0.2093$ | | |
| $r_6 = 86.4611$(Aspheric) | $d_6 = 0.8500$ | $n_{d3} = 1.62299$ | $\nu_{d3} = 58.16$ |
| $r_7 = -5.1116$(Aspheric) | $d_7 = 0.4982$ | | |
| $r_8 = 2.2029$(Aspheric) | $d_8 = 0.8724$ | $n_{d4} = 1.63854$ | $\nu_{d4} = 55.38$ |
| $r_9 = 1.9068$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
2 nd surface

K = −8.0552
$A_4 = -2.2916 \times 10^{-2}$
$A_6 = -1.2521 \times 10^{-2}$
$A_8 = -1.4940 \times 10^{-2}$
$A_{10} = 0.0000$ 4 th surface K = 0
$A_4 = 6.6320 \times 10^{-2}$
$A_6 = 2.0831 \times 10^{-2}$
$A_8 = 9.3086 \times 10^{-3}$
$A_{10} = 0.0000$ 6 th surface K = 0
$A_4 = 2.8798 \times 10^{-2}$
$A_6 = -3.2131 \times 10^{-3}$
$A_8 = -1.9396 \times 10^{-3}$
$A_{10} = 0.0000$ 7 th surface K = 1.9910
$A_4 = -1.0405 \times 10^{-3}$
$A_6 = 2.6707 \times 10^{-2}$
$A_8 = -5.0660 \times 10^{-3}$
$A_{10} = 0.0000$ 8 th surface K = −6.0203
$A_4 = -3.3787 \times 10^{-2}$
$A_6 = -4.0427 \times 10^{-3}$
$A_8 = 2.9000 \times 10^{-3}$
$A_{10} = -3.3624 \times 10^{-4}$ 9 th surface K = −3.4110
$A_4 = -4.2925 \times 10^{-2}$
$A_6 = 5.3809 \times 10^{-3}$
$A_8 = -2.9530 \times 10^{-4}$
$A_{10} = 0.0000$

EXAMPLE 8

| | | | |
|---|---|---|---|
| $r_1 = 9.6049$(Aspheric) | $d_1 = 0.8143$ | $n_{d1} = 1.52542$ | $v_{d1} = 55.70$ |
| $r_2 = -3.0451$ | $d_2 = 0.2000$ | | |
| $r_3 = \infty$(Stop) | $d_3 = 0.1500$ | | |
| $r_4 = -17.4641$(Aspheric) | $d_4 = 0.6000$ | $n_{d2} = 1.58423$ | $v_{d2} = 30.40$ |
| $r_5 = 3.4233$ | $d_5 = 0.3383$ | | |
| $r_6 = -6.5090$(Aspheric) | $d_6 = 0.8658$ | $n_{d3} = 1.52542$ | $v_{d3} = 55.70$ |
| $r_7 = -2.2473$(Aspheric) | $d_7 = 0.2000$ | | |
| $r_8 = 1.9371$(Aspheric) | $d_8 = 0.9213$ | $n_{d4} = 1.52542$ | $v_{d4} = 55.70$ |
| $r_9 = 1.6318$(Aspheric) | $d_9 = 1.5000$ | | |
| $r_{10} = \infty$ | $d_{10} = 0.5000$ | $n_{d5} = 1.51633$ | $v_{d5} = 64.14$ |
| $r_{11} = \infty$ | $d_{11} = 0.7103$ | | |
| $r_{12} = \infty$(Image Plane) | | | |

Aspherical Coefficients
1 st surface $K = -57.1295$
$A_4 = -2.5251 \times 10^{-2}$
$A_6 = -6.9876 \times 10^{-3}$
$A_8 = 1.6384 \times 10^{-3}$
$A_{10} = 0.0000$ 4 th surface $K = 0$
$A_4 = 1.7795 \times 10^{-3}$
$A_6 = 1.7628 \times 10^{-2}$
$A_8 = -1.1189 \times 10^{-2}$
$A_{10} = 0.0000$ 6 th surface $K = -99.1171$
$A_4 = 3.2617 \times 10^{-2}$
$A_6 = 1.1567 \times 10^{-2}$
$A_8 = -1.0656 \times 10^{-3}$
$A_{10} = 0.0000$ 7 th surface $K = -0.7640$
$A_4 = 2.9521 \times 10^{-4}$
$A_6 = 1.1174 \times 10^{-2}$
$A_8 = 3.1097 \times 10^{-3}$
$A_{10} = 0.0000$ 8 th surface $K = -4.0010$
$A_4 = -1.2496 \times 10^{-2}$
$A_6 = -2.1672 \times 10^{-4}$
$A_8 = 9.4245 \times 10^{-4}$
$A_{10} = -1.5277 \times 10^{-4}$ 9 th surface $K = -1.9604$
$A_4 = -3.5863 \times 10^{-2}$
$A_6 = 6.5338 \times 10^{-3}$
$A_8 = -5.2745 \times 10^{-4}$
$A_{10} = 0.0000$ FIGS. 9 to 16 are aberration diagrams for Examples 1 to 8 upon focused at infinity. In these figures, "SA", "AS", "DT", "CC" and "ω" represent spherical aberrations, astigmatism, distortion, chromatic aberration of magnification and a half angle of view, respectively.

The values of conditions (1) to (13) in Examples 1 to 8 are enumerated below.

| Conditions | Example 1 | Example 2 | Example 3 | Example 4 |
|---|---|---|---|---|
| (1) | 25.0° | 24.7° | 25.0° | 23.3° |
| (2) | 1.27 | 1.10 | 1.04 | 1.68 |
| (3) | -0.73 | -0.63 | -0.78 | -1.38 |
| (4) | 1.51 | 1.79 | 2.36 | 2.10 |
| (5) | 42.56 | 39.91 | 42.57 | 21.28 |
| (6) | 8.96 | 3.87 | 2.32 | 3.12 |
| (7) | -46.92 | -3.90 | -3.77 | 5.91 |
| (8) | -0.56 | -0.51 | -0.12 | -0.58 |
| (9) | -0.26 | -0.18 | 0.03 | 0.99 |
| (10) (11) | 1.18 | 1.16 | 2.78 | 3.71 |
| (12) | 0.07 | 0.07 | 0.09 | 0.07 |
| (13) | — | — | 10.98 | — |
| | 22.58 | 9.56 | 5.38 | 0.01 |
| | 2.33 | 4.57 | — | 0.83 |
| | 0.33 | 0.21 | 1.75 | 1.86 |
| | 1.50 | 1.84 | 2.22 | 1.81 |
| | 2.39 | 2.57 | 2.69 | 2.07 |
| | 2.03 | 2.14 | 2.27 | 1.78 |

| Conditions | Example 5 | Example 6 | Example 7 | Example 8 |
|---|---|---|---|---|
| (1) | 30.0° | 21.0° | 30.0° | 35.1° |
| (2) | 0.95 | 1.29 | 0.68 | 1.45 |
| (3) | -0.57 | -0.68 | -0.45 | -1.03 |
| (4) | 1.67 | 1.69 | 2.48 | 1.96 |
| (5) | 256.06 | 6.38 | 31.93 | 106.40 |
| (6) | 7.66 | 12.65 | 2.50 | 4.06 |
| (7) | -2.60 | -15.80 | -0.98 | 556.72 |
| (8) | 0.19 | -0.52 | 0.49 | 0.52 |
| (9) | -1.04 | -0.19 | -0.92 | 0.67 |
| (10) (11) | 0.94 | 0.97 | 0.89 | 2.05 |
| (12) | 0.09 | 0.04 | 0.07 | 0.09 |
| (13) | 3.07 | — | 1.80 | 0.86 |
| | — | — | — | — |
| | 2.56 | 13.35 | 3.34 | 4.61 |
| | — | 1.13 | — | — |
| | 0.31 | 0.08 | 0.28 | 1.05 |
| | 1.45 | 1.22 | 1.22 | 2.86 |
| | 2.37 | 1.98 | 1.67 | 2.92 |
| | 2.14 | 1.64 | 1.64 | 2.66 |

It is here understood that the maximum image height Ih at the image plane is defined by ½ of the diagonal length L of the (substantially rectangular) effective image pickup area of the image pickup device used. More specifically, when a field frame is located as means for defining the image pickup area, the maximum image height is given by ½ of the diagonal length L of the field frame, and when an image pickup device such as a solid-state image pickup device is used, it is given by ½ of the diagonal length L of its effective image pickup area.

Figure 17:
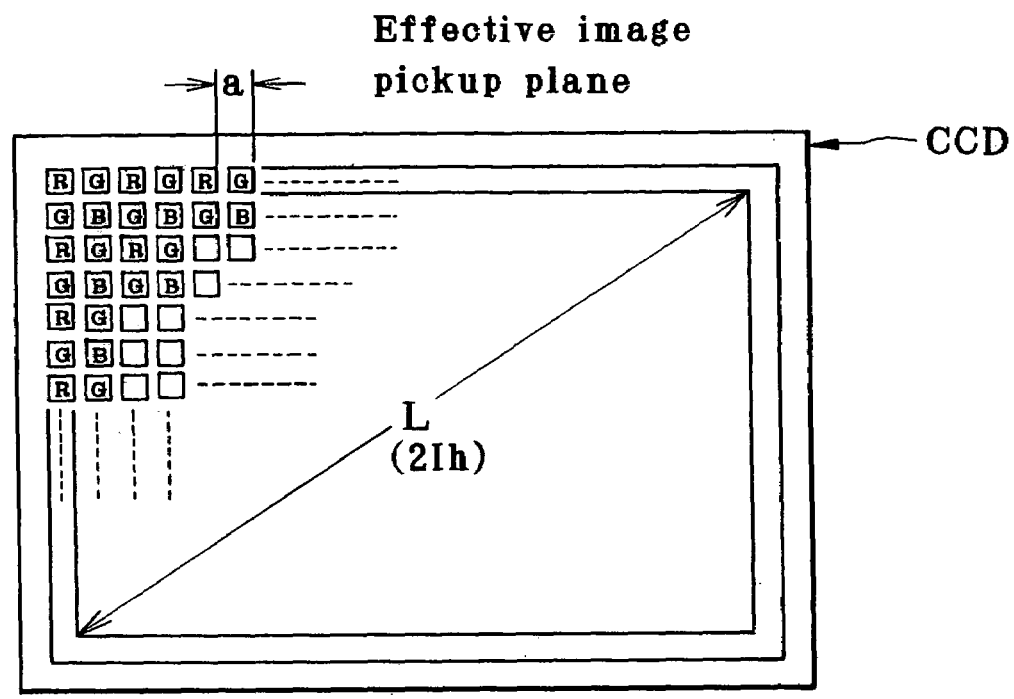
FIG. 17 is illustrative of the diagonal length L of an effective image pickup plane, by which the maximum image height Ih is defined upon phototaking through an image pickup device.

In this connection, the diagonal length L of the effective image pickup plane (area) of the electronic image pickup device and the pixel spacing a are explained. FIG. 17 is illustrative of one exemplary pixel array for the image pickup device, wherein R (red), G (green) and B (blue) pixels are mosaically arranged at the pixel spacing a. The "effective image pickup plane" used herein is understood to mean a certain area in the photoelectric conversion surface on the image pickup device used for the reproduction of phototaken images (on a personal computer or by a printer). The effective image pickup plane shown in FIG. 17 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the image-formation optical system of the invention is used on an image pickup apparatus having such functions, the diagonal length L of its effective image pickup plane varies. In that case, the diagonal length L of the effective image pickup plane that defines the maximum image height Ih herein is given by the maximum value in the widest possible range for L.

Figure 18:
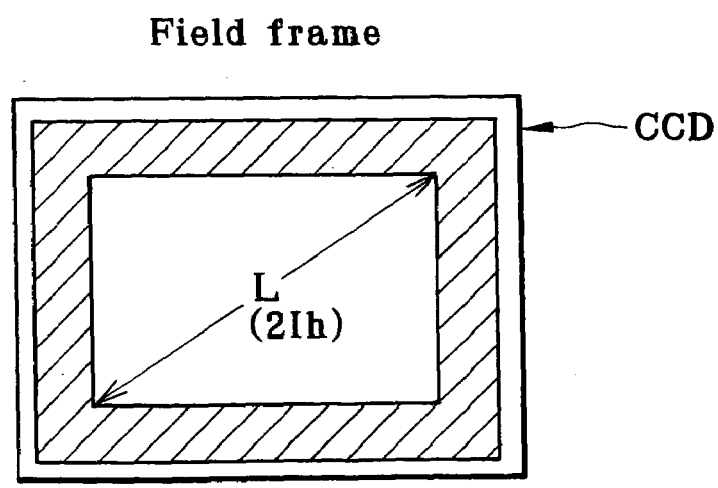
FIG. 18 is illustrative of the diagonal length L of an effective image pickup plane, by which the maximum image height Ih is defined when a field frame is located on the image pickup plane of an image pickup device.

FIG. 18 is illustrative of the diagonal length of a field frame when located on the image pickup plane of an electronic image pickup device such as a CCD. When an image formed on the CCD or other electronic image pickup device is used for phototaking purposes, its effective image pickup area is determined by an aperture in the field frame located just before the image pickup plane. In this case, too, the field frame may be configured in various forms; however, as in FIG. 17, the diagonal length L of the effective image pickup plane that defines the maximum image height Ih herein is given by the maximum value in the widest possible range for L.

Throughout Examples 1 to 8, a cover glass may be located just before the aperture stop S.

Throughout the above examples of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1 to 7, that flare stop may be interposed at any desired position between the aperture stop S and the first lens L1, the first lens L1 and the second lens L2, the second lens L2 and the third lens L3, the third lens L3 and the fourth lens L4, and the fourth lens L4 and the image plane I, and in Example 8, it may be interposed at any desired position between the first lens L1 and the aperture stop S, the aperture stop S and the second lens L2, the second lens L2 and the third lens L3, the third lens L3 and the fourth lens L4, and the fourth lens L4 and the image plane I. Alternatively, a lens frame may be used to cut off flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut off not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

The imaging system of the invention constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones. Given below are some such embodiments.

Figure 19:
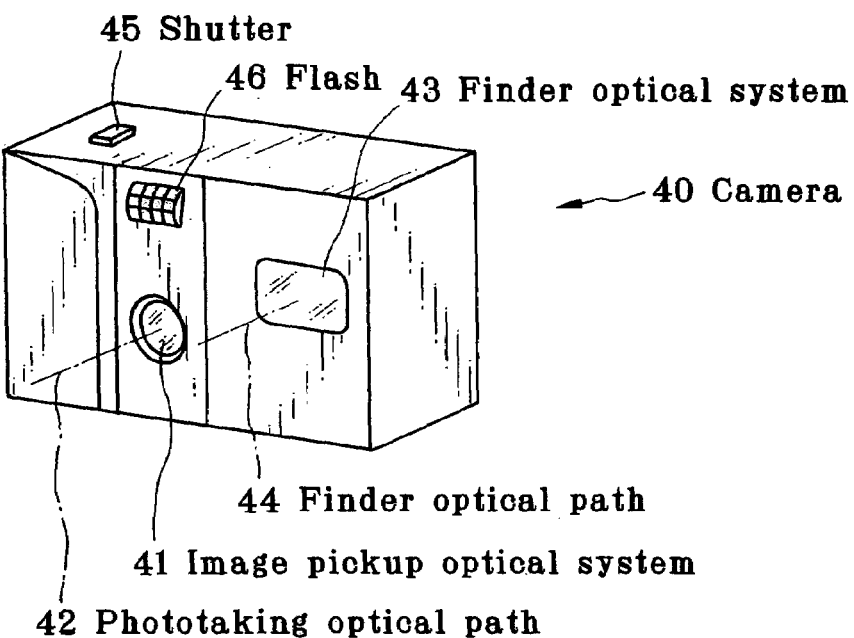
FIG. 19 is a front perspective view that illustrates the outward appearance of a digital camera in which the image-formation optical system according to any one of the first to fifth aspects of the invention is built.
Figure 20:
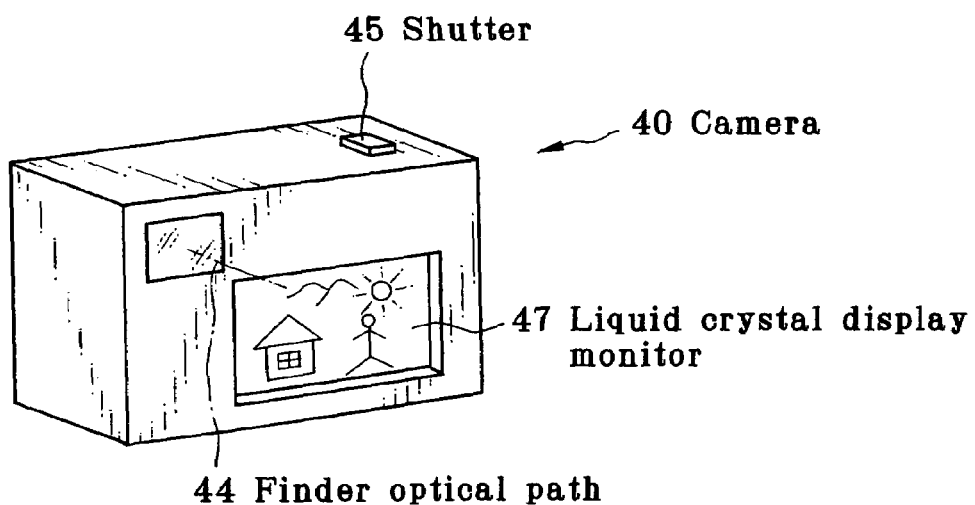
FIG. 20 is a rear perspective view of the digital camera of FIG. 19.
Figure 21:
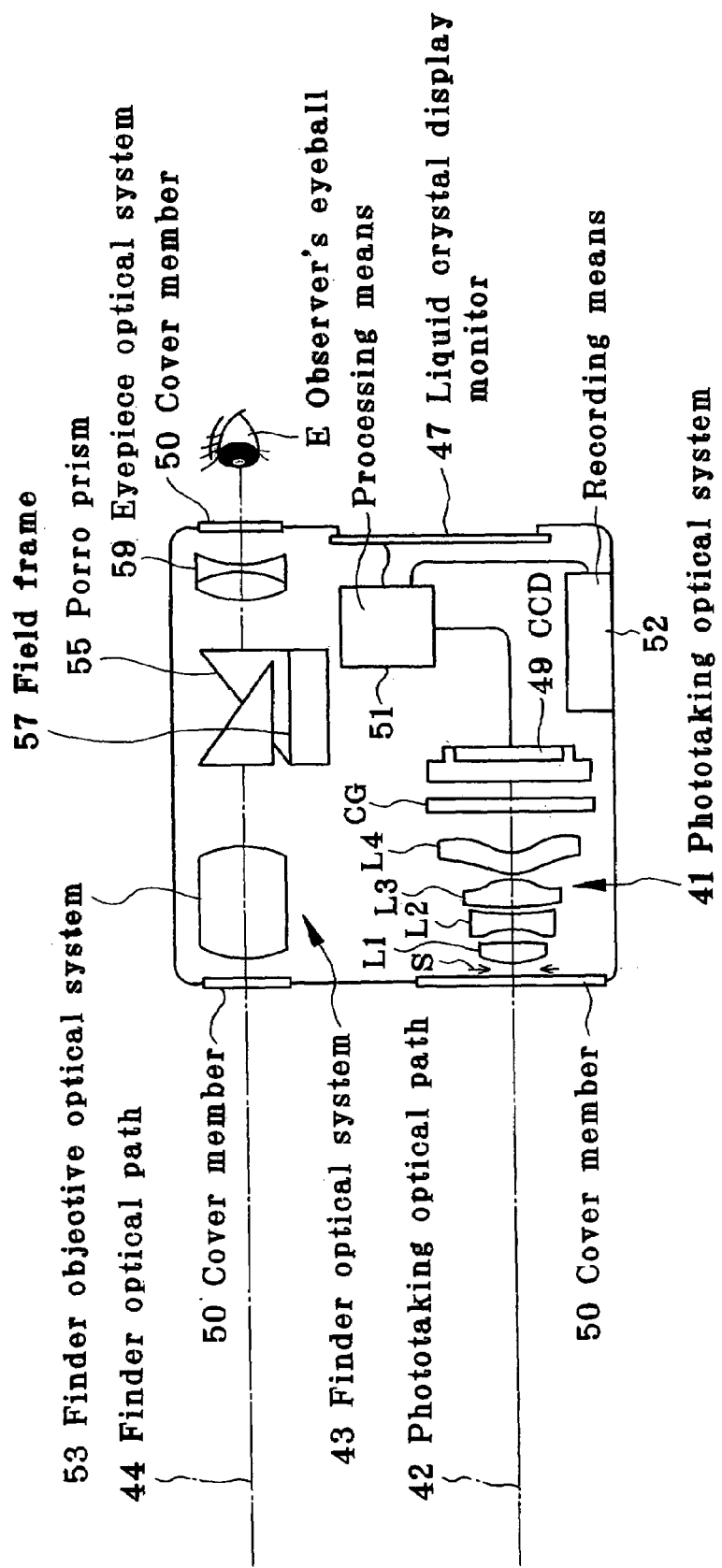
FIG. 21 is illustrative in section of a digital camera in which the image-formation optical system according to the first or second aspect of the invention is incorporated.

FIGS. 19, 20 and 21 are conceptual illustrations of a phototaking optical system 41 for digital cameras, in which the image-formation optical system of the invention is incorporated. FIG. 19 is a front perspective view of the outward appearance of a digital camera 40, and FIG. 20 is a rear perspective view of the same. FIG. 21 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 21, plane-parallel plates are used as the cover members 50; however, it is acceptable to use powered lenses.

Figure 22:
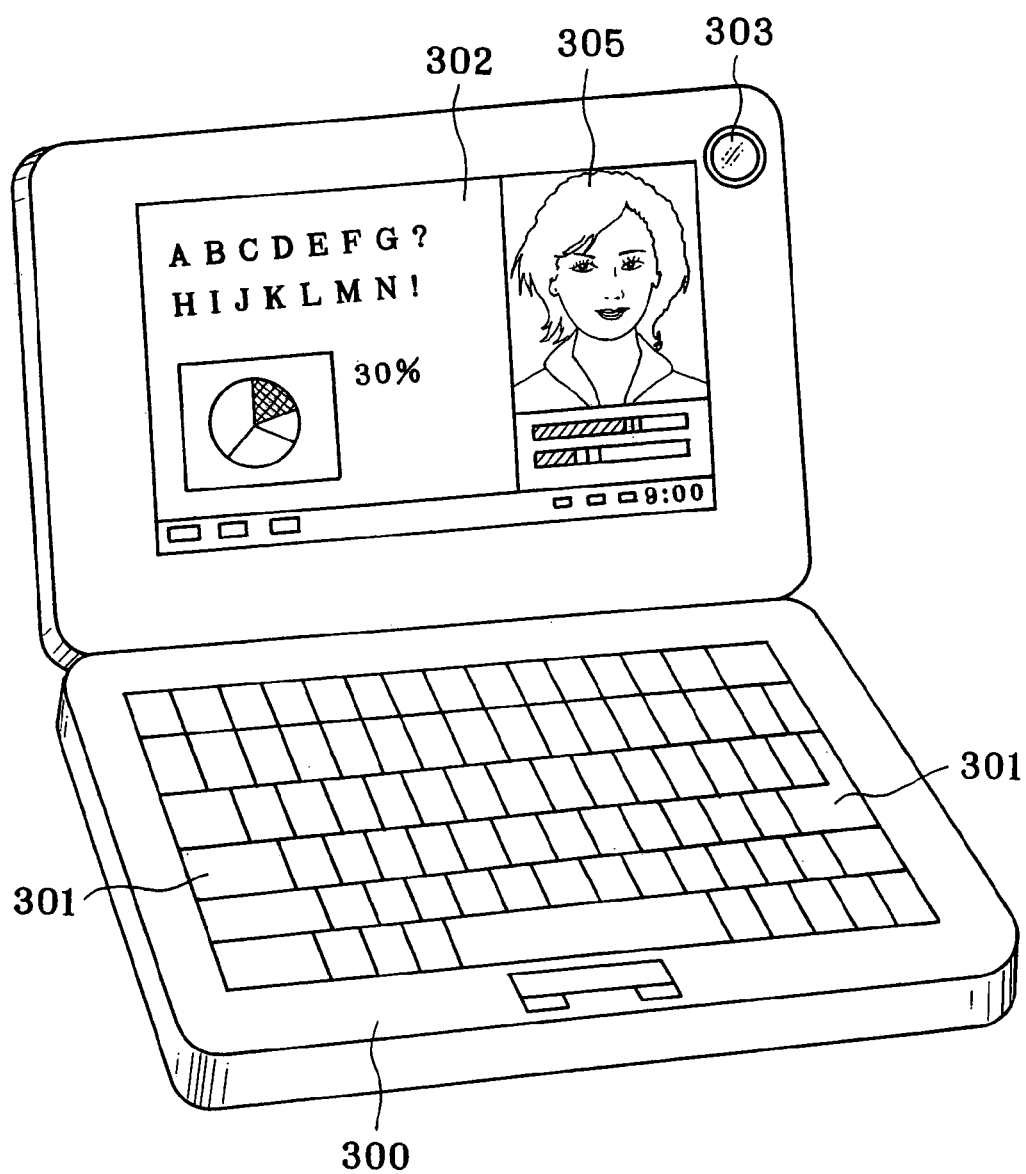
FIG. 22 is a front perspective view of a personal computer with a cover unfolded, in which the image-formation optical system according to any one of the first to fifth aspects of the invention is built.
Figure 23:
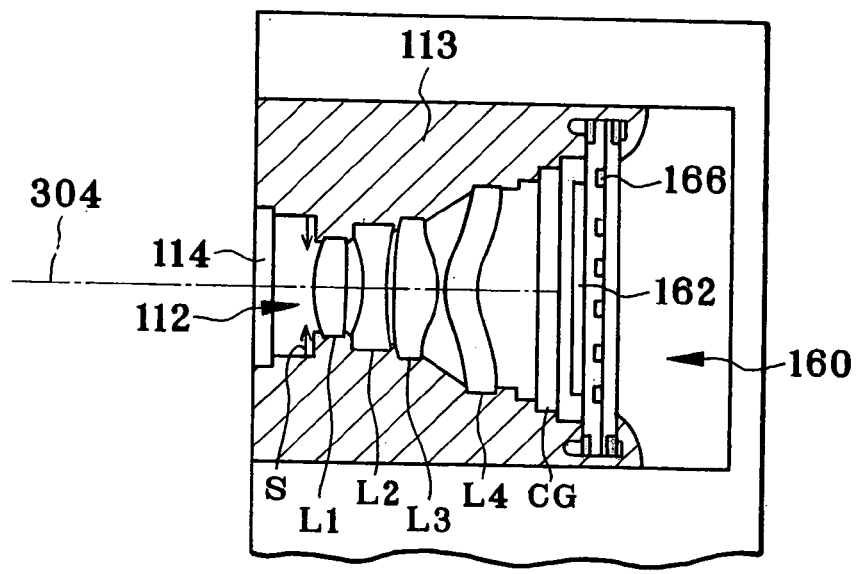
FIG. 23 is illustrative in section of a phototaking optical system in a personal computer in which the image-formation optical system according to the first or second aspect of the invention is built.
Figure 24:
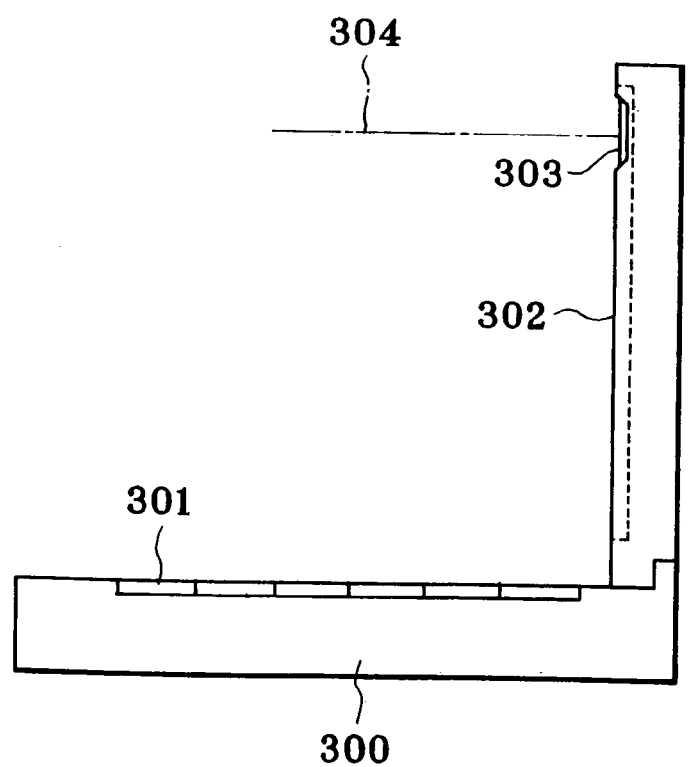
FIG. 24 is a side view of the state of FIG. 22.

FIGS. 22, 23 and 24 are illustrative of a personal computer that is one example of the information processor in which the image-formation optical system of the invention is built as an objective optical system. FIG. 22 is a front perspective view of a personal computer 300 in use, FIG. 23 is a sectional view of a phototaking optical system 303 in the personal computer 300, and FIG. 24 is a side view of the state of FIG. 30. As shown in FIGS. 22, 23 and 24, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the invention (roughly shown) and an image pickup device chip 162 for receiving an image. These are built in the personal computer 300.

Here a cover CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

Figure 25A:
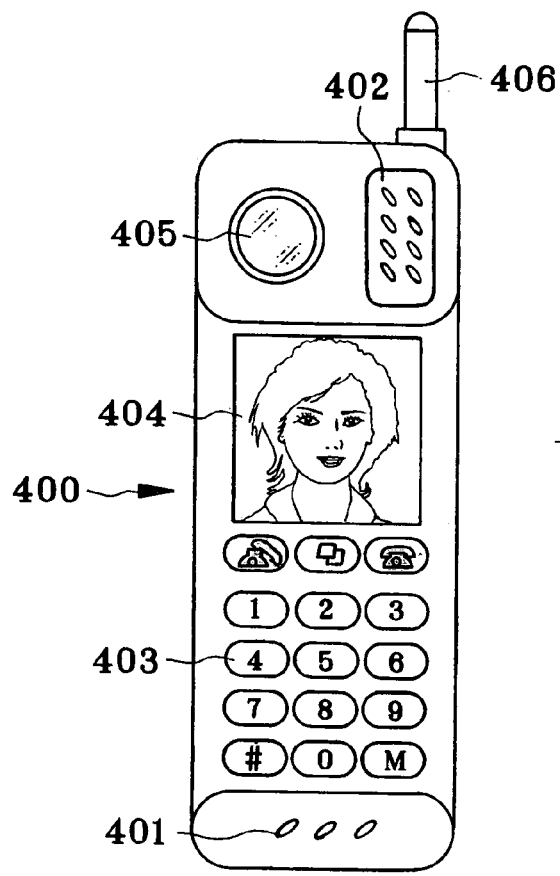
FIGS. 25(*a*) and 25(*b*) are a front and a side view of a cellular phone in which the image-formation optical system according to the first or second aspect of the invention is built in the form of an objective optical system, and FIG. 25(*c*) is illustrative in section of a phototaking optical system therein.
Figure 25B:
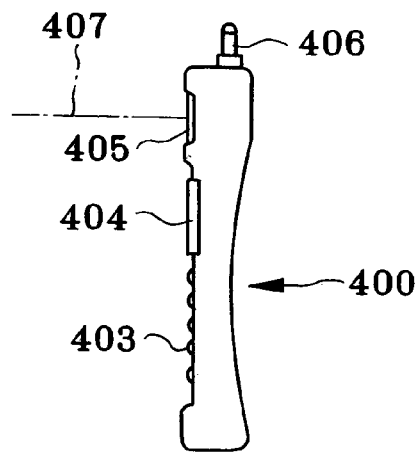
Figure 25C:
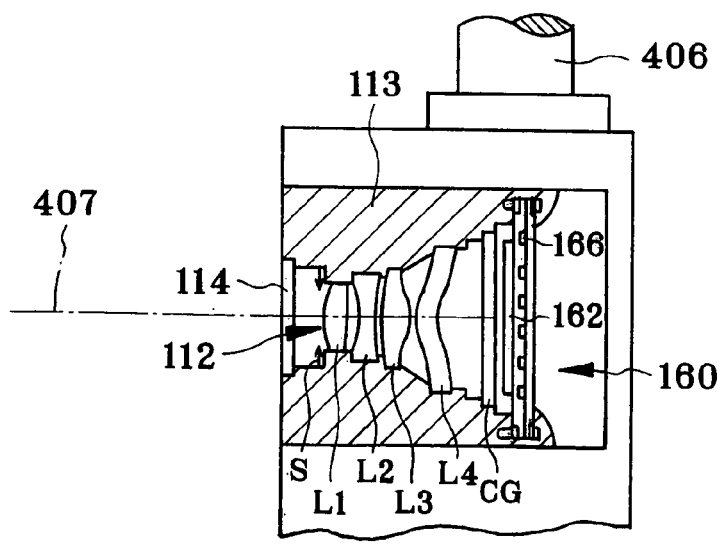

FIGS. 25(a), 25(b) and 25(c) are illustrative of a telephone set that is one example of the information processor in which the image-formation optical system of the invention is built in the form of a phototaking optical system, especially a convenient-to-carry cellular phone. FIG. 25(a) and FIG. 25(b) are a front and a side view of a cellular phone 400, respectively, and FIG. 25(c) is a sectional view of a phototaking optical system 405. As shown in FIGS. 25(a), 25(b) and 25(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

In accordance with the first aspect of the invention, it is possible to provide an small-format yet high-performance image-formation system having a half angle of view of about 30 to 35° and a wide-angle arrangement, and a small-format yet high-performance imaging system incorporating the same.

Examples 1 to 5 of the image-formation optical system according to the second aspect of the invention are given below. FIGS. 26 to 30 are illustrative in section of the lens arrangements of Examples 1 to 5 upon focused on an object point at infinity. In these figures, S stands for an aperture stop, L1 a first positive lens, L2 a second negative lens, L3 a third positive lens, L4 a fourth positive lens, CG a cover glass for an electronic image pickup device and I an image plane. It is noted that the cover glass CG may be provided on its surface with a wavelength range-limiting multilayer film with or without a low-pass filter function.

EXAMPLE 1

Figure 26:
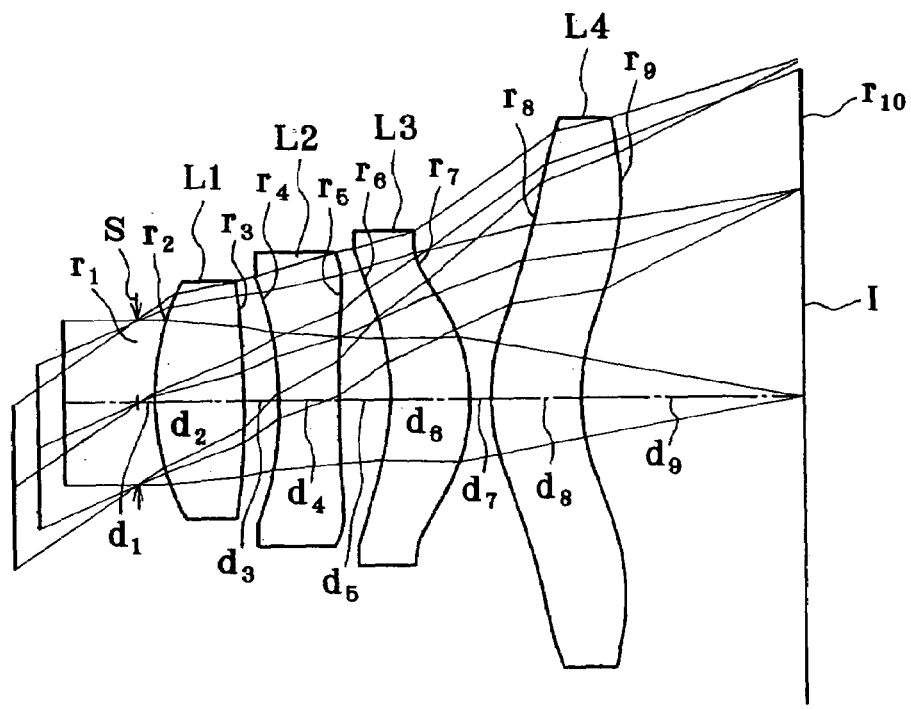
FIG. 26 is a lens arrangement section of Example 1 of the image-formation optical system according to the second aspect of the invention upon focused on an object point at infinity.

As shown in FIG. 26, the image-formation optical system of Example 1 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides and a fourth positive meniscus lens L4 that is convex on its object side and has aspheric surfaces on both its sides. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex (trade name).

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.094 mm for $2^{nd}$ surface $r_2$, 1.203 mm for $3^{rd}$ surface $r_3$, 1.243 mm for $4^{th}$ surface $r_4$, 1.484 mm for $5^{th}$ surface $r_5$, 1.525 mm for $6^{th}$ surface $r_6$, 1.692 mm for $7^{th}$ surface $r_7$, 2.654 mm for $8^{th}$ surface $r_8$ and 2.789 mm for $9^{th}$ surface $r_9$.

EXAMPLE 2

Figure 27:
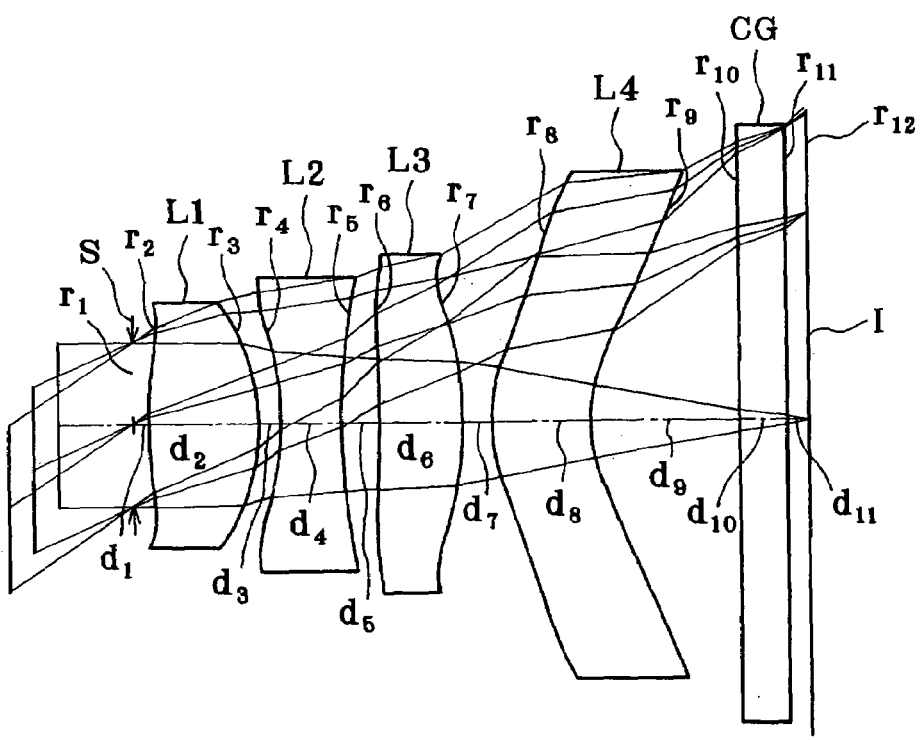
FIG. 27 is a lens arrangement section similar to FIG. 26 of Example 2 of the image-formation optical system.

As shown in FIG. 27, the image-formation optical system of Example 2 is made up of, in order from its object side, an aperture stop S, a first positive lens L1 that has an aspheric surface on its object side and is of double-convex shape, a second negative lens L2 that has an aspheric surface on its object side and is of double-concave shape, a third positive meniscus lens L3 that is convex on its image side and has aspheric surfaces on both its side, a fourth positive meniscus lens L4 that is convex on its object side and has aspheric surfaces on both its sides and a cover glass CG. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 0.985 mm for $2^{nd}$ surface $r_2$, 1.238 mm for $3^{rd}$ surface $r_3$, 1.338 mm for $4^{th}$ surface $r_4$, 1.486 mm for $5^{th}$ surface $r_5$, 1.593 mm for $6^{th}$ surface $r_6$, 1.702 mm for $7^{th}$ surface $r_7$, 2.442 mm for $8^{th}$ surface $r_8$ and 2.558 mm for $9^{th}$ surface $r_9$.

EXAMPLE 3

Figure 28:
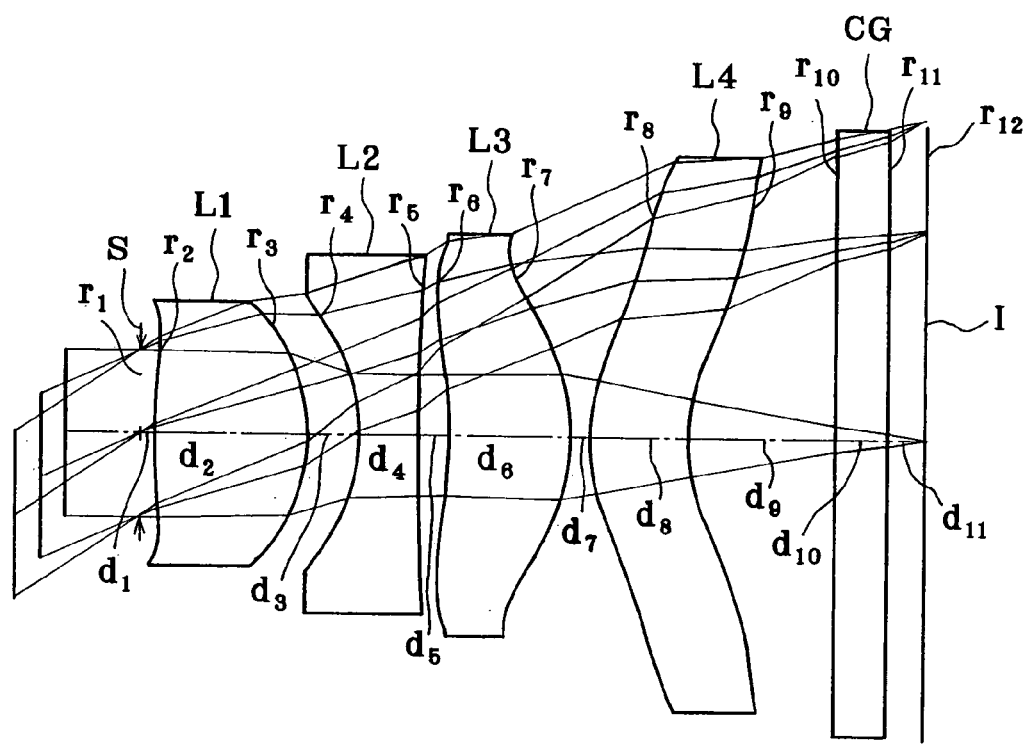
FIG. 28 is a lens arrangement section similar to FIG. 26 of Example 3 of the image-formation optical system.

As shown in FIG. 28, the image-formation optical system of Example 3 is made up of, in order from its object side, an aperture stop S, a first positive lens L1 that has an aspheric surface on its object side and is of double-convex shape, a second negative lens L2 that has an aspheric surface on its object side and is of double-concave shape, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first, second and third lenses L1, L2 and L3 are each made of glass, and the fourth lens L4 is made of an amorphous polyolefin Zeonex.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 0.970 mm for $2^{nd}$ surface $r_2$, 1.345 mm for $3^{rd}$ surface $r_3$, 1.441 mm for $4^{th}$ surface $r_4$, 1.808 mm for $5^{th}$ surface $r_5$, 1.973 mm for $6^{th}$ surface $r_6$, 2.029 mm for $7^{th}$ surface $r_7$, 2.778 mm for $8^{th}$ surface $r_8$ and 2.816 mm for $9^{th}$ surface $r_9$.

EXAMPLE 4

Figure 29:
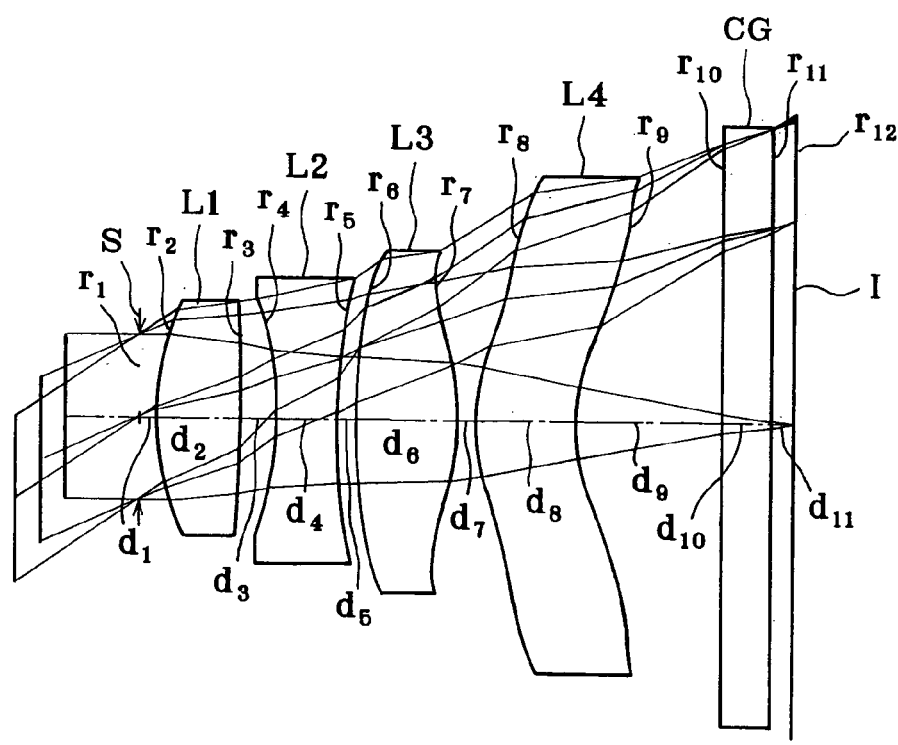
FIG. 29 is a lens arrangement section similar to FIG. 26 of Example 4 of the image-formation optical system.

As shown in FIG. 29, the image-formation optical system of Example 4 is made up of, in order from its object side, an aperture stop S, a first positive lens L1 of double-convex shape, a second negative lens L2 that is of double-concave shape and has aspheric surfaces on both its sides, a third positive lens L3 that is of double-convex shape and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex (trade name).

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.091 mm for $2^{nd}$ surface $r_2$, 1.180 mm for $3^{rd}$ surface $r_3$, 1.220 mm for $4^{th}$ surface $r_4$, 1.449 mm for $5^{th}$ surface $r_5$, 1.648 mm for $6^{th}$ surface $r_6$, 1.741 mm for $7^{th}$ surface $r_7$, 2.353 mm for $8^{th}$ surface $r_8$ and 2.521 mm for $9^{th}$ surface $r_9$.

EXAMPLE 5

Figure 30:
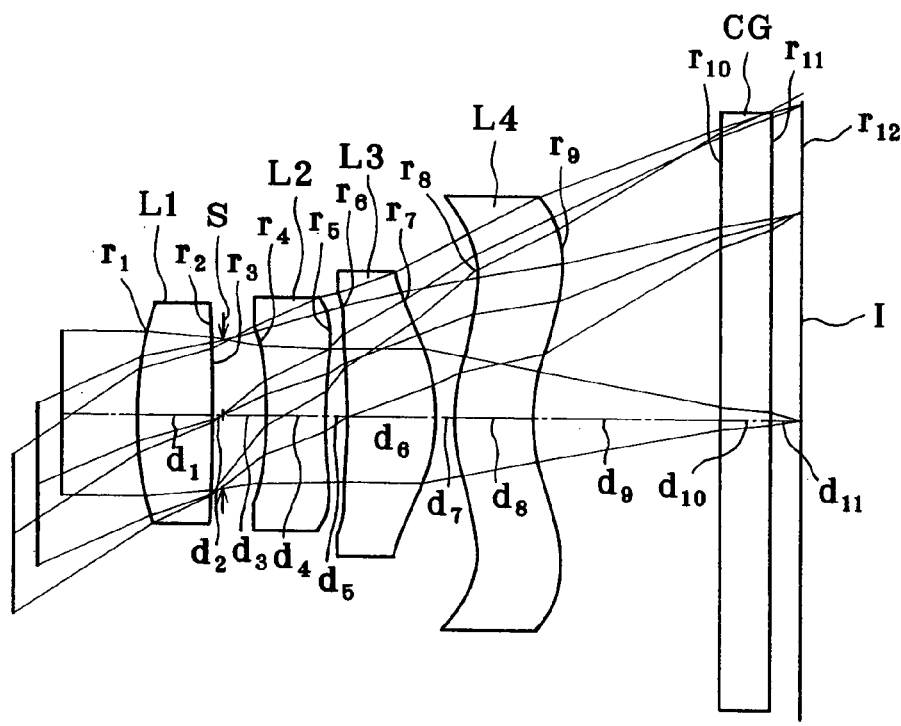
FIG. 30 is a lens arrangement section similar to FIG. 26 of Example 5 of the image-formation optical system.
Figure 31:
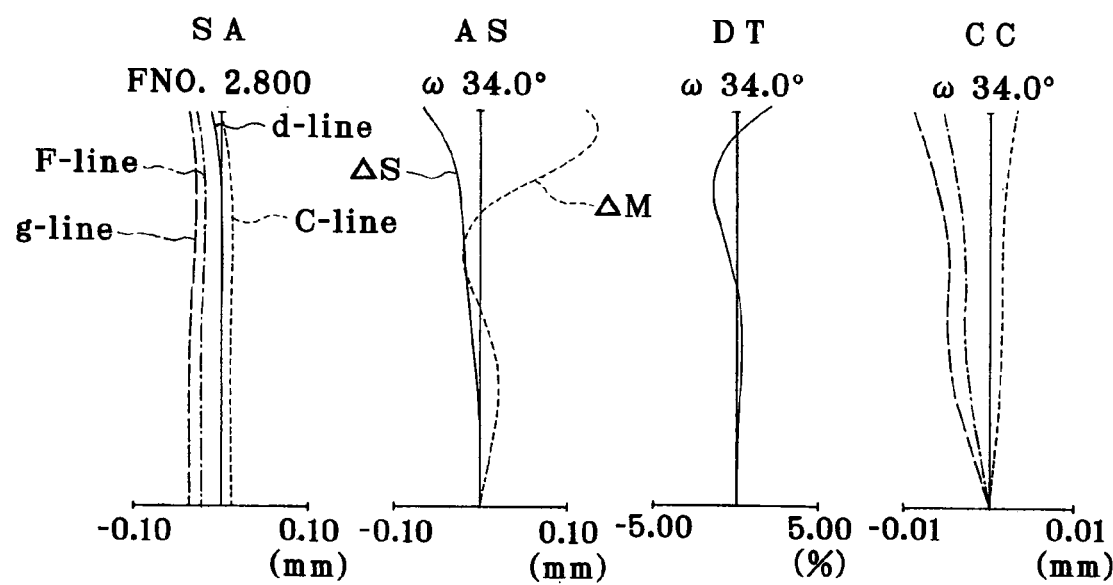
FIG. 31 is an aberration diagram for Example 1 upon focused on an object point at infinity.
Figure 32:
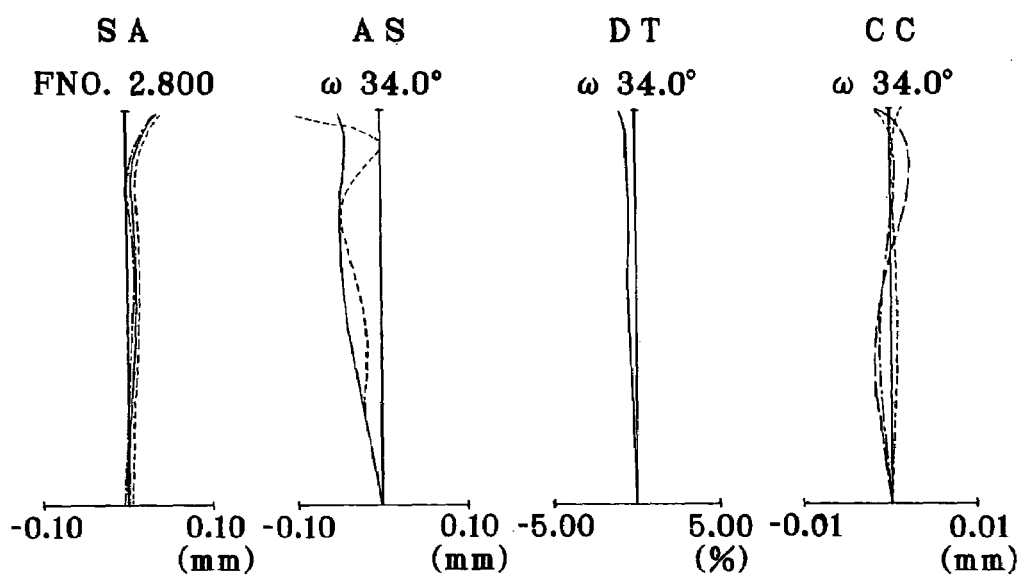
FIG. 32 is an aberration diagram for Example 2 upon focused on an object point at infinity.
Figure 33:
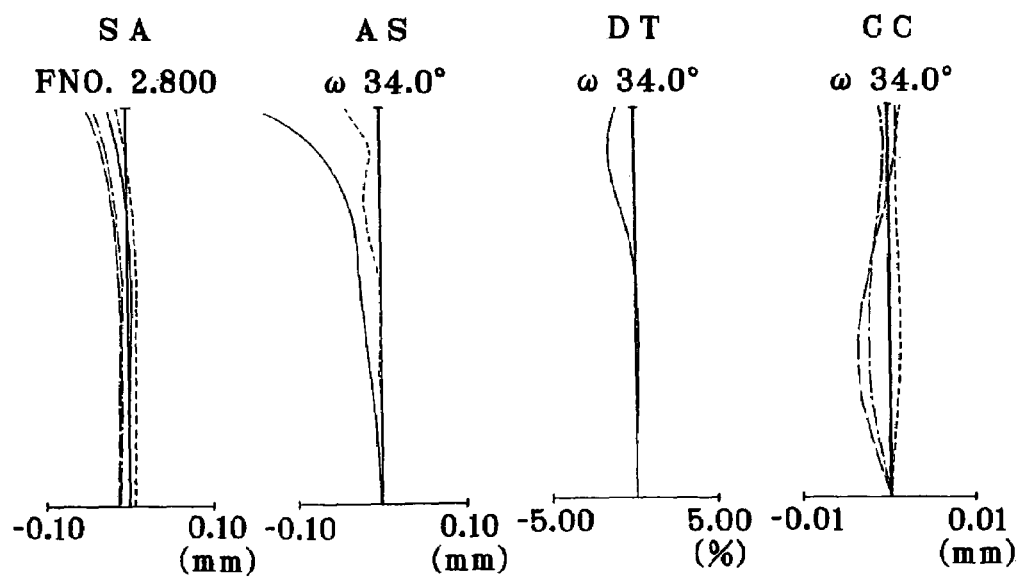
FIG. 33 is an aberration diagram for Example 3 upon focused on an object point at infinity.
Figure 34:
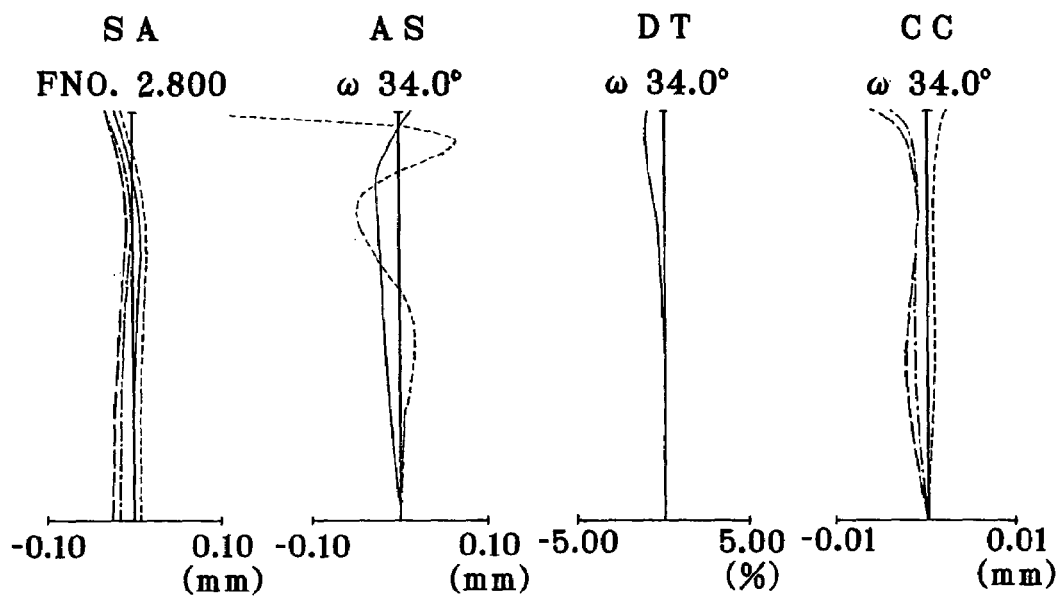
FIG. 34 is an aberration diagram for Example 4 upon focused on an object point at infinity.
Figure 35:
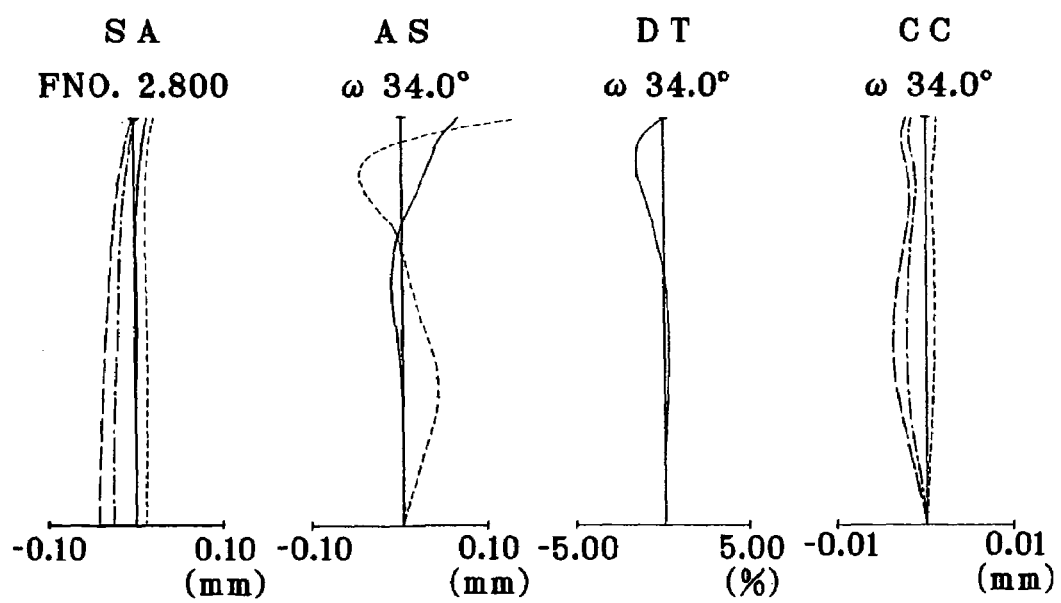
FIG. 35 is an aberration diagram for Example 5 upon focused on an object point at infinity.

As shown in FIG. 30, the image-formation optical system of Example 5 is made up of, in order from its object side, a first positive lens L1 of double-convex shape, an aperture stop S, a second negative lens L2 that is of double-concave shape and has aspheric surfaces on both its sides, a third positive meniscus lens L3 that is convex on its image side and has aspheric surface on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made up of polycarbonate, and the third and fourth lenses L3 and L4 are each made of an amorphous polyolefin Zeonex.

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.127 mm for $1^{st}$ surface $r_1$, 0.832 mm for $2^{nd}$ surface $r_2$, 0.887 mm for $4^{th}$ surface $r_4$, 1.186 mm for $5^{th}$ surface $r_5$, 1.238 mm for $6^{th}$ surface $r_6$, 1.456 mm for $7^{th}$ surface $r_7$, 1.846 mm for $8^{th}$ surface $r_8$ and 2.226 mm for $9^{th}$ surface $r_9$.

The numerical data on each example are given below. Symbols used hereinafter but not hereinbefore have the following meanings:

$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$v_{d1}, v_{d2}, \ldots$ : Abbe number of each lens. It is noted that aspheric shape is given by the aforesaid equation (a).

EXAMPLE 1

| | | | |
|---|---|---|---|
| $r_1 = \infty$(Stop) | $d_1 = 0.1500$ | | |
| $r_2 = 2.7407$ | $d_2 = 0.9120$ | $n_{d1} = 1.51633$ | $v_{d1} = 64.14$ |
| $r_3 = -8.6454$ | $d_s = 0.3395$ | | |
| $r_4 = -4.3919$(Aspheric) | $d_4 = 0.6000$ | $n_{d2} = 1.58423$ | $v_{d2} = 30.40$ |
| $r_5 = 19.7384$(Aspheric) | $d_5 = 0.5228$ | | |
| $r_6 = -1.9837$(Aspheric) | $d_6 = 0.8151$ | $n_{d3} = 1.52542$ | $v_{d3} = 55.70$ |
| $r_7 = -1.5571$(Aspheric) | $d_7 = 0.2000$ | | |
| $r_8 = 1.8961$(Aspheric) | $d_8 = 0.9033$ | $n_{d4} = 1.52542$ | $v_{d4} = 55.70$ |
| $r_9 = 1.6142$(Aspheric) | $d_9 = 2.2572$ | | |
| $r_{10} = \infty$(Image Plane) | | | |

-continued

Aspherical Coefficients
4 th surface

K = 3.7466
$A_4 = -8.0644 \times 10^{-3}$
$A_6 = 4.1382 \times 10^{-3}$
$A_8 = -3.9600 \times 10^{-3}$
$A_{10} = 0.0000$
5 th surface K = −1647.4094
$A_4 = 1.3930 \times 10^{-2}$
$A_6 = 3.9433 \times 10^{-4}$
$A_8 = -5.7048 \times 10^{-3}$
$A_{10} = 0.0000$
6 th surface K = 0
$A_4 = 7.0783 \times 10^{-2}$
$A_6 = 8.4410 \times 10^{-3}$
$A_8 = -4.2873 \times 10^{-3}$
$A_{10} = 0.0000$
7 th surface K = −1.0334
$A_4 = 1.1690 \times 10^{-2}$
$A_6 = 3.3723 \times 10^{-3}$
$A_8 = 2.4900 \times 10^{-3}$
$A_{10} = 0.0000$
8 th surface K = −2.1492
$A_4 = -3.3462 \times 10^{-2}$
$A_6 = 3.8646 \times 10^{-3}$
$A_8 = -1.2433 \times 10^{-4}$
$A_{10} = 0.0000$
9 th surface K = −3.3808
$A_4 = -2.7513 \times 10^{-2}$
$A_6 = 1.6517 \times 10^{-3}$
$A_8 = -9.0825 \times 10^{-7}$
$A_{10} = 0.0000$

EXAMPLE 2

| | | | |
|---|---|---|---|
| $r_1 = \infty$(Stop) | $d_1 = 0.1500$ | | |
| $r_2 = 4.4565$(Aspheric) | $d_2 = 1.1000$ | $n_{d1} = 1.52542$ | $\nu_{d1} = 55.70$ |
| $r_3 = -2.1704$ | $d_3 = 0.2000$ | | |
| $r_4 = -2.8359$(Aspheric) | $d_4 = 0.6000$ | $n_{d2} = 1.58423$ | $\nu_{d2} = 30.40$ |
| $r_5 = 6.3875$ | $d_5 = 0.4007$ | | |
| $r_6 = -7.2815$(Aspheric) | $d_6 = 0.8500$ | $n_{d3} = 1.52542$ | $\nu_{d3} = 55.70$ |
| $r_7 = -2.9376$(Aspheric) | $d_7 = 0.2993$ | | |
| $r_8 = 1.7581$(Aspheric) | $d_8 = 1.0000$ | $n_{d4} = 1.52542$ | $\nu_{d4} = 55.70$ |
| $r_9 = 1.4377$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.1999$ | | |
| $r_{12} = \infty$ (Image Plane) | | | |

Aspherical Coefficients
2 nd surface

K = −9.0288
$A_4 = -2.3412 \times 10^{-2}$
$A_6 = -8.4070 \times 10^{-4}$
$A_8 = -1.2429 \times 10^{-2}$
$A_{10} = 0.0000$
4 th surface K = −1.3326
$A_4 = 3.7822 \times 10^{-3}$
$A_6 = 2.3627 \times 10^{-2}$
$A_8 = -2.9461 \times 10^{-3}$
$A_{10} = 0.0000$ -continued 6 th surface K = −227.8220
$A_4 = 2.7845 \times 10^{-2}$
$A_6 = -1.0049 \times 10^{-2}$
$A_8 = 2.1183 \times 10^{-3}$
$A_{10} = 0.0000$
7 th surface K = −4.2976
$A_4 = -9.5415 \times 10^{-5}$
$A_6 = 2.7085 \times 10^{-3}$
$A_8 = 1.5866 \times 10^{-3}$
$A_{10} = 0.0000$
8 th surface K = −3.7754
$A_4 = -1.3483 \times 10^{-2}$
$A_6 = -1.0994 \times 10^{-3}$
$A_8 = 7.2599 \times 10^{-4}$
$A_{10} = -5.3732 \times 10^{-5}$
9 th surface K = −2.8435
$A_4 = -1.3715 \times 10^{-2}$
$A_6 = 9.2815 \times 10^{-4}$
$A_8 = 2.4190 \times 10^{-5}$
$A_{10} = 0.0000$

EXAMPLE 3

| | | | |
|---|---|---|---|
| $r_1 = \infty$(Stop) | $d_1 = 0.1500$ | | |
| $r_2 = 6.0580$(Aspheric) | $d_2 = 1.5603$ | $n_{d1} = 1.51633$ | $\nu_{d1} = 64.14$ |
| $r_3 = -1.8365$ | $d_3 = 0.5244$ | | |
| $r_4 = -1.8113$(Aspheric) | $d_4 = 0.6000$ | $n_{d2} = 1.67270$ | $\nu_{d2} = 32.10$ |
| $r_5 = 60.9001$ | $d_5 = 0.3011$ | | |
| $r_6 = -3.4702$(Aspheric) | $d_6 = 1.2135$ | $n_{d3} = 1.65844$ | $\nu_{d3} = 50.88$ |
| $r_7 = -2.0141$(Aspheric) | $d_7 = 0.2000$ | | |
| $r_8 = 1.9471$(Aspheric) | $d_8 = 1.0000$ | $n_{d4} = 1.52542$ | $\nu_{d4} = 55.70$ |
| $r_9 = 1.6329$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.3681$ | | |
| $r_{12} = \infty$(Image Plane) | | | |

Aspherical Coefficients
2nd surface

K = −13.3576
$A_4 = -1.9824 \times 10^{-2}$
$A_6 = -5.7656 \times 10^{-3}$
$A_8 = -7.5488 \times 10^{-3}$
$A_{10} = 0.0000$
4 th surface K = 0.1911
$A_4 = -9.6408 \times 10^{-3}$
$A_6 = 1.9505 \times 10^{-2}$
$A_8 = 2.7521 \times 10^{-3}$
$A_{10} = 0.0000$
6 th surface K = −24.7942
$A_4 = 1.5258 \times 10^{-2}$
$A_6 = -1.6199 \times 10^{-3}$
$A_8 = 5.4007 \times 10^{-4}$
$A_{10} = 0.0000$
7 th surface K = −1.5005
$A_4 = 2.2962 \times 10^{-3}$
$A_6 = -2.0233 \times 10^{-3}$
$A_8 = 1.3299 \times 10^{-3}$
$A_{10} = 0.0000$ -continued 8 th surface K = −2.6822
$A_4 = -1.4740 \times 10^{-2}$
$A_6 = -5.2372 \times 10^{-4}$
$A_8 = 3.2137 \times 10^{-4}$
$A_{10} = -1.6414 \times 10^{-5}$ 9 th surface K = −3.1089
$A_4 = -1.3381 \times 10^{-2}$
$A_6 = -3.0394 \times 10^{-4}$
$A_8 = 1.0577 \times 10^{-4}$
$A_{10} = 0.0000$

EXAMPLE 4

| | | | |
|---|---|---|---|
| $r_1 = \infty$(Stop) | $d_1 = 0.1500$ | | |
| $r_2 = 2.7742$ | $d_2 = 0.8625$ | $n_{d1} = 1.60311$ | $\nu_{d1} = 60.64$ |
| $r_3 = -17.9060$ | $d_3 = 0.3632$ | | |
| $r_4 = -3.9643$(Aspheric) | $d_4 = 0.6000$ | $n_{d2} = 1.57268$ | $\nu_{d2} = 33.51$ |
| $r_5 = 4.2871$(Aspheric) | $d_5 = 0.2022$ | | |
| $r_6 = 22.7387$(Aspheric) | $d_6 = 1.0168$ | $n_{d3} = 1.50913$ | $\nu_{d3} = 56.20$ |
| $r_7 = -2.9109$(Aspheric) | $d_7 = 0.2000$ | | |
| $r_8 = 1.8904$(Aspheric) | $d_8 = 1.0000$ | $n_{d4} = 1.50913$ | $\nu_{d4} = 56.20$ |
| $r_9 = 1.5825$(Aspheric) | $d_9 = 1.5109$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
4 th surface

K = 8.1966
$A_4 = -3.1174 \times 10^{-2}$
$A_6 = 6.2154 \times 10^{-2}$
$A_8 = -3.6541 \times 10^{-2}$
$A_{10} = 1.6101 \times 10^{-2}$ 5 th surface K = −57.0316
$A_4 = 5.5980 \times 10^{-2}$
$A_6 = -4.6238 \times 10^{-2}$
$A_8 = 1.2293 \times 10^{-2}$
$A_{10} = 0.0000$ 6 th surface K = 0
$A_4 = 9.1922 \times 10^{-2}$
$A_6 = -5.0945 \times 10^{-2}$
$A_8 = 9.6274 \times 10^{-3}$
$A_{10} = 0.0000$ 7 th surface K = −0.3738
$A_4 = 2.5736 \times 10^{-2}$
$A_6 = 3.5168 \times 10^{-3}$
$A_8 = -5.6535 \times 10^{-4}$
$A_{10} = 3.3780 \times 10^{-4}$ 8 th surface K = −3.0464
$A_4 = -3.1383 \times 10^{-2}$
$A_6 = -1.0264 \times 10^{-3}$
$A_8 = 1.4742 \times 10^{-3}$
$A_{10} = -1.2517 \times 10^{-4}$ 9 th surface K = −2.1898
$A_4 = -4.5943 \times 10^{-2}$
$A_6 = 8.4927 \times 10^{-3}$
$A_8 = -1.0401 \times 10^{-3}$
$A_{10} = 6.3153 \times 10^{-5}$

EXAMPLE 5

| | | | |
|---|---|---|---|
| $r_1 = 3.8466$ | $d_1 = 0.7629$ | $n_{d1} = 1.65160$ | $\nu_{d1} = 58.55$ |
| $r_2 = -18.1171$ | $d_2 = 0.1000$ | | |
| $r_3 = \infty$(Stop) | $d_3 = 0.4494$ | | |
| $r_4 = -4.3919$(Aspheric) | $d_4 = 0.6000$ | $n_{d2} = 1.58423$ | $\nu_{d2} = 30.40$ |
| $r_5 = 12.6091$(Aspheric) | $d_5 = 0.2130$ | | |
| $r_6 = -3.6435$(Aspheric) | $d_6 = 0.8891$ | $n_{d3} = 1.52542$ | $\nu_{d3} = 55.70$ |
| $r_7 = -1.8034$(Aspheric) | $d_7 = 0.2000$ | | |
| $r_8 = 1.9373$(Aspheric) | $d_8 = 0.8025$ | $n_{d4} = 1.52542$ | $\nu_{d4} = 55.70$ |
| $r_9 = 1.6919$(Aspheric) | $d_9 = 1.9536$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.3184$ | | |
| $r_{12} = \infty$(Image Plane) | | | |

Aspherical Coefficients
4 th surface

K = 13.4593
$A_4 = -1.1668 \times 10^{-2}$
$A_6 = -2.8971 \times 10^{-2}$
$A_8 = 1.7719 \times 10^{-2}$
$A_{10} = 0.0000$ 5 th surface K = 0
$A_4 = 3.5029 \times 10^{-2}$
$A_6 = -3.7895 \times 10^{-2}$
$A_8 = -2.0912 \times 10^{-2}$
$A_{10} = 0.0000$ 6 th surface K = 0
$A_4 = 1.5738 \times 10^{-1}$
$A_6 = -4.5640 \times 10^{-2}$
$A_8 = -1.6164 \times 10^{-2}$
$A_{10} = 0.0000$ 7 th surface K = −1.1579
$A_4 = 1.0562 \times 10^{-2}$
$A_6 = 9.7077 \times 10^{-3}$
$A_8 = 1.1160 \times 10^{-3}$
$A_{10} = 0.0000$ 8 th surface K = −5.0422
$A_4 = -2.1966 \times 10^{-2}$
$A_6 = -8.1690 \times 10^{-3}$
$A_8 = 1.1173 \times 10^{-3}$
$A_{10} = 0.0000$ 9 th surface K = −3.7633
$A_4 = -3.7055 \times 10^{-2}$
$A_6 = 1.2836 \times 10^{-3}$
$A_8 = -8.2364 \times 10^{-5}$
$A_{10} = 0.0000$ FIGS. 31 to 35 are aberration diagrams for Examples 1 to 5 upon focused at infinity. In these figures, "SA", "AS", "DT", "CC" and "ω" represent spherical aberrations, astigmatism, distortion, chromatic aberration of magnification and a half angle of view, respectively.

The values of conditions (21)–(32) in each of Examples 1–5 are enumerated below.

| Conditions | Example 1 | Example 2 | Example 3 | Example 4 | Example 5 |
|---|---|---|---|---|---|
| (21) | 2.76 | 3.42 | 5.17 | 9.56 | 5.37 |
| (22) | 32.42 | −1.95 | −4.62 | −8.81 | 6.53 |
| (23) (24) | 2.95 | 3.14 | 4.25 | 2.96 | 3.10 |
| (25) (26) | 11.17 | 5.99 | 12.18 | 7.89 | 8.70 |

-continued

| Conditions | Example 1 | Example 2 | Example 3 | Example 4 | Example 5 |
|---|---|---|---|---|---|
| (27) | 1.538 | 1.540 | 1.593 | 1.549 | 1.572 |
| (28) | 20.0° | 35.0° | 19.0° | 28.0° | 25.5° |
| (29) | 0.50 | 0.34 | 0.53 | 0.79 | 0.85 |
| (30) | −0.73 | −0.37 | −0.48 | −0.68 | −0.94 |
| (31) | −0.68 | −0.90 | −1.12 | −1.15 | −0.90 |
| (32) | — | 2.07 | 1.87 | — | — |
|  | 3.59 | 2.00 | 7.35 | 13.06 | 2.44 |
|  | 0.29 | — | — | 4.96 | 0.26 |
|  | 3.34 | 1.04 | 1.13 | 0.37 | 2.15 |
|  | 1.66 | 1.27 | 1.54 | 1.16 | 2.43 |
|  | 2.43 | 2.84 | 2.65 | 2.48 | 1.35 |
|  | 1.82 | 2.65 | 2.18 | 2.18 | 1.35 |

It is noted that the values of condition (32) are those for, in order from above, the object and image sides of the first positive lens, the object and image sides of the second negative lens, the object and image side of the third positive lens, and the object and image sides of the fourth positive lens, respectively.

In each example according to the second aspect of the invention, too, the maximum image height Ih on the image plane is defined by ½ of the diagonal length L of the (substantially rectangular) effective area of the image pickup device, as explained with reference to FIGS. 17 and 18. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area. For details, see the explanation of the first aspect of the invention.

In Examples 1 to 4 according to the second aspect of the invention, a cover glass may be located just before the aperture stop S.

Throughout Examples 1–4 according to the second aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1 to 4, that flare stop may be interposed at any desired position between the aperture stop S and the first lens L1, the first lens L1 and the second lens L2, the second lens L2 and the third lens L3, the third lens L3 and the fourth lens L4, and the fourth lens L4 and the image plane I, and in Example 5, it may be interposed at any desired position between the first lens L1 and the aperture stop S, the aperture stop S and the second lens L2, the second lens L2 and the third lens L3, the third lens L3 and the fourth lens L4, and the fourth lens L4 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

The imaging system of the invention constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones.

What has been explained with reference to the digital camera of FIGS. 19–21, the personal computer of FIGS. 22–24 and the cellular phone of FIG. 25 according to the first aspect of the invention holds true for the image-formation optical system and the imaging system according to the second aspect of the invention. For details, see the explanation of the first aspect of the invention. However, it is noted that, for instance, the image-formation optical system of Example 4 according to the second aspect of the invention is used for the optical system 41, 112 in FIGS. 21, 23 and 25.

Each example may be modified in various forms within the scope of what is recited in the claims.

The image-formation optical system according to the second aspect of the invention, and the imaging system incorporating the same, for instance, may be embodied as follows.

(1) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens, and satisfies the following condition:

$$0.5 < f_{12}/Ih < 12.0 \tag{21}$$

where $f_{12}$ is the composite focal length of the first positive lens and the second negative lens, and Ih is the maximum image height of the image-formation optical system.

(2) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens, and satisfies the following condition:

$$-10 < f_{234}/Ih < -0.5 \tag{22}$$

where $f_{234}$ is the composite focal length of the second negative lens, the third positive lens and the fourth positive lens, and Ih is the maximum image height of the image-formation optical system.

(3) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the first positive lens and the second negative lens is positive, and satisfies the following condition:

$$1 < d^2/(f \cdot Ih) < 6 \quad (23)$$

where d is the length of the image-formation optical system, f is the focal length of the image-formation optical system, and Ih is the maximum image height of the image-formation optical system.

(4) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the second negative lens, the third positive lens and the fourth positive lens is negative, and satisfies the following condition:

$$1 < d^2/(f \cdot Ih) < 3.5 \quad (24)$$

where d is the length of the image-formation optical system, f is the focal length of the image-formation optical system, and Ih is the maximum image height of the image-formation optical system.

(5) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the first positive lens and the second negative lens is positive, and satisfies the following condition:

$$5 < f \cdot Fno/(Ih \cdot \tan \theta_{out}) < 35 \quad (25)$$

where f is the focal length of the image-formation optical system, Fno is the F-number of the image-formation optical system, Ih is the maximum image height of the image-formation optical system, and $\theta_{out}$ is the exit angle of a chief ray at the maximum image height.

(6) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens wherein the composite refracting power of the second negative lens, the third positive lens and the fourth positive lens is negative, and satisfies the following condition:

$$8 < f \cdot Fno/(Ih \cdot \tan \theta_{out}) < 12.5 \quad (26)$$

where f is the focal length of the image-formation optical system, Fno is the F-number of the image-formation optical system, Ih is the maximum image height of the image-formation optical system, and $\theta_{out}$ is the exit angle of a chief ray at the maximum image height.

(7) An image-formation optical system, characterized by comprising, in order from an object side thereof, a first positive lens, a second negative lens, a third positive lens and a fourth positive lens and satisfying the following condition:

$$1.4 < n_{avg} < 1.6 \quad (27)$$

where $n_{avg}$ is the average value of d-line refractive indices of the first positive lens, the second negative lens, the third positive lens and the fourth positive lens.

(8) An image-formation optical system, characterized by comprising, in order from an object side thereof, a first positive lens, a second negative lens, a third positive lens and a fourth positive lens, wherein the first positive lens is made of glass, and the second negative lens, the third positive lens and the fourth positive lens are each made of plastics.

(9) An image-formation optical system, characterized by comprising, in order from an object side thereof, a first positive lens, a second negative lens, a third positive lens and a fourth positive lens, wherein the first positive lens, the second negative lens, the third positive lens and the fourth positive lens are each made of plastics.

(10) An imaging system comprising an image-formation optical system and an image pickup device located on an image side thereof, characterized in that said image-formation optical system is an image-formation optical system as recited in any one of (7) to (9) above.

(11) The imaging system as recited in any one of (1) to (6) and (10) above, characterized in that said first positive lens is of double-convex shape.

(12) The imaging system as recited in any one of (1) to (6) and (10) above, characterized in that said second negative lens is of double-concave shape.

(13) The imaging system as recited in any one of (1) to (6) and (10) above, characterized in that said third positive lens is of double-convex shape.

(14) The imaging system as recited in any one of (1) to (6) and (10) above, characterized in that said third positive lens is of a meniscus shape convex on an image side thereof.

(15) The imaging system as recited in any one of (2), (4), (6) and (10) above, characterized in that the composite refracting power of the first positive lens and the second negative lens is positive.

(16) The imaging system as recited in any one of (1), (3), (5) and (10) above, characterized in that the composite refracting power of the second negative lens, the third positive lens and the fourth positive lens is negative.

(17) The imaging system as recited in any one of (1) to (6) and (10) above, characterized in that an aperture stop is located on an image side of the first positive lens.

(18) The imaging system as recited in any one of (1) to (6) and (10) above, characterized in that an aperture stop is interposed between the first positive lens and the second negative lens.

(19) The imaging system as recited in any one of (1) to (6) and (10) above, characterized by satisfying the following condition:

$$15° < \alpha < 40° \quad (28)$$

where $\alpha$ is the angle of incidence of a chief ray on an image plane at the maximum image height.

(20) The imaging system as recited in any one of (1) to (6) and (10) above, characterized by satisfying the following condition:

$$0.3 < f_1/f_3 < 0.9 \quad (29)$$

where $f_1$ is the focal length of the first positive lens, and $f_3$ is the focal length of the third positive lens.

(21) The imaging system as recited in any one of (1) to (6) and (10) above, characterized by satisfying the following condition:

$$-1 < f_2/f_3 < -0.4 \quad (30)$$

where $f_2$ is the focal length of the second negative lens, and $f_3$ is the focal length of the third positive lens.

(22) The imaging system as recited in any one of (1) to (6) and (10) above, characterized by satisfying the following condition:

$$-0.3 < f_1/f_2 < -1.3 \quad (31)$$

where $f_1$ is the focal length of the first positive lens, and $f_3$ is the focal length of the third positive lens.

(23) The imaging system as recited in any one of (1) to (6) and (10) above, characterized by comprising at least one aspheric surface that satisfies the following condition:

$$0.01 < |(r_{sp}+r_{asp})/(r_{sp}-r_{asp})-1| < 100 \quad (13)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(24) The imaging system as recited in (23) above, characterized in that said aspheric surface is located at the first positive lens.

(25) The imaging system as recited in (23) above, characterized in that said aspheric surface is located at the second negative lens.

(26) The imaging system as recited in (23) above, characterized in that said aspheric surface is located at the third positive lens.

(27) The imaging system as recited in (23) above, characterized in that said aspheric surface is located at the fourth negative lens.

In accordance with the second aspect of the invention as described above, it is possible to provide a small-format yet high-performance image-formation optical system and a small-format yet high-performance imaging system incorporating the same, or a low-cost yet high-performance image-formation optical system and a low-cost yet high-performance imaging system incorporating the same.

Examples 1 to 9 of the image-formation optical system according to the third aspect of the invention are given below. FIGS. 36 to 44 are illustrative in section of the lens arrangements of Examples 1 to 9 upon focused on an object point at infinity. In these figures, S stands for an aperture stop, L1 a first positive lens, L2 a second negative lens, L3 a third positive lens, L4 a fourth positive lens, CG a cover glass for an electronic image pickup device, I an image plane and FS a flare stop. It is noted that the cover glass CG may be provided on its surface with a wavelength range-limiting multilayer film with or without a low-pass filter function.

EXAMPLE 1

Figure 36:
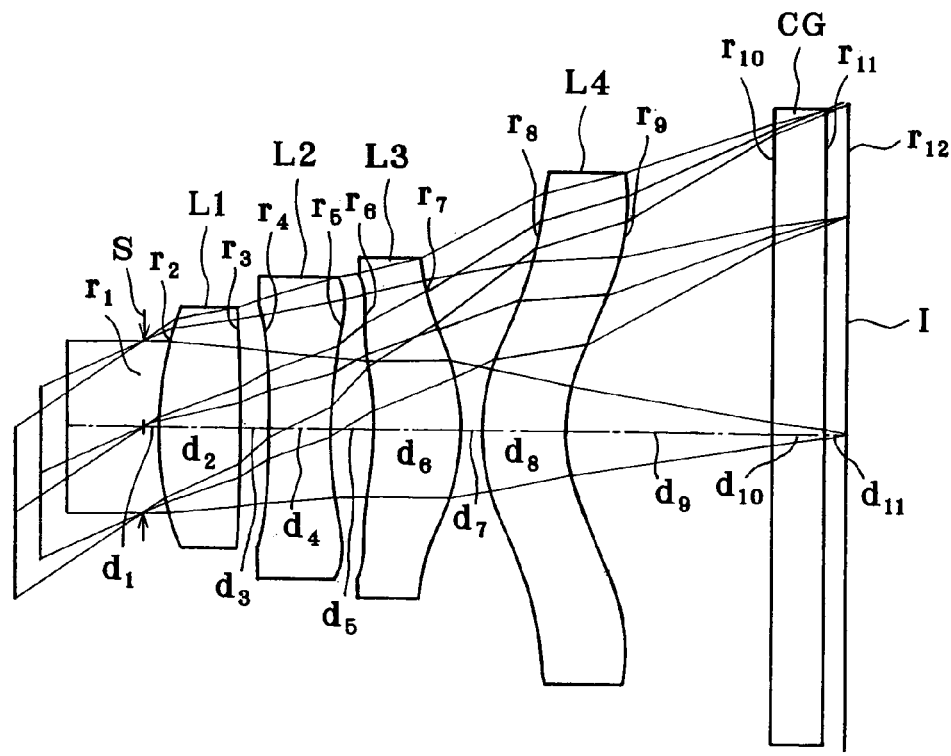
FIG. 36 is a lens arrangement section of Example 1 of the image-formation optical system according to the third aspect of the invention upon focused on an object point at infinity.

As shown in FIG. 36, the image-formation optical system of Example 1 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides and a fourth positive meniscus lens L4 that is convex on its object side and has aspheric surfaces on both its sides. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex (trade name).

The specifications of the wide-angle optical system according to this example are:
 a focal length f=4.7 mm,
 an image height Ih=3.17 mm, and
 a half angle of view ω=34°.

The optically effective diameters of the respective lenses (on one sides) are 1.049 mm for $2^{nd}$ surface $r_2$, 1.174 mm for $3^{rd}$ surface $r_3$, 1.233 mm for $4^{th}$ surface $r_4$, 1.459 mm for $5^{th}$ surface $r_5$, 1.490 mm for $6^{th}$ surface $r_6$, 1.651 mm for $7^{th}$ surface $r_7$, 2.281 mm for $8^{th}$ surface $r_8$ and 2.493 mm for $9^{th}$ surface $r_9$.

EXAMPLE 2

Figure 37:
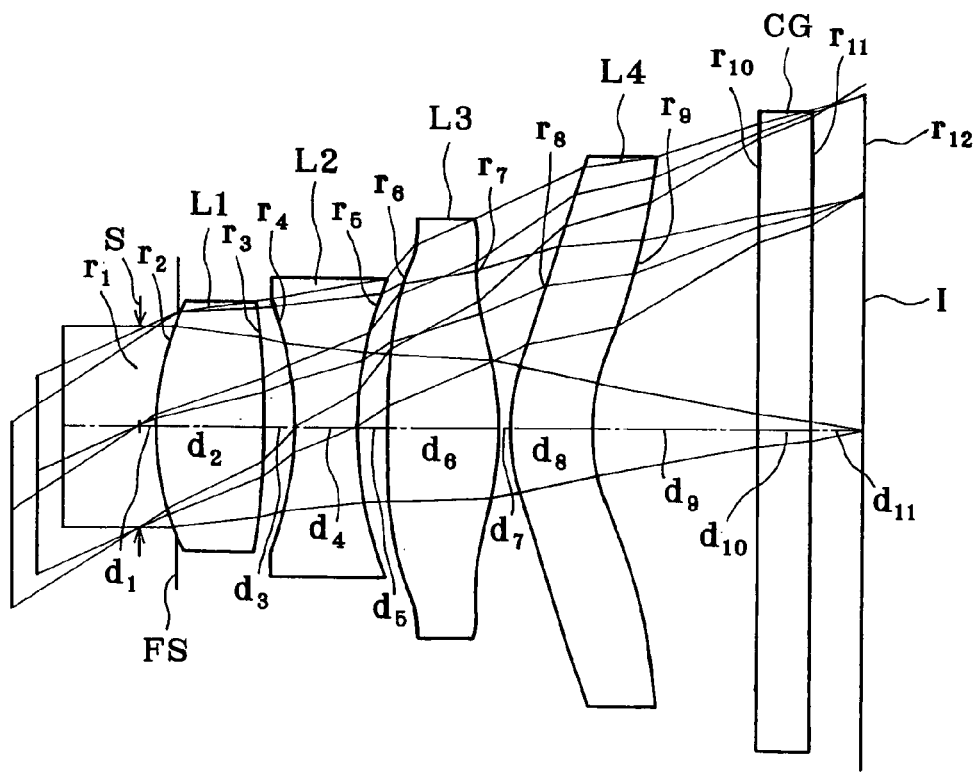
FIG. 37 is a lens arrangement section, similar to FIG. 36, of the image-formation optical system according to Example 2.

As shown in FIG. 37, the image-formation optical system of Example 2 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its side and a fourth positive meniscus lens L4 that is convex on its object side and has aspheric surfaces on both its sides. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex.

The specifications of the wide-angle optical system according to this example are:
 a focal length f=5.14 mm,
 an image height Ih=3.3 mm, and
 a half angle of view ω=32.8°.

The optically effective diameters of the respective lenses (on one sides) are 1.1 mm for $2^{nd}$ surface $r_2$, 1.203 mm for $3^{rd}$ surface $r_3$, 1.225 mm for $4^{th}$ surface $r_4$, 1.443 mm for $5^{th}$ surface $r_5$, 1.785 mm for $6^{th}$ surface $r_6$, 2.036 mm for $7^{th}$ surface $r_7$, 2.554 mm for $8^{th}$ surface $r_8$ and 2.675 mm for $9^{th}$ surface $r_9$.

Further, a flare stop FS is located on the object side of the first lens L1.

EXAMPLE 3

Figure 38:
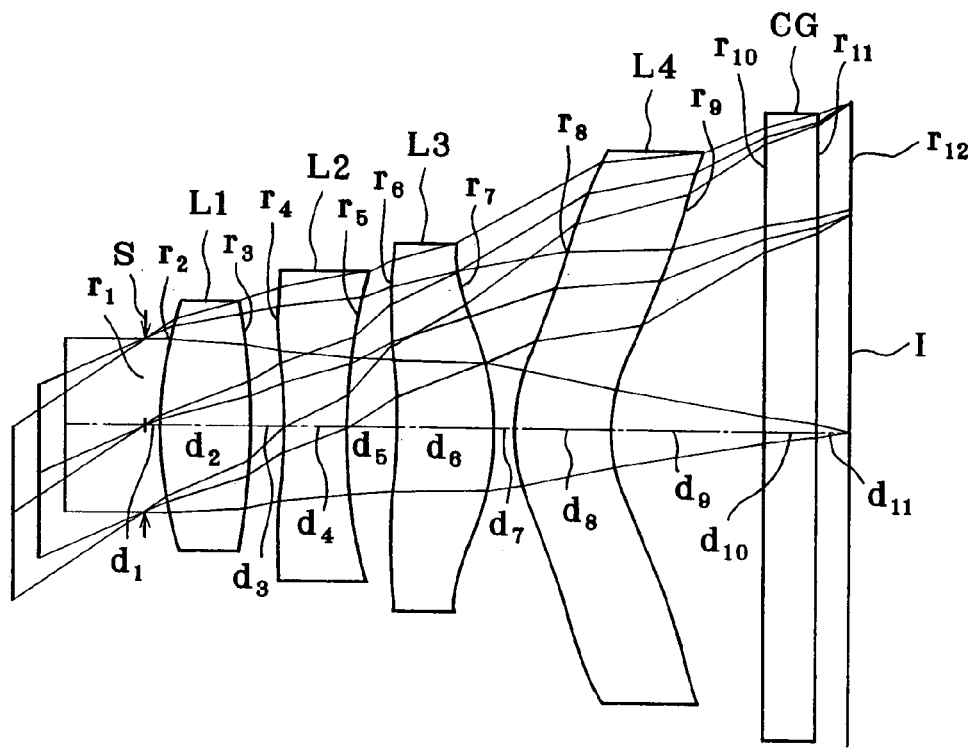
FIG. 38 is a lens arrangement section, similar to FIG. 36, of the image-formation optical system according to Example 3.

As shown in FIG. 38, the image-formation optical system of Example 3 is made up of, in order from its object side, an aperture stop S, a first positive lens L1 that is of double-convex shape and has aspheric surfaces on both its sides, a second negative lens L2 that has an aspheric surface on its object side and is of double-concave shape, a third positive meniscus lens L3 that is convex on its image side and has aspheric surfaces on both its sides and a fourth positive meniscus lens L4 that is convex on its object side and has aspheric surfaces on both its sides. In the instant example, the first, second, third and fourth lenses L1, L2, L3 and L4 are each made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.037 mm for $2^{nd}$ surface $r_2$, 1.205 mm for $3^{rd}$ surface $r_3$, 1.346 mm for $4^{th}$ surface $r_4$, 1.488 mm for $5^{th}$ surface $r_5$, 1.615 mm for $6^{th}$ surface $r_6$, 1.773 mm for $7^{th}$ surface $r_7$, 2.573 mm for $8^{th}$ surface $r_8$ and 2.667 mm for $9^{th}$ surface $r_9$.

EXAMPLE 4

Figure 39:
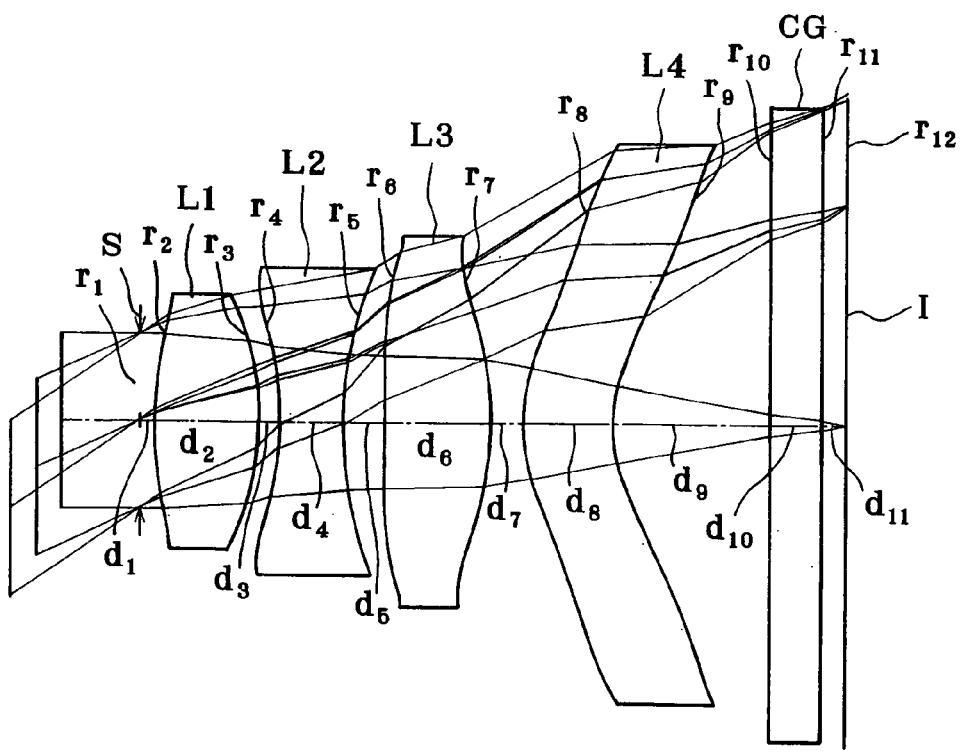
FIG. 39 is a lens arrangement section, similar to FIG. 36, of the image-formation optical system according to Example 4.

As shown in FIG. 39, the image-formation optical system of Example 4 is made up of, in order from its object side, an aperture stop S, a first positive lens L1 that has an aspheric surface on its object side and is of double-convex shape, a second negative lens L2 that has an aspheric surface on its object side and is of double-concave shape, a third positive meniscus lens L3 that is convex on its image side and has aspheric surfaces on both its sides and a fourth positive meniscus lens L4 that is convex on its object side and has aspheric surfaces on both its sides. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.035 mm for $2^{nd}$ surface $r_2$, 1.218 mm for $3^{rd}$ surface $r_3$, 1.275 mm for $4^{th}$ surface $r_4$, 1.474 mm for $5^{th}$ surface $r_5$, 1.645 mm for $6^{th}$ surface $r_6$, 1.793 mm for $7^{th}$ surface $r_7$, 2.650 mm for $8^{th}$ surface $r_8$ and 2.704 mm for $9^{th}$ surface $r_9$.

EXAMPLE 5

Figure 40:
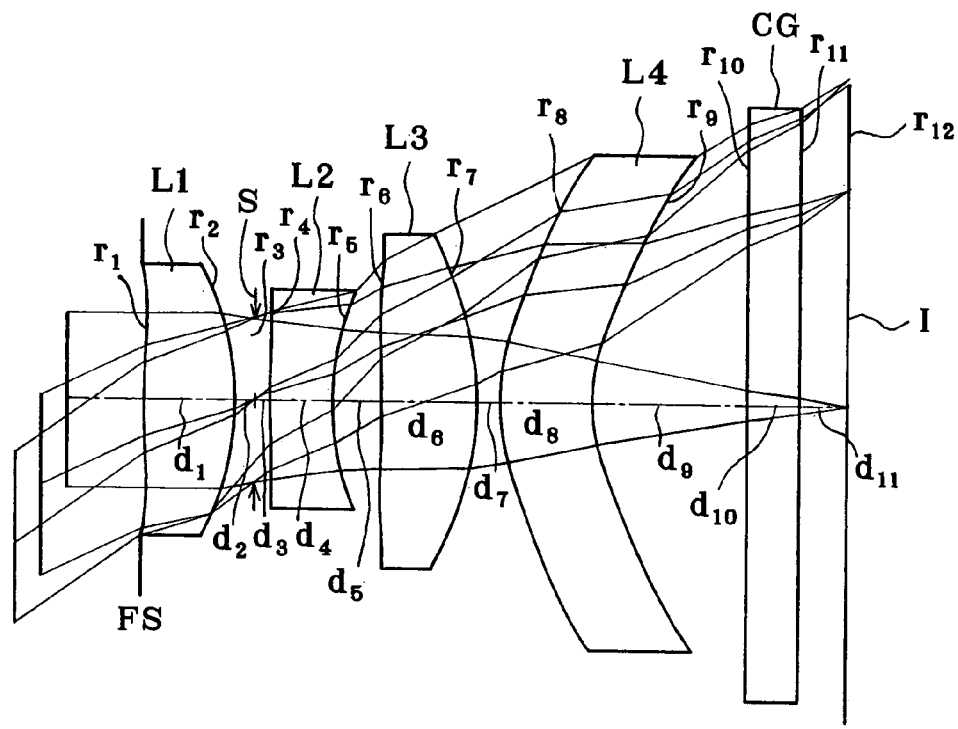
FIG. 40 is a lens arrangement section, similar to FIG. 36, of the image-formation optical system according to Example 5.

As shown in FIG. 40, the image-formation optical system of Example 5 is made up of, in order from its object side, a first positive lens L1 that has an aspheric surface on its object side and is of double-convex shape, an aperture stop S, a second negative lens L2 that has an aspheric surface on its object side and is of double-concave shape, a third positive meniscus lens L3 that is convex on its image side and has aspheric surface on both its sides and a fourth positive meniscus lens L4 that is convex on its object side and has aspheric surfaces on both its sides. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.3 mm for $1^{st}$ surface $r_1$, 1.109 mm for $2^{nd}$ surface $r_2$, 0.856 mm for $4^{th}$ surface $r_4$, 1.054 mm for $5^{th}$ surface $r_5$, 1.361 mm for $6^{th}$ surface $r_6$, 1.613 mm for $7^{th}$ surface $r_7$, 2.401 mm for $8^{th}$ surface $r_8$ and 2.402 mm for $9^{th}$ surface $r_9$.

Further, a flare stop FS is located on the object side of the first lens L1.

EXAMPLE 6

Figure 41:
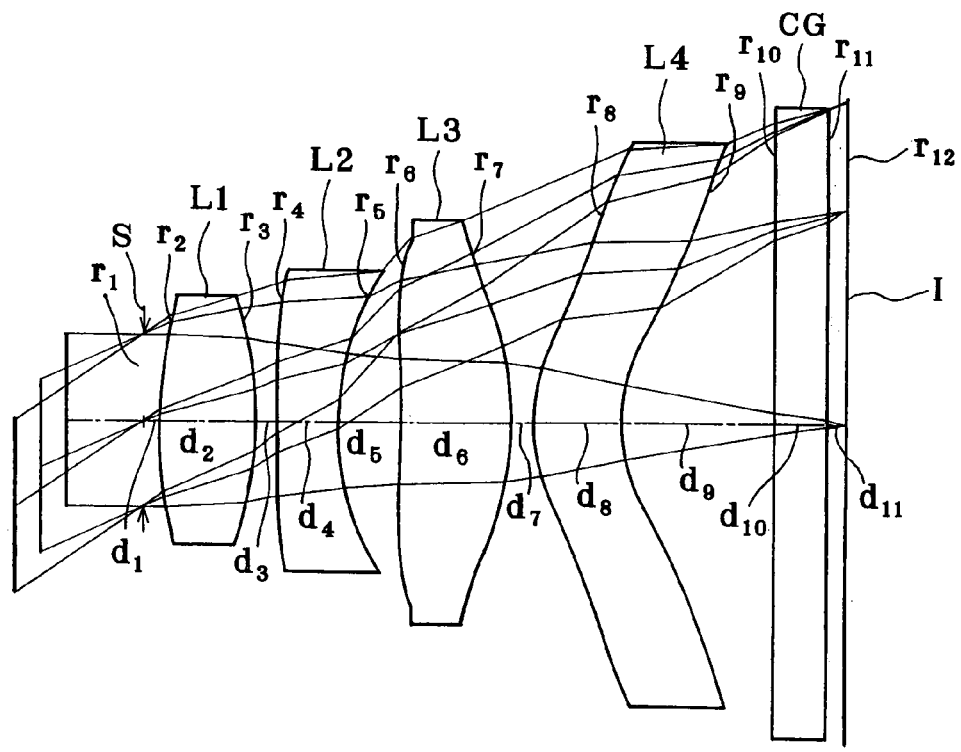
FIG. 41 is a lens arrangement section, similar to FIG. 36, of the image-formation optical system according to Example 6.

1.5 As shown in FIG. 41, the image-formation optical system of Example 6 is made up of, in order from its object side, an aperture stop S, a first positive lens L1 that has an aspheric surface on its object side and is of double-convex shape, a second negative meniscus lens L2 that has an aspheric surface on its object side and is convex on its object side, a third positive meniscus lens L3 that is convex on its image side and has aspheric surfaces on both its sides and a fourth positive meniscus lens L4 that is convex on its object side and has aspheric surfaces on both its sides. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.014 mm for $2^{nd}$ surface $r_2$, 1.212 mm for $3^{rd}$ surface $r_3$, 1.358 mm for $4^{th}$ surface $r_4$, 1.456 mm for $5^{th}$ surface $r_5$, 1.796 mm for $6^{th}$ surface $r_6$, 1.968 mm for $7^{th}$ surface $r_7$, 2.690 mm for $8^{th}$ surface $r_8$ and 2.748 mm for $9^{th}$ surface $r_9$.

EXAMPLE 7

Figure 42:
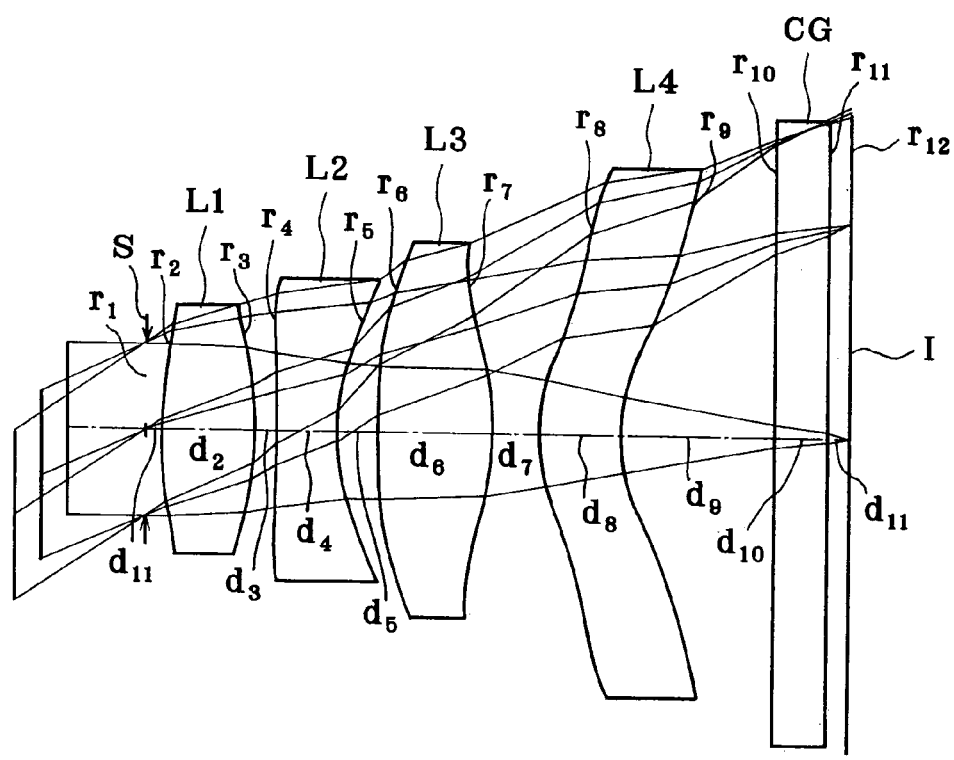
FIG. 42 is a lens arrangement section, similar to FIG. 36, of the image-formation optical system according to Example 7.

As shown in FIG. 42, the image-formation optical system of Example 7 is made up of, in order from its object side, an aperture stop S, a first positive lens L1 that is of double-convex shape and has aspheric surfaces on both its sides, a second negative meniscus lens L2 that is convex on its object side and has aspheric surfaces on both its sides, a third positive lens L3 that is of double-convex shape and has aspheric surfaces on both its side and a fourth positive meniscus lens L4 that is convex on its object side and has aspheric surfaces on both its sides. In the instant embodiment, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:
  a focal length f=4.7 mm,
  an image height Ih=3.17 mm, and
  a half angle of view ω=34°.

The optically effective diameters of the respective lenses (on one sides) are 1.010 mm for $2^{nd}$ surface $r_2$, 1.206 mm for $3^{rd}$ surface $r_3$, 1.322 mm for $4^{th}$ surface $r_4$, 1.464 mm for $5^{th}$ surface $r_5$, 1.661 mm for 6th surface $r_6$, 1.824 mm for $7^{th}$ surface $r_7$, 2.462 mm for $8^{th}$ surface $r_8$ and 2.583 mm for $9^{th}$ surface $r_9$.

EXAMPLE 8

Figure 43:
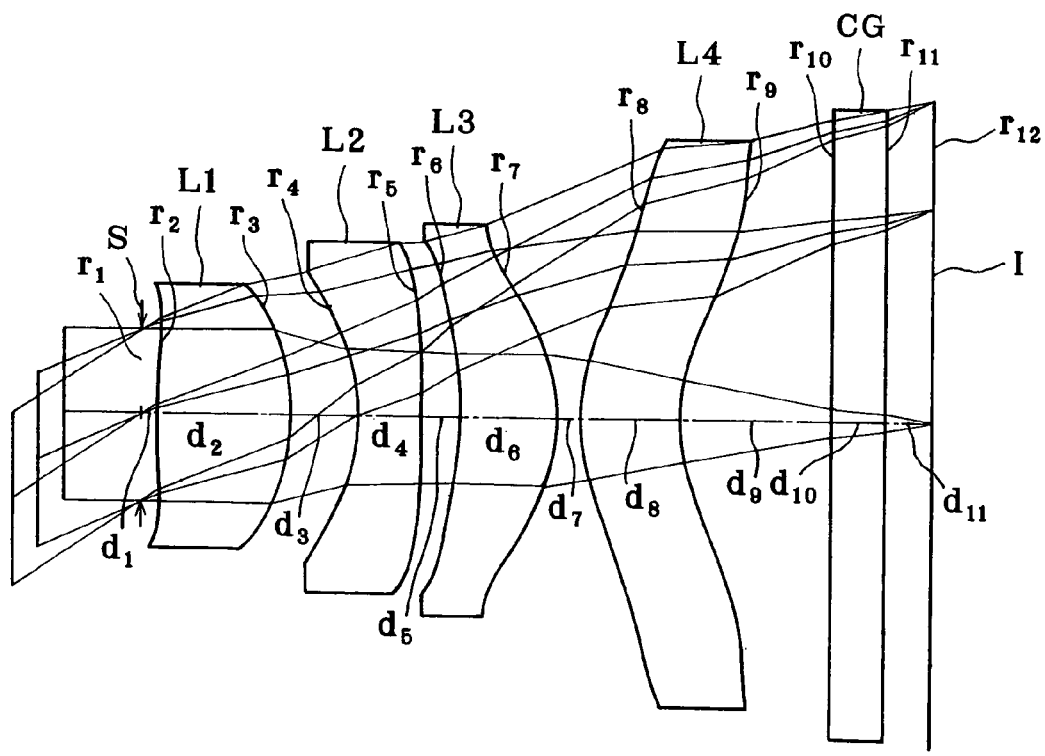
FIG. 43 is a lens arrangement section, similar to FIG. 36, of the image-formation optical system according to Example 8.

As shown in FIG. 43, the image-formation optical system of Example 8 is made up of, in order from its object side, an aperture stop S, a first positive lens L1 that is of double-convex shape and has aspheric surfaces on both its sides, a second negative meniscus lens L2 that is convex on its image side and has aspheric surfaces on its sides, a third positive meniscus lens L3 that is convex on its image side and has aspheric surfaces on both its sides and a fourth positive meniscus lens L4 that is convex on its object side and has aspheric surfaces on both its sides. In the instant example, the first lens L1 is made of glass, and the second, third and fourth lenses L2, L3 and L4 are each made of plastics. More specifically, the second lens L2 is made of polycarbonate, and the third and fourth lenses L3 and L4 are each made of an amorphous polyolefin Zeonex.

The specifications of the wide-angle optical system according to this example are:
  a focal length f=4.7 mm,
  an image height Ih=3.17 mm, and
  a half angle of view ω=34°.

The optically effective diameters of the respective lenses (on one sides) are 0.953 mm for $2^{nd}$ surface $r_2$, 1.289 mm for $3^{rd}$ surface $r_3$, 1.427 mm for $4^{th}$ surface $r_4$, 1.707 mm for $5^{th}$ surface $r_5$, 1.730 mm for $6^{th}$ surface $r_6$, 1.9 mm for $7^{th}$ surface $r_7$, 2.669 mm for $8^{th}$ surface $r_8$ and 2.759 mm for $9^{th}$ surface $r_9$.

EXAMPLE 9

Figure 44:
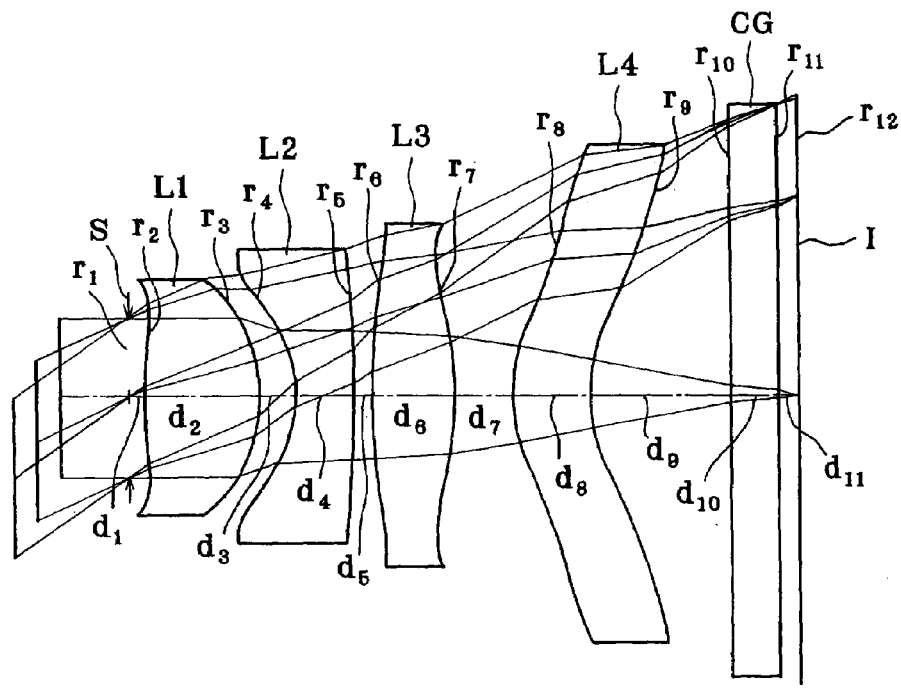
FIG. 44 is a lens arrangement section, similar to FIG. 36, of the image-formation optical system according to Example 9.
Figure 45:
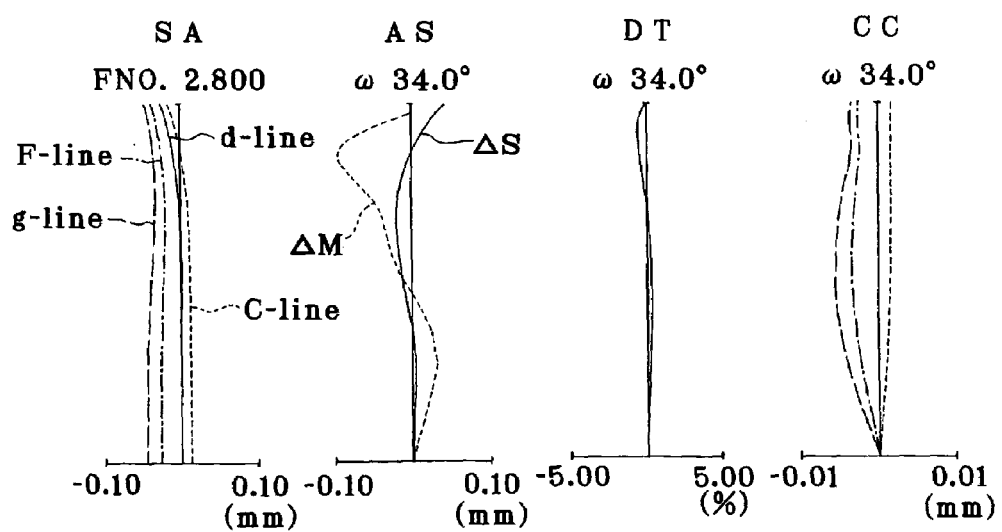
FIG. 45 is an aberration diagram for Example 1 upon focused on an object point at infinity.
Figure 46:
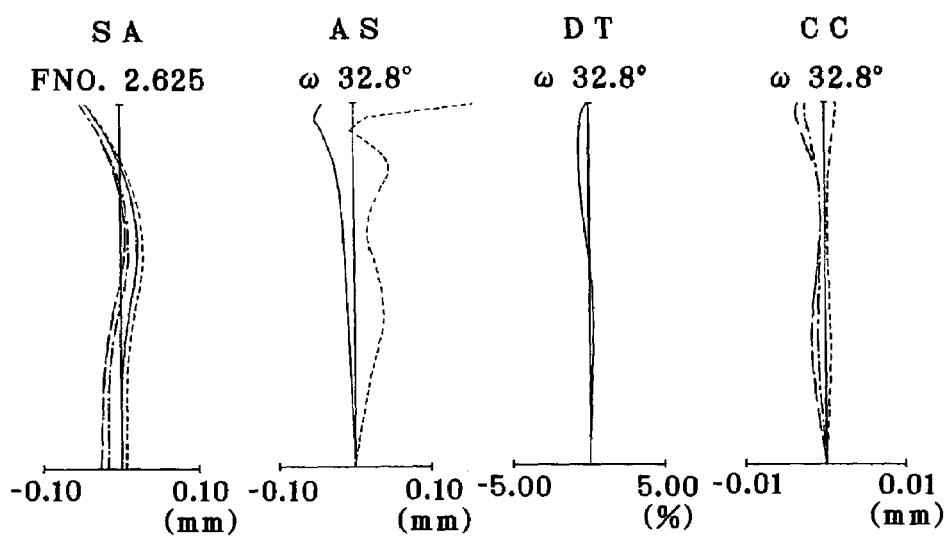
FIG. 46 is an aberration diagram for Example 2 upon focused on an object point at infinity.
Figure 47:
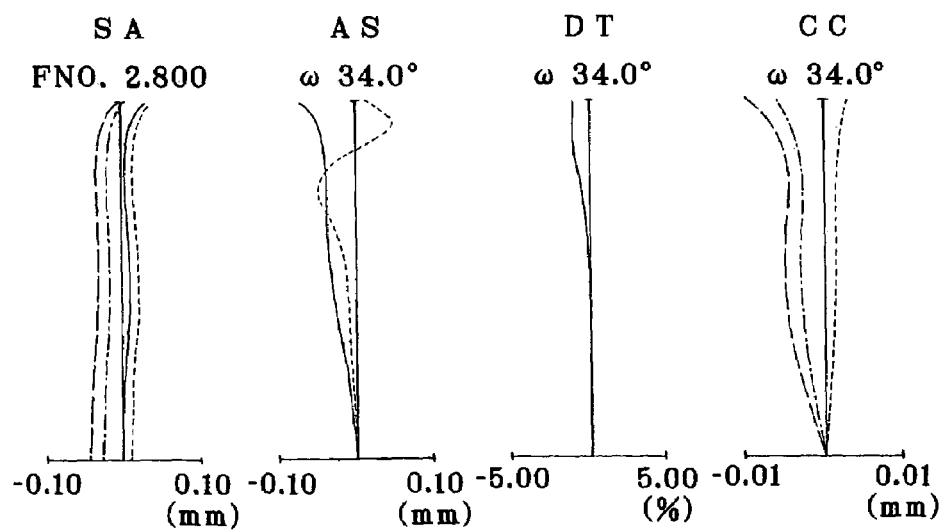
FIG. 47 is an aberration diagram for Example 3 upon focused on an object point at infinity.
Figure 48:
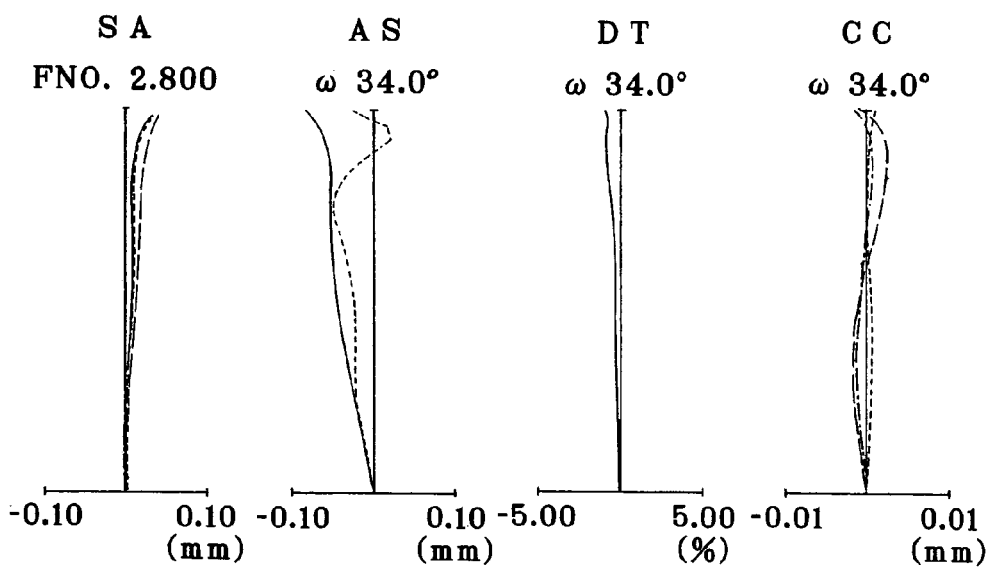
FIG. 48 is an aberration diagram for Example 4 upon focused on an object point at infinity.
Figure 49:
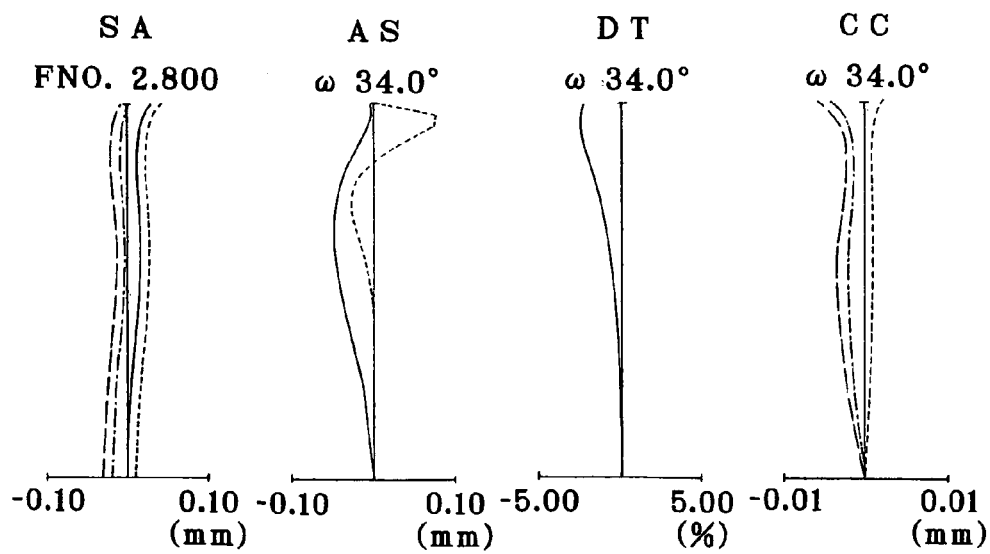
FIG. 49 is an aberration diagram for Example 5 upon focused on an object point at infinity.
Figure 50:
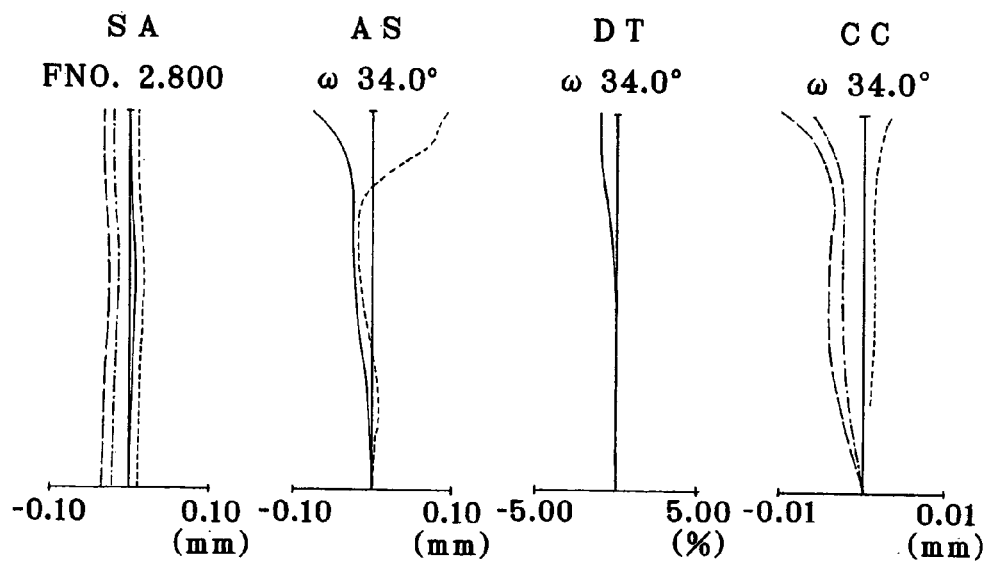
FIG. 50 is an aberration diagram for Example 6 upon focused on an object point at infinity.
Figure 51:
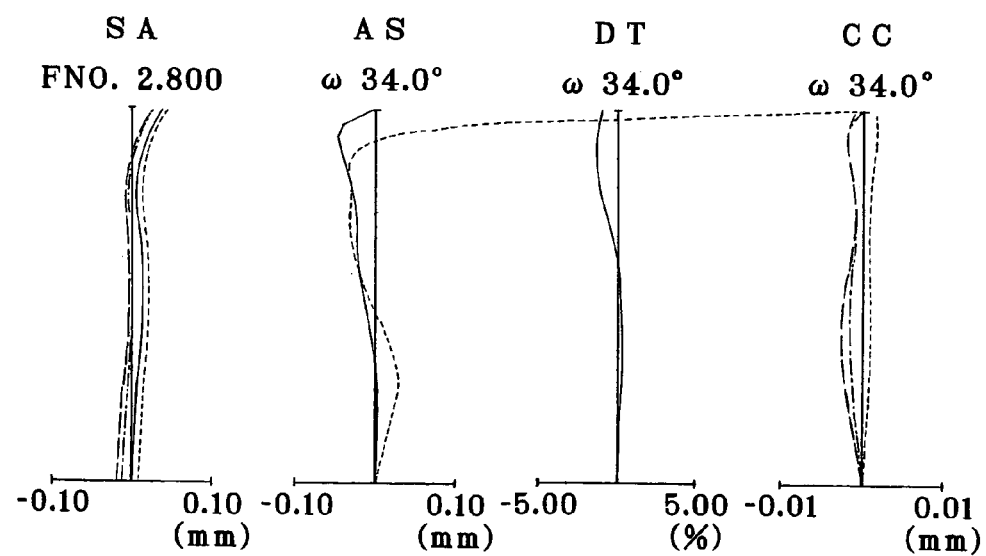
FIG. 51 is an aberration diagram for Example 7 upon focused on an object point at infinity.
Figure 52:
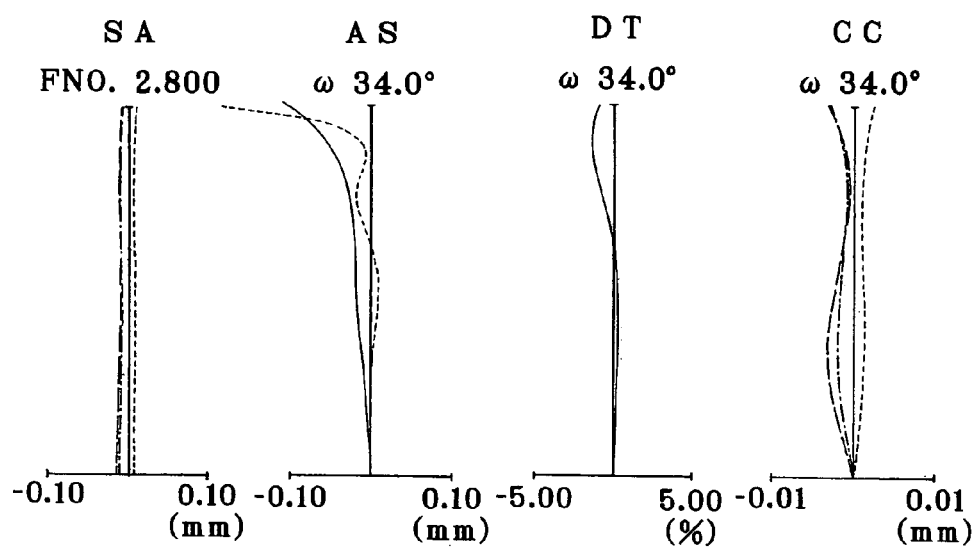
FIG. 52 is an aberration diagram for Example 8 upon focused on an object point at infinity.
Figure 53:
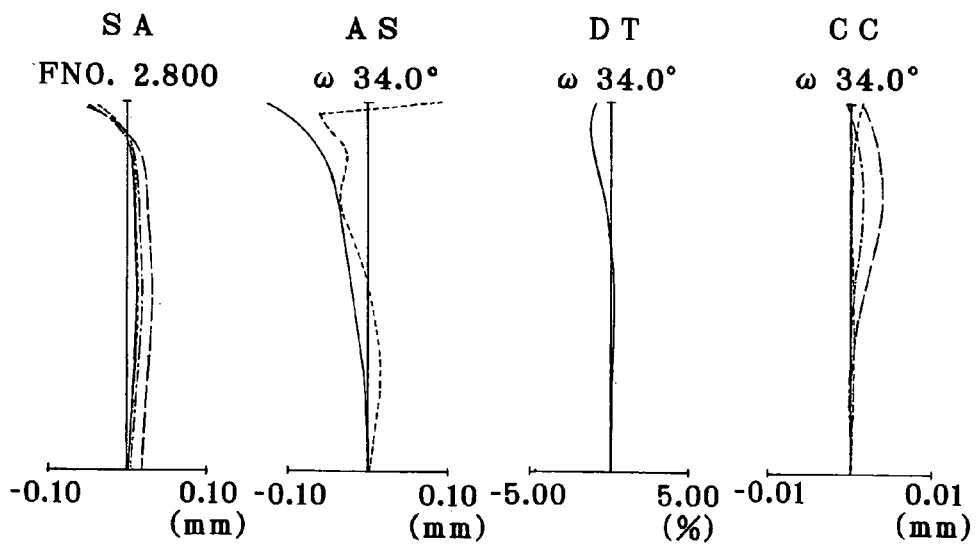
FIG. 53 is an aberration diagram for Example 9 upon focused on an object point at infinity.

As shown in FIG. 44, the image-formation optical system of Example 9 is made up of, in order from its object side, an aperture stop S, a first positive lens L1 that is of double-convex shape and has aspheric surfaces on both its sides, a second negative meniscus lens L2 that is convex on its image side and has aspheric surfaces on both its sides, a third positive lens L3 that is of double-convex shape and has aspheric surfaces on both its sides and a fourth positive meniscus lens L4 that is convex on its object side and has aspheric surfaces on both its sides. In the instant example, the first, second, third and fourth lenses L1, L2, L3 and L4 are all made of plastics. More specifically, the first, third and fourth lenses L1, L3 and L4 are each made of an amorphous polyolefin Zeonex, and the second lens L2 is made of polycarbonate.

The specifications of the wide-angle optical system according to this example are:
  a focal length f=4.7 mm,
  an image height Ih=3.17 mm, and
  a half angle of view ω=34°.

The optically effective diameters of the respective lenses (on one sides) are 0.972 mm for $2^{nd}$ surface $r_2$, 1.237 mm for $3^{rd}$ surface $r_3$, 1.275 mm for $4^{th}$ surface $r_4$, 1.551 mm for $5^{th}$ surface $r_5$, 1.684 mm for $6^{th}$ surface $r_6$, 1.808 mm for $7^{th}$ surface $r_7$, 2.536 mm for $8^{th}$ surface $r_8$ and 2.642 mm for $9^{th}$ surface $r_9$.

The numerical data on each example are given below. Symbols used hereinafter but not hereinbefore have the following meanings:

$r_1, r_2, \ldots$ : radius of curvature of each lens surface,
  $d_1, d_2, \ldots$ : spacing between adjacent lens surfaces,
  $n_{d1}, n_{d2}, \ldots$ : d-line refractive index of each lens, and
  $v_{d1}, v_{d2}, \ldots$ : Abbe number of each lens. It is noted that aspheric shape is given by the aforesaid equation (a).

EXAMPLE 1

$r_1 = \infty$(Stop)          $d_1 = 0.1500$
$r_2 = 3.4988$               $d_2 = 0.8016$   $n_{d1} = 1.60311$   $v_{d1} = 60.64$
$r_3 = -16.9666$             $d_3 = 0.2646$
$r_4 = -89.0994$(Aspheric)   $d_4 = 0.6000$   $n_{d2} = 1.58423$   $v_{d2} = 30.40$
$r_5 = 3.8874$(Aspheric)     $d_5 = 0.4089$
$r_6 = -2.8033$(Aspheric)    $d_6 = 0.8660$   $n_{d3} = 1.52542$   $v_{d3} = 55.70$
$r_7 = -1.7454$(Aspheric)    $d_7 = 0.2000$
$r_8 = 1.7817$(Aspheric)     $d_8 = 0.8089$   $n_{d4} = 1.52542$   $v_{d4} = 55.70$
$r_9 = 1.5291$(Aspheric)     $d_9 = 2.0000$
$r_{10} = \infty$            $d_{10} = 0.5000$ $n_{d5} = 1.51633$  $v_{d5} = 64.14$
$r_{11} = \infty$            $d_{11} = 0.2000$
$r_{12} = \infty$(Image Plane)

Aspherical Coefficients
4 th surface $K = 0$
$A_4 = -3.4699 \times 10^{-2}$
$A_6 = -2.3969 \times 10^{-2}$
$A_8 = 1.7809 \times 10^{-2}$
$A_{10} = -3.3719 \times 10^{-3}$ 5 th surface $K = 0$
$A_4 = -2.7059 \times 10^{-3}$
$A_6 = -1.6898 \times 10^{-2}$
$A_8 = -2.2033 \times 10^{-3}$
$A_{10} = 0.0000$ 6 th surface $K = -1.2818$
$A_4 = 1.2482 \times 10^{-1}$
$A_6 = -2.4728 \times 10^{-2}$
$A_8 = -4.1675 \times 10^{-3}$
$A_{10} = 0.0000$ 7 th surface $K = -1.6988$
$A_4 = 2.1086 \times 10^{-2}$
$A_6 = 5.0063 \times 10^{-3}$
$A_8 = -1.7055 \times 10^{-4}$
$A_{10} = 1.7757 \times 10^{-4}$ 8 th surface $K = -3.5321$
$A_4 = -2.3378 \times 10^{-3}$
$A_6 = -4.4544 \times 10^{-3}$
$A_8 = 5.1437 \times 10^{-4}$
$A_{10} = 0.0000$ 9 th surface $K = -3.6929$
$A_4 = -8.4357 \times 10^{-3}$
$A_6 = -1.7976 \times 10^{-3}$
$A_8 = 1.7871 \times 10^{-4}$
$A_{10} = 0.0000$

EXAMPLE 2

| | |
|---|---|
| $r_1 = \infty$(Stop) | $d_1 = 0.1500$ |
| $r_2 = 2.7108$ | $d_2 = 1.0603$   $n_{d1} = 1.58313$   $v_{d1} = 59.38$ |
| $r_3 = -8.3420$ | $d_3 = 0.2982$ |
| $r_4 = -3.2482$(Aspheric) | $d_4 = 0.6000$   $n_{d2} = 1.57268$   $v_{d2} = 33.51$ |
| $r_5 = 4.6789$(Aspheric) | $d_5 = 0.2875$ |
| $r_6 = -38.8125$(Aspheric) | $d_6 = 1.0811$   $n_{d3} = 1.50913$   $v_{d3} = 56.20$ |
| $r_7 = -2.8236$(Aspheric) | $d_7 = 0.1100$ |
| $r_8 = 1.8103$(Aspheric) | $d_8 = 0.8000$   $n_{d4} = 1.50913$   $v_{d4} = 56.20$ |
| $r_9 = 1.5676$(Aspheric) | $d_9 = 1.6000$ |
| $r_{10} = \infty$ | $d_{10} = 0.5000$   $n_{d5} = 1.51633$   $v_{d5} = 64.14$ |
| $r_{11} = \infty$ | $d_{11} = 0.5119$ |
| $r_{12} = \infty$(Image Plane) | |

Aspherical Coefficients
4 th surface $K = 4.2272$
$A_4 = -8.4154 \times 10^{-4}$
$A_6 = 3.3644 \times 10^{-2}$
$A_8 = -1.6878 \times 10^{-2}$
$A_{10} = 7.1535 \times 10^{-3}$
5 th surface $K = -1.5523$
$A_4 = 2.2157 \times 10^{-2}$
$A_6 = -1.1749 \times 10^{-2}$
$A_8 = 3.7361 \times 10^{-3}$
$A_{10} = 0.0000$
6 th surface $K = -1.942 \times 10^{+4}$
$A_4 = 8.3063 \times 10^{-2}$
$A_6 = -3.2821 \times 10^{-2}$
$A_8 = 7.9071 \times 10^{-3}$
$A_{10} = -9.4840 \times 10^{-4}$
7 th surface $K = -11.8290$
$A_4 = -2.8580 \times 10^{-2}$
$A_6 = 2.6824 \times 10^{-2}$
$A_8 = -4.6918 \times 10^{-3}$
$A_{10} = 1.1729 \times 10^{-4}$
8 th surface $K = -2.8662$
$A_4 = -3.4945 \times 10^{-2}$
$A_6 = 6.4171 \times 10^{-3}$
$A_8 = -3.8843 \times 10^{-4}$
$A_{10} = 0.0000$
9 th surface $K = -3.1664$
$A_4 = -3.0308 \times 10^{-2}$
$A_6 = 3.7325 \times 10^{-3}$
$A_8 = -1.6144 \times 10^{-4}$
$A_{10} = 0.0000$

EXAMPLE 3

| | |
|---|---|
| $r_1 = \infty$(Stop) | $d_1 = 0.1500$ |
| $r_2 = 3.4190$(Aspheric) | $d_2 = 0.8507$   $n_{d1} = 1.52542$   $v_{d1} = 55.70$ |
| $r_3 = -6.3823$(Aspheric) | $d_3 = 0.3210$ |
| $r_4 = -9.4028$(Aspheric) | $d_4 = 0.6000$   $n_{d2} = 1.58423$   $v_{d2} = 30.40$ |
| $r_5 = 5.4033$ | $d_5 = 0.4938$ |
| $r_6 = -4.6192$(Aspheric) | $d_6 = 0.9402$   $n_{d3} = 1.52542$   $v_{d3} = 55.70$ |
| $r_7 = -2.3567$(Aspheric) | $d_7 = 0.2000$ |
| $r_8 = 1.7397$(Aspheric) | $d_8 = 0.9358$   $n_{d4} = 1.52542$   $v_{d4} = 55.70$ |
| $r_9 = 1.4412$(Aspheric) | $d_9 = 1.5000$ |
| $r_{10} = \infty$ | $d_{10} = 0.5000$   $n_{d5} = 1.51633$   $v_{d5} = 64.14$ |
| $r_{11} = \infty$ | $d_{11} = 0.3085$ |
| $r_{12} = \infty$(Image Plane) | |

-continued

Aspherical Coefficients
2 nd surface $K = -1.4451$
$A_4 = -1.0037 \times 10^{-2}$
$A_6 = 7.4001 \times 10^{-3}$
$A_8 = -7.3135 \times 10^{-3}$
$A_{10} = 0.0000$
3 rd surface $K = 0$
$A_4 = -4.2131 \times 10^{-3}$
$A_6 = 3.4938 \times 10^{-3}$
$A_8 = 1.3127 \times 10^{-3}$
$A_{10} = 0.0000$
4 th surface $K = 28.7894$
$A_4 = -6.9309 \times 10^{-3}$
$A_6 = 1.8015 \times 10^{-2}$
$A_8 = -7.5585 \times 10^{-4}$
$A_{10} = 0.0000$
6 th surface $K = -61.1869$
$A_4 = 3.0584 \times 10^{-2}$
$A_6 = -9.0943 \times 10^{-3}$
$A_8 = 1.3737 \times 10^{-3}$
$A_{10} = 0.0000$
7 th surface $K = -4.7251$
$A_4 = -6.0839 \times 10^{-3}$
$A_6 = 4.4494 \times 10^{-4}$
$A_8 = 1.5774 \times 10^{-3}$
$A_{10} = 0.0000$
8 th surface $K = -2.7375$
$A_4 = -1.7588 \times 10^{-2}$
$A_6 = -1.4478 \times 10^{-3}$
$A_8 = 7.4705 \times 10^{-4}$
$A_{10} = -4.8880 \times 10^{-5}$
9 th surface $K = -2.7344$
$A_4 = -1.6642 \times 10^{-2}$
$A_6 = 4.2423 \times 10^{-4}$
$A_8 = 7.9273 \times 10^{-5}$
$A_{10} = 0.0000$

EXAMPLE 4

| | |
|---|---|
| $r_1 = \infty$(Stop) | $d_1 = 0.1500$ |
| $r_2 = 3.2149$(Aspheric) | $d_2 = 1.0183$   $n_{d1} = 1.52542$   $v_{d1} = 55.70$ |
| $r_3 = -2.8101$ | $d_3 = 0.2000$ |
| $r_4 = -3.0754$(Aspheric) | $d_4 = 0.6000$   $n_{d2} = 1.58423$   $v_{d2} = 30.40$ |
| $r_5 = 4.1691$ | $d_5 = 0.3800$ |
| $r_6 = -12.9082$(Aspheric) | $d_6 = 1.0290$   $n_{d3} = 1.52542$   $v_{d3} = 55.70$ |
| $r_7 = -2.8135$(Aspheric) | $d_7 = 0.3128$ |
| $r_8 = 1.6624$(Aspheric) | $d_8 = 0.8856$   $n_{d4} = 1.52542$   $v_{d4} = 55.70$ |
| $r_9 = 1.4016$(Aspheric) | $d_9 = 1.5000$ |
| $r_{10} = \infty$ | $d_{10} = 0.5000$   $n_{d5} = 1.51633$   $v_{d5} = 64.14$ |
| $r_{11} = \infty$ | $d_{11} = 0.2242$ |
| $r_{12} = \infty$(Image Plane) | |

Aspherical Coefficients
2 nd surface $K = -2.2823$
$A_4 = -1.2738 \times 10^{-2}$
$A_6 = 6.8177 \times 10^{-3}$
$A_8 = -1.0899 \times 10^{-2}$
$A_{10} = 0.0000$ -continued 4 th surface K = 0
$A_4 = -5.7451 \times 10^{-3}$
$A_6 = 1.8548 \times 10^{-2}$
$A_8 = -3.8413 \times 10^{-5}$
$A_{10} = 0.0000$ 6 th surface K = −1143.1884
$A_4 = 4.2933 \times 10^{-2}$
$A_6 = -9.5662 \times 10^{-3}$
$A_8 = 9.9442 \times 10^{-4}$
$A_{10} = 0.0000$ 7 th surface K = −1.8506
$A_4 = 2.3128 \times 10^{-3}$
$A_6 = 6.8882 \times 10^{-3}$
$A_8 = -1.2398 \times 10^{-4}$
$A_{10} = 0.0000$ 8 th surface K = −3.7046
$A_4 = -6.4475 \times 10^{-3}$
$A_6 = -2.6524 \times 10^{-3}$
$A_8 = 6.9705 \times 10^{-4}$
$A_{10} = -3.8784 \times 10^{-5}$ 9 th surface K = −2.8662
$A_4 = -1.2113 \times 10^{-2}$
$A_6 = 6.5200 \times 10^{-5}$
$A_8 = 8.6272 \times 10^{-5}$
$A_{10} = 0.0000$

EXAMPLE 5

| | | | |
|---|---|---|---|
| $r_1 = 8.5817$(Aspheric) | $d_1 = 0.8893$ | $n_{d1} = 1.52542$ | $\nu_{d1} = 55.70$ |
| $r_2 = -2.8136$ | $d_2 = 0.2000$ | | |
| $r_3 = \infty$(Stop) | $d_3 = 0.1500$ | | |
| $r_4 = -514.9818$(Aspheric) | $d_4 = 0.6000$ | $n_{d2} = 1.58423$ | $\nu_{d2} = 30.40$ |
| $r_5 = 2.6847$ | $d_5 = 0.4706$ | | |
| $r_6 = -10.4467$(Aspheric) | $d_6 = 0.9352$ | $n_{d3} = 1.52542$ | $\nu_{d3} = 55.70$ |
| $r_7 = -2.7241$(Aspheric) | $d_7 = 0.2000$ | | |
| $r_8 = 1.8977$(Aspheric) | $d_8 = 0.9071$ | $n_{d4} = 1.52542$ | $\nu_{d4} = 55.70$ |
| $r_9 = 1.6446$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.4478$ | | |
| $r_{12} = \infty$(Image plane) | | | |

Aspherical Coefficients
1 st surface

K = −41.1635
$A_4 = -2.8462 \times 10^{-2}$
$A_6 = -7.7157 \times 10^{-3}$
$A_8 = 1.5796 \times 10^{-3}$
$A_{10} = 0.0000$ 4 th surface K = 0
$A_4 = 1.0483 \times 10^{-2}$
$A_6 = 2.6665 \times 10^{-2}$
$A_8 = -1.5410 \times 10^{-2}$
$A_{10} = 0.0000$ 6 th surface K = −321.8313
$A_4 = 3.1497 \times 10^{-2}$
$A_6 = -1.0491 \times 10^{-2}$
$A_8 = 1.5910 \times 10^{-3}$
$A_{10} = 0.0000$ 7 th surface K = −1.2899
$A_4 = -3.4629 \times 10^{-3}$
$A_6 = 7.0928 \times 10^{-3}$
$A_8 = -1.5552 \times 10^{-3}$
$A_{10} = 0.0000$ 8 th surface K = −4.0442
$A_4 = -4.2765 \times 10^{-3}$
$A_6 = -1.1868 \times 10^{-3}$
$A_8 = 5.8476 \times 10^{-4}$
$A_{10} = -4.3388 \times 10^{-5}$ 9 th surface K = −2.6411
$A_4 = -1.4001 \times 10^{-2}$
$A_6 = 1.2787 \times 10^{-3}$
$A_8 = 6.4100 \times 10^{-5}$
$A_{10} = 0.0000$

EXAMPLE 6

| | | | |
|---|---|---|---|
| $r_1 = \infty$(Stop) | $d_1 = 0.1500$ | | |
| $r_2 = 3.8968$(Aspheric) | $d_2 = 0.9226$ | $n_{d1} = 1.52542$ | $\nu_{d1} = 55.70$ |
| $r_3 = -3.9948$ | $d_3 = 0.2000$ | | |
| $r_4 = 43.0601$(Aspheric) | $d_4 = 0.6000$ | $n_{d2} = 1.58423$ | $\nu_{d2} = 30.40$ |
| $r_5 = 2.6728$ | $d_5 = 0.6191$ | | |
| $r_6 = -5.8315$(Aspheric) | $d_6 = 1.0602$ | $n_{d3} = 1.52542$ | $\nu_{d3} = 55.70$ |
| $r_7 = -2.6881$(Aspheric) | $d_7 = 0.2000$ | | |
| $r_8 = 1.5830$(Aspheric) | $d_8 = 0.8481$ | $n_{d4} = 1.52542$ | $\nu_{d4} = 55.70$ |
| $r_9 = 1.3310$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
2nd surface

K = −2.9371
$A_4 = -1.4317 \times 10^{-2}$
$A_6 = -1.3226 \times 10^{-3}$
$A_8 = -2.3640 \times 10^{-3}$
$A_{10} = 0.0000$ 4th surface K = 0
$A_4 = -2.3264 \times 10^{-3}$
$A_6 = 1.2597 \times 10^{-2}$
$A_8 = -1.8873 \times 10^{-3}$
$A_{10} = 0.0000$ 6th surface K = −100.4964
$A_4 = 3.9089 \times 10^{-2}$
$A_6 = -8.5671 \times 10^{-3}$
$A_8 = 1.0117 \times 10^{-3}$
$A_{10} = 0.0000$ 7th surface K = −3.4090
$A_4 = 3.3244 \times 10^{-4}$
$A_6 = 1.8051 \times 10^{-3}$
$A_8 = 4.5537 \times 10^{-6}$
$A_{10} = 0.0000$ 8th surface K = −3.0523
$A_4 = -7.5482 \times 10^{-3}$
$A_6 = -2.9533 \times 10^{-3}$
$A_8 = 6.8360 \times 10^{-4}$
$A_{10} = -3.5377 \times 10^{-5}$ -continued 9th surface K = −2.5972
$A_4$ = −1.3548 × $10^{-2}$
$A_6$ = 3.9581 × $10^{-5}$
$A_8$ = 8.7152 × $10^{-5}$
$A_{10}$ = 0.0000

-continued

9th surface

K = −2.2807
$A_4$ = −3.2860 × $10^{-2}$
$A_6$ = 2.7480 × $10^{-3}$
$A_8$ = −1.8399 × $10^{-5}$
$A_{10}$ = 0.0000

EXAMPLE 7

| | | | |
|---|---|---|---|
| $r_1$ = ∞(Stop) | $d_1$ = 0.1500 | | |
| $r_2$ = 4.2226(Aspheric) | $d_2$ = 0.8904 | $n_{d1}$ = 1.52542 | $v_{d1}$ = 55.70 |
| $r_3$ = −3.7513(Aspheric) | $d_3$ = 0.2000 | | |
| $r_4$ = 32.1671(Aspheric) | $d_4$ = 0.6000 | $n_{d2}$ = 1.58423 | $v_{d2}$ = 30.40 |
| $r_5$ = 2.0997(Aspheric) | $d_5$ = 0.3982 | | |
| $r_6$ = 143.1654(Aspheric) | $d_6$ = 1.0976 | $n_{d3}$ = 1.52542 | $v_{d3}$ = 55.70 |
| $r_7$ = −3.1397(Aspheric) | $d_7$ = 0.4638 | | |
| $r_8$ = 1.6585(Aspheric) | $d_8$ = 0.8000 | $n_{d4}$ = 1.52542 | $v_{d4}$ = 55.70 |
| $r_9$ = 1.3917(Aspheric) | $d_9$ = 1.5000 | | |
| $r_{10}$ = ∞ | $d_{10}$ = 0.5000 | $n_{d5}$ = 1.51633 | $v_{d5}$ = 64.14 |
| $r_{11}$ = ∞ | $d_{11}$ = 0.2000 | | |
| $r_{12}$ = ∞(Image Plane) | | | |

Aspherical Coefficients
2nd surface

K = −2.2181
$A_4$ = −1.2931 × $10^{-2}$
$A_6$ = 9.7714 × $10^{-3}$
$A_8$ = −1.2065 × $10^{-2}$
$A_{10}$ = 0.0000

3rd surface

K = 0
$A_4$ = 1.3343 × $10^{-2}$
$A_6$ = 6.9215 × $10^{-3}$
$A_8$ = −8.5398 × $10^{-3}$
$A_{10}$ = 0.0000

4th surface

K = 0
$A_4$ = −2.5854 × $10^{-2}$
$A_6$ = 7.9194 × $10^{-3}$
$A_8$ = 1.7619 × $10^{-3}$
$A_{10}$ = 0.0000

5th surface

K = 0
$A_4$ = −3.2749 × $10^{-2}$
$A_6$ = −1.4779 × $10^{-2}$
$A_8$ = 4.6729 × $10^{-3}$
$A_{10}$ = 0.0000

6th surface

K = 0
$A_4$ = 8.0638 × $10^{-2}$
$A_6$ = −2.5140 × $10^{-2}$
$A_8$ = 2.6470 × $10^{-3}$
$A_{10}$ = 0.0000

7th surface

K = −0.3492
$A_4$ = −2.6870 × $10^{-3}$
$A_6$ = 1.8093 × $10^{-2}$
$A_8$ = −2.6323 × $10^{-3}$
$A_{10}$ = 0.0000

8th surface

K = −3.5008
$A_4$ = −1.6963 × $10^{-2}$
$A_6$ = −3.9215 × $10^{-3}$
$A_8$ = 1.3806 × $10^{-3}$
$A_{10}$ = −9.3729 × $10^{-5}$

EXAMPLE 8

| | | | |
|---|---|---|---|
| $r_1$ = ∞(Stop) | $d_1$ = 0.1500 | | |
| $r_2$ = 8.3641(Aspheric) | $d_2$ = 1.2830 | $n_{d1}$ = 1.51291 | $v_{d1}$ = 67.78 |
| $r_3$ = −2.2018(Aspheric) | $d_3$ = 0.6575 | | |
| $r_4$ = −1.9227(Aspheric) | $d_4$ = 0.6000 | $n_{d2}$ = 1.58423 | $v_{d2}$ = 30.40 |
| $r_5$ = −12.2576(Aspheric) | $d_5$ = 0.3774 | | |
| $r_6$ = −2.4809(Aspheric) | $d_6$ = 0.9537 | $n_{d3}$ = 1.52542 | $v_{d3}$ = 55.70 |
| $r_7$ = −1.7016(Aspheric) | $d_7$ = 0.2000 | | |
| $r_8$ = 1.7817(Aspheric) | $d_8$ = 0.9584 | $n_{d4}$ = 1.52542 | $v_{d4}$ = 55.70 |
| $r_9$ = 1.5158(Aspheric) | $d_9$ = 1.5000 | | |
| $r_{10}$ = ∞ | $d_{10}$ = 0.5000 | $n_{d5}$ = 1.51633 | $v_{d5}$ = 64.14 |
| $r_{11}$ = ∞ | $d_{11}$ = 0.4250 | | |
| $r_{12}$ = ∞( Image Plane) | | | |

Aspherical Coefficients
2nd surface

K = −45.2051
$A_4$ = −2.3064 × $10^{-2}$
$A_6$ = −8.3597 × $10^{-3}$
$A_8$ = −6.0780 × $10^{-3}$
$A_{10}$ = 0.0000

3rd surface

K = 0
$A_4$ = −2.3436 × $10^{-2}$
$A_6$ = 1.2593 × $10^{-3}$
$A_8$ = −3.2496 × $10^{-4}$
$A_{10}$ = 0.0000

4th surface

K = 0.2908
$A_4$ = −1.5249 × $10^{-2}$
$A_6$ = 2.3548 × $10^{-2}$
$A_8$ = 2.2143 × $10^{-3}$
$A_{10}$ = 0.0000

5th surface

K = 0
$A_4$ = 6.8533 × $10^{-3}$
$A_6$ = −3.3852 × $10^{-3}$
$A_8$ = −1.4124 × $10^{-3}$
$A_{10}$ = 0.0000

6th surface

K = −14.2402
$A_4$ = 1.3445 × $10^{-2}$
$A_6$ = −2.4238 × $10^{-3}$
$A_8$ = −1.3253 × $10^{-3}$
$A_{10}$ = 0.0000

7th surface

K = −1.5908
$A_4$ = 2.1994 × $10^{-3}$
$A_6$ = −2.3496 × $10^{-3}$
$A_8$ = 1.5856 × $10^{-3}$
$A_{10}$ = 0.0000

8th surface

K = −3.1048
$A_4$ = −1.2865 × $10^{-2}$
$A_6$ = −1.4132 × $10^{-3}$
$A_8$ = 4.4014 × $10^{-4}$
$A_{10}$ = −2.1379 × $10^{-5}$

-continued

9th surface

K = −3.2141
$A_4 = -1.4652 \times 10^{-2}$
$A_6 = -2.8983 \times 10^{-4}$
$A_8 = 1.0829 \times 10^{-4}$
$A_{10} = 0.0000$

EXAMPLE 9

| | | | |
|---|---|---|---|
| $r_1 = \infty$(Stop) | $d_1 = 0.1500$ | | |
| $r_2 = 4.6785$(Aspheric) | $d_2 = 1.2146$ | $n_{d1} = 1.52542$ | $v_{d1} = 55.70$ |
| $r_3 = -1.8093$(Aspheric) | $d_3 = 0.3661$ | | |
| $r_4 = -1.2152$(Aspheric) | $d_4 = 0.6000$ | $n_{d2} = 1.58423$ | $v_{d2} = 30.40$ |
| $r_5 = -16.4106$(Aspheric) | $d_5 = 0.2000$ | | |
| $r_6 = 12.9431$(Aspheric) | $d_6 = 0.8500$ | $n_{d3} = 1.52542$ | $v_{d3} = 55.70$ |
| $r_7 = -3.6410$(Aspheric) | $d_7 = 0.6191$ | | |
| $r_8 = 1.6611$(Aspheric) | $d_8 = 0.8002$ | $n_{d4} = 1.52542$ | $v_{d4} = 55.70$ |
| $r_9 = 1.4790$(Aspheric) | $d_9 = 1.5000$ | | |
| $r_{10} = \infty$ | $d_{10} = 0.5000$ | $n_{d5} = 1.51633$ | $v_{d5} = 64.14$ |
| $r_{11} = \infty$ | $d_{11} = 0.2000$ | | |
| $r_{12} = \infty$(Image Plane) | | | |

Aspherical Coefficients
2nd surface

K = −34.3369
$A_4 = 5.6088 \times 10^{-3}$
$A_6 = -2.6842 \times 10^{-2}$
$A_8 = -1.7679 \times 10^{-2}$
$A_{10} = 0.0000$ 3rd surface K = 0
$A_4 = -1.5983 \times 10^{-2}$
$A_6 = -4.1736 \times 10^{-3}$
$A_8 = -4.6832 \times 10^{-3}$
$A_{10} = 0.0000$ 4th surface K = −1.0931
$A_4 = 4.1808 \times 10^{-2}$
$A_6 = -2.4778 \times 10^{-2}$
$A_8 = 1.3685 \times 10^{-2}$
$A_{10} = 0.0000$ 5th surface K = 0
$A_4 = 2.0876 \times 10^{-2}$
$A_6 = -1.7603 \times 10^{-2}$
$A_8 = 3.3464 \times 10^{-3}$
$A_{10} = 0.0000$ 6th surface K = 0
$A_4 = 1.3357 \times 10^{-2}$
$A_6 = -1.6133 \times 10^{-3}$
$A_8 = -8.3914 \times 10^{-4}$
$A_{10} = 0.0000$ 7th surface K = −1.8196
$A_4 = -4.1349 \times 10^{-3}$
$A_6 = 2.0140 \times 10^{-2}$
$A_8 = -3.1065 \times 10^{-3}$
$A_{10} = 0.0000$ 8th surface K = −3.1182
$A_4 = -1.4085 \times 10^{-2}$
$A_6 = -2.3590 \times 10^{-3}$
$A_8 = 8.4456 \times 10^{-4}$
$A_{10} = -5.4657 \times 10^{-5}$ -continued 9th surface K = −2.2781
$A_4 = -2.4102 \times 10^{-2}$
$A_6 = 1.5211 \times 10^{-3}$
$A_8 = 1.6645 \times 10^{-5}$
$A_{10} = 0.0000$ FIGS. 45–53 are aberration diagrams for Examples 1–9 of the third aspect of the invention upon focused at infinity. In these figures, "SA", "AS", "DT", "CC" and "ω" represent spherical aberrations, astigmatism, distortion, chromatic aberration of magnification and a half angle of view, respectively.

The values of conditions (41)–(54) in each of Examples 1–9 are enumerated below.

| Conditions | Example 1 | Example 2 | Example 3 | Example 4 | Example 5 |
|---|---|---|---|---|---|
| (41) | 1.54 | 1.10 | 1.39 | 0.97 | 1.34 |
| (42) | −1.35 | −0.63 | −1.23 | −0.63 | −0.97 |
| (43) (46) | 8.79 | −3.90 | −48.69 | −2.53 | −14.80 |
| (44) | 2.17 | 1.79 | 2.55 | 2.11 | 2.17 |
| (45) | 0.12 | −0.37 | −0.05 | −0.54 | −0.14 |
| (47) | 2.61 | 3.87 | 2.29 | 3.18 | 3.10 |
| (48) | 0.71 | 0.61 | 0.55 | 0.46 | 0.62 |
| (49) | 0.87 | 0.74 | 0.69 | 0.59 | 0.77 |
| (50) | −0.66 | −0.51 | −0.30 | 0.07 | 0.51 |
| (51) | 24.99° | 24.75° | 27.00° | 29.00° | 35.77° |
| (52) | 1.603 | 1.583 | 1.525 | 1.525 | 1.525 |
| (53) (54) | — | — | 8.56 | 5.04 | 0.85 |
| | — | — | 7.97 | — | — |
| | 0.11 | 9.56 | 1.17 | 3.06 | 0.06 |
| | 0.90 | 4.57 | — | — | — |
| | 2.13 | 0.21 | 1.53 | 0.62 | 1.23 |
| | 1.44 | 1.84 | 1.67 | 1.61 | 8.47 |
| | 2.19 | 2.57 | 2.68 | 2.72 | 3.53 |
| | 1.86 | 2.14 | 2.36 | 2.48 | 3.22 |

| Conditions | Example 6 | Example 7 | Example 8 | Example 9 | ° |
|---|---|---|---|---|---|
| (41) | 1.25 | 1.25 | 1.13 | 0.85 | |
| (42) | −1.04 | −0.82 | −0.85 | −0.49 | |
| (43) (46) | −7.84 | −7.00 | −13.23 | −1.84 | |
| (44) | 2.71 | 1.87 | 2.31 | 1.75 | |
| (45) | −0.21 | −0.19 | −0.17 | −0.81 | |
| (47) | 2.13 | 3.88 | 2.48 | 6.51 | |
| (48) | 0.46 | 0.67 | 0.49 | 0.48 | |
| (49) | 0.60 | 0.81 | 0.64 | 0.62 | |
| (50) | −0.01 | 0.06 | 0.58 | 0.44 | |
| (51) | 28.00° | 28.00° | 19.97° | 26.98° | |
| (52) | 1.525 | 1.525 | 1.513 | 1.525 | |
| (53) (54) | 4.94 | 7.18 | 1.48 | 1.41 | |
| | — | 16.91 | 13.31 | 12.78 | |
| | 0.33 | 1.38 | 5.30 | 3.85 | |
| | — | 5.09 | 0.65 | 2.92 | |
| | 0.99 | 0.07 | 3.60 | 2.34 | |
| | 2.57 | 1.83 | 2.48 | 1.41 | |
| | 2.57 | 2.39 | 2.46 | 2.56 | |
| | 2.40 | 2.26 | 2.08 | 2.32 | |

It is noted that the values of conditions (53) and (54) are those for, in order from above, the object and image sides of the first positive lens, the object and image sides of the second negative lens, the object and image side of the third positive lens, and the object and image sides of the fourth positive lens, respectively.

In each example according to the second aspect of the invention, too, the maximum image height Ih on the image plane is defined by ½ of the diagonal length L of the (substantially rectangular) effective area of the image pickup device, as explained with reference to FIGS. 17 and 18. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area. For details, see the explanation of the first aspect of the invention.

In Examples 1–4 and 6–9 according to the third aspect of the invention, the cover glass may be located just before the aperture stop S.

Throughout the above examples of the third aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1–4 and 6–9, that flare stop may be interposed at any desired position between the aperture stop S and the first lens L1, the first lens L1 and the second lens L2, the second lens L2 and the third lens L3, the third lens L3 and the fourth lens L4, and the fourth lens L4 and the image plane I, and in Example 5, it may be interposed at any desired position between the first lens L1 and the aperture stop S, the aperture stop S and the second lens L2, the second lens L2 and the third lens L3, the third lens L3 and the fourth lens L4, and the fourth lens L4 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

The imaging system of the invention constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones.

Figure 54:
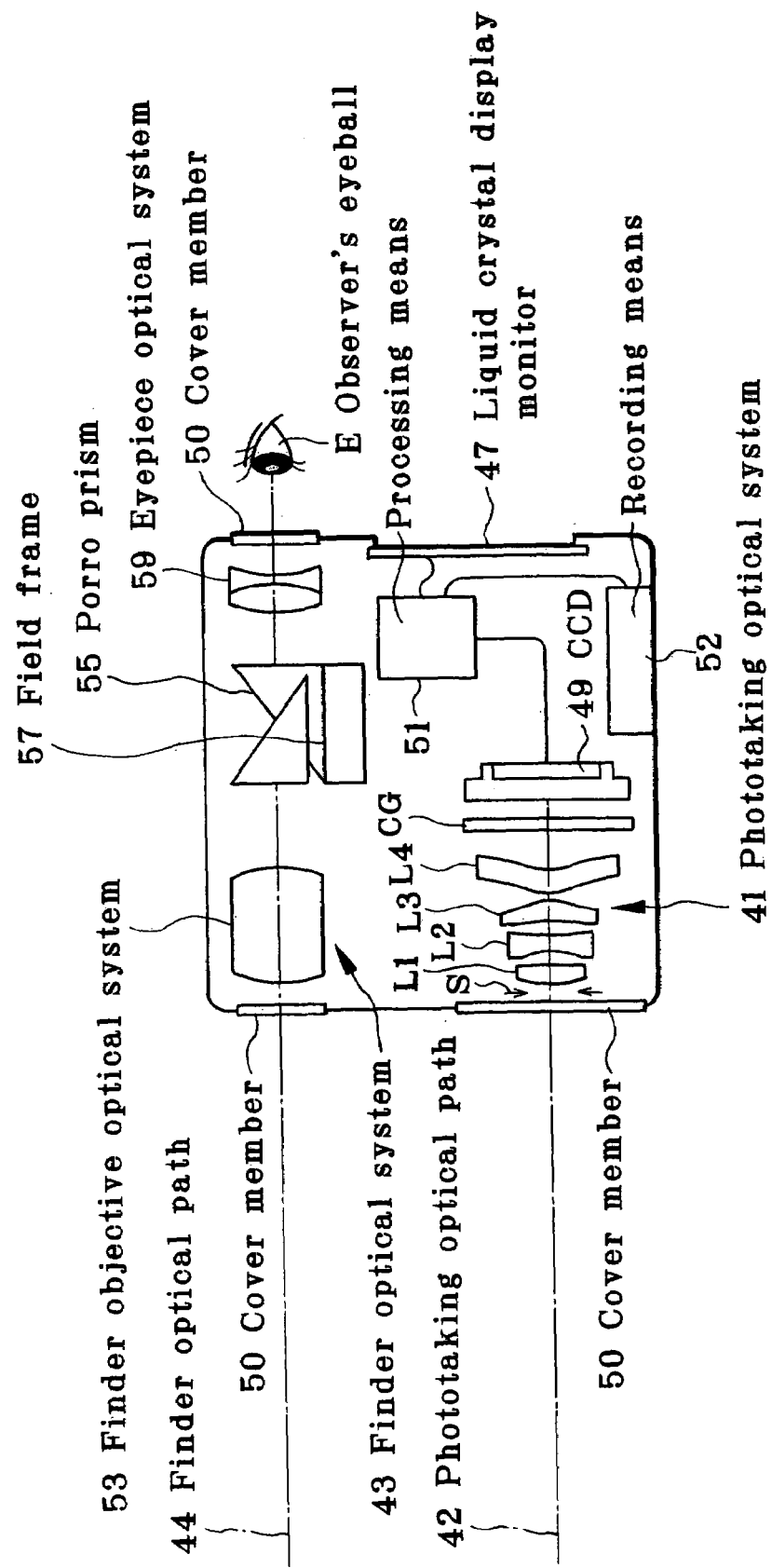
FIG. 54 is illustrative in section of a digital camera in which the image-formation optical system according to any one of the third to fifth aspects of the invention is built.
Figure 55:
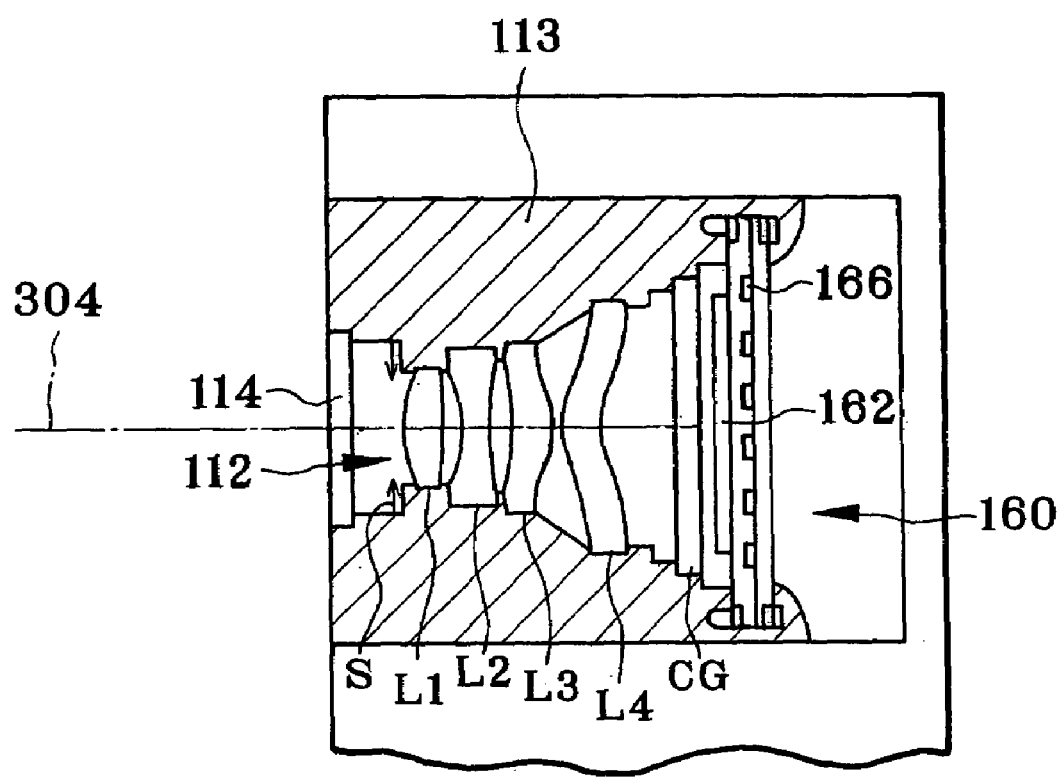
FIG. 55 is illustrative in section of a phototaking optical system in a personal computer in which the image-formation optical system according to any one of the third to fifth aspects of the invention is built.
Figure 56A:
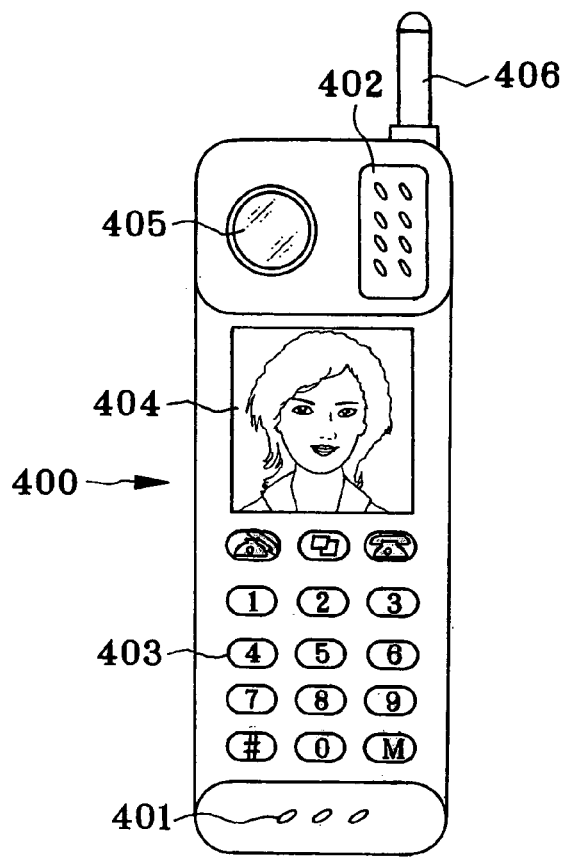
FIGS. 56(*a*) and 56(*b*) are a front and a side view of a cellular phone in which the image-formation optical system according to any one of the third to fifth aspects of the invention is built in the form of an objective optical system, and FIG. 56(*c*) is illustrative in section of a phototaking optical system therein.
Figure 56B:
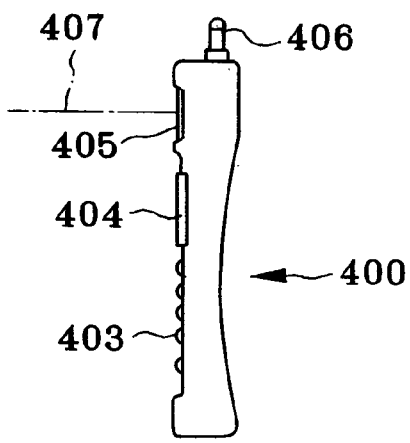
Figure 56C:
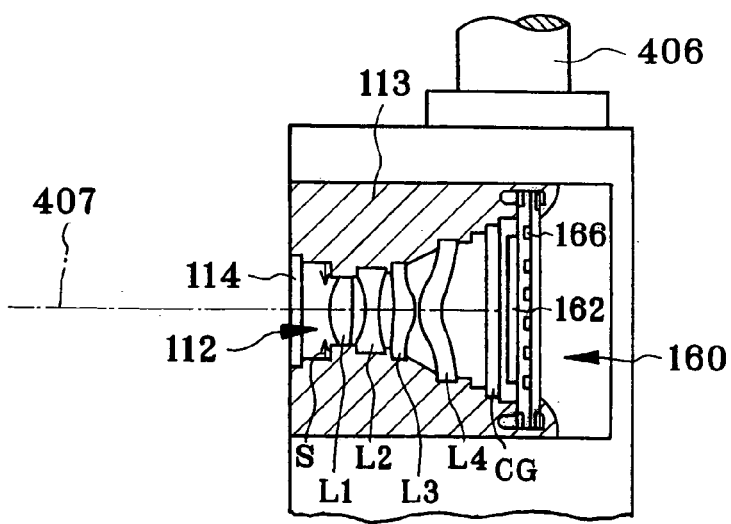

What has been explained with reference to the digital camera of FIGS. 19–21, the personal computer of FIGS. 22–24 and the cellular phone of FIG. 25 according to the first aspect of the invention holds true for the image-formation optical system and the imaging system according to the third aspect of the invention. For details, see the explanation of the first aspect of the invention. However, it is noted that the image-formation optical system of Example 1 according to the third aspect of the invention is used as the optical system 41, 112 in the digital camera as shown in FIG. 54 in place of FIG. 21, in the personal computer as shown in FIG. 55 in place of FIG. 23, and in the case of the cellular phone as shown in FIG. 56 in place of FIG. 25.

It is also noted that each example may be modified in various forms within the scope of what is claimed.

The image-formation optical system according to the third aspect of the invention and the imaging system incorporating the same, for instance, may be embodied as follows.

(1) An imaging system comprising an image-formation optical system and an image pickup device located on an image side thereof, characterized in that:

said image-formation optical system comprises, in order from an object side thereof, a first positive lens of double-convex shape, a second negative lens, a third positive lens and a fourth positive lens of meniscus shape, and satisfies the following condition:

$$0.5 < f_1/Ih < 1.8 \quad (41)$$

where $f_1$ is the focal length of the first positive lens, and Ih is the maximum image height of the image-formation optical system.

(2) An image-formation optical system, characterized by comprising, in order from an object side thereof, a first positive lens of double-convex shape, a second negative lens, a third positive lens and a fourth positive lens, and satisfying the following condition:

$$-2.0 < f_2/f < -0.65 \quad (42)$$

where $f_2$ is the focal length of the second negative lens, and f is the focal length of the image-formation optical system.

(3) An imaging system comprising an image-formation optical system and an image pickup device located on an image side thereof, characterized in that:

said image-formation optical system is an image-formation optical system as recited in (2) above.

(4) An imaging system comprising an image-formation optical system and an image pickup device located on an image side thereof, characterized in that:

said image-formation optical system comprises, in order from an object side thereof, a first positive lens of double-convex shape, a second negative lens, a third positive lens and a fourth positive lens, and satisfies the following condition:

$$-18 < f_{234}/Ih < -0.5 \quad (43)$$

where $f_{234}$ is the composite focal length of the second negative lens, the third positive lens and the fourth positive lens, and Ih is the maximum image height of the image-formation optical system.

(5) An imaging system comprising an image-formation optical system and an image pickup device located on an image side thereof, characterized in that:

said image-formation optical system comprises, in order from an object side thereof, a first positive lens of double-convex shape, a second negative lens, a third positive lens and a fourth positive lens, with an aperture stop located on an object side of the first positive lens, and satisfying the following condition:

$$1.0 < f_3/Ih < 2.7 \quad (44)$$

where $f_3$ is the focal length of the third positive lens, and Ih is the maximum image height of the image-formation optical system.

(6) An image-formation optical system, characterized by comprising, in order from an object side thereof, a first positive lens of double-convex shape, a second negative lens, a third positive lens and a fourth positive lens, with an aperture stop located on an object side of the first positive lens, and satisfying the following condition:

$$-0.6 < f/f_{23} < 0.15 \quad (45)$$

where $f_{23}$ is the composite focal length of the second negative lens and the third positive lens, and f is the focal length of the image-formation optical system.

(7) An imaging system comprising an image-formation optical system and an image pickup device located on an image side thereof, characterized in that:

said image-formation optical system is an image-formation optical system as recited in (6) above.

(8) The imaging system according to any one of (1), (3), (4), (5) and (7) above, characterized in that:

said second negative lens is of double-concave shape.

(9) The imaging system according to any one of (1), (3), (4), (5) and (7) above, characterized in that:

said third positive lens is of double-convex shape.

(10) The imaging system according to any one of (1), (3), (4), (5) and (7) above, characterized in that:

said third positive lens is of a meniscus shape convex on an image side thereof.

(11) The imaging system according to any one of (1), (3), (4), (5) and (7) above, characterized in that:

the composite refracting power of the first positive lens and the second negative lens is positive.

(12) The imaging system according to any one of (1), (3), (4), (5) and (7) above, characterized in that:

the composite refracting power of the second negative lens, the third positive lens and the fourth positive lens is negative.

(13) The imaging system according to any one of (1), (3), (5) and (7), characterized by satisfying the following condition:

$$-100 < f_{234}/Ih < -0.5 \quad (46)$$

where $f_{234}$ is the composite focal length of the second negative lens, the third positive lens and the fourth positive lens, and Ih is the maximum image height of the image-formation optical system.

(14) The imaging system according to any one of (1), (3) and (4) above, characterized in that:

an aperture stop is located on the object side of the first positive lens.

(15) The imaging system according to any one of (1), (3) and (4) above, characterized in that:

an aperture stop is interposed between the first positive lens and the second negative lens.

(16) The imaging system according to any one of (1), (3), (4), (5) and (7) above, characterized by satisfying the following condition:

$$0.5 < f_{12}/f < 30 \quad (47)$$

where $f_{12}$ is the composite focal length of the first positive lens and the second negative lens, and f is the focal length of the image-formation optical system.

(17) The imaging system according to any one of (1), (3), (4), (5) and (7) above, characterized by satisfying the following condition:

$$0.4 < f_1/f_3 < 0.9 \quad (48)$$

where $f_1$ is the focal length of the first positive lens, and $f_3$ is the focal length of the third positive lens.

(18) The imaging system according to any one of (1), (3), (4), (5) and (7) above, characterized by satisfying the following condition:

$$0.3 < f_1/f_{34} < 0.9 \quad (49)$$

where $f_1$ is the focal length of the first positive lens, and $f_{34}$ is the composite focal length of the third positive lens and the fourth positive lens.

(19) The imaging system according to any one of (1), (3), (4), (5) and (7) above, characterized by satisfying the following condition:

$$-0.9 < (r_{1f} + r_{1r})/(r_{1f} - r_{1r}) < 0.5 \quad (50)$$

where $r_{1f}$ is the axial radius of curvature of the object side-surface of the first positive lens, and $r_{1r}$ is the axial radius of curvature of the image side-surface of the first positive lens.

(20) The imaging system according to any one of (1), (3), (4), (5) and (7) above, characterized by satisfying the following condition:

$$15° < \alpha < 40° \quad (51)$$

where $\alpha$ is the angle of incidence of a chief ray on the image plane at the maximum image height.

(21) The imaging system according to any one of (1), (3), (4), (5) and (7) above, characterized by satisfying the following condition:

$$1.4 < n_1 < 1.7 \quad (52)$$

where $n_1$ is the refractive index of the first positive lens.

(22) The imaging system according to any one of (1), (3), (4), (5) and (7) above, characterized by comprising at least one aspheric surface that satisfies the following condition:

$$0.01 < |(r_{sp} + r_{asp})/(r_{sp} - r_{asp}) - 1| < 100 \quad (53)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(23) The imaging system according to (22) above, characterized in that said aspheric surface is located at the second negative lens.

(24) The imaging system according to (22) above, characterized in that said aspheric surface is located at the third positive lens.

(25) The imaging system according to (22) above, characterized in that said aspheric surface is located at (26) The imaging system according to any one of (1), (3), (4), (5) and (7), characterized in that the first positive lens in said image-formation optical system comprises at least one aspheric surface that satisfies the following condition:

$$0.1 < |(r_{sp} + r_{asp})/(r_{sp} - r_{asp}) - 1| < 20 \quad (54)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(27) An image-formation optical system, characterized by comprising, in order from an object side thereof, an aperture stop, a first positive lens, a second negative lens, a third positive lens and a fourth positive lens, wherein an aspheric surface is used at the first positive lens.

(28) An image-formation optical system, characterized by comprising, in order from an object side thereof, a first positive lens, a second negative meniscus lens convex on an object side thereof, a third positive meniscus lens convex on an image side thereof and a fourth positive lens.

(29) An image-formation optical system, characterized by comprising, in order from an object side thereof, a first positive lens, a second negative meniscus lens convex on an object side thereof, a third positive lens of double-convex shape and a fourth positive lens.

(30) An image-formation optical system, characterized by comprising, in order from an object side thereof, a first positive lens, a second negative meniscus lens convex on an image side thereof, a third positive meniscus lens convex on an image side thereof and a fourth positive lens, wherein the composite power of the second negative lens, the third positive lens and the fourth positive lens is negative.

(31) An image-formation optical system, characterized by comprising, in order from an object side thereof, a first positive lens, a second negative meniscus lens convex on an image side thereof, a third positive lens of double-convex shape and a fourth positive lens.

In accordance with the third aspect of the invention as described above, it is possible to provide a small-format yet high-performance image-formation optical system, and a small-format yet high-performance imaging system incorporating the same.

Examples 1 to 4 of the image-formation optical system according to the fourth aspect of the invention are given below. FIGS. 57 to 60 are illustrative in section of the lens arrangements of Examples 1 to 4 upon focused on an object point at infinity. In these figures, S stands for an aperture stop, L1 a first positive lens, L2 a second negative lens, L3 a third positive lens, L4 a fourth positive lens, CG a cover glass for an electronic image pickup device, I an image plane and FS a flare stop. It is noted that the cover glass CG may be provided on its surface with a wavelength range-limiting multilayer film with or without a low-pass filter function.

EXAMPLE 1

Figure 57:
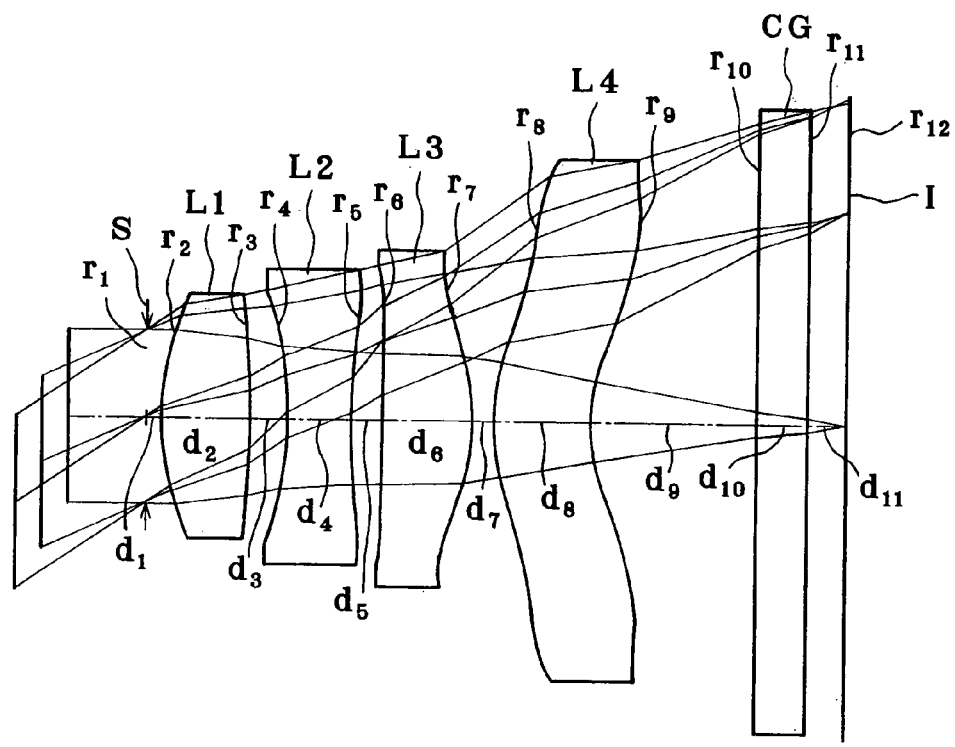
FIG. 57 is a lens arrangement section of Example 1 of the image-formation optical system according to the fourth aspect of the invention upon focused on an object point at infinity.

As shown in FIG. 57, the image-formation optical system of Example 1 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made of Esthylene, and the third and fourth lenses L3 and L4 are each made of an amorphous polyolefin Zeonex (trade name).

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.080 mm for $2^{nd}$ surface $r_2$, 1.179 mm for $3^{rd}$ surface $r_3$, 1.220 mm for $4^{th}$ surface $r_4$, 1.432 mm for $5^{th}$ surface $r_5$, 1.491 mm for $6^{th}$ surface $r_6$, 1.636 mm for $7^{th}$ surface $r_7$, 2.637 mm for $8^{th}$ surface $r_8$ and 2.539 mm for $9^{th}$ surface $r_9$.

EXAMPLE 2

Figure 58:
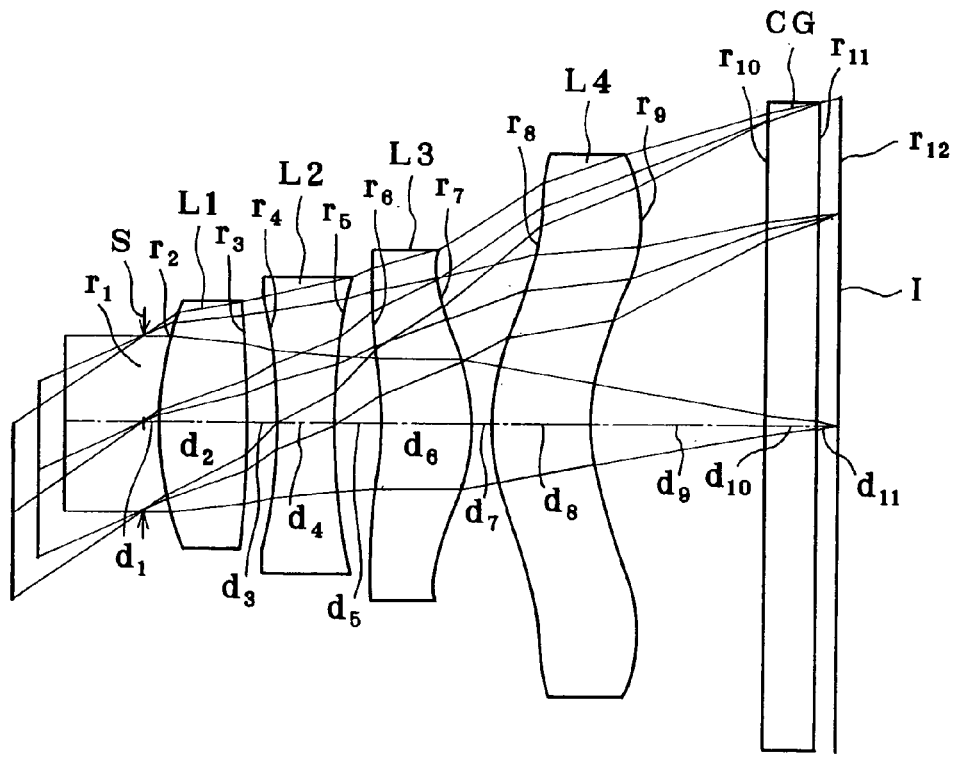
FIG. 58 is a lens arrangement section, similar to FIG. 57, of the image-formation optical system of Example 2.

As shown in FIG. 58, the image-formation optical system of Example 2 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its side, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made up of polycarbonate, and the third and fourth lenses L3 and L4 are each made of an amorphous polyolefin Zeonex.

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.077 mm for $2^{nd}$ surface $r_2$, 1.178 mm for $3^{rd}$ surface $r_3$, 1.227 mm for $4^{th}$ surface $r_4$, 1.426 mm for $5^{th}$ surface $r_5$, 1.522 mm for $6^{th}$ surface $r_6$, 1.686 mm for $7^{th}$ surface $r_7$, 2.353 mm for $8^{th}$ surface $r_8$ and 2.625 mm for $9^{th}$ surface $r_9$.

EXAMPLE 3

Figure 59:
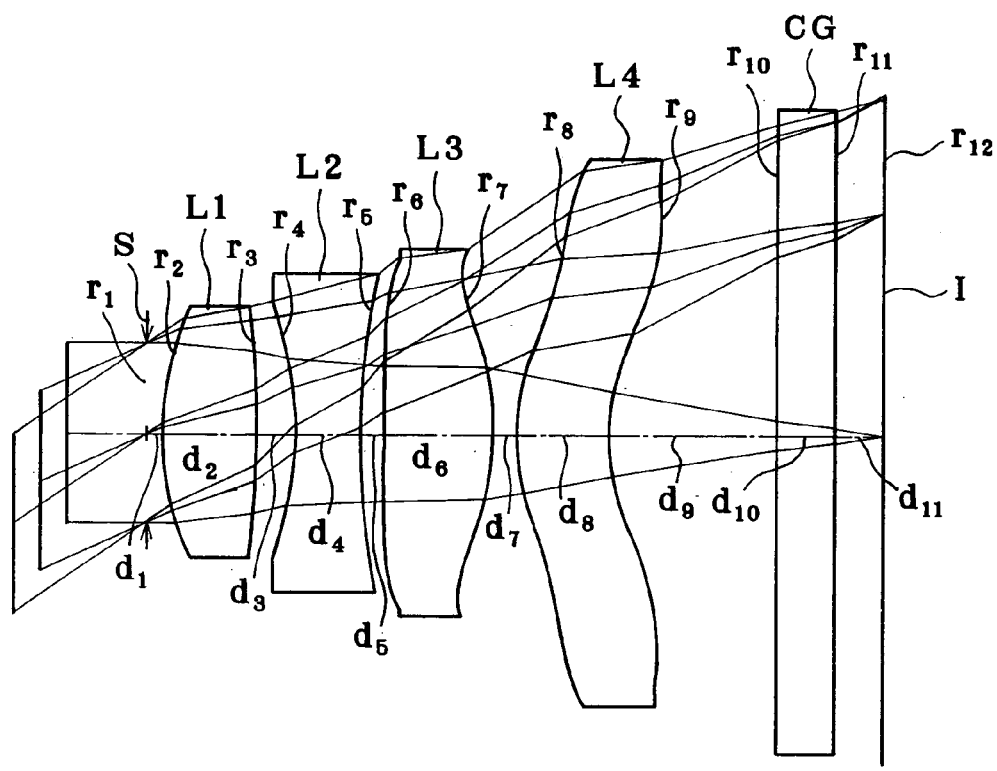
FIG. 59 is a lens arrangement section, similar to FIG. 57, of the image-formation optical system of Example 3.

As shown in FIG. 59, the image-formation optical system of Example 3 is made up of, in order from its object side, an aperture stop S, a first positive lens L1 that has an aspheric surface on its image side and is of double-convex shape, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, the second lens L2 is made of Esthylene, and the third and fourth lenses L3 and L4 are each made of an amorphous polyolefin Zeonex.

The specifications of the wide-angle optical system according to this example are:
a focal length f=4.7 mm,
an image height Ih=3.17 mm, and
a half angle of view ω=34°.

The optically effective diameters of the respective lenses (on one sides) are 1.075 mm for $2^{nd}$ surface $r_2$, 1.180 mm for $3^{rd}$ surface $r_3$, 1.234 mm for $4^{th}$ surface $r_4$, 1.495 mm for $5^{th}$ surface $r_5$, 1.640 mm for $6^{th}$ surface $r_6$, 1.724 mm for $7^{th}$ surface $r_7$, 2.466 mm for $8^{th}$ surface $r_8$ and 2.583 mm for $9^{th}$ surface $r_9$.

EXAMPLE 4

Figure 60:
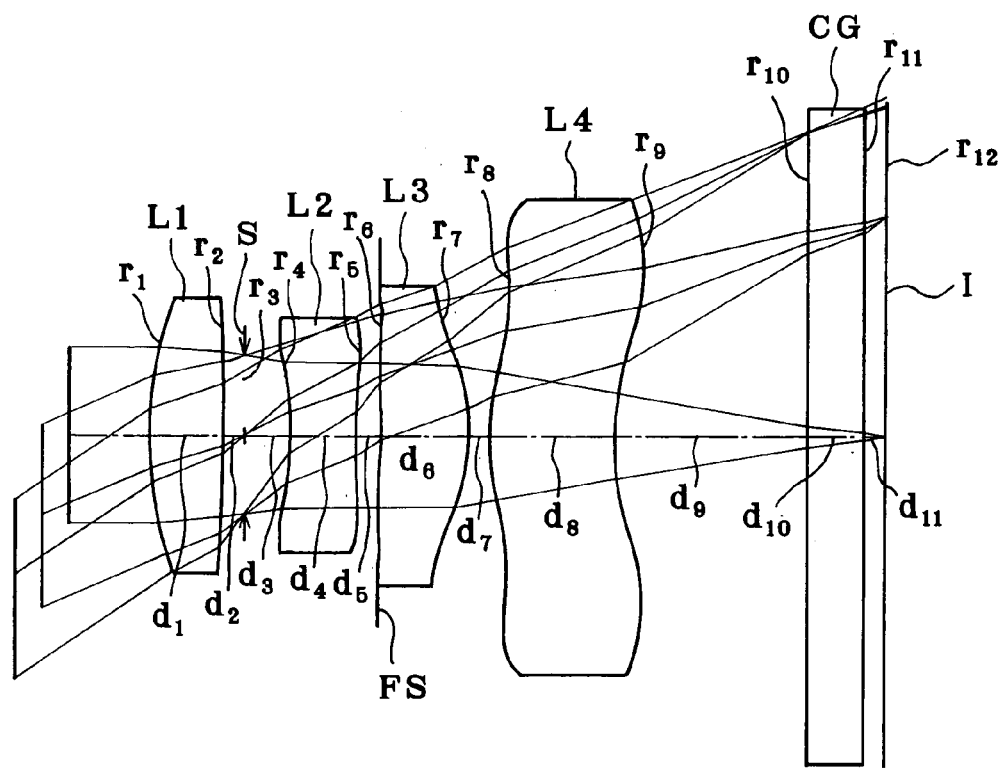
FIG. 60 is a lens arrangement section, similar to FIG. 57, of the image-formation optical system of Example 4.
Figure 61:
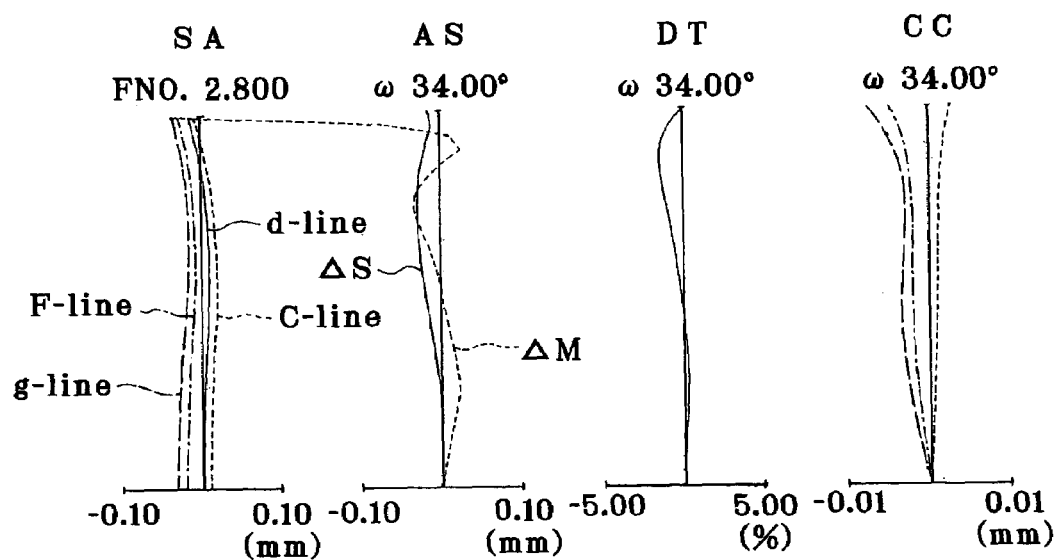
FIG. 61 is an aberration diagram for Example 1 upon focused on an object point at infinity.
Figure 62:
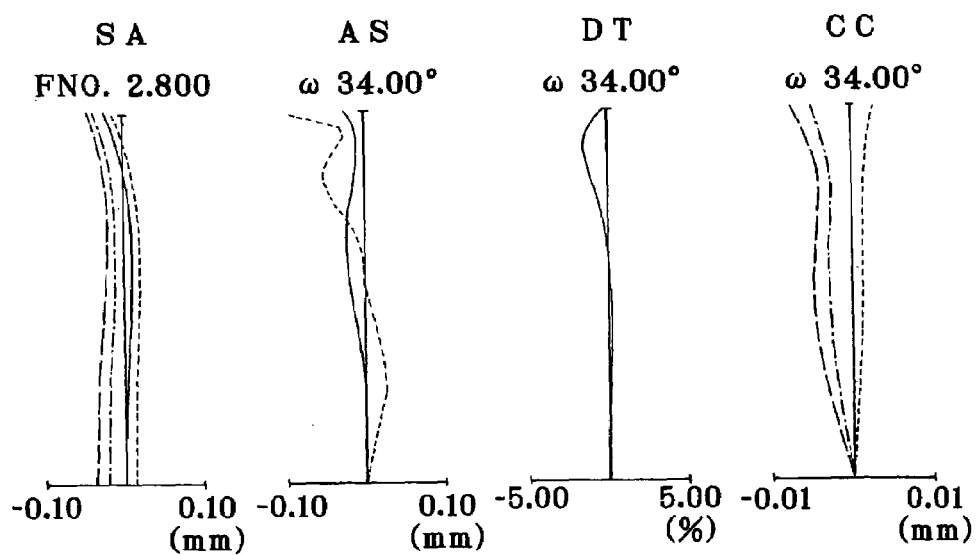
FIG. 62 is an aberration diagram for Example 2 upon focused on an object point at infinity.
Figure 63:
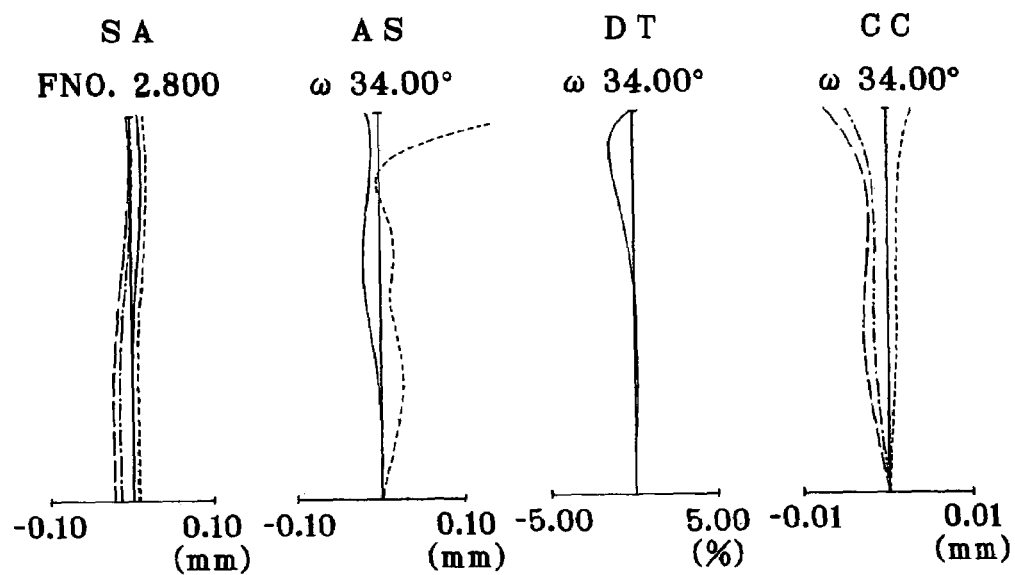
FIG. 63 is an aberration diagram for Example 3 upon focused on an object point at infinity.
Figure 64:
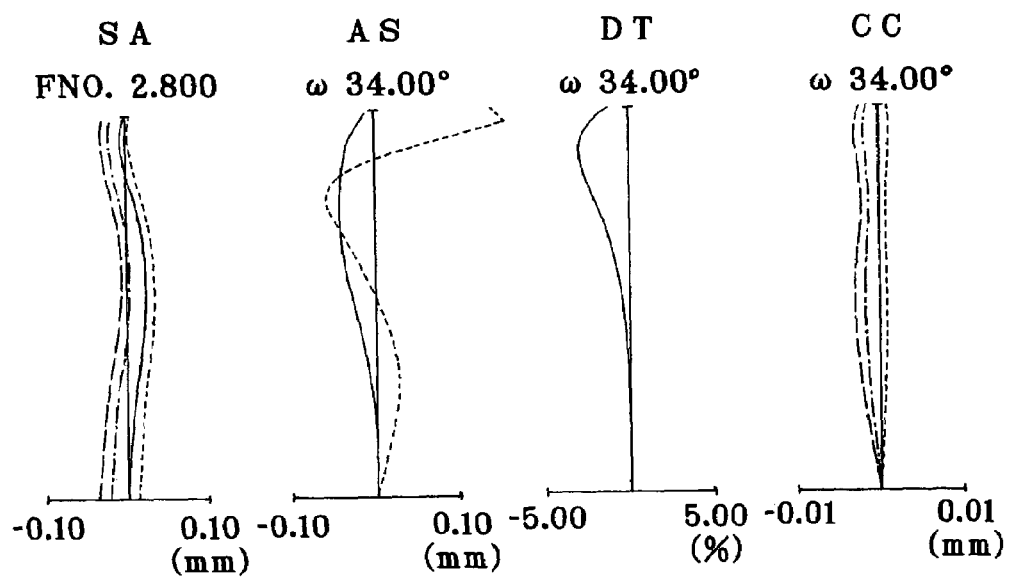
FIG. 64 is an aberration diagram for Example 4 upon focused on an object point at infinity.

As shown in FIG. 60, the image-formation optical system of Example 4 is made up of, in order from its object side, a first positive lens L1 of double-convex shape, an aperture stop S, a second negative lens L2 that is of double-concave shape and has aspheric surfaces on both its sides, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made up of polycarbonate, and the third and fourth lenses L3 and L4 are each made of an amorphous polyolefin Zeonex.

The specifications of the wide-angle optical system according to this example are:

a focal length f=4.7 mm, an image height Ih=3.17 mm, and a half angle of view ω=34°.

The optically effective diameters of the respective lenses (on one sides) are 1.302 mm for $1^{st}$ surface $r_1$, 1.057 mm for $2^{nd}$ surface $r_2$, 0.854 mm for $4^{th}$ surface $r_4$, 1.115 mm for $5^{th}$ surface $r_5$, 1.25 mm for $6^{th}$ surface $r_6$, 1.422 mm for $7^{th}$ surface $r_7$, 1.805 mm for $8^{th}$ surface $r_8$ and 2.253 mm for $9^{th}$ surface $r_9$.

In instant example, a flare stop FS for cutting off off-axis light beams is located halfway between the second lens L2 and the third lens L3.

The numerical data on each example are given below. Symbols used hereinafter but not hereinbefore have the following meanings:

$r_1, r_2, \ldots$ : radius of curvature of each lens surface, $d_1, d_2, \ldots$ : spacing between adjacent lens surfaces, $n_{d1}, n_{d2}, \ldots$ : d-line refractive index of each lens, and $v_{d1}, v_{d2}, \ldots$ : Abbe number of each lens. It is noted that aspheric shape is given by the aforesaid equation (a).

EXAMPLE 1

$r_1 = \infty$(Stop)          $d_1 = 0.1500$
$r_2 = 2.9186$              $d_2 = 0.8621$     $n_{d1} = 1.60311$   $v_{d1} = 60.64$
$r_3 = -12.7072$            $d_3 = 0.3557$
$r_4 = -4.2153$(Aspheric)   $d_4 = 0.6000$     $n_{d2} = 1.57268$   $v_{d2} = 33.51$
$r_5 = 5.7138$(Aspheric)    $d_5 = 0.2967$
$r_6 = -6.1337$(Aspheric)   $d_6 = 0.8514$     $n_{d3} = 1.50913$   $v_{d3} = 56.20$
$r_7 = -2.1486$(Aspheric)   $d_7 = 0.2000$
$r_8 = 1.9900$(Aspheric)    $d_8 = 0.9374$     $n_{d4} = 1.50913$   $v_{d4} = 56.20$
$r_9 = 1.7071$(Aspheric)    $d_9 = 1.5351$
$r_{10} = \infty$           $d_{10} = 0.5000$  $n_{d5} = 1.51633$   $v_{d5} = 64.14$
$r_{11} = \infty$           $d_{11} = 0.3453$
$r_{12} = \infty$(Image Plane)
Aspherical Coefficients
4th surface $K = 8.9870$
$A_4 = -2.7536 \times 10^{-2}$
$A_6 = 4.2600 \times 10^{-2}$
$A_8 = -2.8061 \times 10^{-2}$
$A_{10} = 1.3592 \times 10^{-2}$ -continued 5th surface $K = -83.8153$
$A_4 = 3.9328 \times 10^{-2}$
$A_6 = -3.9784 \times 10^{-2}$
$A_8 = 7.1802 \times 10^{-3}$
$A_{10} = 0.0000$ 6th surface $K = 7.4795$
$A_4 = 1.2216 \times 10^{-1}$
$A_6 = -6.2283 \times 10^{-2}$
$A_8 = 1.0173 \times 10^{-2}$
$A_{10} = 0.0000$ 7th surface $K = -2.4784$
$A_4 = 3.1637 \times 10^{-2}$
$A_6 = -1.0931 \times 10^{-2}$
$A_8 = 2.7926 \times 10^{-3}$
$A_{10} = 5.1589 \times 10^{-4}$ 8th surface $K = -2.1822$
$A_4 = -3.5837 \times 10^{-2}$
$A_6 = -1.5145 \times 10^{-3}$
$A_8 = 1.4274 \times 10^{-3}$
$A_{10} = -1.0646 \times 10^{-4}$ 9th surface $K = -3.3940$
$A_4 = -2.9231 \times 10^{-2}$
$A_6 = 2.6368 \times 10^{-3}$
$A_8 = -3.0961 \times 10^{-4}$
$A_{10} = 3.1131 \times 10^{-5}$

EXAMPLE 2

$r_1 = \infty$(Stop)           $d_1 = 0.1500$
$r_2 = 2.9693$               $d_2 = 0.8432$     $n_{d1} = 1.60311$   $v_{d1} = 60.64$
$r_3 = -16.8640$             $d_3 = 0.2987$
$r_4 = -8.5522$(Aspheric)    $d_4 = 0.6000$     $n_{d2} = 1.58423$   $v_{d2} = 30.40$
$r_5 = 6.3335$(Aspheric)     $d_5 = 0.4281$
$r_6 = -2.8020$(Aspheric)    $d_6 = 0.8500$     $n_{d3} = 1.52542$   $v_{d3} = 55.70$
$r_7 = -1.8737$(Aspheric)    $d_7 = 0.2000$
$r_8 = 2.0672$(Aspheric)     $d_8 = 0.9400$     $n_{d4} = 1.52542$   $v_{d4} = 55.70$
$r_9 = 1.7549$(Aspheric)     $d_9 = 1.6712$
$r_{10} = \infty$            $d_{10} = 0.5000$  $n_{d5} = 1.51633$   $v_{d5} = 64.14$
$r_{11} = \infty$            $d_{11} = 0.2000$
$r_{12} = \infty$(Image Plane)
Aspherical Coefficients
4th surface $K = 9.8341$
$A_4 = -1.9352 \times 10^{-2}$
$A_6 = -7.6597 \times 10^{-3}$
$A_8 = 1.1751 \times 10^{-2}$
$A_{10} = -3.0200 \times 10^{-3}$ 5th surface $K = 5.6454$
$A_4 = 7.6981 \times 10^{-3}$
$A_6 = -1.2103 \times 10^{-2}$
$A_8 = 1.7503 \times 10^{-3}$
$A_{10} = 0.0000$ 6th surface $K = -0.3129$
$A_4 = 1.2046 \times 10^{-1}$
$A_6 = -3.0250 \times 10^{-2}$
$A_8 = 2.8452 \times 10^{-3}$
$A_{10} = 0.0000$ -continued 7th surface K = −2.8080
$A_4 = 1.7112 \times 10^{-2}$
$A_6 = 2.8871 \times 10^{-3}$
$A_8 = 8.4790 \times 10^{-4}$
$A_{10} = -2.1154 \times 10^{-5}$ 8th surface K = −3.4710
$A_4 = -7.7556 \times 10^{-3}$
$A_6 = -2.8970 \times 10^{-3}$
$A_8 = 3.6257 \times 10^{-4}$
$A_{10} = 0.0000$ 9th surface K = −4.4996
$A_4 = -7.7876 \times 10^{-3}$
$A_6 = -2.0916 \times 10^{-3}$
$A_8 = 1.6683 \times 10^{-4}$
$A_{10} = 0.0000$

EXAMPLE 3

| | | | |
|---|---|---|---|
| $r_1 = \infty$(Stop) | $d_1 = 0.1500$ | | |
| $r_2 = 2.9914$ | $d_2 = 0.8699$ | $n_{d1} = 1.60311$ | $\nu_{d1} = 60.64$ |
| $r_3 = -9.5883$(Aspheric) | $d_3 = 0.3684$ | | |
| $r_4 = -3.2245$(Aspheric) | $d_4 = 0.6000$ | $n_{d2} = 1.57268$ | $\nu_{d2} = 33.51$ |
| $r_5 = 5.3819$(Aspheric) | $d_5 = 0.2148$ | | |
| $r_6 = -24.3563$(Aspheric) | $d_6 = 1.0248$ | $n_{d3} = 1.50913$ | $\nu_{d3} = 56.20$ |
| $r_7 = -2.4488$(Aspheric) | $d_7 = 0.2000$ | | |
| $r_8 = 1.8353$(Aspheric) | $d_8 = 0.8520$ | $n_{d4} = 1.50913$ | $\nu_{d4} = 56.20$ |
| $r_9 = 1.6319$(Aspheric) | $d_9 = 1.5351$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.4315$ | | |
| $r_{12} = \infty$(Image Plane) | | | |

Aspherical Coefficients
3rd surface

K = 0
$A_4 = -3.3473 \times 10^{-4}$
$A_6 = 5.5328 \times 10^{-3}$
$A_8 = 1.1133 \times 10^{-3}$
$A_{10} = 0.0000$ 4th surface K = 4.6682
$A_4 = -1.8046 \times 10^{-2}$
$A_6 = 5.9706 \times 10^{-2}$
$A_8 = -2.3485 \times 10^{-2}$
$A_{10} = 8.8554 \times 10^{-3}$ 5th surface K = −88.8288
$A_4 = 2.3469 \times 10^{-2}$
$A_6 = -1.5225 \times 10^{-2}$
$A_8 = 3.8980 \times 10^{-3}$
$A_{10} = 0.0000$ 6th surface K = 192.4597
$A_4 = 5.8402 \times 10^{-2}$
$A_6 = -2.8706 \times 10^{-2}$
$A_8 = 6.8722 \times 10^{-3}$
$A_{10} = 0.0000$ 7th surface K = −0.8885
$A_4 = 2.1238 \times 10^{-2}$
$A_6 = -3.9995 \times 10^{-3}$
$A_8 = 2.8581 \times 10^{-3}$
$A_{10} = 1.1619 \times 10^{-4}$ -continued 8th surface K = −2.9206
$A_4 = -2.1761 \times 10^{-2}$
$A_6 = -3.3999 \times 10^{-3}$
$A_8 = 1.2756 \times 10^{-3}$
$A_{10} = -7.8141 \times 10^{-5}$ 9th surface K = −2.3084
$A_4 = -3.9894 \times 10^{-2}$
$A_6 = 5.3319 \times 10^{-3}$
$A_8 = -6.8344 \times 10^{-4}$
$A_{10} = 5.1655 \times 10^{-5}$

EXAMPLE 4

| | | | |
|---|---|---|---|
| $r_1 = 3.8735$ | $d_1 = 0.6993$ | $n_{d1} = 1.65160$ | $\nu_{d1} = 58.55$ |
| $r_2 = -30.6267$ | $d_2 = 0.2000$ | | |
| $r_3 = \infty$(Stop) | $d_3 = 0.4494$ | | |
| $r_4 = -4.3919$(Aspheric) | $d_4 = 0.6000$ | $n_{d2} = 1.58423$ | $\nu_{d2} = 30.40$ |
| $r_5 = 13.8400$(Aspheric) | $d_5 = 0.2291$ | | |
| $r_6 = -6.2424$(Aspheric) | $d_6 = 0.8024$ | $n_{d3} = 1.52542$ | $\nu_{d3} = 55.70$ |
| $r_7 = -2.1432$(Aspheric) | $d_7 = 0.2020$ | | |
| $r_8 = 2.4555$(Aspheric) | $d_8 = 1.1643$ | $n_{d4} = 1.52542$ | $\nu_{d4} = 55.70$ |
| $r_9 = 2.1552$(Aspheric) | $d_9 = 1.7537$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
4th surface

K = 17.7957
$A_4 = -2.7562 \times 10^{-2}$
$A_6 = 1.8632 \times 10^{-2}$
$A_8 = 5.4170 \times 10^{-3}$
$A_{10} = 0.0000$ 5th surface K = 0
$A_4 = -9.2780 \times 10^{-4}$
$A_6 = -3.2718 \times 10^{-2}$
$A_8 = -6.9954 \times 10^{-3}$
$A_{10} = 0.0000$ 6th surface K = 0
$A_4 = 1.2433 \times 10^{-1}$
$A_6 = -5.8530 \times 10^{-2}$
$A_8 = 6.4773 \times 10^{-3}$
$A_{10} = 0.0000$ 7th surface K = −0.6326
$A_4 = 2.1163 \times 10^{-3}$
$A_6 = 2.2047 \times 10^{-2}$
$A_8 = -4.5548 \times 10^{-4}$
$A_{10} = 0.0000$ 8th surface K = −10.2521
$A_4 = -2.1092 \times 10^{-2}$
$A_6 = -7.1098 \times 10^{-3}$
$A_8 = 1.9136 \times 10^{-3}$
$A_{10} = 0.0000$ 9th surface K = −5.5619
$A_4 = -2.5049 \times 10^{-2}$
$A_6 = -2.2085 \times 10^{-4}$
$A_8 = 1.9480 \times 10^{-4}$
$A_{10} = 0.0000$ FIGS. 61 to 64 are aberration diagrams for Examples 1 to 4 upon focused at infinity. In these figures, "SA", "AS", "DT", "CC" and "ω" represent spherical aberrations, astigmatism, distortion, chromatic aberration of magnification and a half angle of view, respectively.

The values of conditions (61) to (79) in the respective examples are enumerated below.

| Conditions | Example 1 | Example 2 | Example 3 | Example 4 |
|---|---|---|---|---|
| (61) | −0.88 | −1.31 | −0.73 | −1.20 |
| (62) | 42.57 | 127.69 | 14.89 | 21.28 |
| (63) | 3.26 | 1.95 | 5.85 | 4.44 |
| (64) | −0.97 | −0.69 | −1.13 | −0.94 |
| (65) | 1.06 | 1.45 | 0.90 | 0.99 |
| (66) | −0.68 | −0.75 | −0.65 | −0.97 |
| (67) | 1.91 | 2.59 | 1.66 | 1.85 |
| (68) | 4.84 | 2.89 | 8.68 | 6.65 |
| (69) | −14.74 | −151.85 | −14.14 | 6.20 |
| (70) | −0.68 | −0.75 | −0.65 | −0.97 |
| (71) | 1.93 | 3.28 | 1.40 | 2.63 |
| (72) | −0.09 | −0.02 | −0.14 | 0.18 |
| (73) | 0.66 | 0.52 | 0.74 | 0.91 |
| (74) | 25.0° | 21.8° | 24.4° | 27.0° |
| (75) | −0.74 | −1.35 | −0.60 | −0.32 |
| (76) | 2.85 | 1.50 | 9.95 | 2.91 |
| (77)~ | — | — | — | — |
| (79) | — | — | 2.63 | — |
|  | 8.51 | 3.47 | 5.86 | 3.14 |
|  | 1.24 | 3.88 | 5.48 | 0.37 |
|  | 1.84 | 1.86 | 0.26 | 1.61 |
|  | 1.49 | 1.67 | 1.24 | 1.99 |
|  | 2.31 | 2.08 | 2.33 | 1.76 |
|  | 1.86 | 1.19 | 1.91 | 1.54 |

It is noted that the values of conditions (77) to (79) are those for, in order from above, the object and image sides of the first positive lens, the object and image sides of the second negative lens, the object and image side of the third positive lens, and the object and image sides of the fourth positive lens, respectively.

In each example according to the fourth aspect of the invention, too, the maximum image height Ih on the image plane is defined by ½ of the diagonal length L of the (substantially rectangular) effective area of the image pickup device used, as explained with reference to FIGS. 17 and 18. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area. For details, see the explanation of the first aspect of the invention.

In Examples 1 to 3 according to the fourth aspect of the invention, the cover glass may be located just before the aperture stop S.

Throughout the above examples of the fourth aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1 to 3, that flare stop may be interposed at any desired position between the aperture stop S and the first lens L1, the first lens L1 and the second lens L2, the second lens L2 and the third lens L3, the third lens L3 and the fourth lens L4, and the fourth lens L4 and the image plane I, and in Example 4, it may be interposed at any desired position between the first lens L1 and the aperture stop S, the aperture stop S and the second lens L2, the second lens L2 and the third lens L3, the third lens L3 and the fourth lens L4, and the fourth lens L4 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

The imaging system according to the fourth aspect of the invention constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones.

What has been explained with reference to the digital camera of FIGS. 19–21, the personal computer of FIGS. 22–24 and the cellular phone of FIG. 25 according to the first aspect of the invention holds true for the image-formation optical system and the imaging system according to the fourth aspect of the invention. For details, see the explanation of the first aspect of the invention. However, it is noted that the image-formation optical system of Example 1 according to the fourth aspect of the invention is used as the optical system 41, 112 in the case of the digital camera as shown in FIG. 54 in place of FIG. 21, in the case of the personal computer as shown in FIG. 55 in place of FIG. 23, and in the case of the cellular phone as shown in FIG. 56 in place of FIG. 25.

Each example may be modified in various forms within the scope of what is recited in the claims.

The image-formation optical system according to the fourth aspect of the invention, and the imaging system incorporating the same, for instance, may be embodied as follows.

(1) An image-formation optical system, characterized by comprising, in order from an object side thereof, a first positive lens, a second negative lens, a third positive lens and a fourth positive lens, and satisfying the following condition:

$$-1.4 < f_2/f < -0.7 \tag{61}$$

where $f_2$ is the focal length of the second negative lens, and f is the focal length of the image-formation optical system.

(2) An imaging system comprising an image-formation optical system and an image pickup device located on an image side thereof, characterized in that said image-formation optical system is an image-formation optical system as recited in (1) above.

(3) An image-formation optical system, characterized by comprising, in order from an object side thereof, a first positive lens, a second negative lens of double-concave shape, a third positive lens and a fourth positive and satisfying the following condition.

$$5 < f_4/f < 200 \tag{62}$$

where $f_4$ is the focal length of the fourth positive lens, and f is the focal length of the image-formation optical system.

(4) An imaging system comprising an image-formation optical system and an image pickup device located on an image side thereof, characterized in that said image-formation optical system is an image-formation optical system as recited in (3) above.

(5) An image-formation optical system, characterized by comprising, in order from an object side thereof, a first positive lens, a second negative lens of double-concave shape, a third positive lens and a fourth positive lens and satisfying the following condition:

$$0.1 < f_{12}/f < 6 \tag{63}$$

where $f_{12}$ is the composite focal length of the first positive lens and the second negative lens, and f is the focal length of the image-formation optical system.

(6) An imaging system comprising an image-formation optical system and an image pickup device located on an image side thereof, characterized in that said image-formation optical system is an image-formation optical system as recited in (5) above.

(7) An image-formation optical system, characterized by comprising, in order from an object side thereof, a first positive lens, a second negative lens of double-concave shape, a third positive lens and a fourth positive lens and satisfying the following condition:

$$-1.3 < f_1/f_2 < -0.1 \tag{64}$$

where $f_1$ is the focal length of the first positive lens, and $f_2$ is the focal length of the second negative lens.

(8) An imaging system comprising an image-formation optical system and an image pickup device located on an image side thereof, characterized in that said image-formation optical system is an image-formation optical system as recited in (7) above.

(9) An image-formation optical system, characterized by comprising, in order from an object side thereof, a first positive lens, a second negative lens, a third positive lens and a fourth positive lens and satisfying the following conditions:

$$0.75 < f_{34}/f < 5 \tag{65}$$

$$-1 < f_2/f_3 < -0.5 \tag{66}$$

where $f_{34}$ is the composite focal length of the third positive lens and the fourth positive lens, f is the focal length of the image-formation optical system, $f_2$ is the focal length of the second negative lens, and $f_3$ is the focal length of the third positive lens.

(10) An imaging system comprising an image-formation optical system and an image pickup device located on an image side thereof, characterized in that said image-formation optical system is an image-formation optical system as recited in (9) above.

(11) An imaging system comprising an image-formation optical system and an image pickup device located on an image side thereof, characterized in that:

said image-formation optical system comprises, in order from an object side thereof, a first positive lens of double-convex shape, a second negative lens, a third positive lens of meniscus shape and a fourth positive lens, with an aperture stop located on an object side of the first positive lens, and satisfying the following condition:

$$1 < f_3/Ih < 3 \tag{67}$$

where $f_3$ is the focal length of the third positive lens, and Ih is the maximum image height of the image-formation optical system.

(12) The imaging system according to any one of (2), (10) and (11) above, characterized in that the second negative lens is of double-concave shape.

(13) The imaging system according to any one of (2), (4), (6), (8) and (10) above, characterized in that the third positive lens is of double-convex shape.

(14) The imaging system according to any one of (2), (4), (6), (8), (10) and (11) above, characterized in that the third positive lens is of a meniscus shape convex on an image side thereof.

(15) The imaging system according to any one of (2), (4), (8), (10) and (11), characterized in that the composite refracting power of the first positive lens and the second negative lens is positive.

(16) The imaging system according to any one of (2), (4), (6), (8), (10) and (11), characterized in that the composite refracting power of the second negative lens, the third positive lens and the fourth positive lens is negative.

(17) The imaging system according to any one of (2), (4), (6), (8), (10) and (11), characterized by satisfying the following condition:

$$0.5 < f_{12}/Ih < 50 \tag{68}$$

where $f_{12}$ is the composite focal length of the first positive lens and the second negative lens, and Ih is the maximum height of the image-formation optical system.

(18) The imaging system according to any one of (2), (4), (6), (8), (10) and (11), characterized by satisfying the following condition:

$$-100 < f_{234}/Ih < -0.5 \tag{69}$$

where $f_{234}$ is the composite focal length of the second negative lens, the third positive lens and the fourth positive lens, and Ih is the maximum image height of the image-formation optical system.

(19) The imaging system according to any one of (2), (4), (6), (8) and (10) above, characterized in that an aperture stop is located on an object side of the first positive lens.

(20) The imaging system according to any one of (2), (4), (6), (8) and (10) above, characterized in that an aperture stop is interposed between the first positive lens and the second negative lens.

(21) The imaging system according to any one of (2), (4), (6), (8) and (11) above, characterized by satisfying the following condition:

$$-1 < f_2/f_3 < -0.5 \quad (70)$$

where $f_2$ is the focal length of the second negative lens, and $f_3$ is the focal length of the third positive lens.

(22) The imaging system according to any one of (2), (4), (6), (8), (10) and (11) above, characterized by satisfying the following condition:

$$0.8 < f_2/r_6 < 5 \quad (71)$$

where $f_2$ is the focal length of the second negative lens, and $r_6$ is the axial radius of curvature of the image side-surface of the third positive lens.

(23) The imaging system according to any one of (2), (4), (6), (8), (10) and (11) above, characterized by satisfying the following condition:

$$-0.5 < f_1/f_{23} < 0.3 \quad (72)$$

where $f_1$ is the focal length of the first positive lens, and $f_{23}$ is the composite focal length of the second negative lens and the third positive lens.

(24) The imaging system according to any one of (2), (4), (6), (8), (10) and (11) above, characterized by satisfying the following condition:

$$0.4 < f_1/f_3 < 0.9 \quad (73)$$

where $f_1$ is the focal length of the first positive lens, and $f_3$ is the focal length of the third positive lens.

(25) The imaging system according to any one of (2), (4), (6), (8), (10) and (11), characterized by satisfying the following condition:

$$15° < \alpha < 40° \quad (74)$$

where $\alpha$ is the angle of incidence of a chief ray on the image plane at the maximum image height.

(26) The imaging system according to any one of (2), (4), (6), (8), (10) and (11), characterized by satisfying the following condition:

$$-1.5 < r_3/r_4 < -0.3 \quad (75)$$

where $r_3$ is the axial radius of curvature of the object side of the second negative lens, and $r_4$ is the axial radius of curvature of the image side of the second negative lens.

(27) The imaging system according to any one of (2), (4), (6), (8), (10) and (11), characterized by satisfying the following condition:

$$1.1 < r_5/r_6 < 20 \quad (76)$$

where $r_5$ is the axial radius of curvature of the object side of the third positive lens, and $r_6$ is the axial radius of curvature of the image side of the third positive lens.

(28) The imaging system according to any one of (2), (4), (6), (8), (10) and (11) above, characterized by comprising at least one aspheric surface that satisfies the following condition:

$$0.01 < |(r_{sp}+r_{asp})/(r_{sp}-r_{asp})-1| < 100 \quad (77)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(29) The imaging system according to any one of (2), (4), (6), (8), (10) and (11) above, characterized in that the second negative lens in said image-formation optical system comprises at least one aspheric surface that satisfies the following condition:

$$0.1 < |(r_{sp}+r_{asp})/(r_{sp}-r_{asp})-1| < 20 \quad (78)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(30) The imaging system according to any one of (2), (4), (6), (8), (10) and (11) above, characterized in that the third positive lens in said image-formation optical system comprises at least one aspheric surface that satisfies the following condition:

$$0.1 < |(r_{sp}+r_{asp})/(r_{sp}-r_{asp})-1| < 20 \quad (79)$$

where $r_{sp}$ is the axial radius of curvature of the aspheric surface, and $r_{asp}$ is a value that is obtained when a difference between a radius of curvature with the aspheric surface taken into account and an axial radius of curvature reaches a maximum in an optically effective range.

(31) An image-formation optical system, characterized by comprising, in order from an object side thereof, an aperture stop, a first positive lens, a second negative lens, a third positive lens and a fourth positive lens, wherein an aspheric surface is used at the second negative lens.

(32) An image-formation optical system, characterized by comprising, in order from an object side thereof, an aperture stop, a first positive lens, a second negative lens, a third positive lens and a fourth positive lens, wherein an aspheric surface is used at the third positive lens.

In accordance with the fourth aspect of the invention as described above, it is possible to provide a small-format yet high-performance image-formation optical system, and a small-format yet high-performance imaging system incorporating the same.

Examples 1 to 4 of the image-formation optical system according to the fifth aspect of the invention are given below. FIGS. 65 to 68 are illustrative in section of the lens arrangements of Examples 1 to 4 upon focused on an object point at infinity. In these figures, S stands for an aperture stop, L1 a first positive lens, L2 a second negative lens, L3 a third positive lens, L4 a fourth positive lens, CG a cover glass for an electronic image pickup device, I an image plane and FS a flare stop. It is noted that the cover glass CG may be provided on its surface with a wavelength range-limiting multilayer film with or without a low-pass filter function.

EXAMPLE 1

Figure 65:
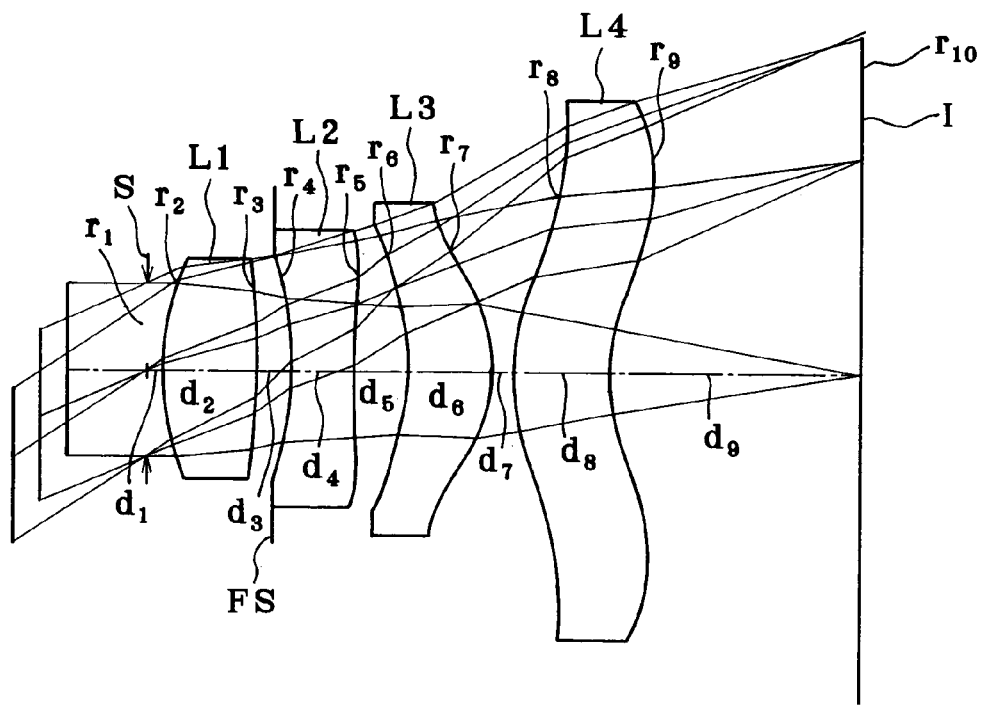
FIG. 65 is a lens arrangement section of Example 1 of the image-formation optical system according to the fifth aspect of the invention upon focused on an object point at infinity.

As shown in FIG. 65, the image-formation optical system of Example 1 is made up of, in order from its object side, an aperture stop S, a first positive lens L1 of double-convex shape, a second negative lens L2 that is of double-concave shape and has aspheric surfaces on both its sides, a third positive meniscus lens L3 that is convex on its image side and has aspheric surfaces on both its sides and a fourth positive meniscus lens L4 that is convex on its object side and has aspheric surfaces on both its sides. In the instant example, the first, second, third and fourth lenses L1, L2, L3 and L4 are all made of plastics. More specifically, the first, third and fourth lenses L1, L3 and L4 are each made of an amorphous polyolefin Zeonex (trade name), and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 0.985 mm for $2^{nd}$ surface $r_2$, 1.066 mm for $3^{rd}$ surface $r_3$, 1.1 mm for $4^{th}$ surface $r_4$, 1.343 mm for $5^{th}$ surface $r_5$, 1.398 mm for $6^{th}$ surface $r_6$, 1.605 mm for $7^{th}$ surface $r_7$, 2.374 mm for $8^{th}$ surface $r_8$ and 2.618 mm for $9^{th}$ surface $r_9$.

Further, a flare stop FS for cutting out off-axis light beams is interposed halfway between the first lens L1 and the second lens L2.

EXAMPLE 2

Figure 66:
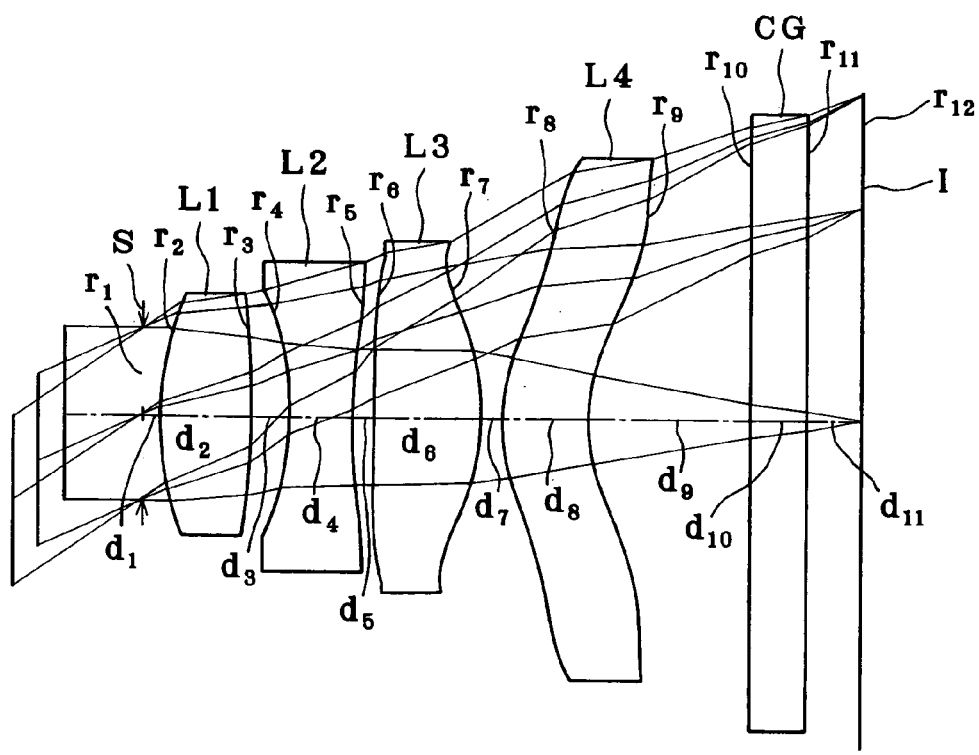
FIG. 66 is a lens arrangement section, similar to FIG. 65, of the image-formation optical system of Example 2.

As shown in FIG. 66, the image-formation optical system of Example 2 is made up of, in order from its object side, an aperture stop S, a first positive lens L1 that is of double-convex shape, a second negative lens L2 that is of double-concave shape and has aspheric surfaces on both its sides, a third positive meniscus lens L3 that is convex on its image side and has aspheric surfaces on both its side, a fourth positive meniscus lens L4 that is convex on its object side and has aspheric surfaces on both its sides and a cover glass CG. In the instant example, the first lens L1 is made of glass, and the second, third and fourth lenses L2, L3 and L4 are each made of plastics. More specifically, the second lens L2 is made up of Esthylene, and the third and fourth lenses L3 and L4 are each made of an amorphous polyolefin Zeonex.

The specifications of the wide-angle optical system according to this example are:

a focal length f=4.7 mm, an image height Ih=3.17 mm, and a half angle of view ω=34°.

The optically effective diameters of the respective lenses (on one sides) are 1.069 mm for $2^{nd}$ surface $r_2$, 1.176 mm for $3^{rd}$ surface $r_3$, 1.221 mm for $4^{th}$ surface $r_4$, 1.499 mm for $5^{th}$ surface $r_5$, 1.594 mm for $6^{th}$ surface $r_6$, 1.697 mm for $7^{th}$ surface $r_7$, 2.416 mm for $8^{th}$ surface $r_8$ and 2.522 mm for $9^{th}$ surface $r_9$.

EXAMPLE 3

Figure 67:
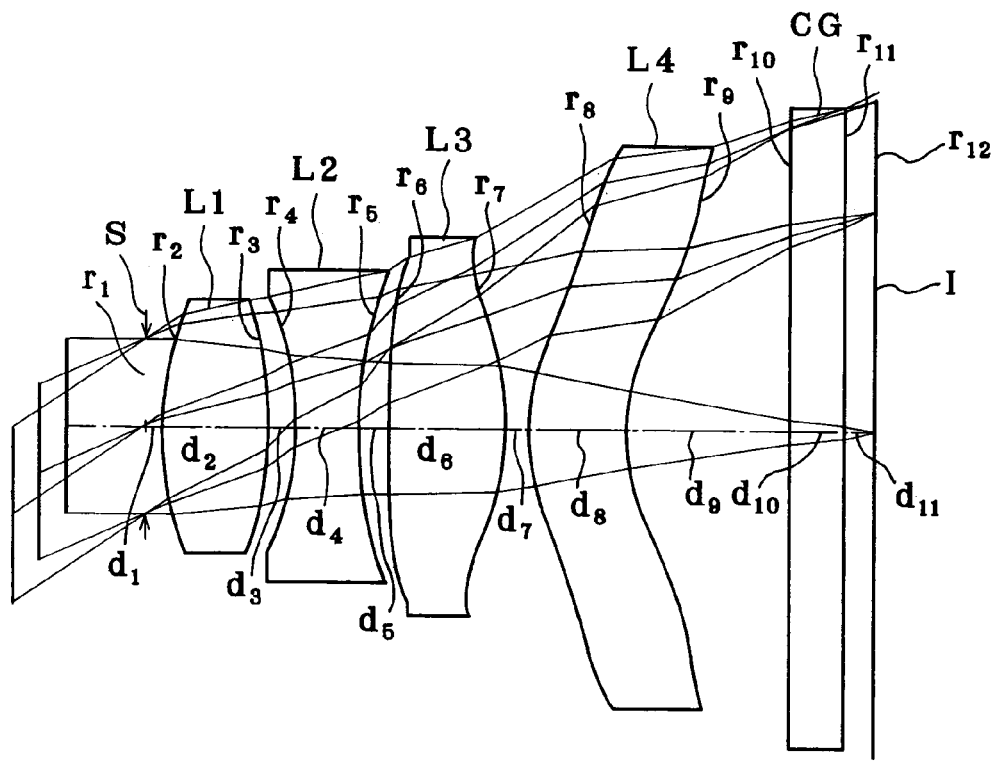
FIG. 67 is a lens arrangement section, similar to FIG. 65, of the image-formation optical system of Example 3.

As shown in FIG. 67, the image-formation optical system of Example 3 is made up of, in order from its object side, an aperture stop S, a first positive lens L1 that has an aspheric surface on its object side and is of double-convex shape, a second negative lens L2 that has an aspheric surface on its object side and is of double-concave shape, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first, second, third and fourth lenses L1, L2, L3 and L4 are all made of plastics; the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.08 mm for $2^{nd}$ surface $r_2$, 1.206 mm for $3^{rd}$ surface $r_3$, 1.237 mm for $4^{th}$ surface $r_4$, 1.485 mm for $5^{th}$ surface $r_5$, 1.643 mm for $6^{th}$ surface $r_6$, 1.795 mm for $7^{th}$ surface $r_7$, 2.596 mm for $8^{th}$ surface $r_8$ and 2.686 mm for $9^{th}$ surface $r_9$.

EXAMPLE 4

Figure 68:
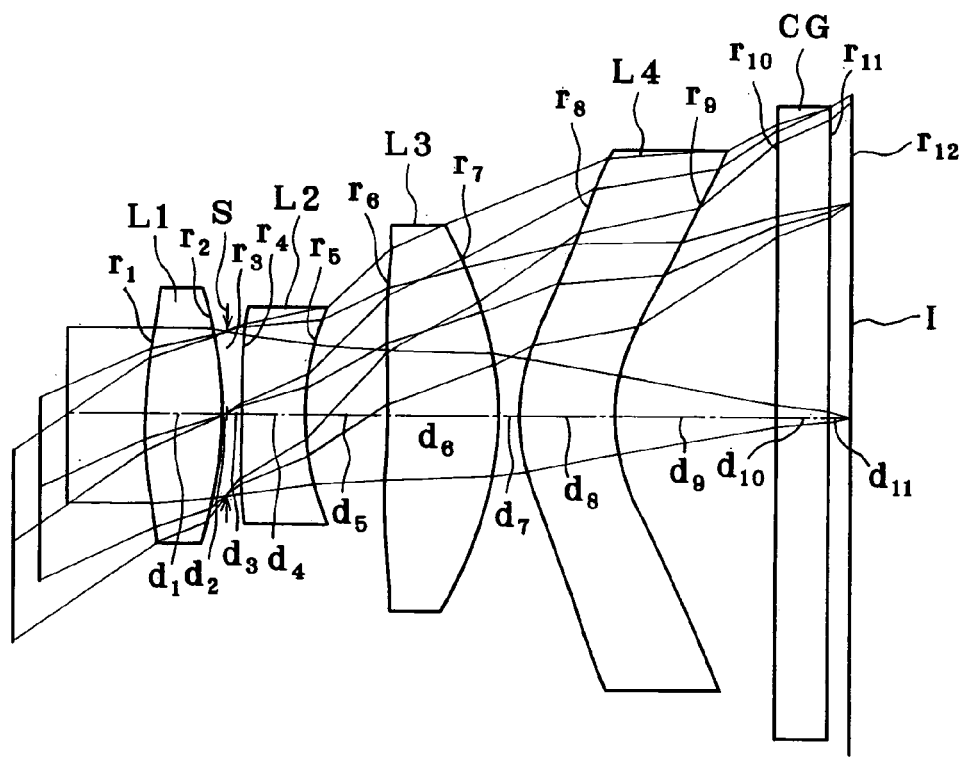
FIG. 68 is a lens arrangement section, similar to FIG. 65, of the image-formation optical system of Example 4.
Figure 69:
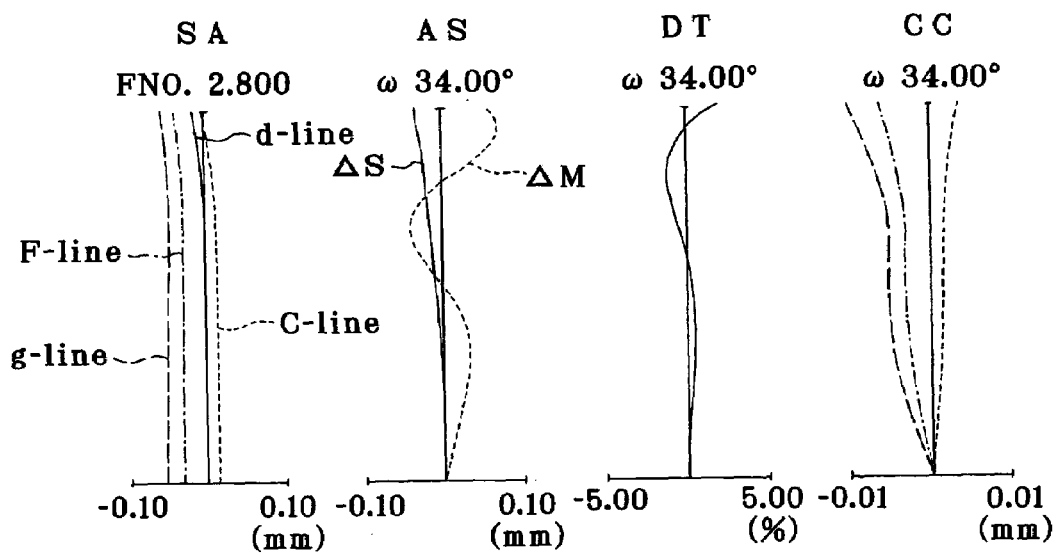
FIG. 69 is an aberration diagram for Example 1 upon focused on an object point at infinity.
Figure 70:
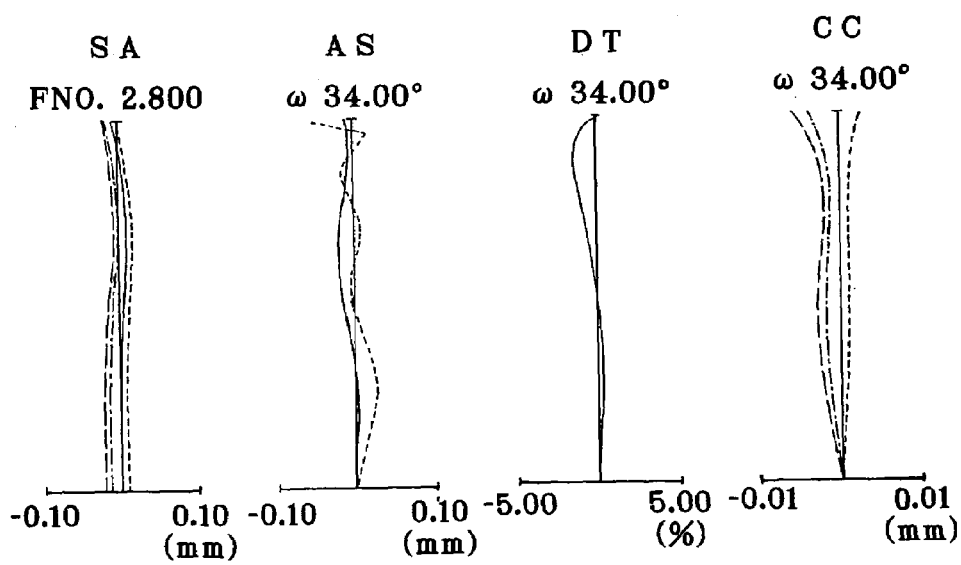
FIG. 70 is an aberration diagram for Example 2 upon focused on an object point at infinity.
Figure 71:
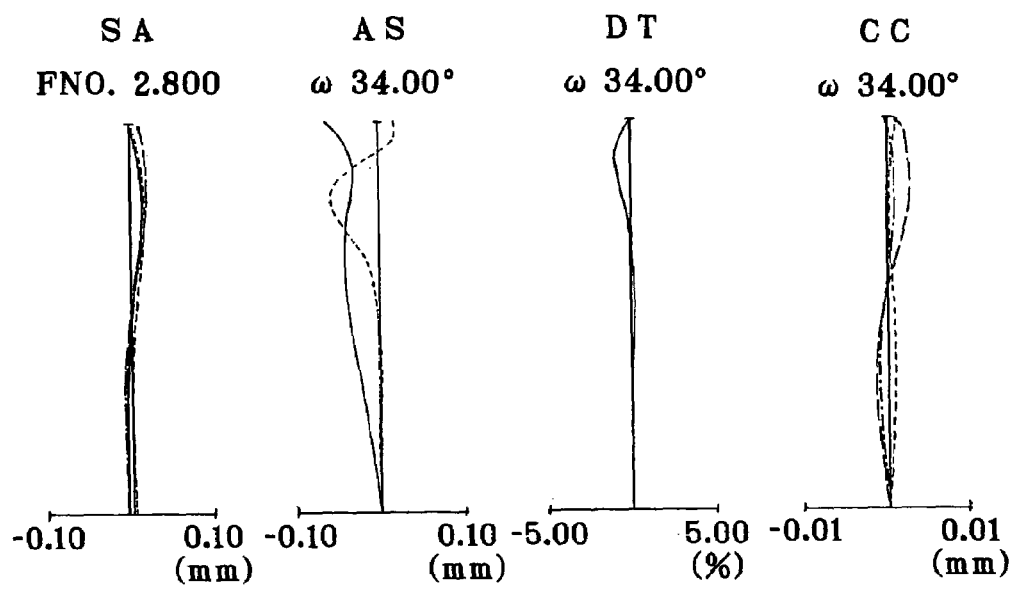
FIG. 71 is an aberration diagram for Example 3 upon focused on an object point at infinity.
Figure 72:
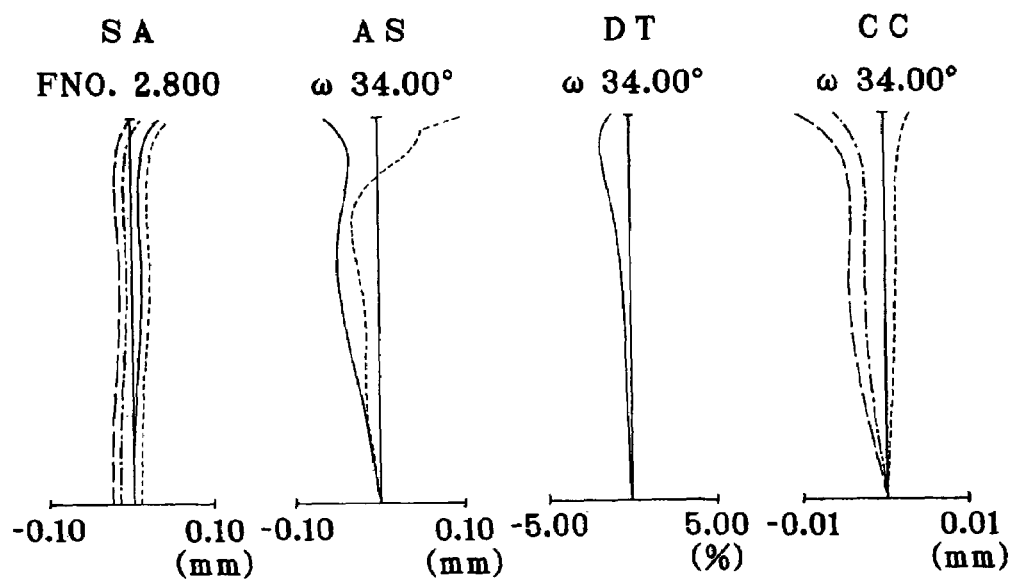
FIG. 72 is an aberration diagram for Example 4 upon focused on an object point at infinity.

As shown in FIG. 68, the image-formation optical system of Example 4 is made up of, in order from its object side, a first positive lens L1 that has an aspheric surface on its object side and is of double-convex shape, an aperture stop S, a second negative meniscus lens L2 that has an aspheric surface on its image side and is convex on its object side, a third positive meniscus lens L3 that is convex on its image side and has aspheric surfaces on both its sides, a fourth positive meniscus lens L4 that is convex on its object side and has aspheric surfaces on both its sides and a cover glass CG. In the instant example, the first, second, third and fourth lenses L1, L2, L3 and L4 are all made of plastics; the first, third and fourth lenses L1, L3 and L4 are each made of an amorphous polyolefin Zeonex, and the second lens L2 is made of polycarbonate.

The specifications of the wide-angle optical system according to this example are:

a focal length f=4.7 mm, an image height Ih=3.17 mm, and a half angle of view ω=34°.

The optically effective diameters of the respective lenses (on one sides) are 1.219 mm for $1^{st}$ surface $r_1$, 1.022 mm for $2^{nd}$ surface $r_2$, 0.856 mm for $4^{th}$ surface $r_4$, 1.036 mm for $5^{th}$ surface $r_5$, 1.616 mm for $6^{th}$ surface $r_6$, 1.841 mm for $7^{th}$ surface $r_7$, 2.503 mm for $8^{th}$ surface $r_8$ and 2.571 mm for $9^{th}$ surface $r_9$.

The numerical data on each example are given below. Symbols used hereinafter but not hereinbefore have the following meanings:

$r_1, r_2, \ldots$ : radius of curvature of each lens surface, $d_1, d_2, \ldots$ : spacing between adjacent lens surfaces, $n_{d1}, n_{d2}, \ldots$ : d-line refractive index of each lens, and $v_{d1}, v_{d2}, \ldots$ : Abbe number of each lens. It is noted that aspheric shape is given by the aforesaid equation (a).

EXAMPLE 1

| | | |
|---|---|---|
| $r_1 = \infty$(Stop) | $d_1 = 0.1500$ | |
| $r_2 = 2.8364$ | $d_2 = 0.9028$ | $n_{d1} = 1.52542$ $v_{d1} = 55.70$ |
| $r_3 = -8.3419$ | $d_3 = 0.3425$ | |
| $r_4 = -4.3919$(Aspheric) | $d_4 = 0.6000$ | $n_{d2} = 1.58423$ $v_{d2} = 30.40$ |
| $r_5 = 18.5501$(Aspheric) | $d_5 = 0.5093$ | |
| $r_6 = -1.9050$(Aspheric) | $d_6 = 0.7767$ | $n_{d3} = 1.52542$ $v_{d3} = 55.70$ |
| $r_7 = -1.5007$(Aspheric) | $d_7 = 0.2000$ | |
| $r_8 = 1.9964$(Aspheric) | $d_8 = 0.9090$ | $n_{d4} = 1.52542$ $v_{d4} = 55.70$ |
| $r_9 = 1.7159$(Aspheric) | $d_9 = 2.3097$ | |
| $r_{10} = \infty$(Image Plane) | | |

Aspherical Coefficients
4th surface

K = 7.1381
$A_4 = 4.0034 \times 10^{-3}$
$A_6 = -1.4903 \times 10^{-2}$
$A_8 = 6.4131 \times 10^{-3}$
$A_{10} = 0.0000$ -continued 5th surface K = 0
$A_4 = 8.3982 \times 10^{-3}$
$A_6 = -3.8234 \times 10^{-3}$
$A_8 = -7.3744 \times 10^{-3}$
$A_{10} = 0.0000$ 6th surface K = 0
$A_4 = 8.1884 \times 10^{-2}$
$A_6 = 1.6154 \times 10^{-2}$
$A_8 = -1.1018 \times 10^{-1}$
$A_{10} = 0.0000$ 7th surface K = -1.0079
$A_4 = 1.1127 \times 10^{-2}$
$A_6 = 9.6565 \times 10^{-3}$
$A_8 = 1.1138 \times 10^{-3}$
$A_{10} = 0.0000$ 8th surface K = -1.5841
$A_4 = -4.3508 \times 10^{-2}$
$A_6 = 4.8152 \times 10^{-3}$
$A_8 = -2.1719 \times 10^{-4}$
$A_{10} = 0.0000$ 9th surface K = -3.3708
$A_4 = -3.1495 \times 10^{-2}$
$A_6 = 2.3335 \times 10^{-3}$
$A_8 = -8.7619 \times 10^{-5}$
$A_{10} = 0.0000$

EXAMPLE 2

| | | | |
|---|---|---|---|
| $r_1 = \infty$(Stop) | $d_1 = 0.1500$ | | |
| $r_2 = 3.0843$ | $d_2 = 0.8564$ | $n_{d1} = 1.60311$ | $\nu_{d1} = 60.64$ |
| $r_3 = -10.6426$ | $d_3 = 0.3922$ | | |
| $r_4 = -3.3263$(Aspheric) | $d_4 = 0.6000$ | $n_{d2} = 1.57268$ | $\nu_{d2} = 33.51$ |
| $r_5 = 4.6349$(Aspheric) | $d_5 = 0.2000$ | | |
| $r_6 = -46.2321$(Aspheric) | $d_6 = 1.0375$ | $n_{d3} = 1.50913$ | $\nu_{d3} = 56.20$ |
| $r_7 = -2.2089$(Aspheric) | $d_7 = 0.2000$ | | |
| $r_8 = 1.7661$(Aspheric) | $d_8 = 0.8000$ | $n_{d4} = 1.50913$ | $\nu_{d4} = 56.20$ |
| $r_9 = 1.5032$(Aspheric) | $d_9 = 1.5351$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.5287$ | | |
| $r_{12} = \infty$(Image Plane) | | | |

Aspherical Coefficients
4 th surface

K = 4.6395
$A_4 = -3.0854 \times 10^{-2}$
$A_6 = 5.3138 \times 10^{-2}$
$A_8 = -2.6513 \times 10^{-2}$
$A_{10} = 9.0609 \times 10^{-3}$ 5 th surface K = -62.6728
$A_4 = 1.8267 \times 10^{-2}$
$A_6 = -1.7899 \times 10^{-2}$
$A_8 = 3.1652 \times 10^{-3}$
$A_{10} = 0.0000$ 6 th surface K = 771.1171
$A_4 = 5.7657 \times 10^{-2}$
$A_6 = -3.0982 \times 10^{-2}$
$A_8 = 6.6834 \times 10^{-3}$
$A_{10} = 0.0000$ -continued 7 th surface K = -1.0467
$A_4 = 2.2897 \times 10^{-2}$
$A_6 = -4.7964 \times 10^{-3}$
$A_8 = 2.9245 \times 10^{-3}$
$A_{10} = 1.6877 \times 10^{-4}$ 8 th surface K = -2.8210
$A_4 = -2.1878 \times 10^{-2}$
$A_6 = -2.9258 \times 10^{-3}$
$A_8 = 1.1735 \times 10^{-3}$
$A_{10} = -7.1091 \times 10^{-5}$ 9 th surface K = -2.5376
$A_4 = -3.6646 \times 10^{-2}$
$A_6 = 5.0100 \times 10^{-3}$
$A_8 = -6.5295 \times 10^{-4}$
$A_{10} = 5.2524 \times 10^{-5}$

EXAMPLE 3

| | | | |
|---|---|---|---|
| $r_1 = \infty$(Stop) | $d_1 = 0.1500$ | | |
| $r_2 = 2.7675$(Aspheric) | $d_2 = 0.9944$ | $n_{d1} = 1.52542$ | $\nu_{d1} = 55.70$ |
| $r_3 = -3.9842$ | $d_3 = 0.2655$ | | |
| $r_4 = -2.9654$(Aspheric) | $d_4 = 0.6000$ | $n_{d2} = 1.58423$ | $\nu_{d2} = 30.40$ |
| $r_5 = 4.3379$ | $d_5 = 0.2924$ | | |
| $r_6 = -15.7733$(Aspheric) | $d_6 = 1.0711$ | $n_{d3} = 1.52542$ | $\nu_{d3} = 55.70$ |
| $r_7 = -2.6974$(Aspheric) | $d_7 = 0.2000$ | | |
| $r_8 = 1.7654$(Aspheric) | $d_8 = 0.9331$ | $n_{d4} = 1.52542$ | $\nu_{d4} = 55.70$ |
| $r_9 = 1.5764$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2935$ | | |
| $r_{12} = \infty$(Image Plane) | | | |

Aspherical Coefficients
2 nd surface

K = -0.6179
$A_4 = -5.3251 \times 10^{-3}$
$A_6 = 3.8359 \times 10^{-3}$
$A_8 = -2.9080 \times 10^{-3}$
$A_{10} = 0.0000$ 4 th surface K = 0.8234
$A_4 = -8.7197 \times 10^{-3}$
$A_6 = 1.6416 \times 10^{-2}$
$A_8 = -1.4981 \times 10^{-3}$
$A_{10} = 0.0000$ 6 th surface K = -2244.4800
$A_4 = 4.6521 \times 10^{-2}$
$A_6 = -9.8281 \times 10^{-3}$
$A_8 = 9.8443 \times 10^{-4}$
$A_{10} = 0.0000$ 7 th surface K = -7.6779
$A_4 = -3.3112 \times 10^{-2}$
$A_6 = 1.7012 \times 10^{-2}$
$A_8 = -1.1825 \times 10^{-3}$
$A_{10} = 0.0000$ 8 th surface K = -4.1447
$A_4 = -1.6308 \times 10^{-3}$
$A_6 = -4.4703 \times 10^{-3}$
$A_8 = 9.3365 \times 10^{-4}$
$A_{10} = -4.9117 \times 10^{-5}$ -continued 9 th surface K = −3.2493
$A_4 = -8.8712 \times 10^{-3}$
$A_6 = -1.3958 \times 10^{-3}$
$A_8 = 1.9410 \times 10^{-4}$
$A_{10} = 0.0000$

EXAMPLE 4

| | | | |
|---|---|---|---|
| $r_1 = 3.8944$(Aspheric) | $d_1 = 0.7253$ | $n_{d1} = 1.52542$ | $\nu_{d1} = 55.70$ |
| $r_2 = -4.0192$ | $d_2 = 0.0500$ | | |
| $r_3 = \infty$(Stop) | $d_3 = 0.1500$ | | |
| $r_4 = 98.0982$(Aspheric) | $d_4 = 0.6000$ | $n_{d2} = 1.58423$ | $\nu_{d2} = 30.40$ |
| $r_5 = 2.6299$ | $d_5 = 0.7592$ | | |
| $r_6 = -10.9088$(Aspheric) | $d_6 = 1.0330$ | $n_{d3} = 1.52542$ | $\nu_{d3} = 55.70$ |
| $r_7 = -3.0597$(Aspheric) | $d_7 = 0.2000$ | | |
| $r_8 = 1.7442$(Aspheric) | $d_8 = 0.9000$ | $n_{d4} = 1.52542$ | $\nu_{d4} = 55.70$ |
| $r_9 = 1.4835$(Aspheric) | $d_9 = 1.5000$ | | |
| $r_{10} = \infty$ | $d_{10} = 0.5000$ | $n_{d5} = 1.51633$ | $\nu_{d5} = 64.14$ |
| $r_{11} = \infty$ | $d_{11} = 0.2000$ | | |
| $r_{12} = \infty$(Image Plane) | | | |

Aspherical Coefficients
1 st surface

K = −4.7442
$A_4 = -1.7837 \times 10^{-2}$
$A_6 = -5.6534 \times 10^{-3}$
$A_8 = -2.9540 \times 10^{-3}$
$A_{10} = 0.0000$ 4 th surface K = 0
$A_4 = 7.4894 \times 10^{-3}$
$A_6 = 2.9077 \times 10^{-2}$
$A_8 = -1.6418 \times 10^{-2}$
$A_{10} = 0.0000$ 6 th surface K = −572.4727
$A_4 = 2.5527 \times 10^{-2}$
$A_6 = -8.4825 \times 10^{-3}$
$A_8 = 1.3034 \times 10^{-3}$
$A_{10} = 0.0000$ 7 th surface K = −1.8546
$A_4 = -2.7323 \times 10^{-3}$
$A_6 = 2.4305 \times 10^{-3}$
$A_8 = -3.0941 \times 10^{-4}$
$A_{10} = 0.0000$ 8 th surface K = −3.5723
$A_4 = -6.7489 \times 10^{-3}$
$A_6 = -2.0623 \times 10^{-3}$
$A_8 = 6.1861 \times 10^{-4}$
$A_{10} = -3.8329 \times 10^{-5}$ 9 th surface K = −2.5764
$A_4 = -1.2584 \times 10^{-2}$
$A_6 = 4.6300 \times 10^{-4}$
$A_8 = 7.1300 \times 10^{-5}$
$A_{10} = 0.0000$ FIGS. 69 to 72 are aberration diagrams for Examples 1 to 4 upon focused at infinity. In these figures, "SA", "AS", "DT", "CC" and "ω" represent spherical aberrations, astigmatism, distortion, chromatic aberration of magnification and a half angle of view, respectively.

The values of conditions (81) to (94) in the respective examples are enumerated below.

| Conditions | Example 1 | Example 2 | Example 3 | Example 4 |
|---|---|---|---|---|
| (81) | 61.9 | 236.7 | 12.6 | 31.9 |
| (82) | −1.28 | −0.70 | −0.62 | −0.99 |
| (83) | 2.51 | 1.43 | 1.90 | 2.47 |
| (84) (85) | 2.81 | 20.83 | 6.41 | 3.62 |
| (86) | 27.63 | −53.74 | −3.77 | −8.97 |
| (87) | 20.0° | 25.0° | 25.0° | 35.3° |
| (88) | 0.08 | 0.08 | 0.06 | 0.08 |
| (89) | 0.51 | 0.90 | 0.54 | 0.50 |
| (90) | 1.19 | 1.37 | 1.47 | 1.44 |
| | 1.53 | 1.91 | 1.70 | 1.73 |
| (91) (92) | 0.43 | 0.41, 0.78 | 0.45, 0.76 | 0.50, 0.75 |
| | 0.35 | 0.39, 0.88 | 0.43, 0.87 | 0.51, 0.80 |
| (93) (94) | — | — | 18.96 | 2.32 |
| | — | — | — | — |
| | 5.12 | 14.72 | 9.55 | 0.35 |
| | 0.37 | 1.94 | — | — |
| | 3.81 | 0.23 | 0.48 | 1.08 |
| | 2.28 | 1.46 | 1.58 | 6.76 |
| | 1.99 | 2.40 | 2.66 | 2.85 |
| | 1.53 | 2.03 | 2.24 | 2.75 |

It is noted that the values of condition (90) in the upper and lower rows are those for the object and image sides, respectively; the values of conditions (91) and (92) in the upper and lower rows are those for the object and image sides, respectively, and two data are given in the example wherein there are two points of inflection; and the values of conditions (93) and (94) are those for, in order from above, the object and image sides of the first positive lens, the object and image sides of the second negative lens, the object and image side of the third positive lens and the object and image sides of the fourth positive lens, respectively.

In each example according to the fifth aspect of the invention, too, the maximum image height Ih on the image plane is defined by ½ of the diagonal length L of the (substantially rectangular) effective area of the image pickup device, as explained with reference to FIGS. 17 and 18. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area. For details, see the explanation of the first aspect of the invention.

In Examples 1 to 3 according to the fifth aspect of the invention, the cover glass may be located just before the aperture stop S.

Throughout the above examples of the fifth aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1 to 3, that flare stop may be interposed at any desired position between the aperture stop S and the first lens L1, the first lens L1 and the second lens L2, the second lens L2 and the third lens L3, the third lens L3 and the fourth lens L4, and the fourth lens L4 and the image plane I, and in Example 4, it may be interposed at any desired position between the first lens L1 and the aperture stop S, the aperture stop S and the second lens L2, the second lens L2 and the third lens L3, the third lens L3 and the fourth lens L4, and the fourth lens L4 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

The imaging system according to the fifth aspect of the invention constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones.

What has been explained with reference to the digital camera of FIGS. 19–21, the personal computer of FIGS. 22–24 and the cellular phone of FIG. 25 according to the first aspect of the invention holds true for the image-formation optical system and the imaging system according to the fifth aspect of the invention. For details, see the explanation of the first aspect of the invention. However, it is noted that the image-formation optical system of Example 2 according to the fifth aspect of the invention is used as the optical system 41, 112 in the case of the digital camera as shown in FIG. 54 in place of FIG. 21, in the case of the personal computer as shown in FIG. 55 in place of FIG. 23, and in the case of the cellular phone as shown in FIG. 56 in place of FIG. 25.

Each example may be modified in various forms within the scope of what is recited in the claims.

The image-formation optical system according to the fifth aspect of the invention, and the imaging system incorporating the same, for instance, may be embodied as follows.

(1) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens, and satisfies the following condition:

$$10 < f_4/Ih < 250 \qquad (81)$$

where $f_4$ is the focal length of the fourth positive lens, and Ih is the maximum image height of the image-formation optical system.

(2) An image-formation optical system, characterized by comprising, in order from an object side thereof, a first positive lens, a second negative lens, a third positive lens and a fourth positive lens of meniscus shape, and satisfying the following condition:

$$-2 < f_2/f < -0.65 \qquad (82)$$

where $f_2$ is the focal length of the second negative lens, and f is the focal length of the image-formation optical system.

(3) An imaging system comprising an image-formation optical system and an image pickup device located on an image side thereof, characterized in that said image-formation optical system is an image-formation optical system as recited in (2) above.

(4) An imaging system comprising an image-formation optical system and an image pickup device located on an image side thereof, characterized in that:

said image-formation optical system comprises, in order from an object side thereof, a first positive lens of double-convex shape, a second negative lens, a third positive lens and a fourth positive lens of meniscus shape, and satisfying the following condition:

$$1 < f_3/Ih < 3 \qquad (83)$$

where $f_3$ is the focal length of the third positive lens, and Ih is the maximum image height of the image-formation optical system.

(5) An imaging system comprising an image-formation optical system and an image pickup device located on an image side thereof, characterized in that:

said image-formation optical system comprises, in order from an object side thereof, a first positive lens, a second negative lens, a third positive lens and a fourth positive lens of meniscus shape, and satisfying the following condition:

$$0.5 < f_{12}/Ih < 25 \qquad (84)$$

where $f_{12}$ is the composite focal length of the first positive lens and the second negative lens, and Ih is the maximum image height of the image-formation optical system.

(6) The imaging system according to any one of (1) and (3)–(5) above, characterized in that the second negative lens is of double-concave shape.

(7) The imaging system according to any one of (1) and (3)–(5) above, characterized in that the third positive lens is of double-convex shape.

(8) The imaging system according to any one of (1) and (3)–(5) above, characterized in that the third positive lens is of a meniscus shape convex on an image side thereof.

(9) The imaging system according to any one of (1), (3) and (4) above, characterized in that the composite refracting power of the first positive lens and the second negative lens is power.

(10) The imaging system according to any one of (1) and (3)–(5) above, characterized in that the composite refracting power of the second negative lens, the third positive lens and the fourth positive lens is negative.

(11) The imaging system according to any one of (1), (3) and (4) above, characterized by satisfying the following condition:

$$0.5 < f_{12}/Ih < 50 \qquad (85)$$

where $f_{12}$ is the composite focal length of the first positive lens and the second negative lens, and Ih is the maximum image height of the image-formation optical system.

(12) The imaging system according to any one of (1) and (3)–(5) above, characterized by satisfying the following condition:

$$-100 < f_{234}/Ih < -0.5 \qquad (86)$$

where $f_{234}$ is the composite focal length of the second negative lens, the third positive lens and the fourth positive lens, and Ih is the maximum image height of the image-formation optical system.

(13) The imaging system according to any one of (1) and (3)–(5) above, characterized in that an aperture stop is located on an object side of the first positive lens.

(14) The imaging system according to any one of (1) and (3)–(5) above, characterized in that an aperture stop is interposed between the first positive lens and the second negative lens.

(15) The imaging system according to any one of (1) and (3)–(5) above, characterized by satisfying the following condition:

$$12° < \alpha < 40° \qquad (87)$$

where $\alpha$ is the angle of incidence of a chief ray on the image plane at the maximum image height.

(16) The imaging system according to any one of (1) and (3)–(5) above, characterized by satisfying the following condition:

$$-0.5 < (r_{4f} - r_{4r})/(r_{4f} + r_{4r}) < 0.2 \qquad (88)$$

where $r_{4f}$ is the axial radius of curvature of the object side of the fourth positive lens, and $r_{4r}$ is the axial radius of curvature of the image side of the fourth positive lens.

(17) The imaging system according to any one of (1) and (3)–(5) above, characterized by satisfying the following condition:

$$0.4 < f_1/f_3 < 0.9 \qquad (89)$$

where $f_1$ is the focal length of the first positive lens, and $f_3$ is the focal length of the third positive lens.

(18) The imaging system according to any one of (1) and (3)–(5) above, characterized by comprising an aspheric surface that satisfies the following condition:

$$1.0 < Ya/ra < 2.0 \qquad (90)$$

where Ya is the maximum height of a ray through the aspheric surface in the fourth positive lens, as measured from an optical axis of the optical system, and ra is the axial radius of curvature of the aspheric surface in the fourth positive lens.

(19) The imaging system according to any one of (1) and (3)–(5) above, characterized in that the fourth positive lens comprises an aspheric surface having at least one point of inflection that satisfies the following condition:

$$0.25 < Yca/Ya < 0.85 \qquad (91)$$

where Yca is the position, as measured from an optical axis of the optical system, of the point of inflection on the aspheric surface in the fourth positive lens, and Ya is the maximum height of a ray through the aspheric surface in the fourth positive lens, as measured from the optical axis.

(20) The imaging system according to any one of (1) to (3)–(5) above, characterized in that said image-formation optical system comprises an aspheric surface that satisfies the following condition:

$$0.01 < |(r_{sp} + r_{asp})/(r_{sp} - r_{asp}) - 1| < 100 \qquad (93)$$

where $r_{sp}$ is the axial radius of curvature of the aspheric surface, and $r_{asp}$ is a value that is obtained when a difference between the radius of curvature with the aspheric surface taken into account and the axial radius of curvature reaches a maximum in an optically effective range.

(21) The imaging system according to any one of (1) and (3)–(5) above, characterized in that the fourth positive lens comprises an aspheric surface that satisfies the following condition:

$$0.1 < |(r_{sp} + r_{asp})/(r_{sp} - r_{asp}) - 1| < 20 \qquad (94)$$

where $r_{sp}$ is the axial radius of curvature of the aspheric surface, and $r_{asp}$ is a value that is obtained when a difference between the radius of curvature with the aspheric surface taken into account and the axial radius of curvature reaches a maximum in an optically effective range.

(22) An image-formation optical system, characterized by comprising, in order from an object side thereof, a first positive lens, a second negative lens, a third positive lens and a fourth positive lens, wherein an aspheric surface is used at the fourth positive lens.

(23) An image-formation optical system, characterized by comprising, in order from an object side thereof, a first positive lens, a second negative lens, a third positive lens and a fourth positive lens, and satisfying the following condition:

$$1.0 < Ya/ra < 2.0 \qquad (90)$$

where Ya is the maximum height of a ray through the aspheric surface in the fourth positive lens, as measured from an optical axis of the optical system, and ra is the axial radius of curvature of the aspheric surface in the fourth positive lens.

(24) An image-formation optical system, characterized by comprising, in order from an object side thereof, a first positive lens, a second negative lens, a third positive lens and a fourth positive lens, wherein the fourth positive lens has an aspheric surface, and satisfying the following condition:

$$0.25 < Yca/Ya < 0.85 \qquad (91)$$

where Yca is the position, as measured from an optical axis of the optical system, of the point of inflection on the aspheric surface in the fourth positive lens, and Ya is the maximum height of a ray through the aspheric surface in the fourth positive lens, as measured from the optical axis.

In accordance with the fifth aspect of the invention, it is possible to provide a small-format yet high-performance image-formation optical system, and a small-format yet high-performance imaging system incorporating the same.

What we claim is:

1. An image-formation optical system comprising, in order from an object side thereof, a first positive lens, a second negative lens of double-concave shape, a third positive lens and a fourth positive meniscus lens convex on an object side thereof, including at least one aspheric surface, said aspheric surface located at the first positive lens and satisfying the following condition:

$$0.01 < |(r_{sp} + r_{asp})/(r_{sp} - r_{asp}) - 1| < 100 \qquad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the first positive lens and the second negative lens is positive.

2. An image-formation optical system comprising, in order from an object side thereof, a first positive lens of double-convex shape, a second negative lens, a third positive lens and a fourth positive lens of a meniscus shape convex on an object side thereof, including at least one aspheric surface, said aspheric surface located at the first positive lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the second negative lens, the third positive lens and the fourth positive lens is negative.

3. An image-formation optical system comprising, in order from an object side thereof, a first positive lens of double-convex shape, a second negative lens, a third positive lens of double-convex shape and a fourth positive lens of a meniscus lens convex on an object side thereof, including at least one aspheric surface, said aspheric surface located at the first positive lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four.

4. The image-formation optical system according to claim 1, wherein the first positive lens is of double-convex shape.

5. The image-formation optical system according to claim 1 or 2, wherein the third positive lens is of double-convex shape.

6. The image-formation optical system according to claim 1 or 3, wherein a composite focal length of the second negative lens, the third positive lens and the fourth positive lens is negative.

7. The image-formation optical system according to claim 2 or 3, wherein the second negative lens is of double-concave shape.

8. The image-formation optical system according to claim 1, wherein an aperture stop is located on an object side of the first positive lens.

9. The image-formation optical system according to claim 1, wherein an aperture stop is interposed between the first positive lens and the second negative lens.

10. An imaging system, comprising an image-formation optical system as recited in claim 1 and an electronic image pickup device located on an image side of the fourth positive lens.

11. The imaging system according to claim 10, which satisfies the following condition:

$$15°<\alpha<40° \quad (1)$$

where $\alpha$ is an angle of incidence of a chief ray on an image plane at a maximum image height.

12. The imaging system according to claim 10, which satisfies the following condition:

$$0.3<f_1/Ih<2.5 \quad (2)$$

where $f_1$ is a focal length of the first positive lens, and Ih is a maximum image height of the image-formation optical system.

13. The imaging system according to claim 10, which satisfies the following condition:

$$0.7<f_3/Ih<5.0 \quad (4)$$

where $f_3$ is a focal length of the third positive lens, and Ih is a maximum image height of the image-formation optical system.

14. The imaging system according to claim 10, which satisfies the following condition:

$$-50<f_{234}/Ih<-1.0 \quad (7)$$

where $f_{234}$ is a composite focal length of the second negative lens, the third positive lens and the fourth positive lens, and Ih is a maximum image height of the image-formation optical system.

15. The image-formation optical system according to claim 1, which satisfies the following condition:

$$-0.2<f_2/f<-0.3 \quad (3)$$

where $f_2$ is a focal length of the second negative lens, and f is a focal length of the image-formation optical system.

16. The image-formation optical system according to claim 1, which satisfies the following condition:

$$1.5<f_4/f<500 \quad (5)$$

where $f_4$ is a focal length of the fourth positive lens, and f is a focal length of the image-formation optical system.

17. The image-formation optical system according to claim 1, which satisfies the following condition:

$$-0.9<(r_{1f}+r_{1r})/(r_{1f}-r_{1r})<0.5 \quad (8)$$

where $r_{1f}$ is an axial radius of curvature of an object side-surface of the first positive lens, and $r_{1r}$ is an axial radius of curvature of an image side-surface of the first positive lens.

18. The image-formation optical system according to claim 1, which satisfies the following condition:

$$-0.8<(r_{2f}+r_{2r})/(r_{2f}+r_{2r})<1.0 \quad (9)$$

where $r_{2f}$ is an axial radius of curvature of an object side-surface of the second negative lens, and $r_{2r}$ is an axial radius of curvature of an image side-surface of the second negative lens.

19. The image-formation optical system according to claim 1, which satisfies the following condition:

$$1<(r_{3f}+r_{3r})/(r_{3f}-r_{3r})<10 \quad (10)$$

where $r_{3f}$ is an axial radius of curvature of an object side-surface of the third positive lens, and $r_{3r}$ is an axial radius of curvature of an image side-surface of the third positive lens.

20. The image-formation optical system according to claim 1, which satisfies the following condition:

$$-0.3<(r_{4f}-r_{4r})/(r_{4f}+r_{4r})<0.3 \quad (12)$$

where $r_{4f}$ is an axial radius of curvature of an object side-surface of the fourth positive lens, and $r_{4r}$ is an axial radius of curvature of an image side-surface of the fourth positive lens.

21. The image-formation optical system according to claim 3, wherein a composite focal length of the first positive lens and the second negative lens is positive.

22. The image-formation optical system according to claim 3, which satisfies the following condition:

$$0<(r_{3f}+r_{3r})/(r_{3f}-r_{3r})<0.99 \qquad (11)$$

where $r_{3f}$ is an axial radius of curvature of an object side-surface of the third positive lens, and $r_{3r}$ is an axial radius of curvature of an image side-surface of the third positive lens.

23. An imaging system comprising, an image-formation optical system comprising, in order from an object side thereof, a first positive lens, a second negative lens of double-concave shape, a third positive lens and a fourth positive meniscus lens convex on an object side thereof, including at least one aspheric surface, said aspheric surface located at the second negative lens and satisfying the following condition:

$$0.01<|(r_{sp}+r_{asp})/(r_{sp}-r_{asp})-1|<100 \qquad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the first positive lens and the second negative lens is positive, and an electronic image pickup device located on an image side of the fourth positive lens.

24. An imaging system comprising, an image-formation optical system comprising, in order from an object side thereof, a first positive lens, a second negative lens of double-concave shape, a third positive lens and a fourth positive meniscus lens convex on an object side thereof, including at least one aspheric surface, said aspheric surface located at the third positive lens and satisfying the following condition:

$$0.01<|(r_{sp}+r_{asp})/(r_{sp}-r_{asp})-1|<100 \qquad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the first positive lens and the second negative lens is positive, and an electronic image pickup device located on an image side of the fourth positive lens.

25. An imaging system comprising, an image-formation optical system comprising, in order from an object side thereof, a first positive lens, a second negative lens of double-concave shape, a third positive lens and a fourth positive meniscus lens convex on an object side thereof, including at least one aspheric surface, said aspheric surface located at the fourth positive lens and satisfying the following condition:

$$0.01<|(r_{sp}+r_{asp})/(r_{sp}-r_{asp})-1|<100 \qquad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the first positive lens and the second negative lens is positive, and an electronic image pickup device located on an image side of the fourth positive lens.

26. An imaging system comprising an image-formation optical system and an image pickup device located on an image side thereof, wherein:

said image-formation optical system comprises, in order from an object side thereof, a first positive lens of double-convex shape, a second negative lens, a third positive lens and a fourth positive lens of meniscus shape, and satisfies the following condition, provided that a total number of lens elements in the image-formation optical system is four:

$$0.5<f_1/Ih<1.8 \qquad (41)$$

where $f_1$ is a focal length of the first positive lens, and Ih is a maximum image height of the image-formation optical system.

27. An image-formation optical system, which comprises, in order from an object side thereof, an aperture stop, a first positive lens, a second negative lens, a third positive lens and a fourth positive lens, wherein a total number of lens elements is four and an aspheric surface is used at the first positive lens.

28. An image-formation optical system, which comprises, in order from an object side thereof, an aperture stop, a first positive lens, a second negative lens, a third positive lens and a fourth positive lens, wherein an aspheric surface is used at the second negative lens and a total number of lens elements is four.

29. An image-formation optical system, which comprises, in order from an object side thereof, an aperture stop, a first positive lens, a second negative lens, a third positive lens and a fourth positive lens, wherein an aspheric surface is used at the third positive lens and a total number of lens elements is four.

30. An image-formation optical system comprising, in order from an object side thereof, a first positive lens, a second negative lens of double-concave shape, a third positive lens of a meniscus shape convex on an image side thereof and a fourth positive meniscus lens convex on an object side thereof, wherein a total number of lens elements is four and a composite focal length of the first positive lens and the second negative lens is positive.

31. An image-formation optical system comprising, in order from an object side thereof, a first positive lens of double-convex shape, a second negative lens, a third positive lens of a meniscus shape convex on an image side thereof and a fourth positive lens of a meniscus shape convex on an object side thereof, wherein a total number of lens elements is four and a composite focal length of the second negative lens, the third positive lens and the fourth positive lens is negative.

32. An image-formation optical system comprising, in order from an object side thereof, a first positive lens of double-convex shape, a second negative lens, a third positive lens of double-convex shape and a fourth positive lens of a meniscus lens convex on an object side thereof, and satisfying the following condition:

$$1<(r_{3f}+r_{3r})/(r_{3f}-r_{3r})<10 \qquad (10)$$

where $r_{3f}$ is an axial radius of curvature of an object side-surface of the third positive lens, and $r_{3r}$ is an axial radius of curvature of an image side-surface of the third positive lens, wherein a total number of lens elements is four.

33. An image-formation optical system comprising, in order from an object side thereof, a first positive lens, a second negative lens of double-concave shape, a third positive lens and a fourth positive meniscus lens convex on an object side thereof, wherein a total number of lens elements is four and a composite focal length of the first positive lens and the second negative lens is positive and wherein said image-formation optical system comprises at least one aspheric surface, said aspheric surface located at the second negative lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range.

34. An image-formation optical system comprising, in order from an object side thereof, a first positive lens of double-convex shape, a second negative lens, a third positive lens and a fourth positive lens of a meniscus shape convex on an object side thereof, including at least one aspheric surface, said aspheric surface located at the second negative lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the second negative lens, the third positive lens and the fourth positive lens is negative.

35. An image-formation optical system comprising, in order from an object side thereof, a first positive lens of double-convex shape, a second negative lens, a third positive lens of double-convex shape and a fourth positive lens of a meniscus lens convex on an object side thereof, including at least one aspheric surface, said aspheric surface located at the second negative lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four.

36. An image-formation optical system comprising, in order from an object side thereof, a first positive lens, a second negative lens of double-concave shape, a third positive lens and a fourth positive meniscus lens convex on an object side thereof, including at least one aspheric surface, said aspheric surface located at the third positive lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the first positive lens and the second negative lens is positive.

37. An image-formation optical system comprising, in order from an object side thereof, a first positive lens of double-convex shape, a second negative lens, a third positive lens and a fourth positive lens of a meniscus shape convex on an object side thereof, including at least one aspheric surface, said aspheric surface located at the third positive lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four and a composite focal length of the second negative lens, the third positive lens and the fourth positive lens is negative.

38. An image-formation optical system comprising, in order from an object side thereof, a first positive lens of double-convex shape, a second negative lens, a third positive lens of double-convex shape and a fourth positive lens of a meniscus lens convex on an object side thereof, including at least one aspheric surface, said aspheric surface located at the third positive lens and satisfying the following condition:

$$0.01<|(r_{sp}+r_{asp})/(r_{sp}-r_{asp})-1|<100 \quad (13)$$

where $r_{sp}$ is an axial radius of curvature of the aspheric surface, and $r_{asp}$ is a value that is obtained when a difference between a radius of curvature with the aspheric surface taken into account and an axial radius of curvature reaches a maximum in an optically effective range, wherein a total number of lens elements is four.

39. An image-formation optical system comprising, in order from an object side thereof, a first positive lens, a second negative lens of double-concave shape, a third positive lens and a fourth positive meniscus lens convex on an object side thereof, which satisfies the following condition:

$$1.0<f_{12}/f<50.0 \quad (6)$$

where $f_{12}$ is a composite focal length of the first positive lens and the second negative lens, and f is a focal length of the image-formation optical system, wherein a total number of lens elements is four and a composite focal length of the first positive lens and the second negative lens is positive.

40. An image-formation optical system comprising, in order from an object side thereof, a first positive lens of double-convex shape, a second negative lens, a third positive lens and a fourth positive lens of a meniscus shape convex on an object side thereof, which satisfies the following condition:

$$1.0<f_{12}/f<50.0 \quad (6)$$

where $f_{12}$ is a composite focal length of the first positive lens and the second negative lens, and f is a focal length of the image-formation optical system, wherein a total number of lens elements is four and a composite focal length of the second negative lens, the third positive lens and the fourth positive lens is negative.

41. An image-formation optical system comprising, in order from an object side thereof, a first positive lens of double-convex shape, a second negative lens, a third positive lens of double-convex shape and a fourth positive lens of a meniscus lens convex on an object side thereof, which satisfies the following condition:

$$1.0 < f_{12}/f < 50.0 \qquad (6)$$

where $f_{12}$ is a composite focal length of the first positive lens and the second negative lens, and f is a focal length of the image-formation optical system, wherein a total number of lens elements is four.

42. An image-formation optical system comprising, in order from an object side thereof, a first positive lens, a second negative lens of double-concave shape, a third positive lens and a fourth positive meniscus lens convex on an object side thereof, which satisfies the following condition:

$$-50 < f_{234}/Ih < -1.0 \qquad (7)$$

where $f_{234}$ is a composite focal length of the second negative lens, the third positive lens and the fourth positive lens, and Ih is a maximum image height of the image-formation optical system, wherein a total number of lens elements is four and a composite focal length of the first positive lens and the second negative lens is positive.

43. An image-formation optical system comprising, in order from an object side thereof, a first positive lens of shape, a second negative lens, a third positive lens and a fourth positive lens of a meniscus shape convex on an object side thereof, which satisfies the following condition:

$$-50 < f_{234}/Ih < -1.0 \qquad (7)$$

where $f_{234}$ is a composite focal length of the second negative lens, the third positive lens and the fourth positive lens, and Ih is a maximum image height of the image-formation optical system, wherein a total number of lens elements is four and a composite focal length of the second negative lens, the third positive lens and the fourth positive lens is negative.

44. An image-formation optical system comprising, in order from an object side thereof, a first positive lens of double-convex shape, a second negative lens, a third positive lens of double-convex shape and a fourth positive lens of a meniscus lens convex on an object side thereof, which satisfies the following condition:

$$-50 < f_{234}/Ih < -1.0 \qquad (7)$$

where $f_{234}$ is a composite focal length of the second negative lens, the third positive lens and the fourth positive lens, and Ih is a maximum image height of the image-formation optical system, wherein a total number of lens elements is four.

* * * * *

UNITED STATES PATENT AND TRADEMARK OFFICE
CERTIFICATE OF CORRECTION

PATENT NO. : 7,206,143 B2  
APPLICATION NO. : 10/838638  
DATED : April 17, 2007  
INVENTOR(S) : Yuji Kamo et al.

Page 1 of 1

It is certified that error appears in the above-identified patent and that said Letters Patent is hereby corrected as shown below:

Column 140, line 26, change " -0.2" to -- -2.0-- and

Column 140, line 46, change " $-0.8<(r_{2f}+r_{2r})/(r_{2f}+r_{2r})<10$" to -- $-0.8<(r_{2f}+r_{2r})/(r_{2f}-r_{2r})<10$--.

Signed and Sealed this

Fourth Day of December, 2007

JON W. DUDAS  
*Director of the United States Patent and Trademark Office*